(12) United States Patent
Chen et al.

(10) Patent No.: US 10,392,471 B2
(45) Date of Patent: Aug. 27, 2019

(54) POLYMERS AND METHODS OF MAKING THE SAME

(71) Applicant: Iowa State University Research Foundation, Inc., Ames, IA (US)

(72) Inventors: Jason Shih-Hao Chen, Ames, IA (US); Michael Dennis Zenner, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 513 days.

(21) Appl. No.: 15/153,234

(22) Filed: May 12, 2016

(65) Prior Publication Data

US 2016/0333143 A1    Nov. 17, 2016

Related U.S. Application Data

(60) Provisional application No. 62/161,395, filed on May 14, 2015.

(51) Int. Cl.
*C08G 63/78* (2006.01)
*C08G 63/00* (2006.01)
*C08G 63/676* (2006.01)

(52) U.S. Cl.
CPC ............. *C08G 63/78* (2013.01); *C08G 63/00* (2013.01); *C08G 63/676* (2013.01)

(58) Field of Classification Search
None
See application file for complete search history.

(56) References Cited

U.S. PATENT DOCUMENTS

| 4,013,688 A | 3/1977 | Babcock et al. |
| 4,383,051 A | 5/1983 | Meyborg et al. |

(Continued)

FOREIGN PATENT DOCUMENTS

| CN | 1384109 A | 12/2002 |
| CN | 103044669 A | 4/2013 |

(Continued)

OTHER PUBLICATIONS

"U.S. Appl. No. 15/581,229, Notice of Allowance dated Nov. 24, 2017", 9 pgs.

(Continued)

*Primary Examiner* — Catherine S Branch
(74) *Attorney, Agent, or Firm* — Schwegman Lundberg & Woessner, P.A.

(57) ABSTRACT

Various embodiments disclosed relate to polymers and methods of making the same. In various embodiments, the present invention provides a method of forming a polymer including subjecting a composition including a carboxylic acid having the structure $(R^f\text{—}O)_{z1}\text{—}R^a$ to conditions sufficient to form a polymer having the structure $R^{eg}\text{—}[O\text{—}R^a(O\text{—}R^b)_{z1\text{-}2}\text{—}O\text{—}C(O)\text{—}R'(O\text{—}R^d)_{z2\text{-}1}\text{—}C(O)]_n\text{—}O\text{—}R^a(O\text{—}R^b)_{z1\text{-}2}\text{—}O\text{—}R^{eg}$ or a salt or ester thereof, wherein $R^a$, $R'$, $R^b$, $R^d$, $R^f$, $R^{eg}$, z1, z2, and n are as defined herein. In various embodiments, the polymer is a tackifier, a viscosifier, or a combination thereof.

15 Claims, 11 Drawing Sheets

(56) References Cited

U.S. PATENT DOCUMENTS

| | | |
|---|---|---|
| 4,559,351 A | 12/1985 | Stoss et al. |
| 4,791,156 A | 12/1988 | Hostettler |
| 6,737,481 B1 | 5/2004 | Kurian et al. |
| 7,619,056 B2 | 11/2009 | East et al. |
| 9,556,293 B2 | 1/2017 | Chen et al. |
| 9,688,794 B2 | 6/2017 | Chen et al. |
| 9,920,145 B2 | 3/2018 | Chen et al. |
| 10,081,638 B2 | 9/2018 | Chen et al. |
| 2003/0212244 A1 | 11/2003 | Hayes et al. |
| 2009/0018300 A1 | 1/2009 | Bloom et al. |
| 2012/0071577 A1 | 3/2012 | Pfeffer et al. |
| 2012/0073472 A1 | 3/2012 | Spyrou et al. |
| 2014/0249285 A1 | 9/2014 | Palmese et al. |
| 2015/0274861 A1 | 10/2015 | Chen et al. |
| 2015/0274880 A1 | 10/2015 | Chen et al. |
| 2017/0044178 A1 | 2/2017 | Chen |
| 2017/0226243 A1 | 8/2017 | Chen et al. |
| 2018/0148524 A1 | 5/2018 | Chen et al. |

FOREIGN PATENT DOCUMENTS

| | | |
|---|---|---|
| DE | 102007006442 A1 | 8/2008 |
| EP | 0114270 A1 | 8/1984 |
| JP | 2002265419 A | 9/2002 |
| KR | 20130070970 A | 6/2013 |
| WO | WO-9636639 A1 | 11/1996 |
| WO | WO-0108677 A1 | 2/2001 |
| WO | WO-2004098538 A2 | 11/2004 |
| WO | WO-2010138842 A1 | 12/2010 |
| WO | WO-2013066461 A2 | 5/2013 |
| WO | WO-2014062625 A1 | 4/2014 |
| WO | WO-2014062631 A1 | 4/2014 |

OTHER PUBLICATIONS

"U.S. Appl. No. 15/881,117, Preliminary Amendment filed Jan. 29, 2018", 14 pgs.

"U.S. Appl. No. 15/336,450, Notice of Allowance dated Jun. 16, 2018", 8 pgs.

"International Application Serial No. PCT/US2013/064960, International Preliminary Report on Patentability dated Apr. 30, 2015", 12 pgs.

"International Application Serial No. PCT/US2013/064960, International Search Report dated Feb. 4, 2014", 8 pgs.

"International Application Serial No. PCT/US2013/064960, Written Opinion dated Feb. 4, 2014", 10 pgs.

"International Application Serial No. PCT/US2013/064972, International Preliminary Report on Patentability dated Apr. 30, 2015", 10 pgs.

"International Application Serial No. PCT/US2013/064972, International Search Report dated Feb. 4, 2014", 5 pgs.

"International Application Serial No. PCT/US2013/064972, Written Opinion dated Feb. 4, 2014", 8 pgs.

Bachmann, Frank, et al., "Synthesis of Novel Polyurethanes and Polyureas by Polyaddition Reactions of Dianhydrohexitol Configurated Diisocyanates", Macromol. Chem. Phys., vol. 202, No. 17, (Jan. 1, 2001), 3410-3419.

Barros, Thalita G, et al., "Novel Peptide Mimetics Based on N-protected Amino Acids Derived from Isomannide as Potential Inhibitors of NS3 Serine Protease of Hepatitis C Virus", Letters in Organic Chemistry, vol. 9, No. 4, (Feb. 1, 2012), 239-249.

Beldi, M., et al., "Characterization of cyclic and non-cyclic poly(ether-urethane)s bio-based sugar diols by a combination of MALDI-TOF and NMR", European Polymer Journal, 43, (2007), 3415-3433.

Cocker, J. D, et al., "Action of some steroids on the central nervous system of the mouse. I. Synthetic methods", Journal of Medicinal Chemistry 8(4), (1965).

Feng, Xianhong, et al., "Overview of advances in sugar-based polymers", Polymers for Advanced Technologies, vol. 22, No. 1, (Jan. 10, 2011), 139-150.

Garaleh, Mazen, et al., "(Co-)Polyesters Derived from Isosorbide and 1,4-Cyclohexane Dicarboxylic Acid and Succinic Acid", Macromol. Chem. Phys., 211, (2010), 1206-1214.

Gohil, R. M., "Properties and Strain Hardening Character of Polyethylene Terephthalate Containing Isosorbide", Polymer Engineering and Science, (2009), 544-553.

Hojabri, Leila, et al., "Fatty Acid-Derived Diisocyanate and Biobased Polyurethane Produced from Vegetable Oil: Synthesis, Polymerization, and Characterization", Biomacromolecules, 10, (1009), 884-891.

Hojabri, Leila, et al., "Novel Long Chain Unsaturated Diisocyanate from Fatty Acid: Synthesis, Characterization, and Application in Bio-Based Polyurethane", Journal of Polymer Science: Part A: Polymer Chemistry, 48, (2010), 3302-3310.

Imm, Sebastian, et al., "Improved Ruthenium-Catalyzed Amination of Alcohols with Ammonia: Synthesis of Diamines and Amino Esters", Angew. Chem. Int. Ed., 50, (2011), 7599-7603.

Lee, Chi-Han, et al., "Synthesis, Characterization, and Properties of Polyurethanes Containing 1,4:3,6-Dianhydro-D-sorbitol", Journal of Polymer Science: Part A: Polymer Chemistry, 47, (2009), 6025-6031.

Li, Ruilin, et al., "Synthesis and antifertility activities of A-nor-steroidal compounds", Yiyao Gongye, 17(9), (1987).

Marin, Romina, et al., "Carbohydrate-Based Poly(ester-urethane)s: A Comparative Study Regarding Cyclic Alditols Extenders and Polymerization Procedures", Journal of Applied Polymer Science, 114, (2009), 3723-3736.

Min, Zhen Li, et al., "Asymmetric synthesis of 3-butylphthalide using isomannide and isosorbide as chiral auxiliaries", Chinese Chemical Letters, vol. 18, No. 11, (Nov. 5, 2007), 1361-1363.

Nakamura, Yoshinobu, et al., "Effects of the Compatibility of a Polyacrylic Block Copolymer/Tackifier Blend on the Phase Structure and Tack of a Pressure-Sensitive Adhesive", Journal of Applied Polymer Science, vol. 123, No. 5, (Mar. 5, 2012), 2883-2893.

Rose, Marcus, et al., "Isosorbide as a Renewable Platform chemical for Versatile Applications—Quo Vadis?", ChemSusChem, 5, (2012), 167-176.

Sabiong, Rafaei, et al., "Incorporation of Isosorbide into Poly(butyiene terephthalate) via Solid-State Polymerization", Macromolecules, American Chemical Society, vol. 9, (Nov. 10, 2008), 3090-3097.

Scalia, Santo, et al., "HPLC determination of ursodeoxycholic acid disuccinate in tablet formulations", (1991), 2 pgs.

Thiem, Joachim, et al., "Synthesis and properties of polyurethanes derived from diaminodianhydroalditols", Makromol. Chem., 187, (1986), 2775-2785.

Varkey, Elizabeth Chirackal, et al., "Isosorbide based chiral polyurethanes: optical and thermal studies", Journal of Materials Science, vol. 45, No. 7, (Jan. 13, 2010), 1912-1920.

Zenner, Michael D, et al., "Polyurethanes from Isosorbide-Based Diisocyanates", ChemSusChem, 6, (2013), 1182-1185.

"U.S. Appl. No. 16/018,148, Preliminary Amendment filed Jun. 26, 2018", 8 pgs.

"U.S. Appl. No. 15/336,450, Response Filed May 11, 2018 to Non Final Office Action dated Feb. 15, 2018", 8 pgs.

"U.S. Appl. No. 14/434,710, Restriction Requirement dated Jul. 6, 2016", 10 pgs.

"U.S. Appl. No. 14/434,719, Restriction Requirement dated Aug. 25, 2016", 8 pgs.

"U.S. Appl. No. 14/434,710, Response filed Aug. 24, 2016 to Restriction Requirement dated Jul. 6, 2016", 12 pgs.

"U.S. Appl. No. 14/434,710, Notice of Allowance dated Sep. 21, 2016", 9 pgs.

"U.S. Appl. No. 14/434,719, Response filed Oct. 11, 2016 to Restriction Requirement dated Aug. 25, 2016", 13 pgs.

"Application Serial No. Preliminary Amendment filed Apr. 9, 2015", 13 pgs.

"U.S. Appl. No. 14/434,719, Notice of Allowance dated Mar. 23, 2017", 11 pgs.

"U.S. Appl. No. 14/434,719, Notice of Allowability dated Apr. 4, 2017", 5 pgs.

"U.S. Appl. No. 15/581,229, Preliminary Amendment filed May 1, 2017", 12 pgs.

(56) References Cited

OTHER PUBLICATIONS

"U.S. Appl. No. 15/336,450, Non-Final Office Action dated Feb. 15, 2018", 8 pgs.

POLYMERS AND METHODS OF MAKING THE SAME

CROSS-REFERENCE TO RELATED APPLICATION

This application claims the benefit of priority to U.S. Provisional Patent Application Serial No. 62/161,395, filed May 14, 2015, the disclosure of which is incorporated herein in its entirety by reference.

STATEMENT OF GOVERNMENT SUPPORT

The invention was made with Government support under 2014-38202-22318 awarded by the USDA/NIFA. The U.S. Government has certain rights in this invention.

BACKGROUND

Tackifiers are materials that have a characteristic of immediate tackiness or stickiness. Tackifiers can be used in a wide variety of applications, and often form a major component of adhesive compositions. Examples of tackifiers include rosins, terpenes and modified terpenes, petroleum-derived resins, terpene-phenol resins, and silicone resins. Tackifiers can be expensive, and are frequently the most costly component of adhesive formulations. Tackifiers are frequently derived from non-biorenewable materials.

SUMMARY OF THE INVENTION

In various embodiments, the present invention provides a method of forming a polymer. The method includes subjecting a composition including a carboxylic acid having the structure $(R^f$—$O)_{z1}$—$R^a$ to conditions sufficient to form a polymer having the structure $R^{eg}$—$[O$—$R^a(O$—$R^b)_{z1-2}$—$O$—$C(O)$—$R'(O$—$R^d)_{z2-1}$—$C(O)]_n$—$O$—$R^a(O$—$R^b)_{z1-2}$—$O$—$R^{eg}$ or a salt or ester thereof. The variable $R^a$ is a substituted or unsubstituted $(C_1$-$C_{50})$hydrocarbyl having a valency of z1 and interrupted or terminated by 0, 1, 2, or 3 groups independently chosen from —O—, —S—, substituted or unsubstituted —NH—, and —(O—$(C_2$-$C_3)$alkylene$)_{y1}$- wherein y1 is about 1 to about 10,000 and wherein the $(C_2$-$C_3)$alkylene is substituted or unsubstituted. At each occurrence, R' is independently a substituted or unsubstituted $(C_1$-$C_{50})$hydrocarbyl having a valency of z2+1 interrupted or terminated by 0, 1, 2, or 3 groups independently chosen from —O—, —S—, substituted or unsubstituted —NH—, and —(O—$(C_2$-$C_3)$alkylene$)_{y2}$- wherein y2 is about 1 to about 10,000 and wherein the $(C_2$-$C_3)$alkylene is substituted or unsubstituted. At each occurrence, $R^b$ is independently chosen from —H, —C(O)—R'(O—$R^d)_{z2-1}$—C(O)—[O—$R^a$(O—$R^c)_{z1-2}$—O—C(O)—R'(O—$R^d)_{z2-1}$—C(O)]$_{n1}$—OH, and —C(O)—R'(O—$R^d)_{z2-1}$—C(O)—[O—$R^a$(O—$R^c)_{z1-2}$—O—C(O)—R'(O—$R^d)_{z2-1}$—C(O)]$_{n1}$—O—$R^a$(O—$R^c)_{z1-2}$—O—$R^{eg}$, wherein at each occurrence, n1 is independently about 0 to about 100,000. At each occurrence, $R^c$ is independently chosen from —H, —C(O)—R'(O—$R^d)_{z2-1}$—C(O)—[O—$R^a$(O—$R^b)_{z1-2}$—O—C(O)—R'(O—$R^d)_{z2-1}$—C(O)]$_{n2}$—OH, and —C(O)—R'(O—$R^d)_{z2-1}$—C(O)—[O—$R^a$(O—$R^b)_{z1-2}$—O—C(O)—R'(O—$R^d)_{z2-1}$—C(O)]$_{n2}$—O—$R^a$(O—$R^b)_{z1-2}$—O—$R^{eg}$, wherein at each occurrence, n2 is independently about 0 to about 100,000. At each occurrence, $R^d$ is independently chosen from —H, —C(O)—[O—$R^a(R^b)_{z1-2}$—O—C(O)—R'(O—$R^e)_{z2-1}$—C(O)]$_{n3}$—OH, and —C(O)—[O—$R^a$(O—$R^b)_{z1-2}$—O—C(O)—R'(O—$R^e)_{z2-1}$—C(O)]$_{n3}$—O—$R^a$(O—$R^b)_{z1-2}$—O—$R^{eg}$, wherein at each occurrence, n3 is independently about 0 to about 100,000. At each occurrence, $R^e$ is independently chosen from —H, —C(O)—[O—$R^a$(O—$R^b)_{z1-2}$—O—C(O)—R'(O—$R^d)_{z2-1}$—C(O)]$_{n4}$—OH, and —C(O)—[O—$R^a$(O—$R^b)_{z1-2}$—O—C(O)—R'(O—$R^d)_{z2-1}$—C(O)]$_{n4}$—O—$R^a(R^b)_{z1-2}$—O—$R^{eg}$, wherein at each occurrence, n4 is independently about 0 to about 100,000. At each occurrence, $R^f$ is independently chosen from (HO—C(O))$_{z2}$—R'—C(O)— and H—, wherein at least one $R^f$ in each molecule containing $R^f$ is (HO—C(O))$_{z2}$—R'—C(O)—. At each occurrence, $R^{eg}$ is independently chosen from HO—C(O)—R'(O—$R^d)_{z2-1}$—C(O)— and H—. The variable z1 is about 2 to about 100. The variable z2 is about 1 to about 100. The variable n is about 1 to about 100,000.

In various embodiments, the present invention provides a method of forming a polymer. The method includes subjecting a composition including a carboxylic acid having the structure:

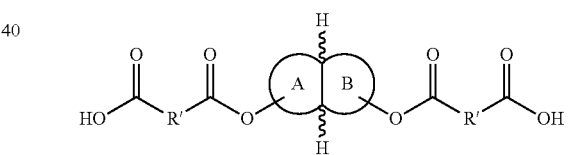

to conditions sufficient to form a polymer having the structure:

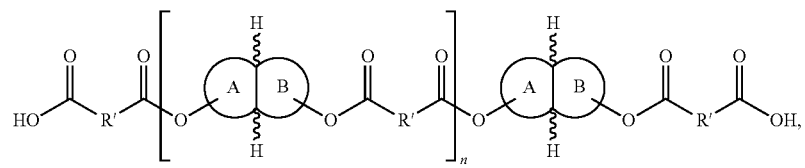

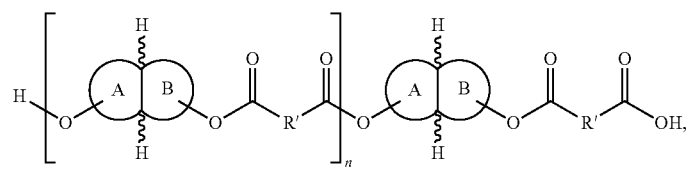

-continued

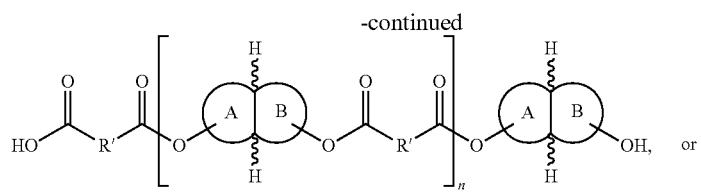

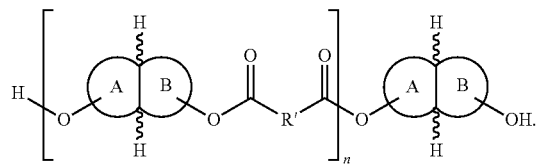

The composition optionally includes a carrier liquid. At least one of conditions a), b), and c) are satisfied. In condition a) the carboxylic acid and the carrier liquid are about 100 wt % of the composition. In condition b) the composition is substantially free of other carboxylic acids. In condition c) the composition is substantially free of carboxylic acids having the structure HO—C(O)—R'—C(O)—OH or HO—C(O)—R'—OH. Fused rings A and B are each independently chosen from substituted or unsubstituted ($C_5$-$C_{10}$) cycloalkyl and ($C_2$-$C_{10}$)heterocyclyl. The variable $R^a$ is substituted or unsubstituted ($C_1$-$C_{50}$)hydrocarbyl having a valency of z1 and interrupted or terminated by 0, 1, 2, or 3 groups independently chosen from —O—, —S—, substituted or unsubstituted —NH—, and —(O—($C_2$-$C_3$)alkylene)$_{y1}$- wherein y1 is about 1 to about 10,000 and wherein the ($C_2$-$C_3$)alkylene is substituted or unsubstituted. At each occurrence, R' is independently a substituted or unsubstituted ($C_2$-$C_{10}$)hydrocarbylene. The variable n is about 1 to about 100,000.

In various embodiments, the present invention provides a polymer having the structure:

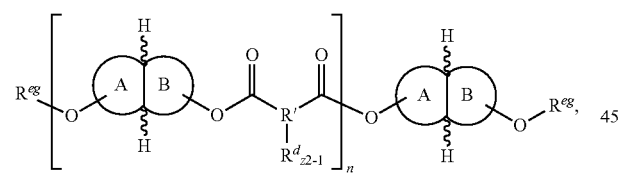

or a salt or ester thereof. At each occurrence, $R^{eg}$ is independently chosen from —H and —C(O)—R'($R^d$)$_{z2-1}$—C(O)—OH. Fused rings A and B are each independently chosen from substituted or unsubstituted ($C_5$-$C_{10}$)cycloalkyl and ($C_2$-$C_{10}$)heterocyclyl. The variable n is about 1 to about 100,000. The variable z2 is about 1 to about 100. At each occurrence, R' is independently a substituted or unsubstituted ($C_2$-$C_{10}$)hydrocarbyl having valence z2+1. At each occurrence, $R^d$ is independently chosen from —H,

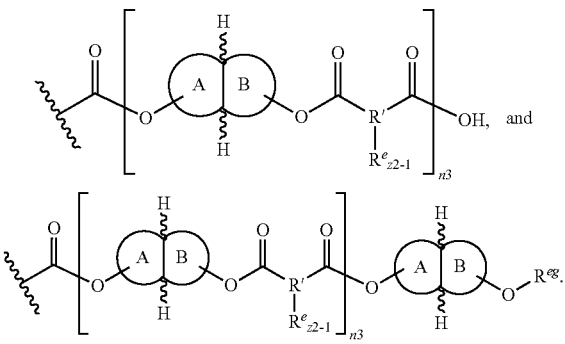

At each occurrence, n3 is independently about 0 to about 100,000. At each occurrence, $R^e$ is independently chosen from —H,

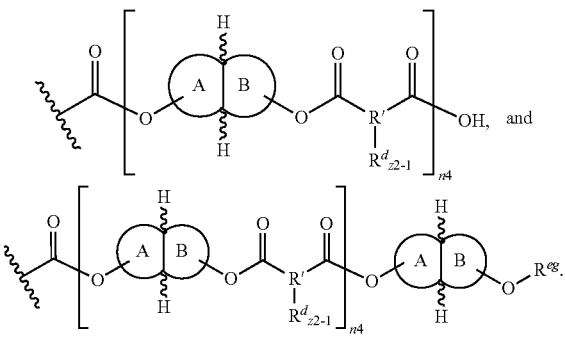

At each occurrence, n4 is independently about 0 to about 100,000.

In various embodiments, the present invention provides a polymer having the structure:

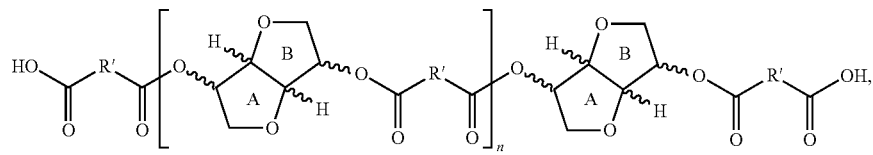

-continued

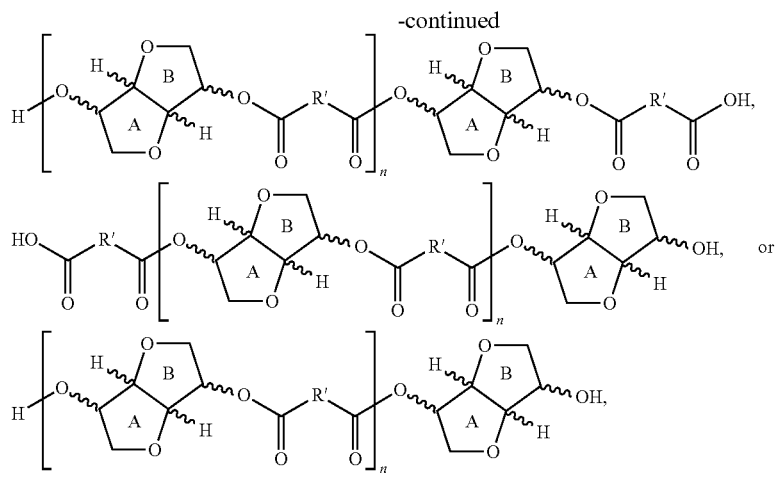

or a salt or ester thereof. Rings A and B form a ring system chosen from isosorbide, isomannide, and isoidide. At each occurrence, R' is independently selected from —CH₂—CH₂—, —CH₂—CH₂—CH₂—, o-phenylene, cis —CH═CH—, and trans —CH═CH—. The variable n is about 1 to about 100,000.

In various embodiments, the present invention provides certain advantages over other polymers or methods of making the same, at least some of which are unexpected. For example, in some embodiments, the non-free-radical polymerization to form the polymer can be unexpected in light of the free-radical polymerization that occurs with other similar starting materials. In some embodiments, the method of making the polymer can require less or no purification as compared to other methods of making polymers. In some embodiments, the properties of the polymer, such as solubility in water, glass transition temperature, tackiness, or amount of viscosification provided, can be more easily adjusted or tuned by varying the starting materials than is possible with other polymers.

In various embodiments, the polymer can be a tackifier. In some embodiments, the polymer can have greater tackiness than other tackifiers. In some embodiments, the polymer can be made for a lower cost than other tackifiers, or at a cost competitive with that of other tackifiers. In some embodiments, the polymer can provide a greater amount of tackiness for a particular cost than that provided by other tackifiers. In some embodiments, the polymer can exhibit stronger tackifier properties at higher temperatures than other tackifiers.

In some embodiments, the polymer is additionally or alternatively useful as a viscosifier, such as in organic liquids, oils, or aqueous liquids. In some embodiments, the polymer can be made for a lower cost than other viscosifiers, or at a cost competitive with that of other viscosifiers. In some embodiments, the polymer can have greater viscosification abilities than other viscosifiers, providing a greater increase in viscosity for a given amount of the compound.

In some embodiments, the polymer can be generated from biorenewable sources. In some embodiments, the polymer can be generated from more readily available or cheaper biorenewable sources than other polymers (e.g., as compared to other polymers having tackifier or viscosifier properties). In some embodiments, the polymer can be generated from biorenewable sources more easily and with less cost than other polymers. In some embodiments, the polymer can be made from a greater proportion of biorenewable materials than other polymers. In some embodiments, the method of making the polymer can be more environmentally friendly than other methods; for example, in some embodiments, the method can use less solvent or can generate less waste than other procedures. In some embodiments, the polymer can cost less than or can have a cost competitive with the cost of petroleum-derived polymers. In some embodiments, the process of making the polymer can be more easily scalable than other methods, such as other methods of making polymers from biorenewable sources. In some embodiments, the method of making the polymer can transform a compound, such as isosorbide, isomannide, or isoidide, into a useful substance for a lower cost, greater convenience, or with less environmental impact, than other methods of transforming of modifying the compound.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
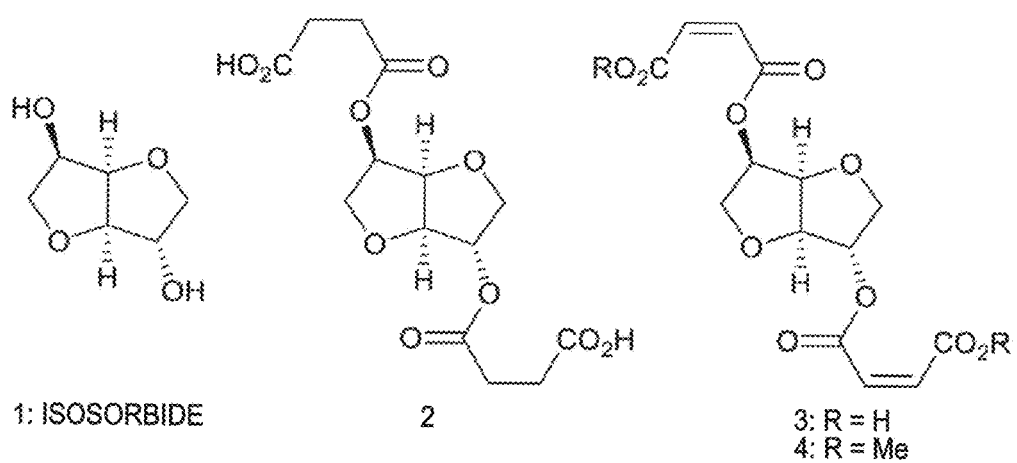
FIG. 1 illustrates isosorbide and three isosorbide-based tackifiers, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "organic group" as used herein refers to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O) CH$_2$C(O)R, C(S)R, C(O)OR, OC(O)R, C(O)N(R)$_2$, OC(O) N(R)$_2$, C(S)N(R)$_2$, (CH$_2$)$_{0-2}$N(R)C(O)R, (CH$_2$)$_{0-2}$N(R) N(R)$_2$, N(R)N(R)C(O)R, N(R)N(R)C(O)OR, N(R)N(R) CON(R)$_2$, N(R)SO$_2$R, N(R)SO$_2$N(R)$_2$, N(R)C(O)OR, N(R) C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4- 2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "heterocyclyl" as used herein refers to aromatic and non-aromatic ring compounds containing three or more ring members, of which one or more is a heteroatom such as, but not limited to, N, O, and S.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include about 1 to about 12, about 1 to about 20, or about 1 to about 40 carbon atoms bonded to the oxygen atom, and can further include double or triple bonds, and can also include heteroatoms. For example, an allyloxy group or a methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" or "hydrocarbyl" as used herein refers to a molecule or functional group, respectively, that includes carbon and hydrogen atoms. The term can also refer to a molecule or functional group that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof. Hydrocarbyl groups can be shown as $(C_a\text{-}C_b)$hydrocarbyl, wherein a and b are integers and mean having any of a to b number of carbon atoms. For example, $(C_1\text{-}C_4)$hydrocarbyl means the hydrocarbyl group can be methyl $(C_1)$, ethyl $(C_2)$, propyl $(C_3)$, or butyl $(C_4)$, and $(C_0\text{-}C_b)$hydrocarbyl means in certain embodiments there is no hydrocarbyl group.

The term "number-average molecular weight" ($M_n$) as used herein refers to the ordinary arithmetic mean of the molecular weight of individual molecules in a sample. It is defined as the total weight of all molecules in a sample divided by the total number of molecules in the sample. Experimentally, $M_n$ is determined by analyzing a sample divided into molecular weight fractions of species i having $n_i$ molecules of molecular weight $M_i$ through the formula $M_n = \Sigma M_i n_i / \Sigma n_i$. The $M_n$ can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

As used herein, the term "polymer" refers to a molecule having at least one repeating unit and can include copolymers.

The term "oligomer" as used herein refers to a molecule having an intermediate relative molecular mass, the structure of which essentially includes a small plurality of units derived, actually or conceptually, from molecules of lower relative molecular mass. A molecule having an intermediate relative mass can be a molecule that has properties that vary with the removal of one or a few of the units. The variation in the properties that results from the removal of the one of more units can be a significant variation. As used herein, oligomers are a subset of polymers.

The term "solvent" as used herein refers to a liquid that can dissolve a solid, liquid, or gas. Non-limiting examples of solvents are silicones, organic compounds, water, alcohols, ionic liquids, and supercritical fluids.

In various embodiments, salts having a positively charged counterion can include any suitable positively charged counterion. For example, the counterion can be ammonium ($NH_4^+$), or an alkali metal such as sodium ($Na^+$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

In various embodiments, salts having a negatively charged counterion can include any suitable negatively charged counterion. For example, the counterion can be a halide, such as fluoride, chloride, iodide, or bromide. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate. In some embodiments, a counterion can have a negative charge greater than −1, which can in some embodiments complex to multiple ionized groups, such as oxide, sulfide, nitride, arsenate, phosphate, arsenite, hydrogen phosphate, sulfate, thiosulfate, sulfite, carbonate, chromate, dichromate, peroxide, or oxalate.

Method of forming a polymer.

In various embodiments, the present invention provides a method of forming a polymer. The method can be any suitable method of forming a polymer, wherein the polymer is described herein. In some embodiments, the polymer can be at least one of a tackifier and a viscosifier.

In various embodiments, the method can include subjecting a composition including a carboxylic acid having the structure $(R^f-O)_{z1}-R^a$ (e.g., $((HO-C(O))_{z2}-R'-C(O)-O)_{z1}-R^a)$ to conditions sufficient to form a polymer having the structure $R^{eg}-[O-R^a(O-R^b)_{z1\text{-}2}-O-C(O)-R'(O-R^d)_{z2\text{-}1}-C(O)]_n-O-R^a(O-R^b)_{z1\text{-}2}-O-R^{eg}$ or a salt or ester thereof. The variable $R^a$ can be a substituted or unsubstituted $(C_1\text{-}C_{50})$hydrocarbyl having a valency of z1 and interrupted or terminated by 0, 1, 2, or 3 groups independently chosen from —O—, —S—, substituted or unsubstituted —NH—, and —(O—$(C_2\text{-}C_3)$alkylene)$_{y1}$- wherein y1 can be about 1 to about 10,000 and wherein the $(C_2\text{-}C_3)$alkylene can be substituted or unsubstituted. At each occurrence, R' is independently a substituted or unsubstituted $(C_1\text{-}C_{50})$hydrocarbyl having a valency of z2+1 interrupted or terminated by 0, 1, 2, or 3 groups independently chosen from —O—, —S—, substituted or unsubstituted —NH—, and —(O—$(C_2\text{-}C_3)$alkylene)$_{y2}$- wherein y2 is about 1 to about 10,000 and wherein the $(C_2\text{-}C_3)$alkylene is substituted or unsubstituted. At each occurrence, $R^b$ can be independently chosen from —H, —C(O)—R'(O—$R^d)_{z2\text{-}1}$—C(O)—[O—$R^a$(O—$R^c)_{z1\text{-}2}$—O—C(O)—R'(O—$R^d)_{z2\text{-}1}$—C(O)]$_{n1}$—OH, and —C(O)—R'(O—$R^d)_{z2\text{-}1}$—C(O)—[O—$R^a$(O—$R^c)_{z1\text{-}2}$—O—C(O)—R'(O—$R^d)_{z2\text{-}1}$—C(O)]$_{n1}$—O—$R^a$(O—$R^c)_{z1\text{-}2}$—O—$R^{eg}$, wherein at each occurrence, n1 can be independently about 0 to about 100,000. At each occurrence, $R^c$ can be independently chosen from —H, —C(O)—R'(O—$R^d)_{z2\text{-}1}$—C(O)—[O—$R^a$(O—$R^b)_{z1\text{-}2}$—O—C(O)—R'(O—$R^d)_{z2\text{-}1}$—C(O)]$_{n2}$—OH, and —C(O)—R'(O—$R^d)_{z2\text{-}1}$—C(O)—[O—$R^a$(O—$R^b)_{z1\text{-}2}$—O—C(O)—R'(O—$R^d)_{z2\text{-}1}$—C(O)]$_{n2}$—O—$R^a$(O—$R^b)_{z1\text{-}2}$—O—$R^{eg}$, wherein at each occurrence, n2 can be independently about 0 to about 100,000. At each occurrence, $R^d$ can be independently chosen from —H, —C(O)—[O—$R^a(R^b)_{z1\text{-}2}$—O—C(O)—R'(O—$R^e)_{z2\text{-}1}$—C(O)]$_{n3}$—OH, and —C(O)—[O—$R^a$(O—$R^b)_{z1\text{-}2}$—O—C(O)—R'(O—$R^e)_{z2\text{-}1}$—C(O)]$_{n3}$—O—$R^a$(O—$R^b)_{z1\text{-}2}$—O—$R^{eg}$, wherein at each occurrence, n3 can be independently about 0 to about 100,000. At each occurrence, $R^e$ can be independently chosen from —H, —C(O)—[O—$R^a$(O—$R^b)_{z1\text{-}2}$—O—C(O)—R'(O—$R^d)_{z2\text{-}1}$—C(O)]$_{n4}$—OH, and —C(O)—[O—$R^a$(O—$R^b)_{z1\text{-}2}$—O—C(O)—R'(O—$R^d)_{z2\text{-}1}$—C(O)]$_{n4}$—O—$R^a(R^b)_{z1\text{-}2}$—O—$R^{eg}$, wherein at each occurrence, n4 can be independently about 0 to about 100,000. At each occurrence, $R^f$ can be independently chosen from (HO—C(O))$_{z2}$—R'—C(O)— and H—, wherein at least one $R^f$ in each molecule containing $R^f$ is (HO—C(O))$_{z2}$—R'—C(O)—. At each occurrence, $R^{eg}$ can be independently chosen from HO—C(O)—R'(O—$R^d)_{z2\text{-}1}$—C(O)— and H—. The variable z1 can be about 2 to about 100. The variable z2 can be about 1 to about 100. The variable n can be about 1 to about 100,000.

In various embodiments, z1 can be 2, such that the carboxylic acid has the structure $R^f$—$R^a$—$R^f$ (e.g., (HO—C(O))$_{z2}$—R'—C(O)—O—$R^a$—O—C(O)—R'—(C(O)—

OH))$_{z2}$), and the polymer has the structure R$^{eg}$—[O—R$^a$—O—C(O)—R'(O—R$^d$)$_{z2-1}$—C(O)]$_n$—O—R$^a$—O—R$^{eg}$.

The variable R$^a$ can be a substituted or unsubstituted (C$_1$-C$_{50}$)hydrocarbylene interrupted or terminated by 0, 1, 2, or 3 groups independently chosen from —O—, —S—, substituted or unsubstituted —NH—, and —(O—(C$_2$-C$_3$)alkylene)$_{y1}$- wherein y1 can be about 1 to about 10,000 and wherein the (C$_2$-C$_3$)alkylene can be substituted or unsubstituted. At each occurrence, R' can independently be substituted or unsubstituted (C$_1$-C$_{50}$)hydrocarbyl having a valency of z2+1 interrupted or terminated by 0, 1, 2, or 3 groups independently chosen from —O—, —S—, substituted or unsubstituted —NH—, and —(O—(C$_2$-C$_3$)alkylene)$_{y2}$- wherein y2 can be about 1 to about 10,000 and wherein the (C$_2$-C$_3$)alkylene can be substituted or unsubstituted. At each occurrence, R$^d$ can be independently chosen from —H, —C(O)—[O—R$^a$—O—C(O)—R'(O—R$^e$)$_{z2-1}$—C(O)]$_{n3}$—OH, and —C(O)—[O—R$^a$—O—C(O)—R'(O—R$^e$)$_{z2-1}$—C(O)]$_{n3}$—O—R$^a$—O—R$^{eg}$ wherein at each occurrence, n3 can be independently about 0 to about 100,000. At each occurrence, R$^e$ can be independently chosen from —H, —C(O)—[O—R$^a$—O—C(O)—R'(O—R$^d$)$_{z2-1}$—C(O)]$_{n4}$—OH, and —C(O)—[O—R$^a$—O—C(O)—R'(O—R$^d$)$_{z2-1}$—C(O)]$_{n4}$—O—R$^a$—O—R$^{eg}$, wherein at each occurrence, n4 can be independently about 0 to about 100,000. The variable z2 can be about 1 to about 100. The variable n can be about 1 to about 100,000.

In various embodiments, z2 can be 1, such that the carboxylic acid has the structure (R$^f$)$_{z1}$—R$^a$ (e.g., (HO—C(O)—R'—C(O)—O)$_{z1}$—R$^a$), and the polymer has the structure R$^{eg}$—[O—R$^a$(O—R$^b$)$_{z1-2}$—O—C(O)—R'—C(O)]$_n$—O—R$^a$(O—R$^b$)$_{z1-2}$—O—R$^{eg}$ or a salt or ester thereof. The variable R$^a$ can be a substituted or unsubstituted (C$_1$-C$_{50}$) hydrocarbyl having a valency of z1 and interrupted or terminated by 0, 1, 2, or 3 groups independently chosen from —O—, —S—, substituted or unsubstituted —NH—, and —(O—(C$_2$-C$_3$)alkylene)$_{y1}$- wherein y1 can be about 1 to about 10,000 and wherein the (C$_2$-C$_3$)alkylene can be substituted or unsubstituted. At each occurrence, R' can independently be a substituted or unsubstituted (C$_1$-C$_{50}$)hydrocarbylene interrupted or terminated by 0, 1, 2, or 3 groups independently chosen from —O—, —S—, substituted or unsubstituted —NH—, and —(O—(C$_2$-C$_3$)alkylene)$_{y2}$- wherein y2 can be about 1 to about 10,000 and wherein the (C$_2$-C$_3$)alkylene can be substituted or unsubstituted. At each occurrence, R$^b$ can be independently chosen from —H, —C(O)—R'—C(O)—[O—R$^a$(O—R$^c$)$_{z1-2}$—O—C(O)—R'—C(O)]$_{n1}$—OH, and —C(O)—R'—C(O)—[O—R$^a$(O—R$^c$)$_{z1-2}$—O—C(O)—R'—C(O)]$_{n1}$—O—R$^a$(O—R$^c$)$_{z1-2}$—O—R$^{eg}$, wherein at each occurrence, n1 can be independently about 0 to about 100,000. At each occurrence, R$^c$ can be independently chosen from —H, —C(O)—R'—C(O)—[O—R$^a$(O—R$^b$)$_{z1-2}$—O—C(O)—R'—C(O)]$_{n2}$—OH, and —C(O)—R'—C(O)—[O—R$^a$(O—R$^b$)$_{z1-2}$—O—C(O)—R'—C(O)]$_{n2}$—O—R$^a$(O—R$^b$)$_{z1-2}$—O—R$^{eg}$, wherein at each occurrence, n2 can be independently about 0 to about 100,000. At each occurrence, R$^f$ can be independently chosen from HO—C(O)—R'—C(O)— and H—, wherein at least one R$^f$ in each molecule containing R$^f$ is HO—C(O)—R'—C(O)—. At each occurrence, R$^{eg}$ can be independently chosen from HO—C(O)—R'—C(O)— and H—. The variable z1 can be about 2 to about 100. The variable n can be about 1 to about 100,000.

In various embodiments, z1 can be 2, and z2 can be 1, such that the carboxylic acid has the structure HO—C(O)—R'—C(O)—O—R$^a$—O—C(O)—R'—C(O)—OH or HO—C(O)—R'—C(O)—O—R$^a$—OH, and the polymer has the structure R$^{eg}$—[O—R$^a$—O—C(O)—R'—C(O)]$_n$—O—R$^a$—O—R$^{eg}$. The variable R$^a$ can be a substituted or unsubstituted (C$_1$-C$_{50}$)hydrocarbylene interrupted or terminated by 0, 1, 2, or 3 groups independently chosen from —O—, —S—, substituted or unsubstituted —NH—, and —(O—(C$_2$-C$_3$)alkylene)$_{y1}$- wherein y1 can be about 1 to about 10,000 and wherein the (C$_2$-C$_3$)alkylene can be substituted or unsubstituted. At each occurrence, R' can independently be a substituted or unsubstituted (C$_1$-C$_{50}$)hydrocarbylene interrupted or terminated by 0, 1, 2, or 3 groups independently chosen from —O—, —S—, substituted or unsubstituted —NH—, and —(O—(C$_2$-C$_3$)alkylene)$_{y2}$- wherein y2 can be about 1 to about 10,000 and wherein the (C$_2$-C$_3$) alkylene can be substituted or unsubstituted. The variable n can be about 1 to about 100,000.

The variable R$^a$ can be substituted or unsubstituted (C$_1$-C$_{50}$)hydrocarbyl having a valency of z1 and interrupted or terminated by 0, 1, 2, or 3 groups independently chosen from —O—, —S—, substituted or unsubstituted —NH—, and —(O—(C$_2$-C$_3$)alkylene)$_{y1}$- wherein y1 can be about 1 to about 10,000 (e.g., about 1 to about 1000, about 1 to about 100, or about 1, 2, 3, 4, 5, 6, 7, 8, 9, 10, 12, 14, 16, 18, 20, 30, 40, 50, 75, 100, 250, 500, 1,000, 5,000, or about 10,000 or more) and wherein the (C$_2$-C$_3$)alkylene can be substituted or unsubstituted. The variable R$^a$ can be a substituted or unsubstituted (C$_1$-C$_{50}$)hydrocarbylene interrupted or terminated by 0, 1, 2, or 3 groups independently chosen from —O—, —S—, substituted or unsubstituted —NH—, and —(O—(C$_2$-C$_3$)alkylene)$_{y2}$-. The variable Ra can be a fused bicyclic ring system having a valency of z1, such as a divalent fused bicyclic ring system.

At each occurrence, R' can independently be substituted or unsubstituted (C$_1$-C$_{50}$)hydrocarbyl having a valency of z2+1 interrupted or terminated by 0, 1, 2, or 3 groups independently chosen from —O—, —S—, substituted or unsubstituted —NH—, and —(O—(C$_2$-C$_3$)alkylene)$_{y2}$- wherein y2 can be about 1 to about 10,000 (e.g., about 1 to about 1000, about 1 to about 100, or about 1, 2, 3, 4, 5, 6, 7, 8, 9, 10, 12, 14, 16, 18, 20, 30, 40, 50, 75, 100, 250, 500, 1,000, 5,000, or about 10,000 or more) and wherein the (C$_2$-C$_3$)alkylene can be substituted or unsubstituted. At each occurrence, R' can independently be a substituted or unsubstituted (C$_1$-C$_{50}$)hydrocarbylene interrupted or terminated by 0, 1, 2, or 3 groups independently chosen from —O—, —S—, substituted or unsubstituted —NH—, and —(O—(C$_2$-C$_3$)alkylene)$_{y2}$-. At each occurrence, the variable R' can independently be a substituted or unsubstituted (C$_2$-C$_{10}$) hydrocarbylene.

At each occurrence, the variable n1 can independently be about 0 to about 100,000, about 0 to about 100, about 0 to about 20, or about 0, 1, 2, 3, 4, 5, 6, 7, 8, 9, 10, 11, 12, 13, 14, 15, 16, 17, 18, 19, 20, 22, 24, 26, 28, 30, 35, 40, 45, 50, 75, 100, 150, 200, 250, 500, 750, 1,000, 2,000, 5,000, 10,000, 20,000, 50,000, or about 100,000 or more. At each occurrence, the variable n2 can independently be about 0 to about 100,000, about 0 to about 100, about 0 to about 20, or about 0, 1, 2, 3, 4, 5, 6, 7, 8, 9, 10, 11, 12, 13, 14, 15, 16, 17, 18, 19, 20, 22, 24, 26, 28, 30, 35, 40, 45, 50, 75, 100, 150, 200, 250, 500, 750, 1,000, 2,000, 5,000, 10,000, 20,000, 50,000, or about 100,000 or more. At each occurrence, the variable n3 can independently be about 0 to about 100,000, about 0 to about 100, about 0 to about 20, or about 0, 1, 2, 3, 4, 5, 6, 7, 8, 9, 10, 11, 12, 13, 14, 15, 16, 17, 18, 19, 20, 22, 24, 26, 28, 30, 35, 40, 45, 50, 75, 100, 150, 200, 250, 500, 750, 1,000, 2,000, 5,000, 10,000, 20,000, 50,000, or about 100,000 or more. At each occurrence, the variable n4 can independently be about 0 to about 100,000, about 0 to about 100, about 0 to about 20, or about 0, 1, 2, 3, 4, 5, 6, 7, 8, 9, 10, 11, 12, 13, 14, 15, 16, 17, 18, 19, 20, 22, 24, 26, 28, 30, 35, 40, 45, 50, 75, 100, 150, 200, 250, 500, 750, 1,000, 2,000, 5,000, 10,000, 20,000, 50,000, or about 100,000 or more.

The variable z1 can be about 2 to about 100, about 2 to 20, about 2 to 10, or about 2, 3, 4, 5, 6, 7, 8, 9, 10, 11, 12, 13, 14, 15, 16, 17, 18, 19, 20, 22, 24, 26, 28, 30, 40, 50, 60, 70, 80, 90, or about 100 or more. The variable z1 can be 2. The variable z2 can be about 1 to about 100, about 1 to 20, about 1 to 10, or about 1, 2, 3, 4, 5, 6, 7, 8, 9, 10, 11, 12, 13, 14, 15, 16, 17, 18, 19, 20, 22, 24, 26, 28, 30, 40, 50, 60, 70, 80, 90, or about 100 or more. The variable z2 can be 1.

The variable n can be about 1 to about 100,000, about 1 to about 2000, about 1 to about 100, about 1 to about 20, about 1 to about 10, or about 1, 2, 3, 4, 5, 6, 7, 8, 9, 10, 11, 12, 13, 14, 15, 16, 17, 18, 19, 20, 22, 24, 26, 28, 30, 35, 40, 45, 50, 55, 60, 65, 70, 75, 80, 85, 90, 95, 100, 125, 150, 175, 200, 225, 250, 300, 400, 500, 750, 1,000, 2,000, 5,000, 10,000, 20,000, 50,000, or about 100,000 or more. In some embodiments, the polymer is an oligomer.

The conditions sufficient to form the polymer can include heating the composition for a suitable time to form the polymer. The heating can include heating to about 50° C. to about 1000° C., about 100° C. to about 250° C., about 150° C. to about 210° C., or about 50° C. or less, or about 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 300, 310, 320, 330, 340, 350, 400, 500, 600, 700, 800, 900, or about 1000° C. or more. The heating can include heating and maintaining at one or more of the aforementioned temperatures for any suitable duration, such as for about 1 s to about 7 d, about 1 min to about 48 h, about 12 h to about 36 h, for about a day, or for about 1 s or less, or for about 2 s, 3, 4, 5, 10, 15, 20, 25, 30, 35, 40, 45, 50, 55 s, 1 min, 1.5, 2, 2.5, 3, 3.5, 4, 4.5, 5, 6, 7, 8, 9, 10, 12, 14, 16, 18, 20, 25, 30, 35, 40, 45, 50, 55 min, 1 h, 1.5, 2, 2.5, 3, 3.5, 4, 4.5, 5, 6, 7, 8, 9, 10, 12, 14, 16, 18, 20, 22 h, 1 d, 1.5 d, 2, 2.5, 3, 3.5, 4, 4.5, 5, about 6 d, or about 7 d or more.

The composition can include one carboxylic acid having the formula $(R^f$—$O)_{z1}$—$R^a$ or multiple such carboxylic acids. The one or more carboxylic acids can form any suitable proportion of the composition. For example, the one or more carboxylic acids can be about 1 wt % to about 100 wt % or the composition, or about 50 wt % to about 100 wt % of the composition, or about 1 wt % or less, or about 2 wt %, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, or about 99.99 wt % or more. The composition can optionally include a carrier liquid, such as one or more suitable solvents for the carboxylic acid. In some embodiments, the composition is free of a carrier liquid, whereas in other embodiments, the composition includes a carrier liquid. The combination of the carrier liquid and the one or more carboxylic acids can be any suitable proportion of the composition, such as about 1 wt % to about 100 wt % or the composition, or about 50 wt % to about 100 wt % of the composition, or about 1 wt % or less, or about 2 wt %, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, or about 99.99 wt % or more. In various embodiments, the optional carrier fluid and the one or more carboxylic acids are about 100 wt % of the composition.

In various embodiments, the composition can be substantially free of (e.g., can have 0 wt % of, or less than 1 wt %, 2, 3, 4, 5, 6, 7, 8, 9, 10, 11, 12, 13, 14, 15, 16, 17, 18, 19, or less than 20 wt % of) other carboxylic acids, such as other polycarboxylic acids. In some embodiments, the composition can be substantially free of carboxylic acids having the structure HO—C(O)—R'$(R^d)_{z2-1}$—C(O)—OH or HO—R'(O—$R^d)_{z2-1}$—C(O)—OH.

In various embodiments, the carboxylic acid can have the structure:

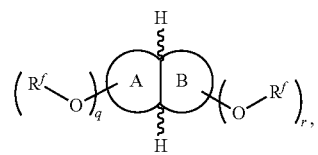

such as the structure:

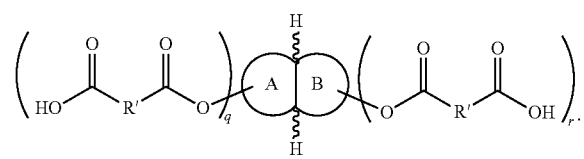

At each occurrence, $R^f$ can be independently chosen from —H and —C(O)—R'—C(O)—OH, wherein the carboxylic acid has at least one $R^f$ that is —C(O)—R'—C(O)—OH. Fused rings A and B can be each independently chosen from substituted or unsubstituted $(C_5$-$C_{10})$cycloalkyl and $(C_2$-$C_{10})$heterocyclyl. The variables q and r can be each independently 1-8 (e.g., 1, 2, 3, 4, 5, 6, 7, or 8). The quantity q+r can equal z1. At each occurrence, R' can independently be independently a substituted or unsubstituted $(C_2$-$C_{10})$hydrocarbylene.

In various embodiments, the carboxylic acid has the structure:

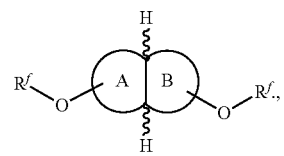

such as the structure

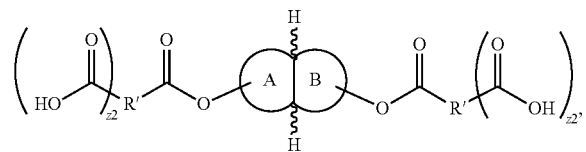

and the polymer has the structure:

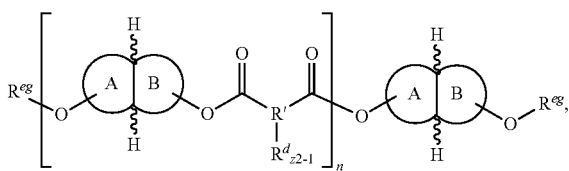

such as the structure

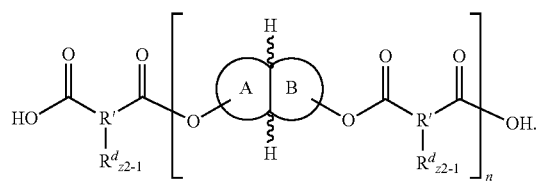

At each occurrence, $R^f$ can be independently chosen from —H and —C(O)—R'—(C(O)—OH)$_{z2}$, wherein the carboxylic acid has at least one $R^f$ that is —C(O)—R'—(C(O)—OH)$_{z2}$. At each occurrence, $R^{eg}$ can be independently chosen from —H and —C(O)—R'($R^d$)$_{z2-1}$—C(O)—OH. Fused rings A and B can be each independently chosen from substituted or unsubstituted ($C_5$-$C_{10}$)cycloalkyl and ($C_2$-$C_{10}$)heterocyclyl. At each occurrence, $R^d$ can be independently chosen from —H,

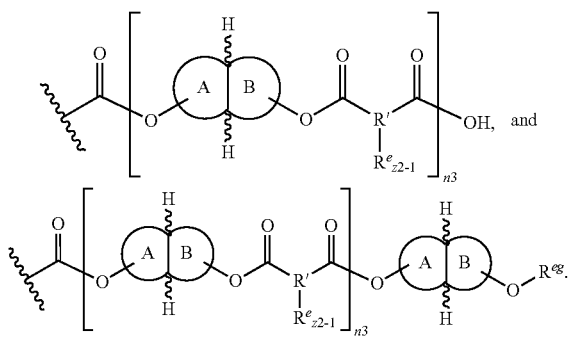

At each occurrence, the variable n3 can independently be about 0 to about 100,000. At each occurrence, $R^e$ can be independently chosen from —H,

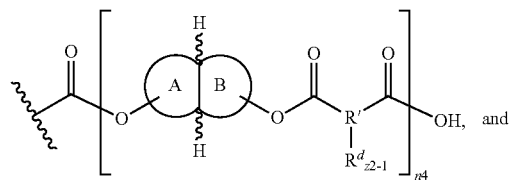

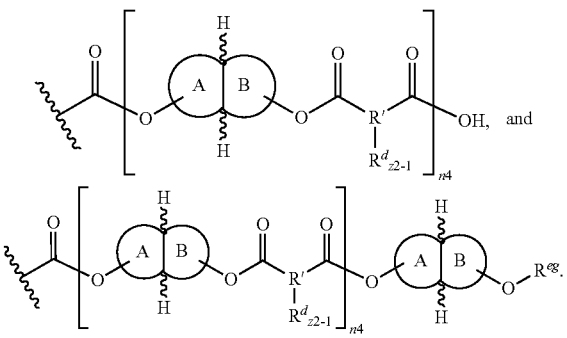

At each occurrence, the variable n4 can independently be about 0 to about 100,000. At each occurrence, R' can be independently a substituted or unsubstituted ($C_2$-$C_{10}$)hydrocarbyl having valence z2+1.

In various embodiments, z2 can equal 1, such that the carboxylic acid has the structure:

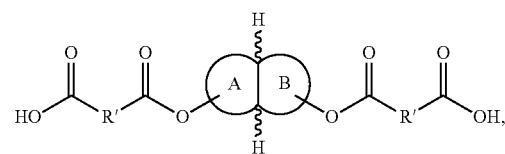

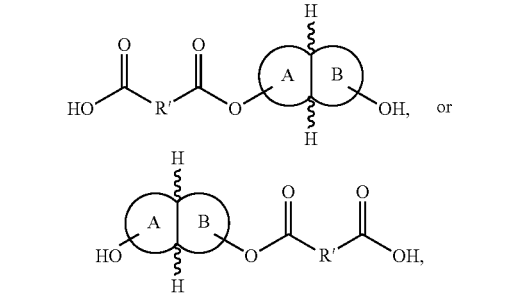

and the polymer has the structure:

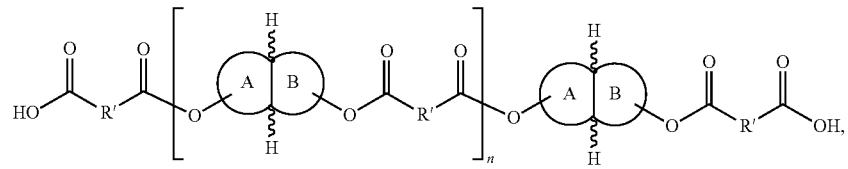

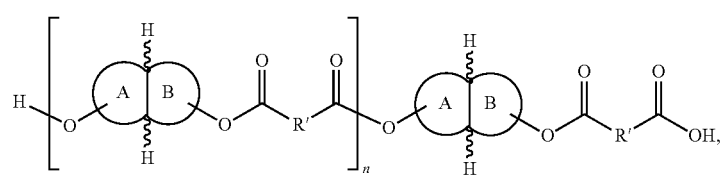

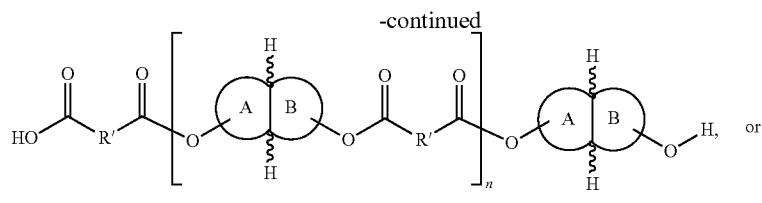

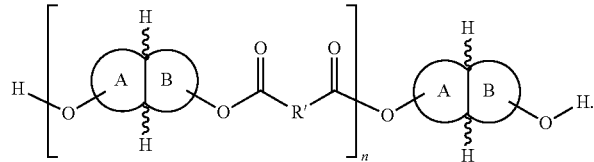

Fused rings A and B can be each independently chosen from substituted or unsubstituted $(C_5$-$C_{10})$cycloalkyl and $(C_2$-$C_{10})$heterocyclyl. At each occurrence, R' can be independently a substituted or unsubstituted $(C_2$-$C_{10})$hydrocarbylene.

At each occurrence, R' can independently be a substituted or unsubstituted $(C_1$-$C_{50})$hydrocarbylene interrupted or terminated by 0, 1, 2, or 3 groups independently chosen from —O—, —S—, substituted or unsubstituted —NH—, and —(O—$(C_2$-$C_3)$alkylene)$_{y2}$-. At each occurrence, the variable R' can independently be a substituted or unsubstituted $(C_2$-$C_{10})$hydrocarbylene. At each occurrence, R' can be independently a substituted or unsubstituted $(C_2$-$C_{10})$hydrocarbylene. At each occurrence, R' can be unsubstituted. At each occurrence, R' can be independently chosen from $(C_1$-$C_5)$alkylene, $(C_5$-$C_{10})$aryl, and $(C_2$-$C_5)$alkenylene. At each occurrence, R' can be independently chosen from —CH$_2$—CH$_2$—, —CH$_2$—CH$_2$—CH$_2$—, o-phenylene, cis —CH=CH—, and trans —CH=CH—.

Fused rings A and B can be each independently chosen from substituted or unsubstituted $(C_5$-$C_{10})$cycloalkyl and $(C_2$-$C_{10})$heterocyclyl. Rings A and B can be unsubstituted with the exception of the one or more alcohol and ester substituents —OC(O)—R'—C(O)OH. One of the alcohol and ester substituents including R' can be alpha to at least one carbon atom shared by rings A and B. Rings A and B can be the same size. Rings A and B can be 5-membered rings.

At least one of rings A and B can include at least one oxygen atom. Each of rings A and B can be a tetrahydrofuran ring, wherein each carbon atom shared by rings A and B can have an oxygen atom alpha thereto. Each of the alcohol and ester substituents —OC(O)—R'—C(O)OH can be alpha to a different carbon atom shared by each of rings A and B. Rings A and B can form a ring system chosen from isosorbide, isomannide, and isoidide. Rings A and B can be unsubstituted.

The carboxylic acid can have the structure:

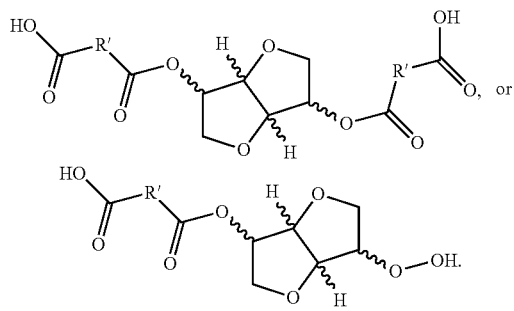

The polymer can have the structure:

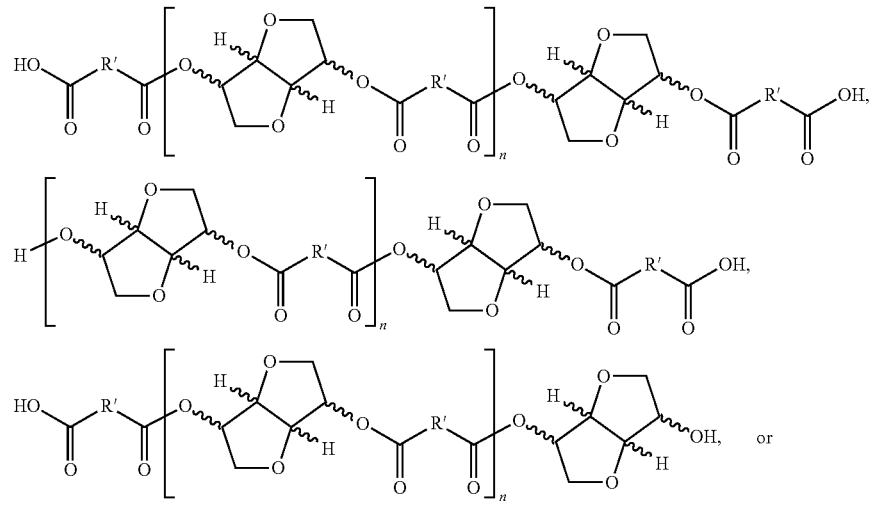

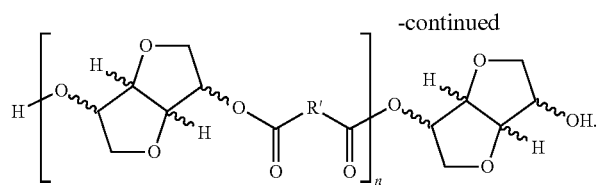
The carboxylic acid can be chosen from
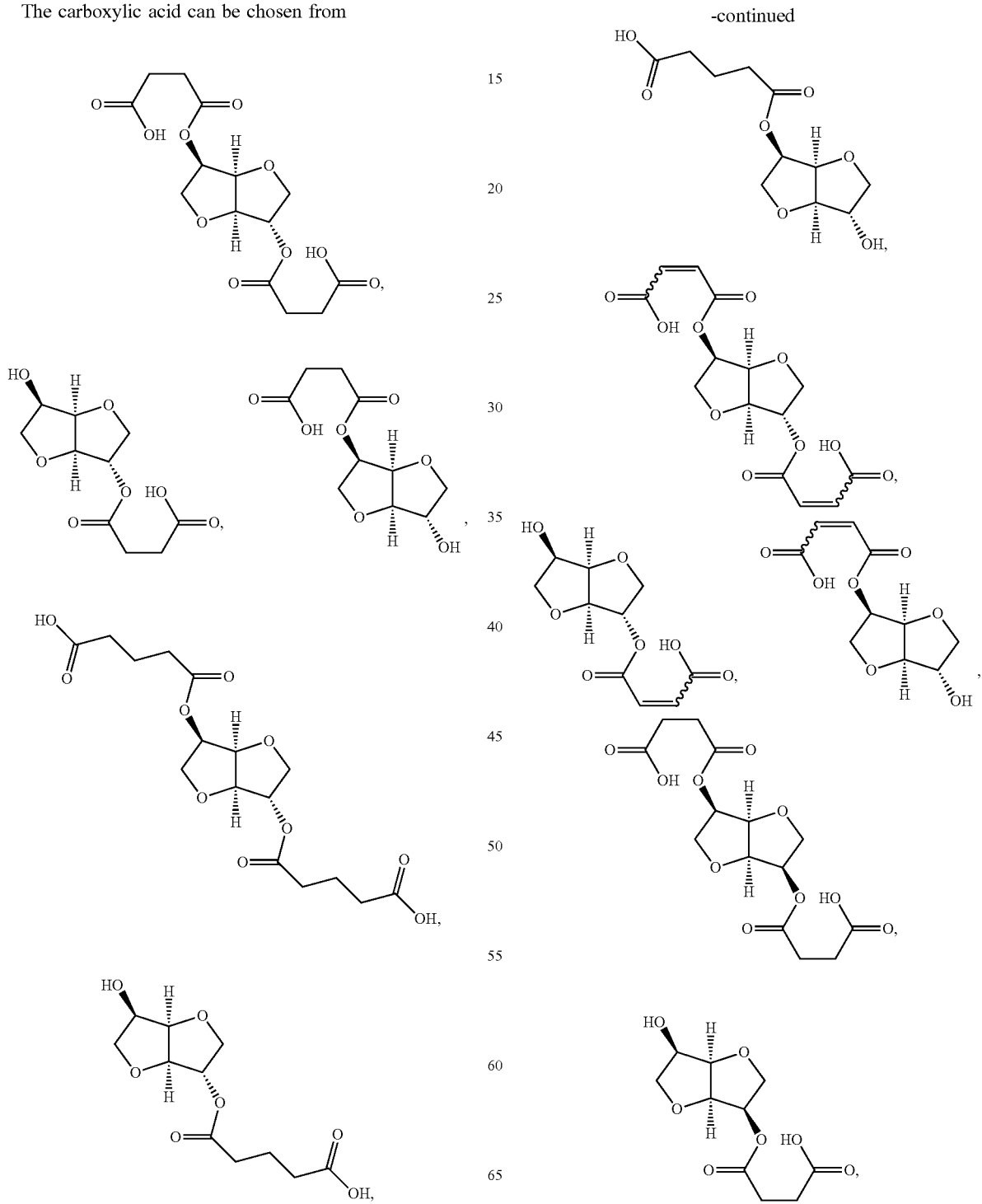

23
-continued
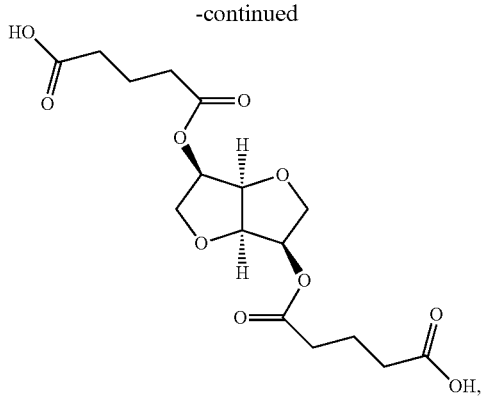
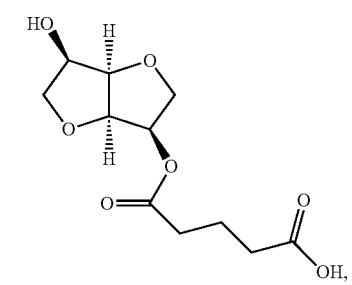
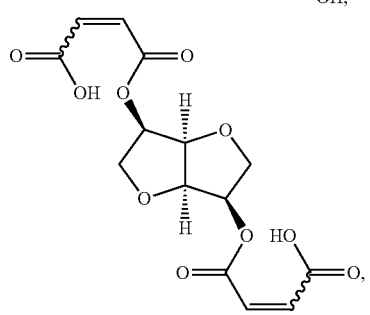
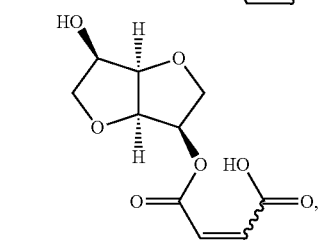
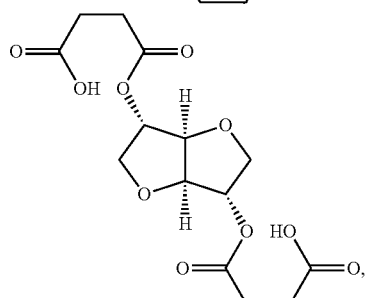
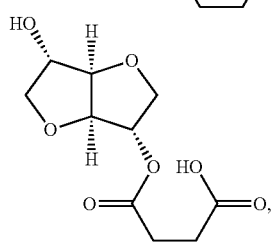
24
-continued
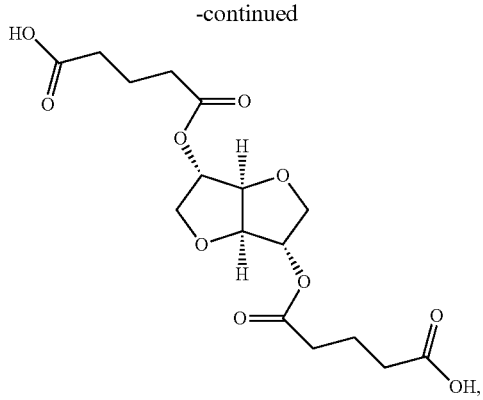
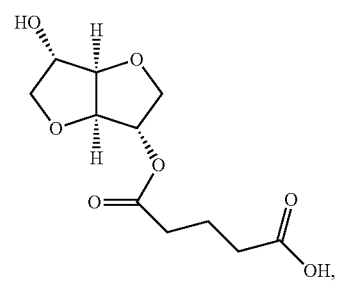
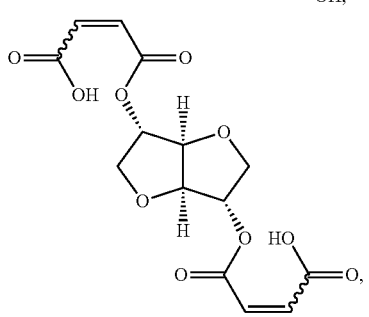
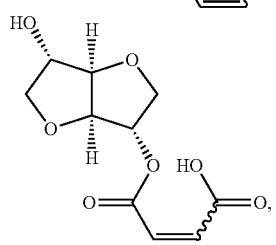
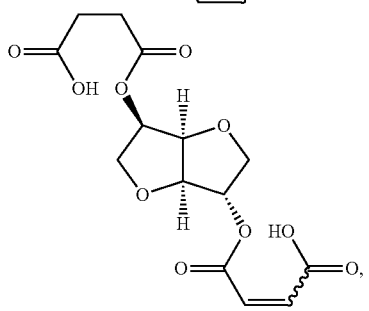
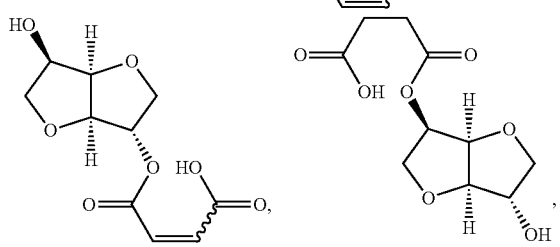

-continued
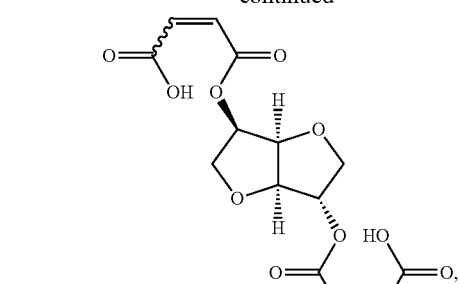
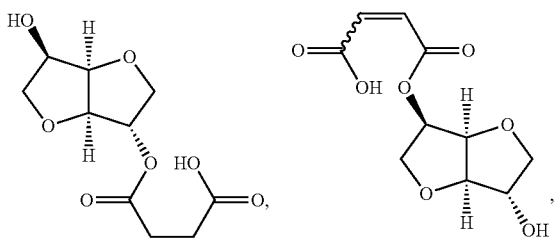
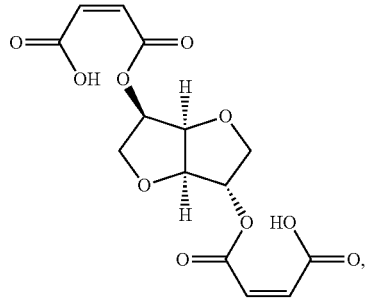
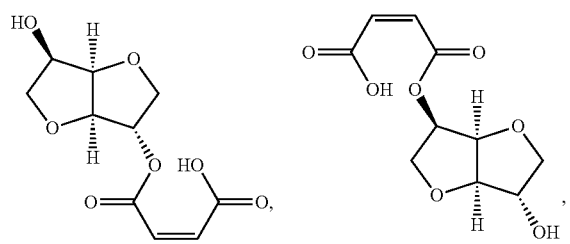
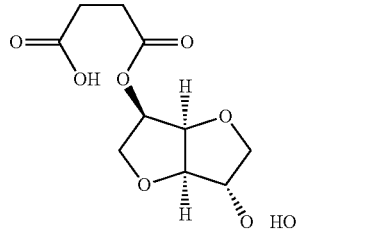
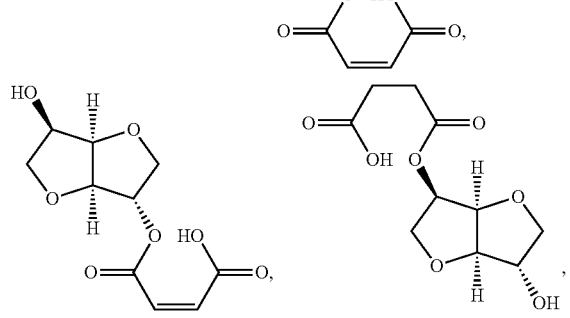
-continued
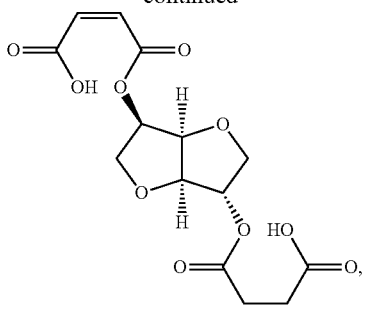
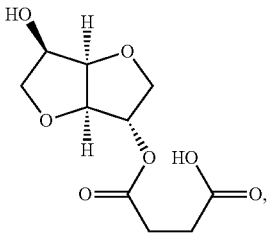
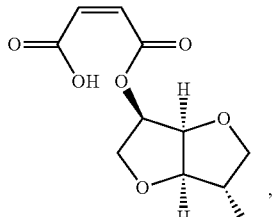
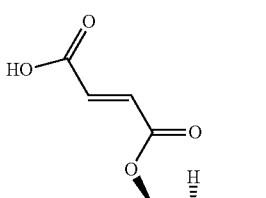
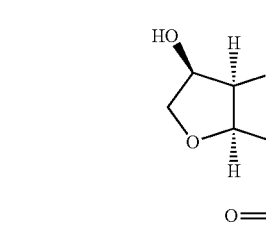
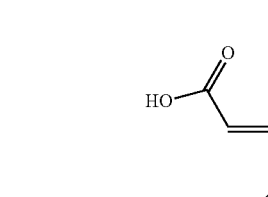

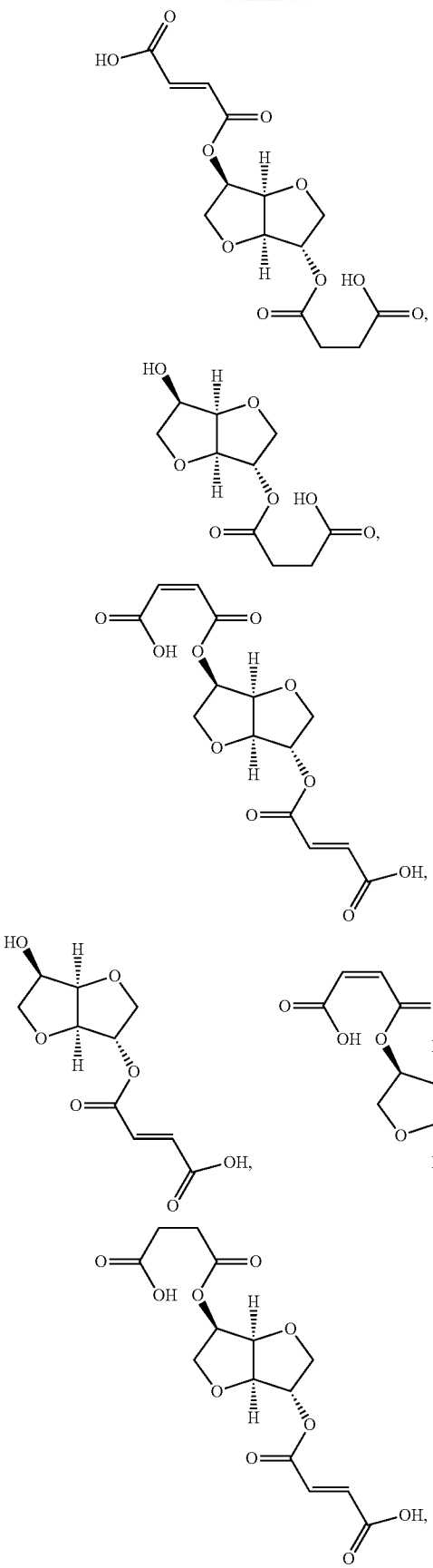
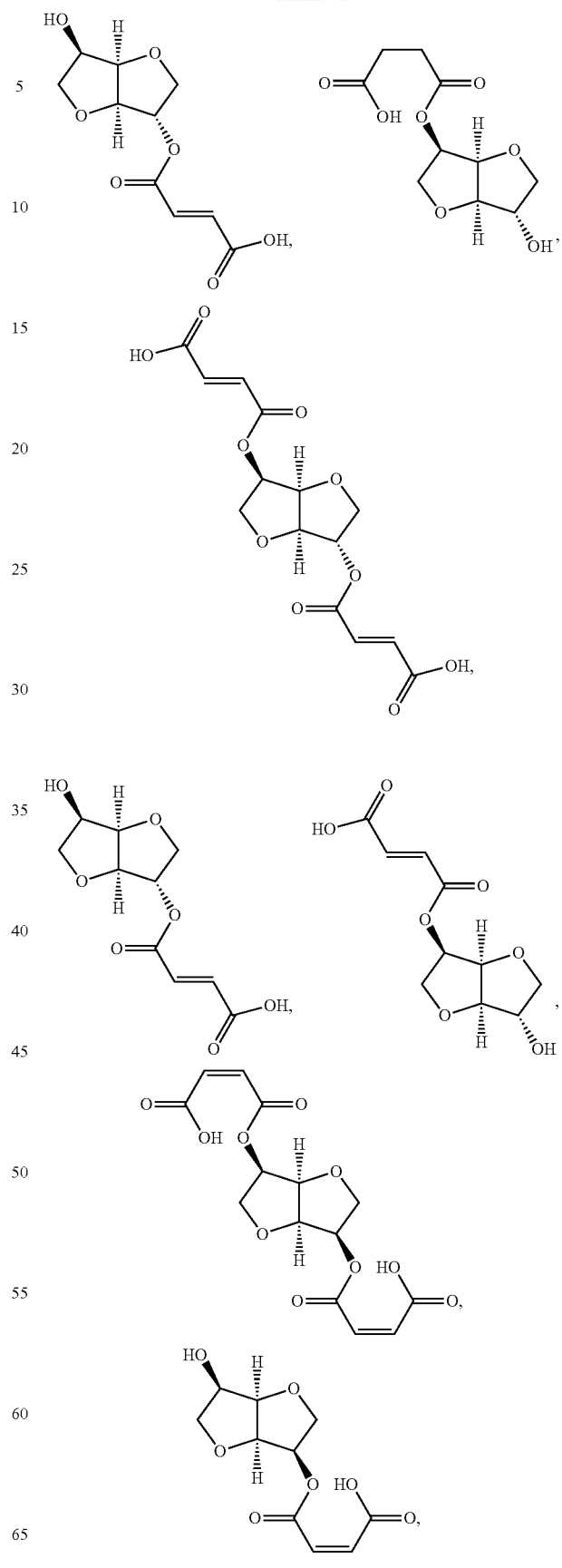

29
-continued
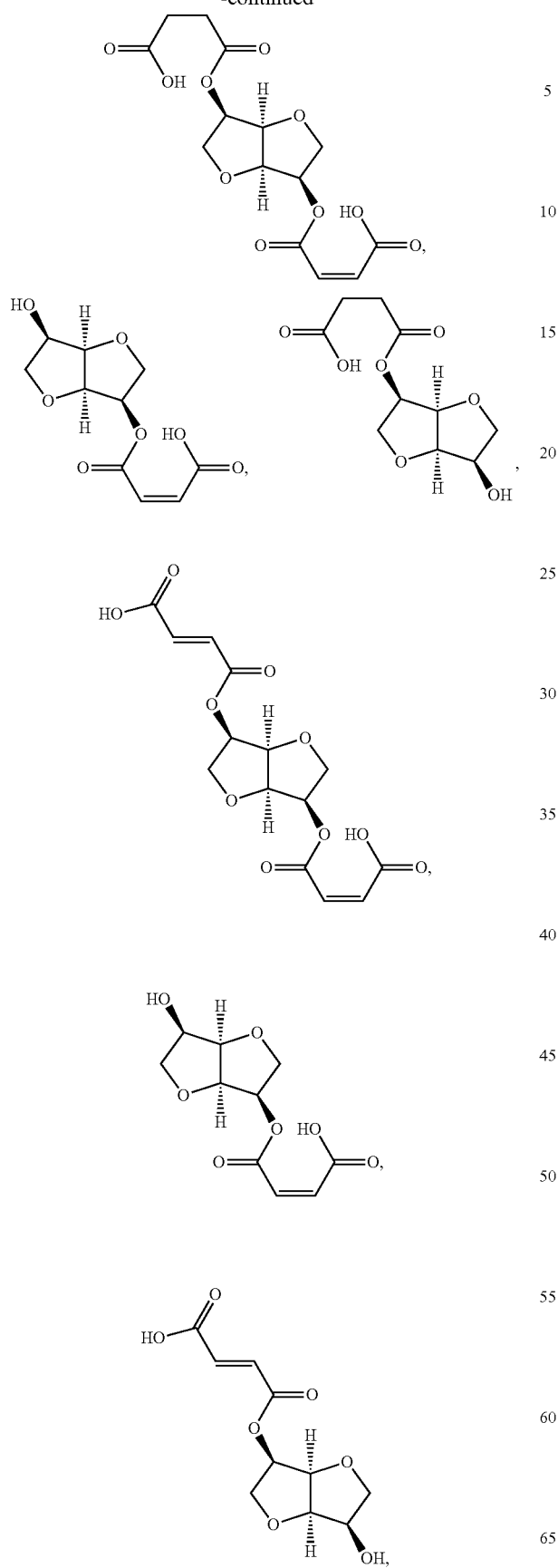
30
-continued
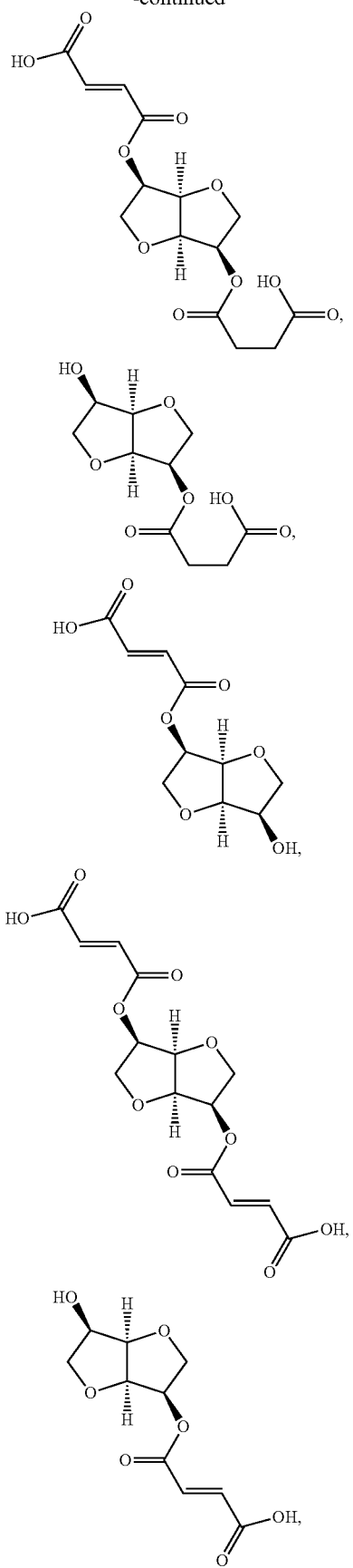

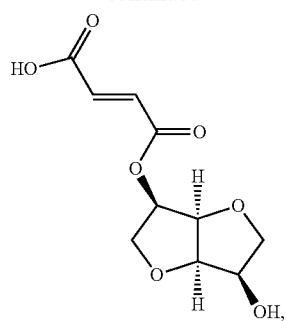
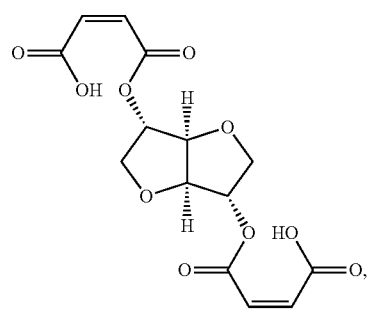
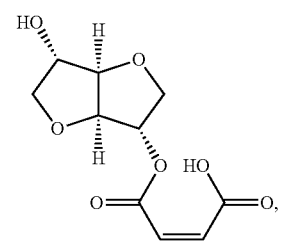
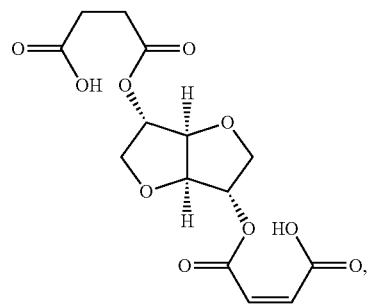
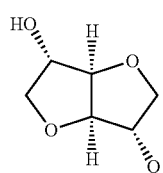
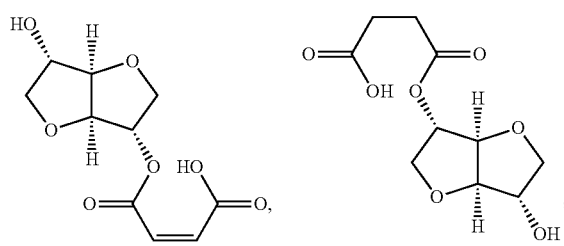
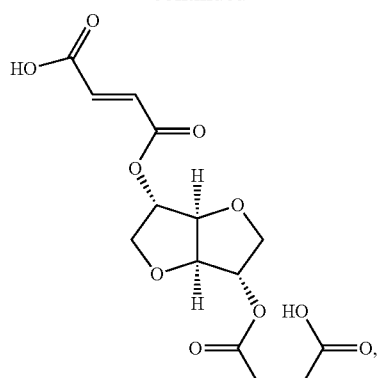
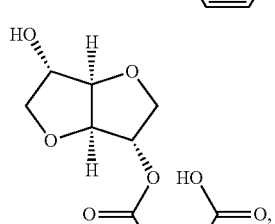
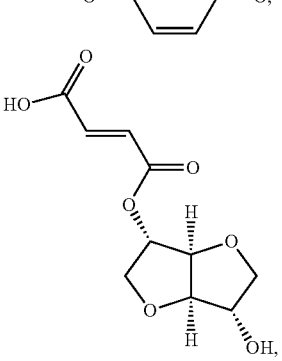
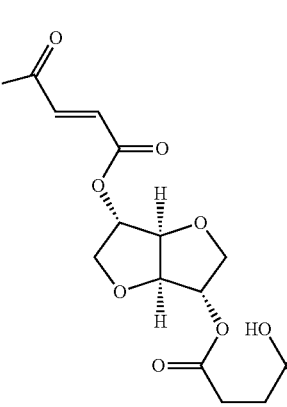
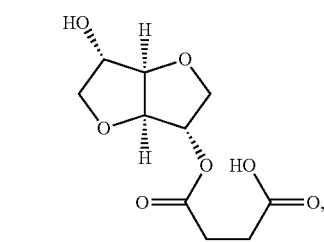

33
-continued
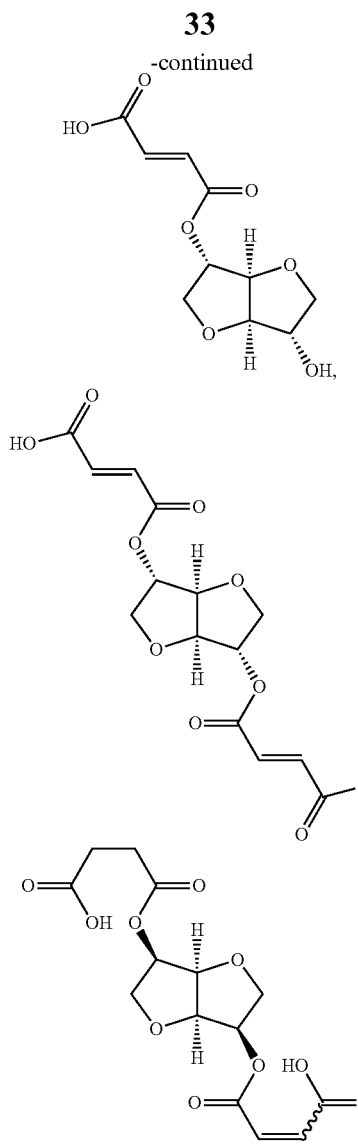
34
-continued
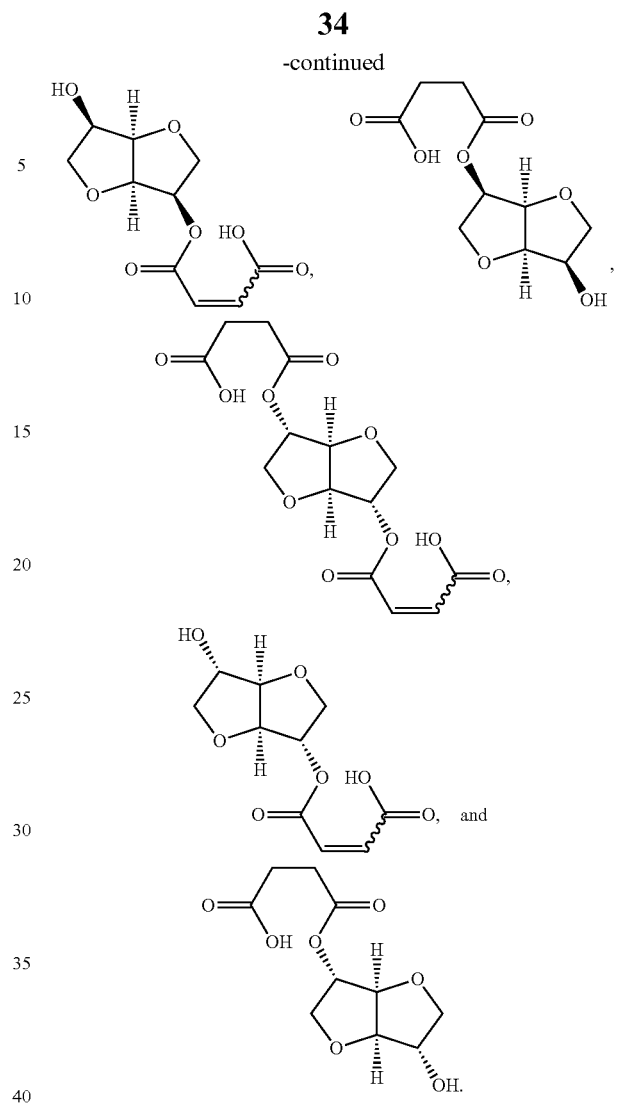
The polymer can have a structure that is chosen from:
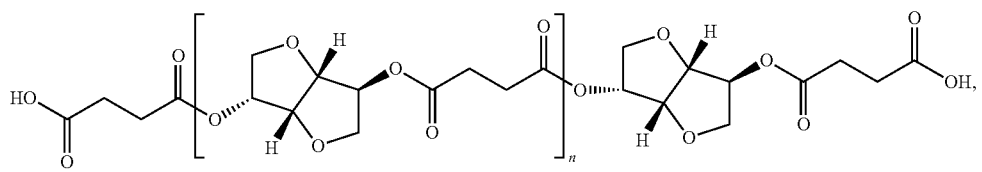
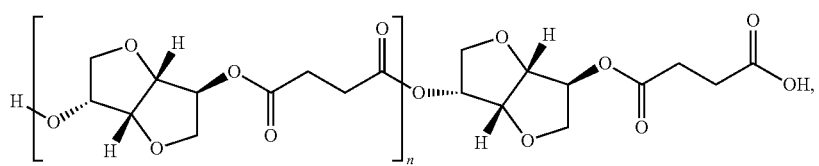
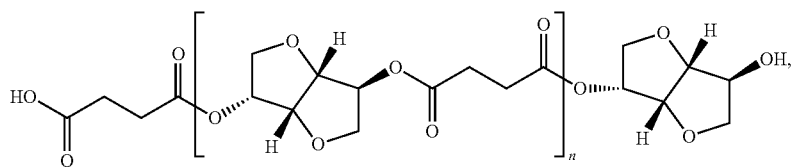

-continued
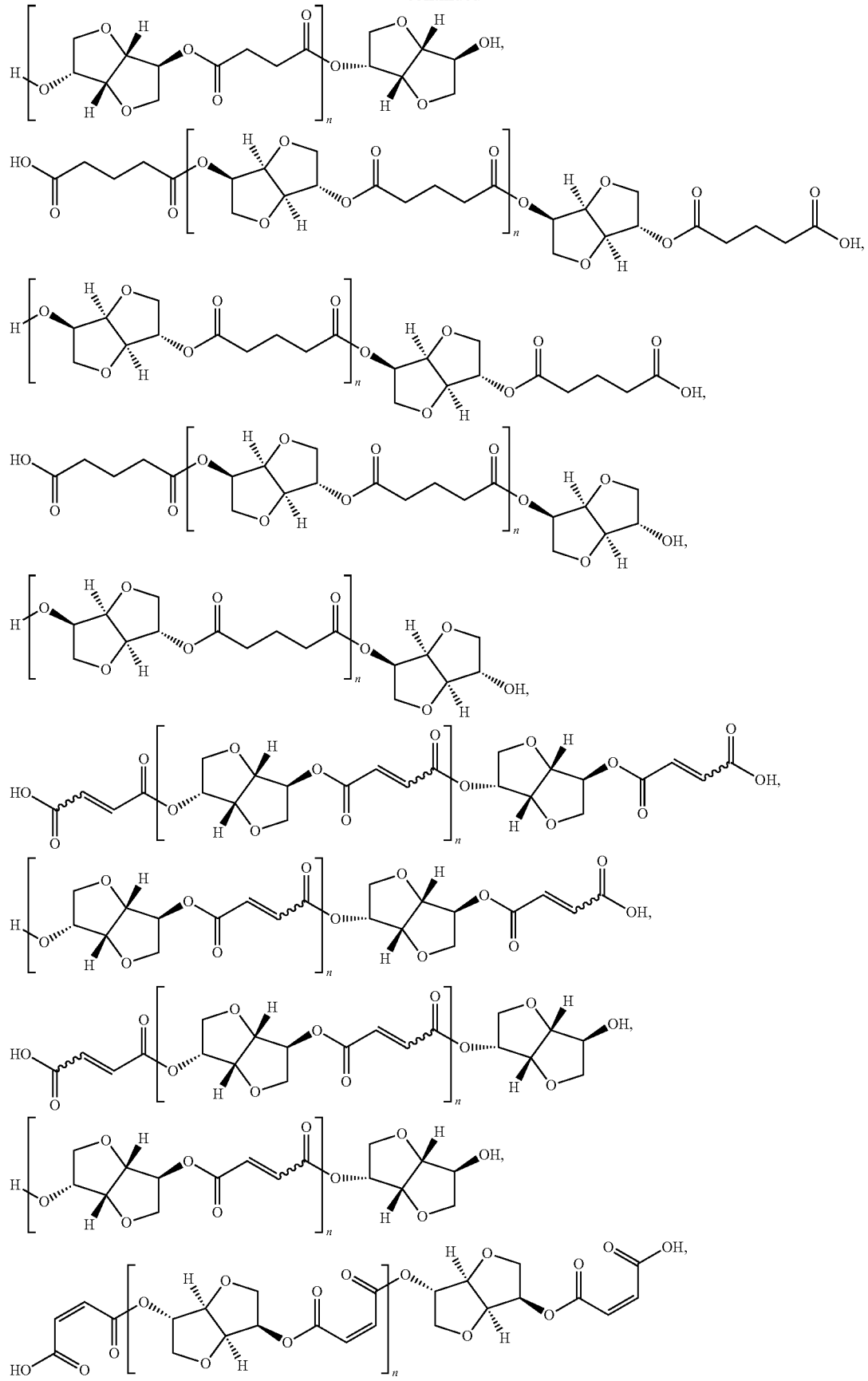

-continued
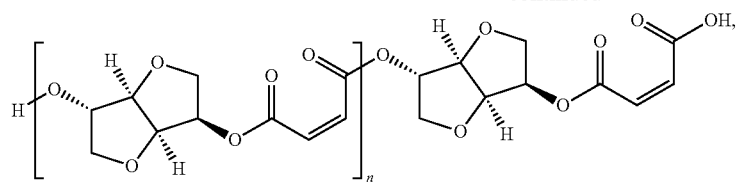
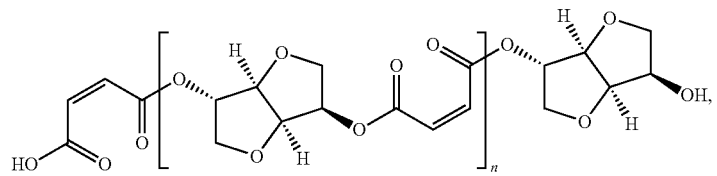
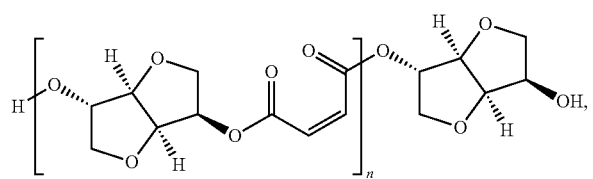
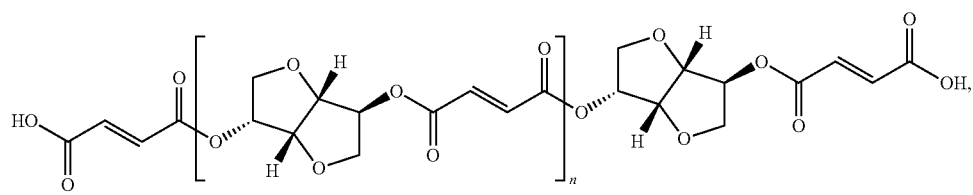
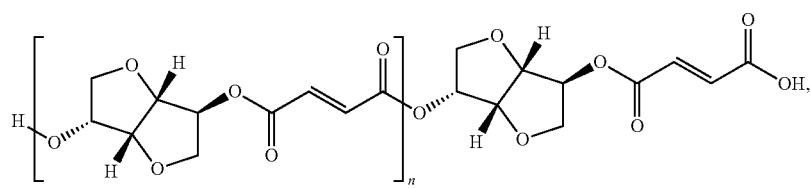
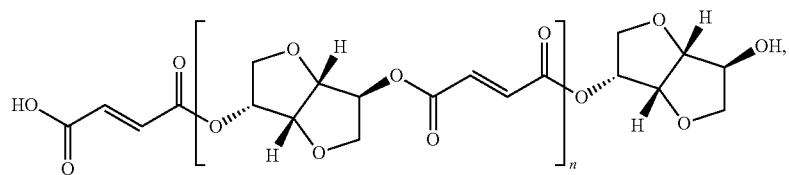
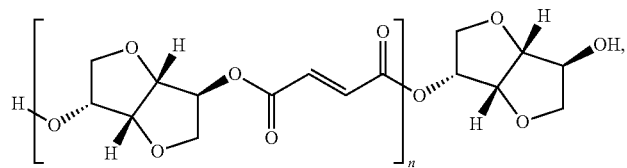
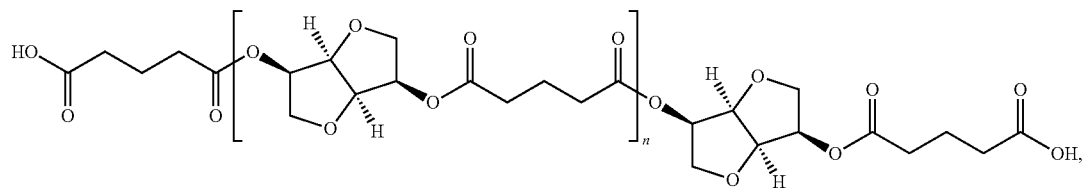
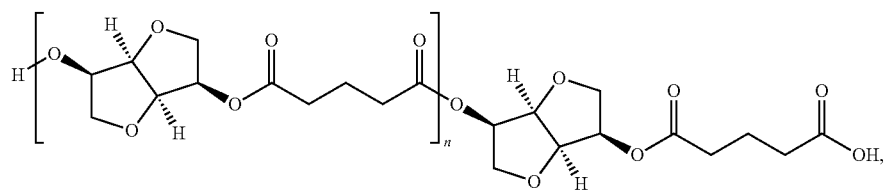

-continued
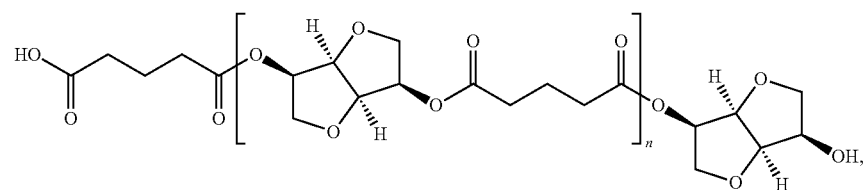
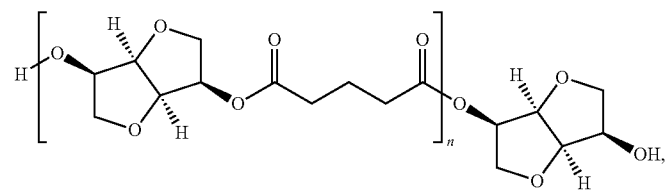
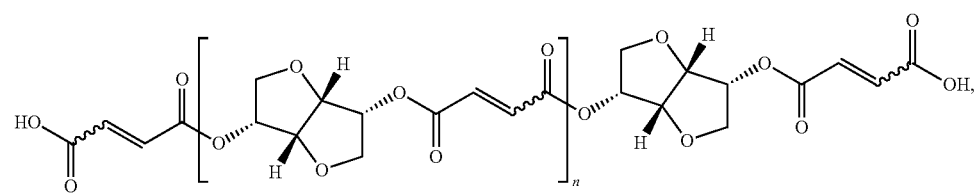
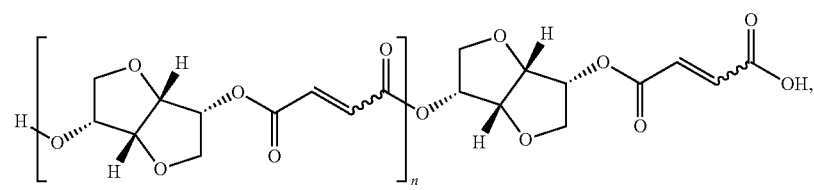
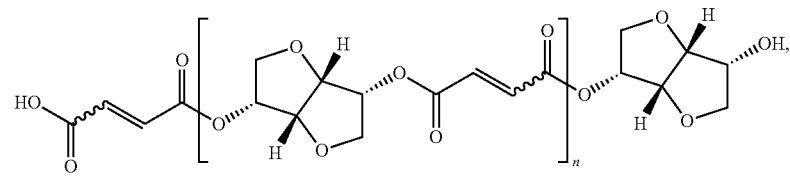
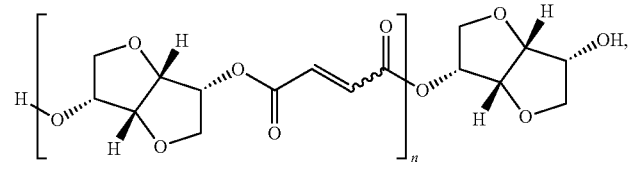
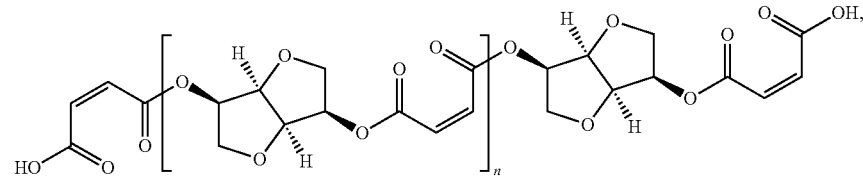
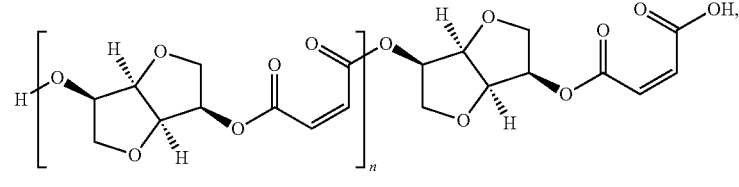
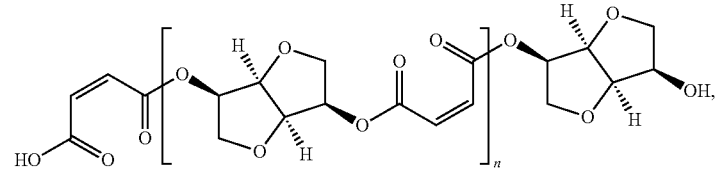

-continued
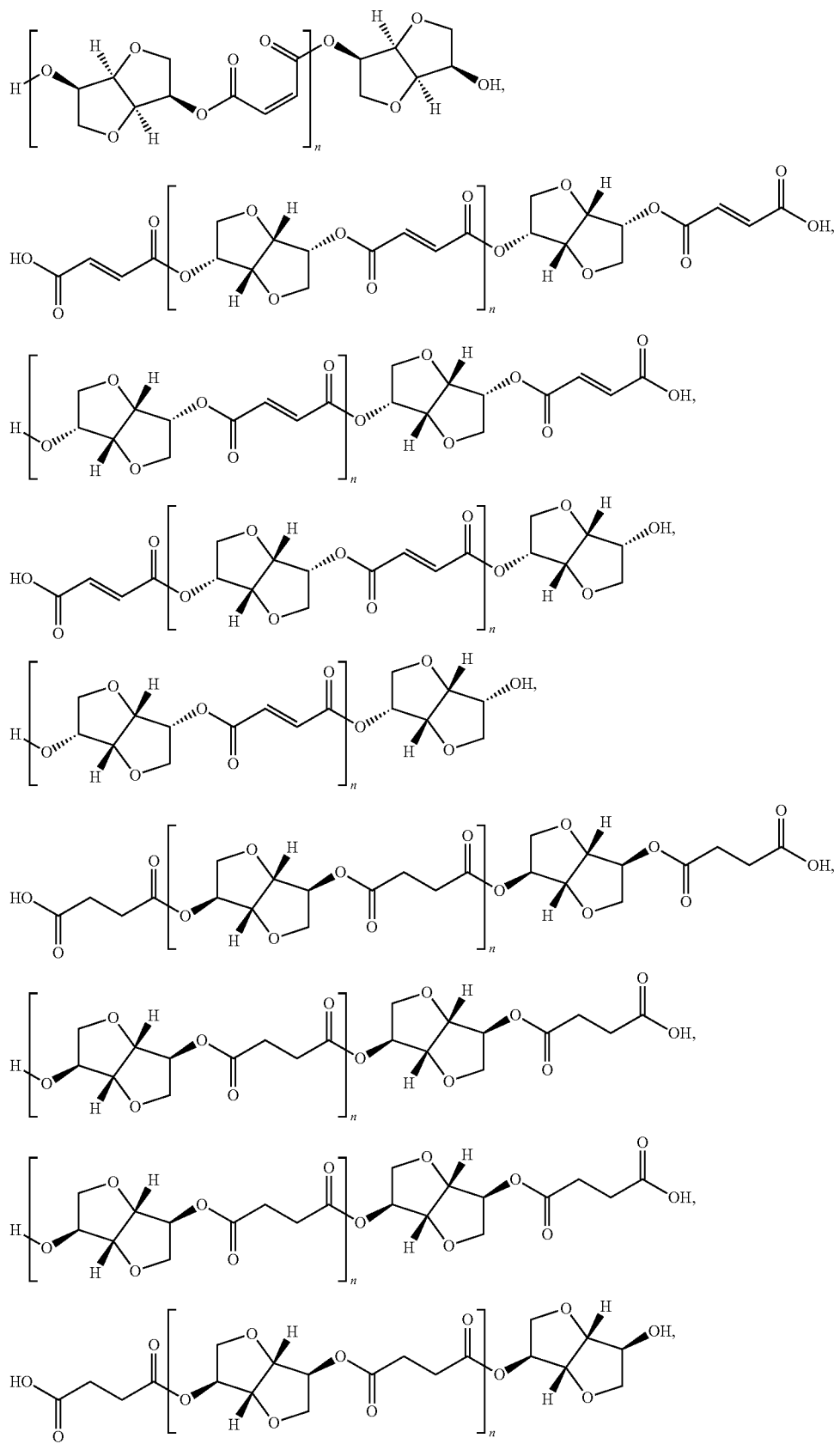

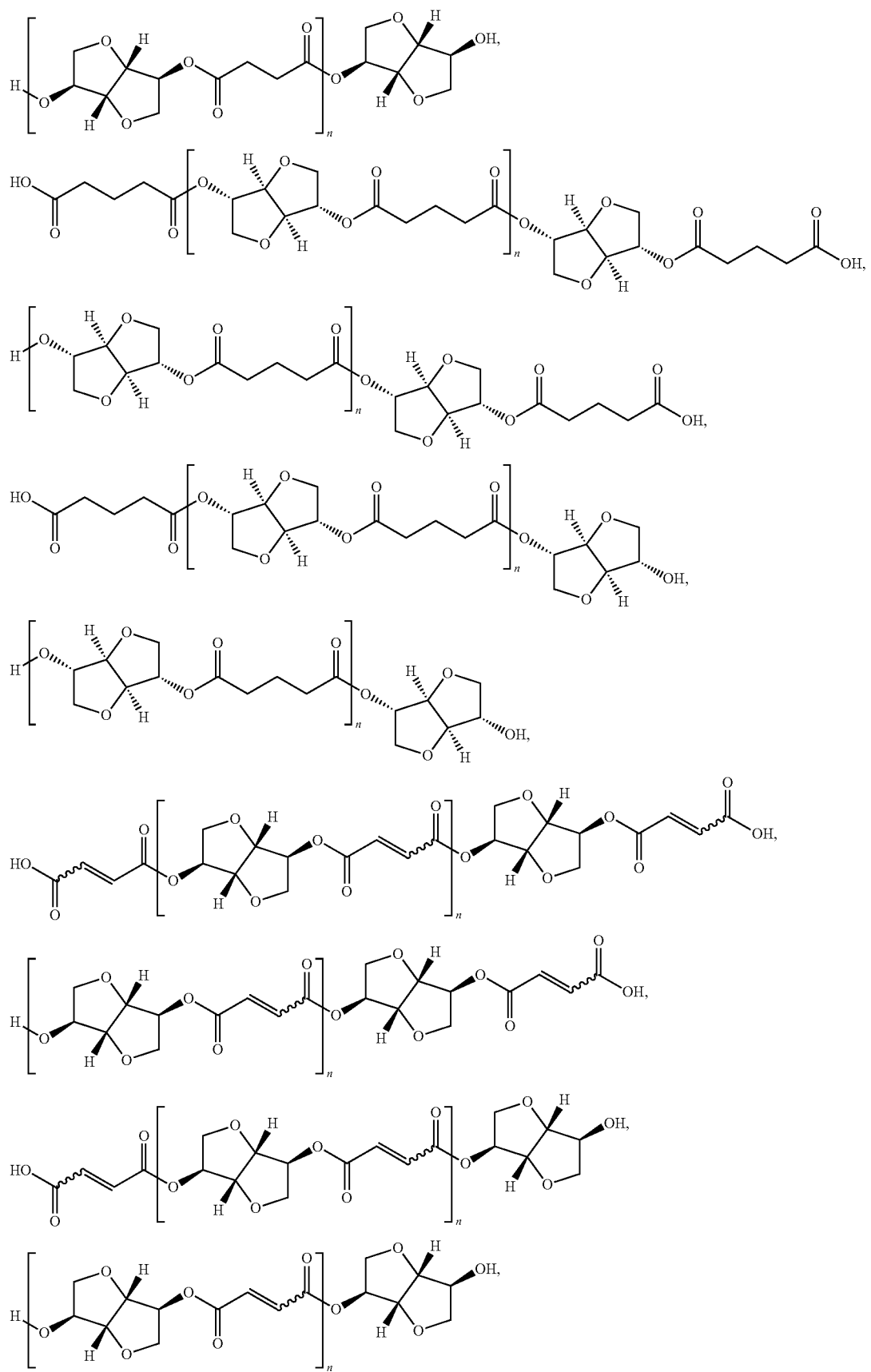

-continued
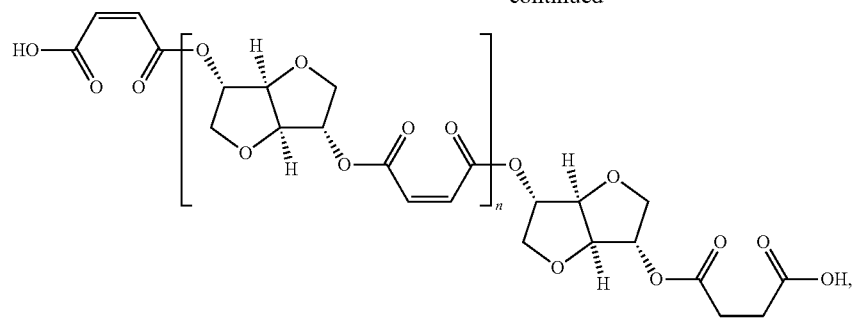
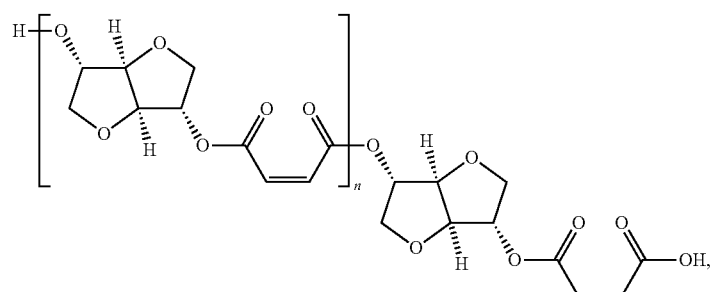
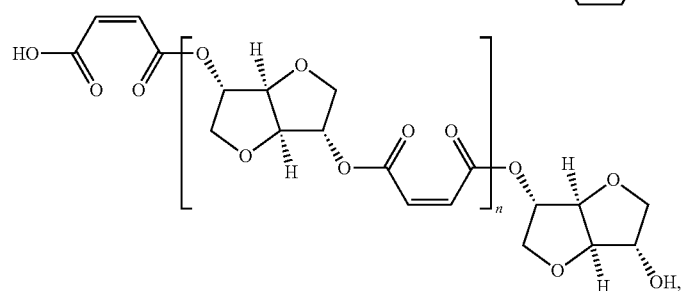
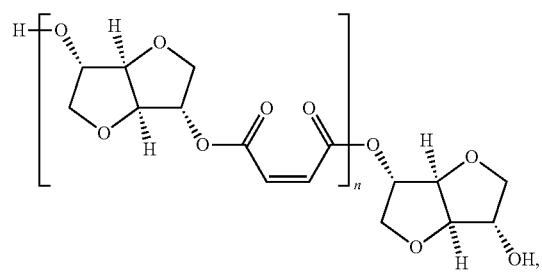
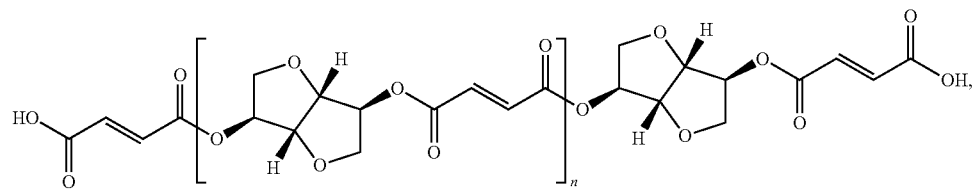
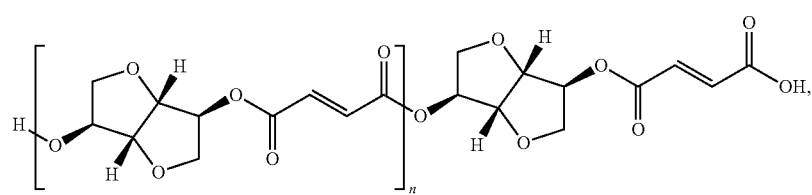
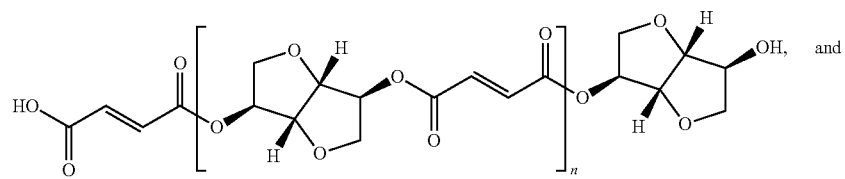
and -continued

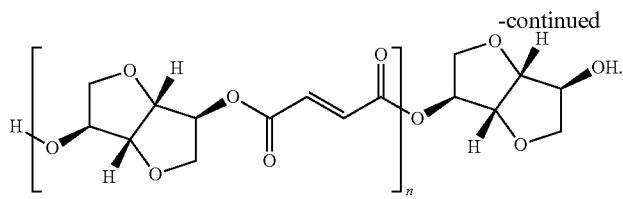

The carboxylic acid can have the structure:

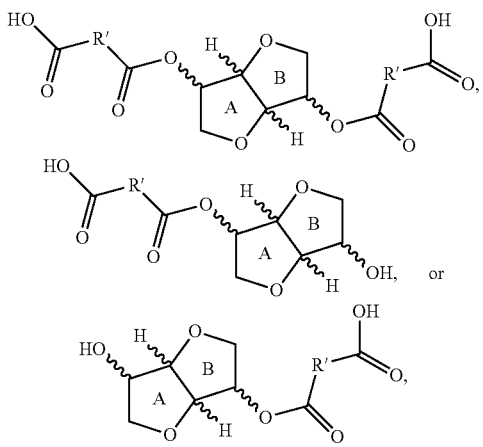

and the polymer can have the structure:

Rings A and B can form a ring system chosen from isosorbide, isomannide, and isoidide. At each occurrence, R' can be independently selected from —CH$_2$—CH$_2$—, —CH$_2$—CH$_2$—CH$_2$—, o-phenylene, cis —CH=CH—, and trans —CH=CH—. In some embodiments, at least one R' is —CH$_2$—CH$_2$— and at least one R' is cis or trans —CH=CH—; at least one R' is —CH$_2$—CH$_2$— and at least one R' is cis —CH=CH—; at least one R' is —CH$_2$—CH$_2$— and at least one R' is trans —CH=CH—; at least one R' is —CH$_2$—CH$_2$—CH$_2$— and at least one R' is cis or trans —CH=CH—; at least one R' is —CH$_2$—CH$_2$—CH$_2$— and at least one R' is cis —CH=CH—; at least one R' is —CH$_2$—CH$_2$—CH$_2$— and at least one R' is trans —CH=CH—; or at least one R' is cis —CH=CH— and at least one R' is trans —CH=CH—.

In some embodiments, at least one R' is —CH$_2$—CH$_2$—, at least one R' is cis or trans —CH=CH—, and wherein the carboxylic acid has the structure:

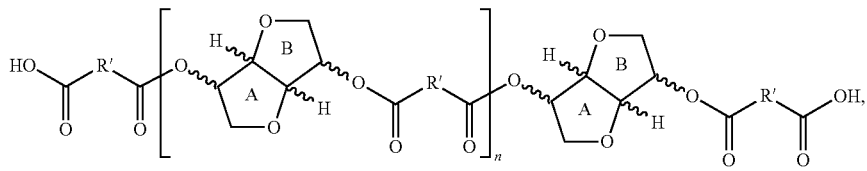

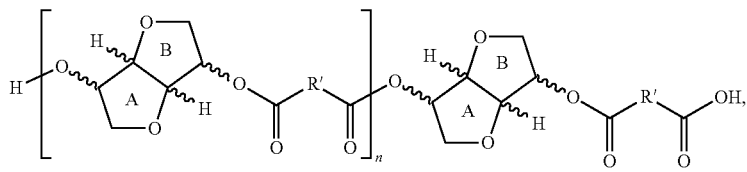

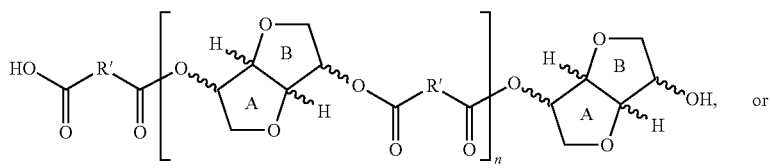

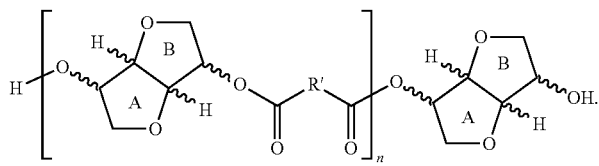

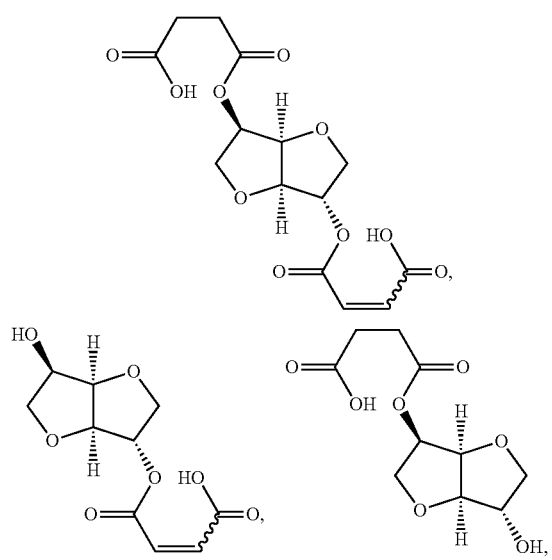
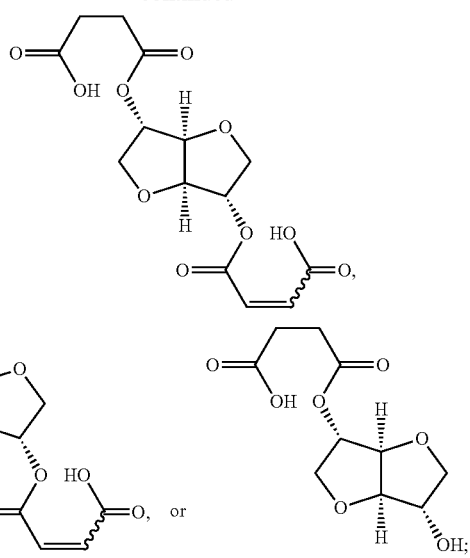
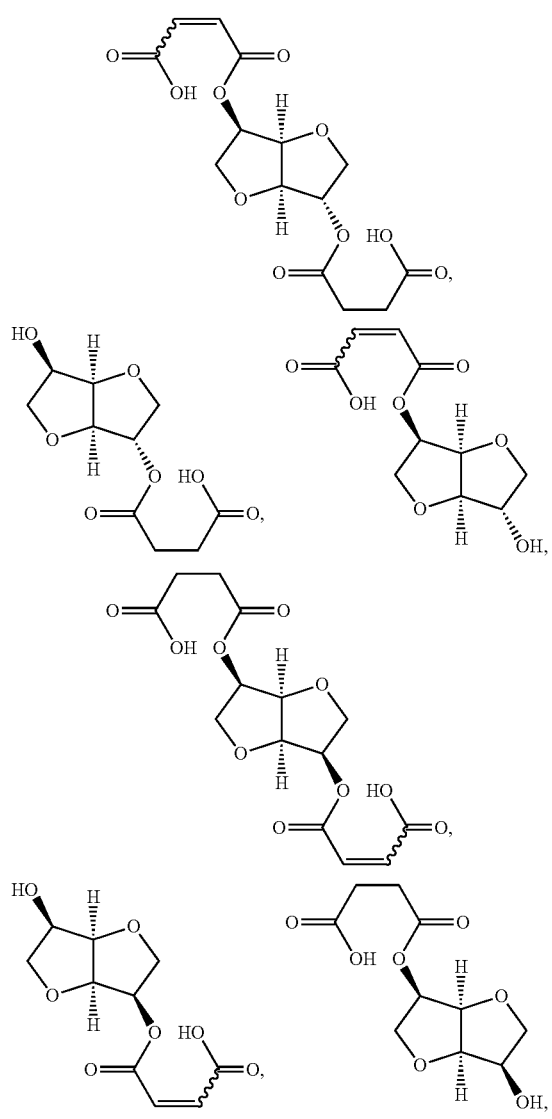
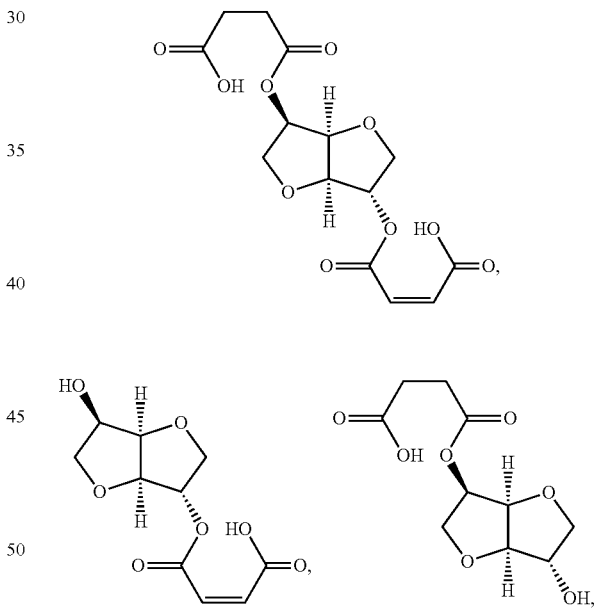
at least one R' is —CH$_2$—CH$_2$—, at least one R' is cis —CH=CH—, and wherein the carboxylic acid has the structure:
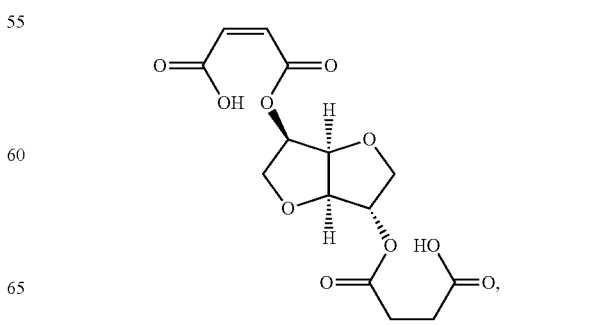

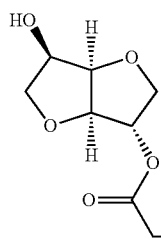 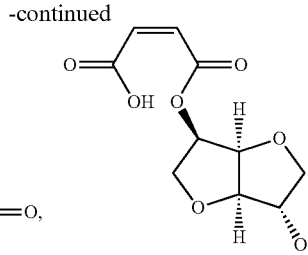
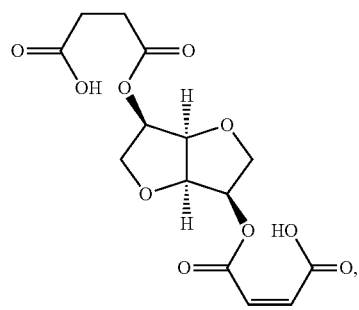
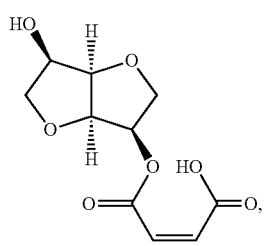 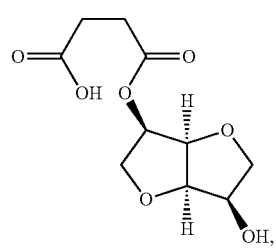
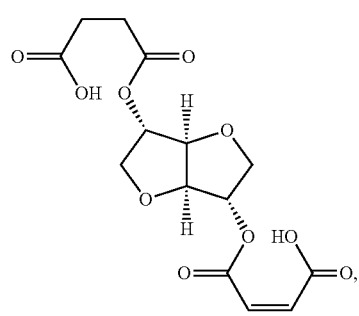
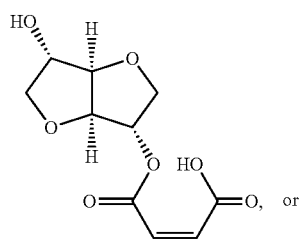 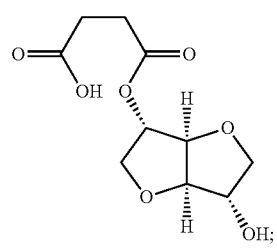 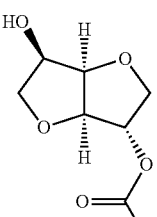 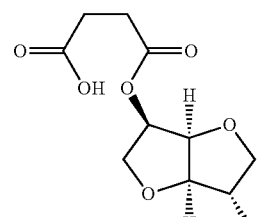
at least one R' is —CH₂—CH₂—, at least one R' is trans —CH=CH—, and wherein the carboxylic acid has the structure:

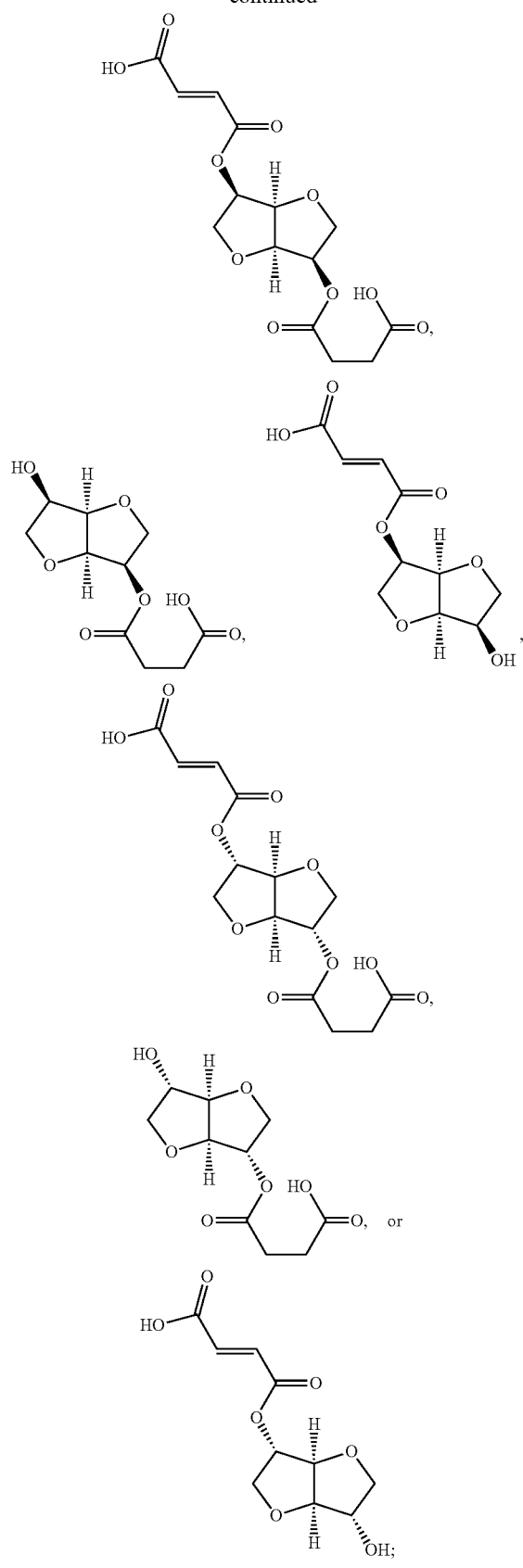
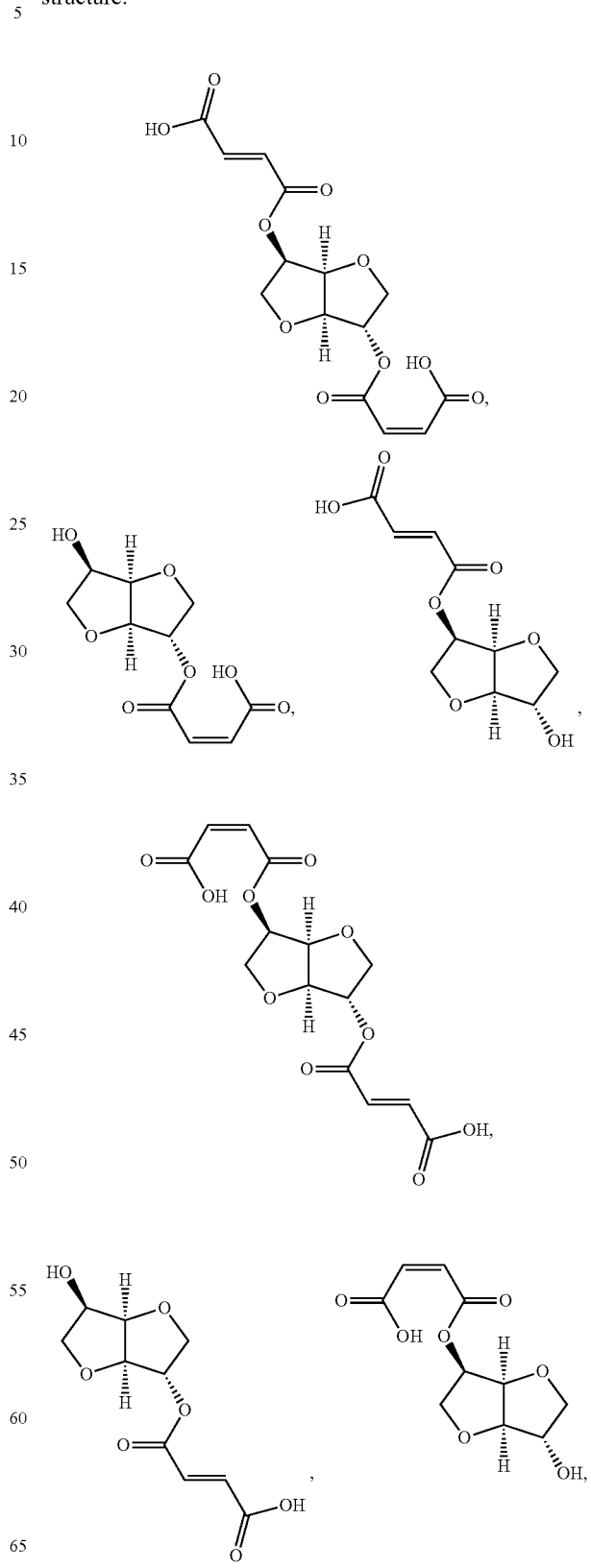
or
at least one R' is cis —CH=CH—, at least one R' is trans —CH=CH—, and wherein the carboxylic acid has the structure:

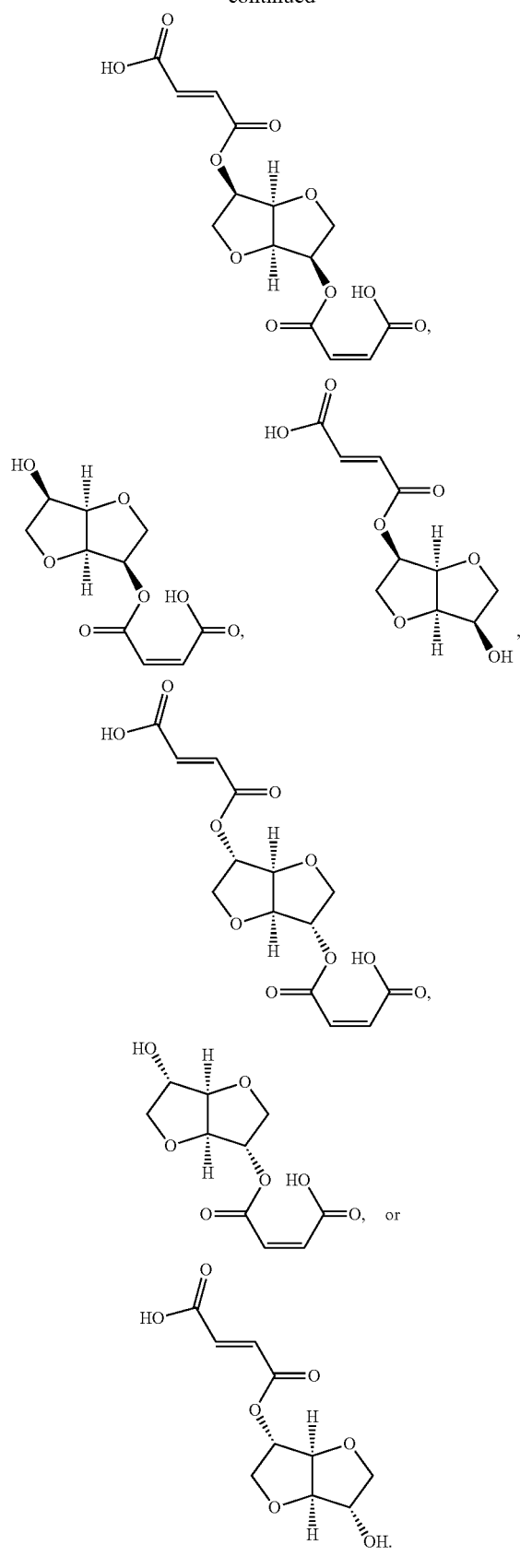
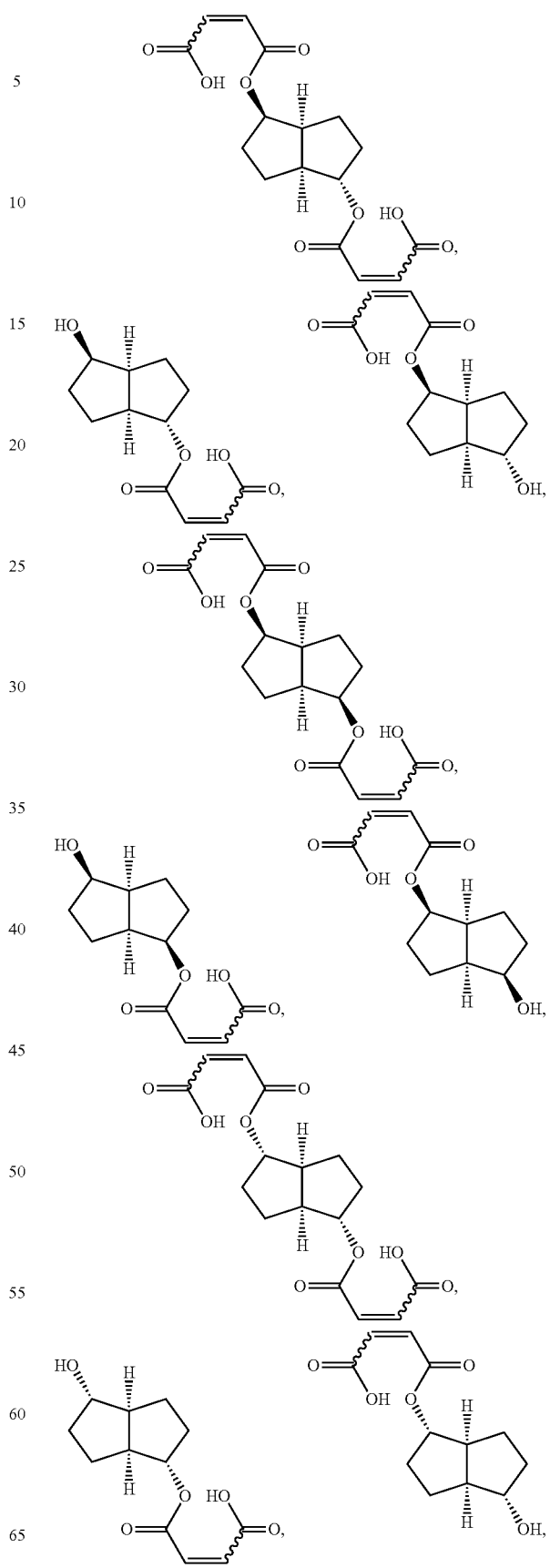
The carboxylic acid can be chosen from:

57
-continued
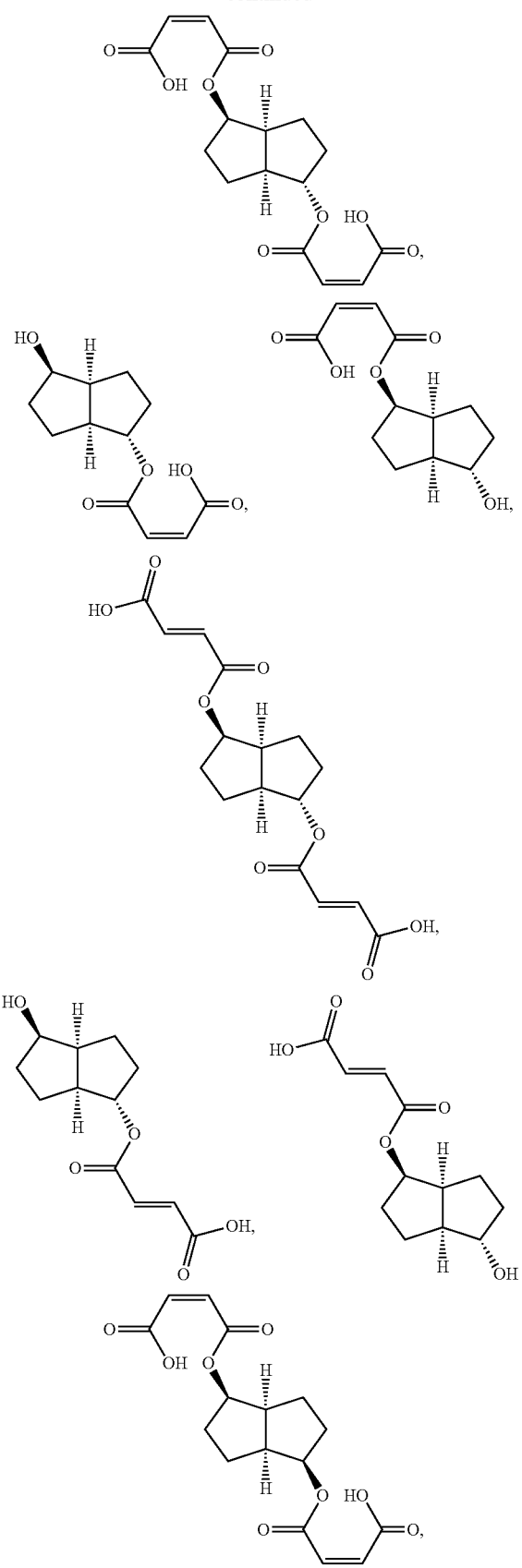
58
-continued
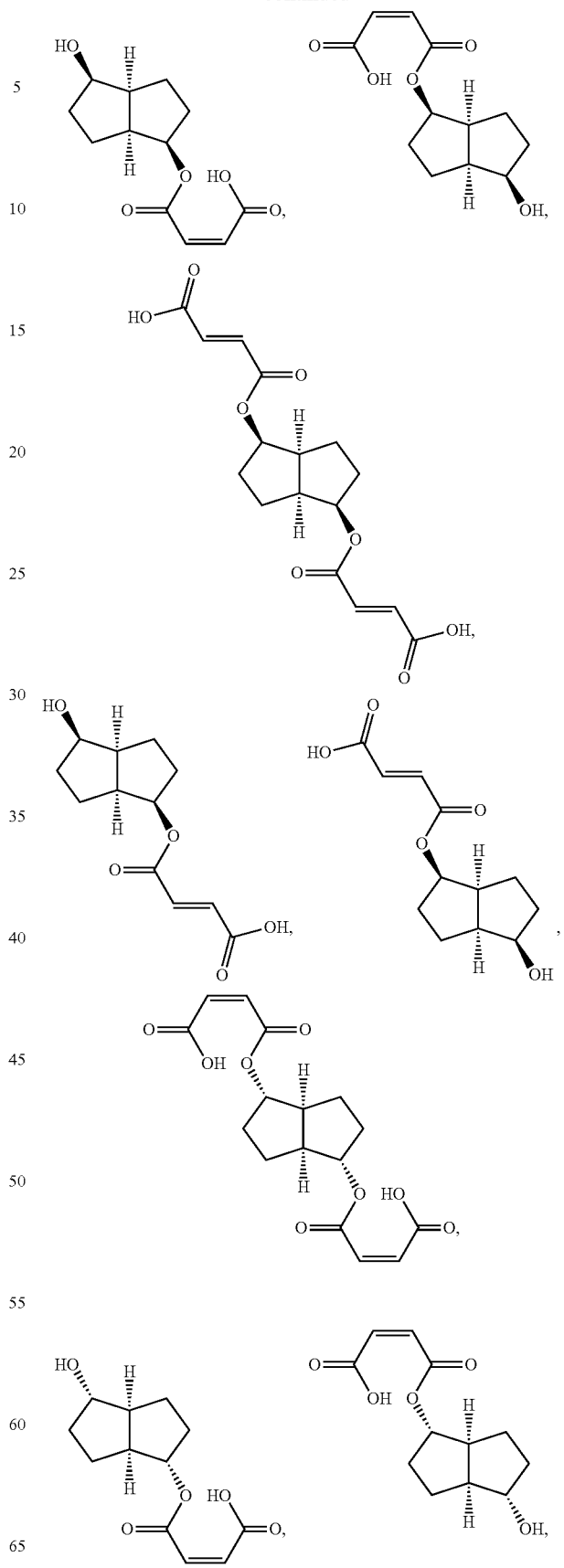

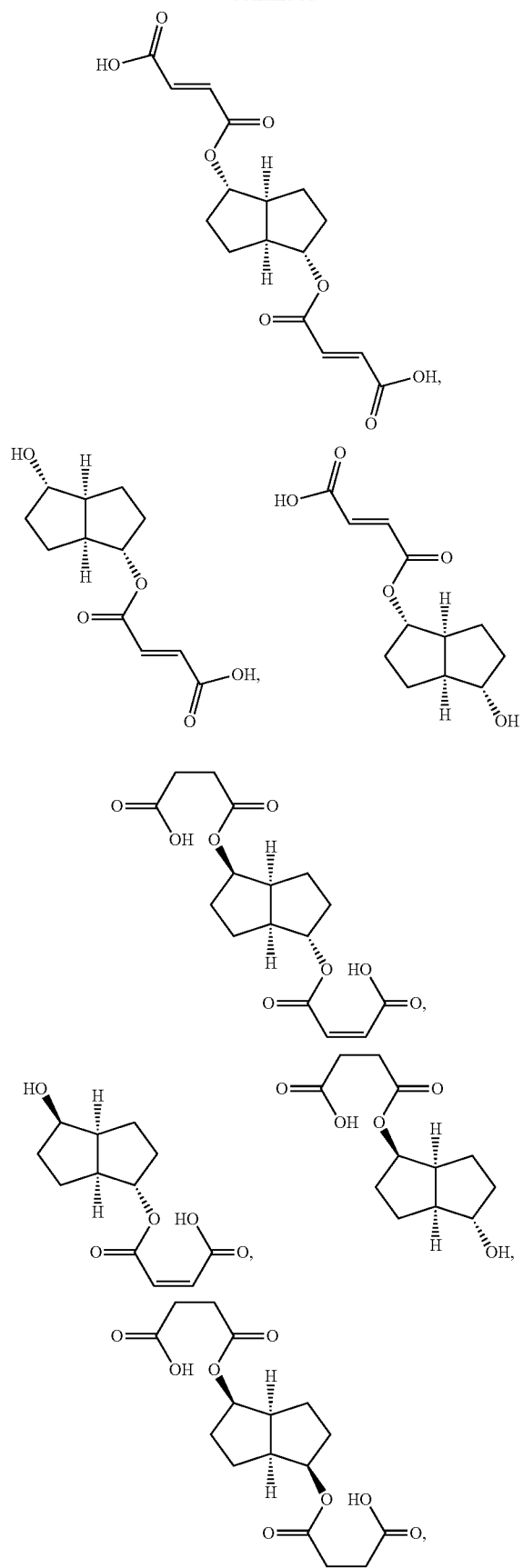

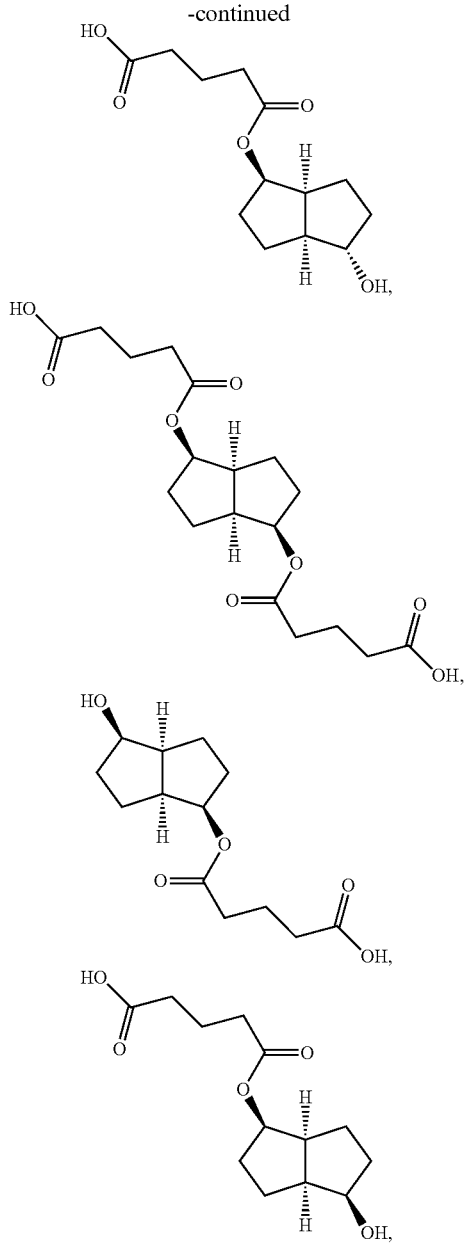
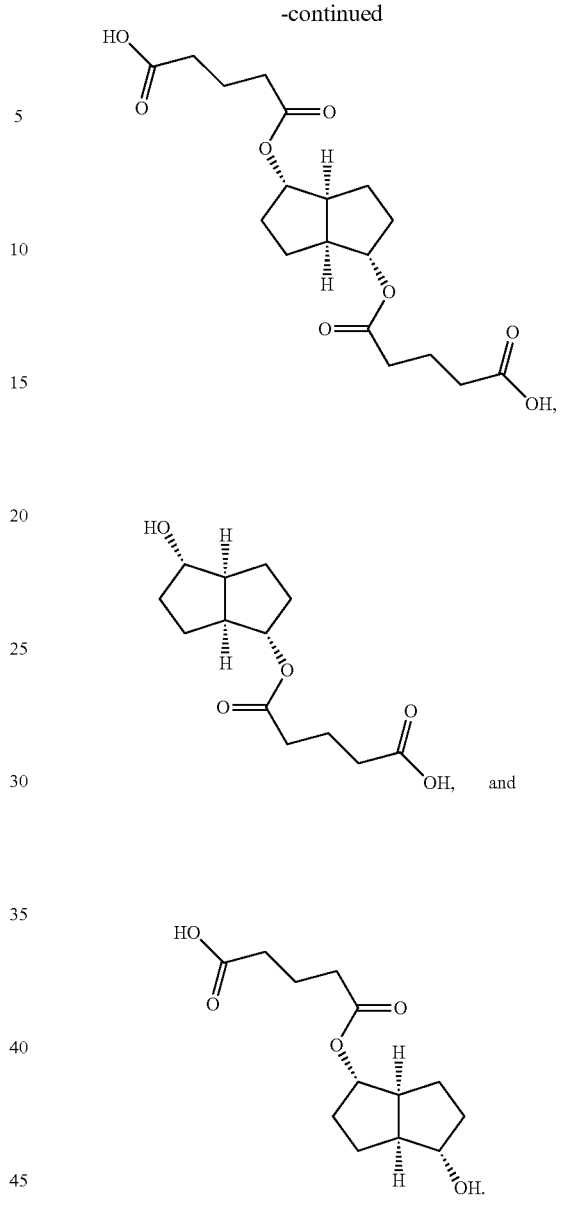
The polymer can have the structure:
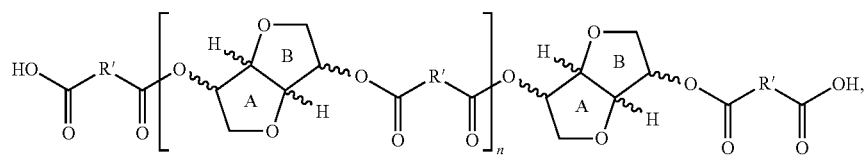
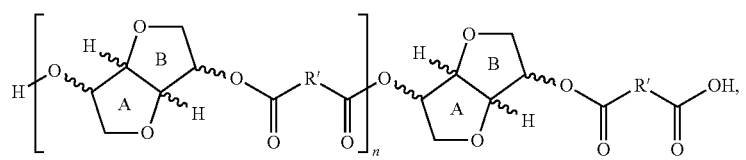

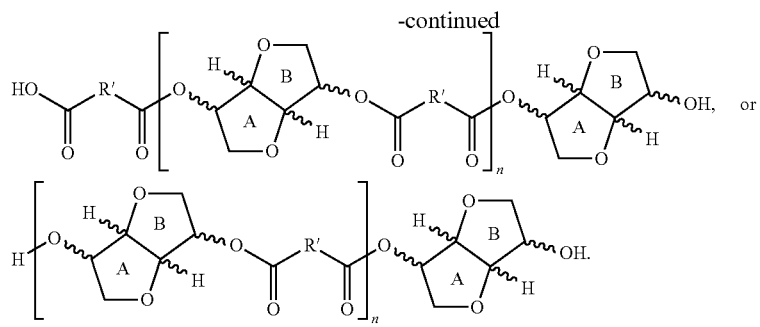

Rings A and B can form a ring system chosen from isosorbide, isomannide, and isoidide. At each occurrence, R' can be independently selected from —$CH_2$—$CH_2$—, —$CH_2$—$CH_2$—$CH_2$—, cis —CH=CH—, and trans —CH=CH—.

Polymer.

In various embodiments, the present invention provides a polymer. The polymer can be any polymer that can be prepared via a method described herein. In various embodiments, the polymer is at least one of a tackifier and a viscosifier.

The polymer can have any suitable molecular weight. In some embodiments, the polymer can have a weight average molecular weight of about 500 to about 1,000,000, about 500 to about 10,000, about 500 to about 5,000, about 1,000 to about 2,000, about 1,250 to about 1,750, or about 500 or less, or about 550, 600, 650, 700, 750, 800, 850, 900, 950, 1,000, 1,050, 1,100, 1,150, 1,200, 1,250, 1,300, 1,350, 1,400, 1,450, 1,500, 1,550, 1,600, 1,650, 1,700, 1,750, 1,800, 1,850, 1,900, 1,950, 2,000, 2,100, 2,200, 2,300, 2,400, 2,500, 2,750, 3,000, 3,500, 4,000, 4,500, 5,000, 6,000, 7,000, 8,000, 9,000, 10,000, 15,000, 20,000, 25,000, 50,000, 100,000, 250,000, 500,000, 750,000, or about 1,000,000 or more. The polymer can have a number average molecular weight of about 200 to about 1,000,000, about 200 to about 10,000, about 200 to about 5,000, about 200 to about 2,000, about 500 to about 1,000, or about 200 or less, or about 250, 300, 350, 400, 450, 500, 550, 600, 650, 700, 750, 800, 850, 900, 950, 1,000, 1,050, 1,100, 1,150, 1,200, 1,250, 1,300, 1,350, 1,400, 1,450, 1,500, 1,550, 1,600, 1,650, 1,700, 1,750, 1,800, 1,850, 1,900, 1,950, 2,000, 2,100, 2,200, 2,300, 2,400, 2,500, 2,750, 3,000, 3,500, 4,000, 4,500, 5,000, 6,000, 7,000, 8,000, 9,000, 10,000, 15,000, 20,000, 25,000, 50,000, 100,000, 250,000, 500,000, 750,000, or about 1,000,000 or more.

The polymer can have any suitable glass transition temperature. In various embodiments, the polymer can have a glass transition temperature of about 20° C. to about 500° C. about 30° C. to about 250° C. about 40° C. to about 90° C., or about 20° C. or less, or about 25° C., 30, 35, 40, 42, 44, 46, 48, 50, 52, 54, 56, 58, 60, 62, 64, 66, 68, 70, 72, 74, 76, 78, 80, 82, 84, 86, 88, 90, 95, 100, 105, 110, 115, 120, 125, 130, 135, 140, 145, 150, 155, 160, 165, 170, 175, 180, 185, 190, 195, 200, 210, 220, 230, 240, 250, 275, 300, 350, 400, 450, or about 500° C. or more.

The polymer can have any suitable tack, with the tack measured in any suitable way, such as using the technique described herein in the Examples. In some embodiments, the polymer can have no tack. In some embodiments, the polymer can have a higher tack at higher temperatures than other polymers, such as compared to other polymers derived from biorenewable materials. In some embodiments, the polymer can have a tack of about 200 kPa to about 2000 kPa, about 300 kPa to about 1500 kPa, or about 200 kPa or less, or about 250 kPa, 300, 350, 400, 450, 500, 550, 600, 650, 700, 750, 800, 850, 900, 950, 1,000, 1,050, 1,100, 1,150, 1,200, 1,250, 1,300, 1,350, 1,400, 1,450, 1,500, 1,600, 1,700, 1,800, 1,900, or about 2,000 kPa or more, measured at one or more temperatures that are about 60° C. to about 120° C. about 70° C. to about 100° C. or about 60° C. or less, or about 65° C. 70, 75, 80, 85, 90, 95, 100, 105, 110, 115, or about 120° C. or more. The polymer can have a tack of about 900 kPa to about 1500 kPa, or about 900 kPa or less, or about 950, 1,000, 1,050, 1,100, 1,150, 1,200, 1,250, 1,300, 1,350, 1,400, 1,450, or about 1,500 kPa or more, measured at one or more temperature that are about 70° C. to about 90° C. or about 70° C. or less, or about 72° C., 74, 76, 78, 80, 82, 84, 86, 88, or about 90° C. or more. The polymer can have a tack of about 0 kPa to about 100 kPa, or about 0 kPa, 5, 10, 15, 20, 25, 30, 35, 40, 45, 50, 55, 60, 65, 70, 75, 80, 85, 90, 95, or about 100 kPa or more, measured at one or more temperatures that are about −40° C. to about 80° C. or about −40° C. or less, or about −35, −30, −25, −20, −15, −10, −5, 0, 5, 10, 15, 20, 25, 30, 35, 40, 45, 50, 55, 60, 65, 70, 75, or about 80° C. or more.

The polymer can have the structure:

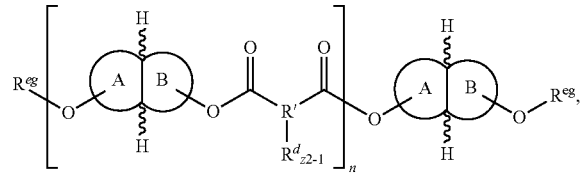

or a salt or ester thereof (e.g., a salt or substituted or unsubstituted ($C_1$-$C_{20}$)hydrocarbyl ester of one or more carboxylic acid groups). At each occurrence, $R^{eg}$ can be independently chosen from —H and —C(O)—R'($R^d$)$_{z2-1}$—C(O)—OH. Fused rings A and B can be each independently chosen from substituted or unsubstituted ($C_5$-$C_{10}$)cycloalkyl and ($C_2$-$C_{10}$)heterocyclyl. The variable n can be about 1 to about 100,000. The variable z2 can be about 1 to about 100. At each occurrence, R' can be independently a substituted or unsubstituted ($C_2$-$C_{10}$)hydrocarbyl having valence z2+1. At each occurrence, $R^d$ can be independently chosen from —H,

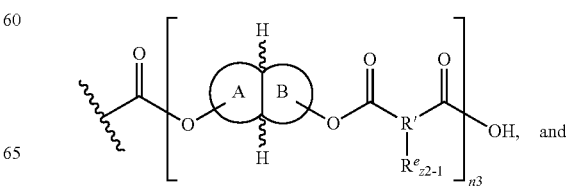

-continued

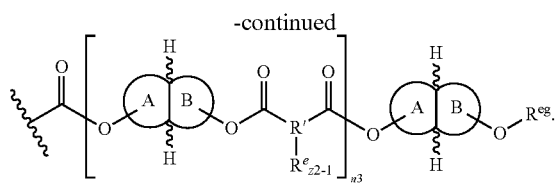

At each occurrence, n3 can be independently about 0 to about 100,000. At each occurrence, $R^e$ can independently chosen from —H,

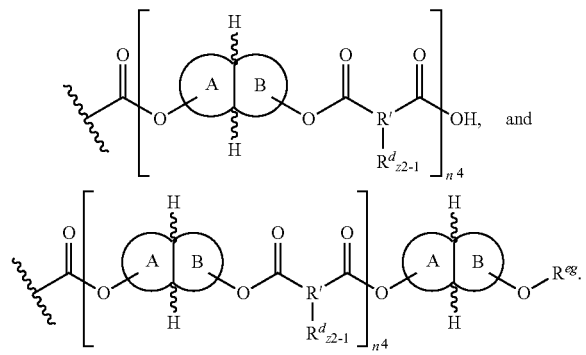

At each occurrence, n4 can be independently about 0 to about 100,000.

In various embodiments, z2 can be 1, such that the polymer has the structure:

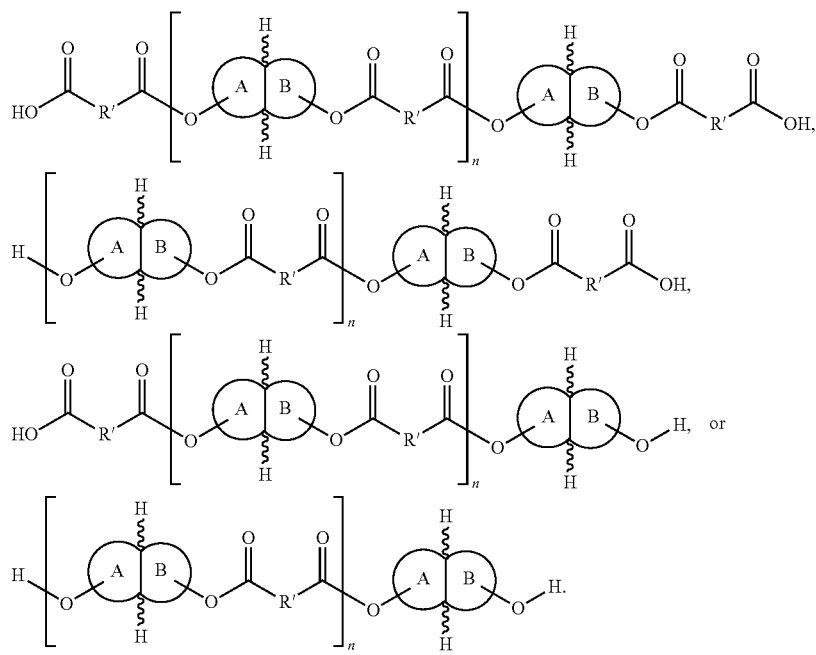

At each occurrence, R' can be independently a substituted or unsubstituted $(C_2$-$C_{10})$hydrocarbylene.

The variable z2 can be about 1 to about 100, about 1 to 20, about 1 to 10, or about 1, 2, 3, 4, 5, 6, 7, 8, 9, 10, 11, 12, 13, 14, 15, 16, 17, 18, 19, 20, 22, 24, 26, 28, 30, 40, 50, 60, 70, 80, 90, or about 100 or more. The variable z2 can be 1.

At each occurrence, the variable n3 can independently be about 0 to about 100,000, about 0 to about 100, about 0 to about 20, or about 0, 1, 2, 3, 4, 5, 6, 7, 8, 9, 10, 11, 12, 13, 14, 15, 16, 17, 18, 19, 20, 22, 24, 26, 28, 30, 35, 40, 45, 50, 75, 100, 150, 200, 250, 500, 750, 1,000, 2,000, 5,000, 10,000, 20,000, 50,000, or about 100,000 or more. At each occurrence, the variable n4 can independently be about 0 to about 100,000, about 0 to about 100, about 0 to about 20, or about 0, 1, 2, 3, 4, 5, 6, 7, 8, 9, 10, 11, 12, 13, 14, 15, 16, 17, 18, 19, 20, 22, 24, 26, 28, 30, 35, 40, 45, 50, 75, 100, 150, 200, 250, 500, 750, 1,000, 2,000, 5,000, 10,000, 20,000, 50,000, or about 100,000 or more.

The variable n can be about 1 to about 100,000, about 1 to about 2000, about 1 to about 100, about 1 to about 20, about 1 to about 10, or about 1, 2, 3, 4, 5, 6, 7, 8, 9, 10, 11, 12, 13, 14, 15, 16, 17, 18, 19, 20, 22, 24, 26, 28, 30, 35, 40, 45, 50, 55, 60, 65, 70, 75, 80, 85, 90, 95, 100, 125, 150, 175, 200, 225, 250, 300, 400, 500, 750, 1,000, 2,000, 5,000, 10,000, 20,000, 50,000, or about 100,000 or more. In some embodiments, the polymer is an oligomer.

At each occurrence, R' can be independently a substituted or unsubstituted $(C_1$-$C_{50})$hydrocarbyl having valence z2+1 interrupted or terminated by 0, 1, 2, or 3 groups independently chosen from —O—, —S—, substituted or unsubstituted —NH—, and —(O—$(C_2$-$C_3)$alkylene)$_{y2}$- wherein y2 can be about 1 to about 10,000 and wherein the $(C_2$-$C_3)$ alkylene can be substituted or unsubstituted. At each occurrence, R' can be independently a substituted or unsubstituted $(C_1$-$C_{50})$hydrocarbylene interrupted or terminated by 0, 1, 2, or 3 groups independently chosen from —O—, —S—, substituted or unsubstituted —NH—, and —(O—$(C_2$-$C_3)$ alkylene)$_{y2}$- wherein y2 can be about 1 to about 10,000 and wherein the $(C_2$-$C_3)$alkylene can be substituted or unsubstituted. At each occurrence, R' can be independently a substituted or unsubstituted $(C_2$-$C_{10})$hydrocarbyl having valence z2+1. At each occurrence, R' can be independently a substituted or unsubstituted $(C_2$-$C_{10})$hydrocarbylene. At each occurrence, R' can be unsubstituted. At each occurrence, R' can be independently chosen from $(C_1$-$C_5)$alkylene, $(C_5$-$C_{10})$aryl, and $(C_2$-$C_5)$alkenylene. At each occurrence, R' can be independently chosen from —$CH_2$—$CH_2$—, —$CH_2$—$CH_2$—$CH_2$—, o-phenylene, cis —CH=CH—, and trans —CH=CH—.

In some embodiments, no R' in the polymer is p-phenylene. In some embodiments, at least one R' in the polymer is p-phenylene and at least one R' is not p-phenylene. In some embodiments, no R' is trans —CH=CH—. In some embodiments, at least one R' is trans —CH=CH— and at least one R' is not trans —CH=CH—. In some embodiments, no R' is cis —CH=CH—. In some embodiments, at least one R' is cis —CH=CH— and at least one R' is not cis —CH=CH—.

Fused rings A and B can be each independently chosen from substituted or unsubstituted $(C_5$-$C_{10})$cycloalkyl and $(C_2$-$C_{10})$heterocyclyl. Rings A and B can be unsubstituted with the exception of the one or more alcohol and ester substituents —OC(O)—R'—C(O)OH. One of the alcohol and ester substituents including R' can be alpha to at least one carbon atom shared by rings A and B. Rings A and B can be the same size. Rings A and B can be 5-membered rings. At least one of rings A and B can include at least one oxygen atom. Each of rings A and B can be a tetrahydrofuran ring, wherein each carbon atom shared by rings A and B can have an oxygen atom alpha thereto. Each of the alcohol and ester substituents —OC(O)—R'—C(O)OH can be alpha to a different carbon atom shared by each of rings A and B. Rings A and B can form a ring system chosen from isosorbide, isomannide, and isoidide. Rings A and B can be unsubstituted.

The polymer can have the structure:

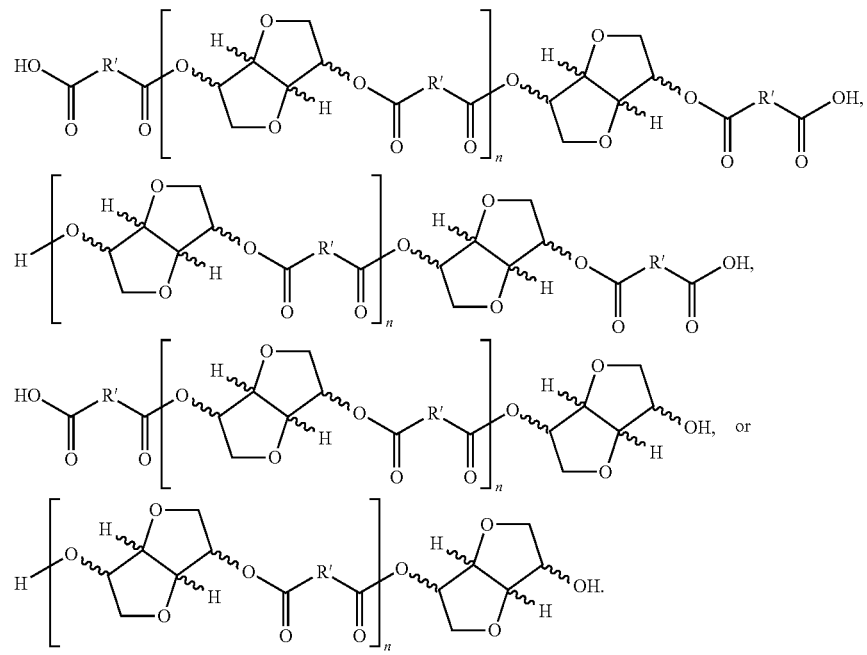

The polymer can have a structure that is chosen from:

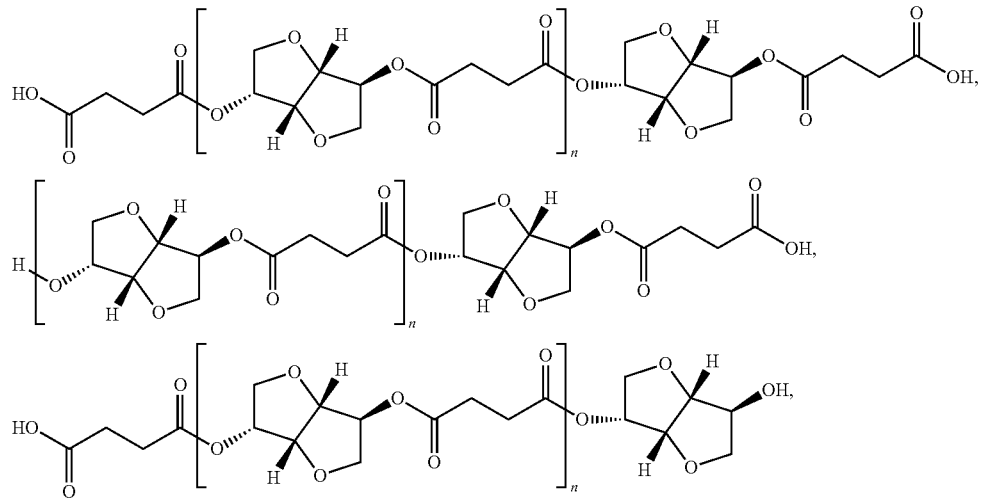

-continued
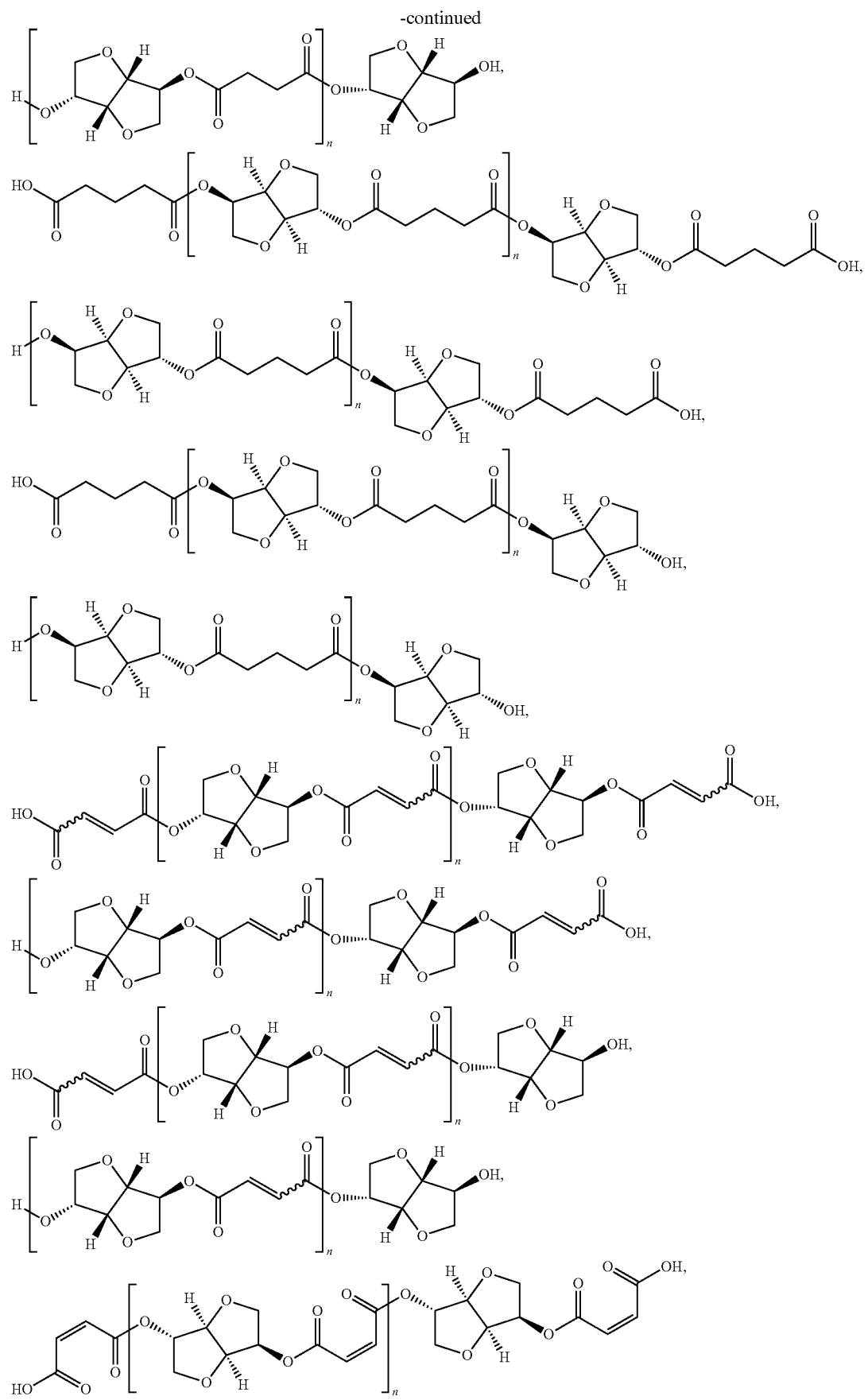

-continued
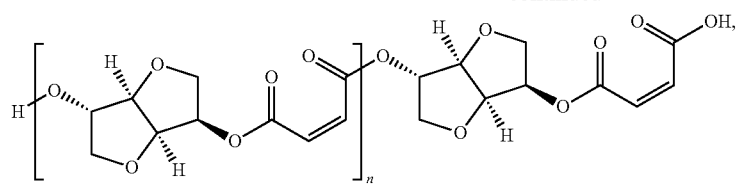
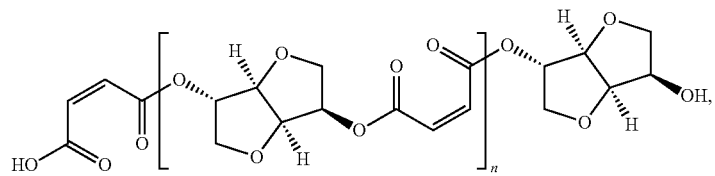
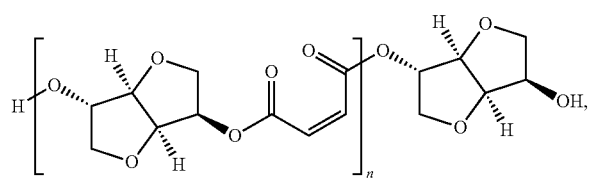
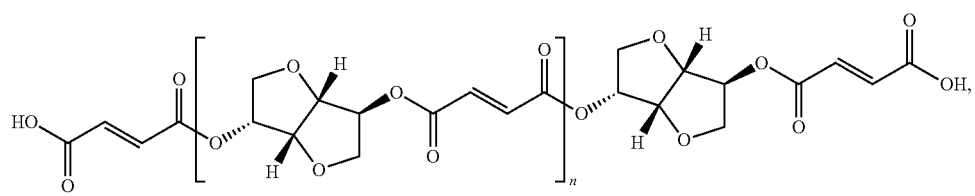
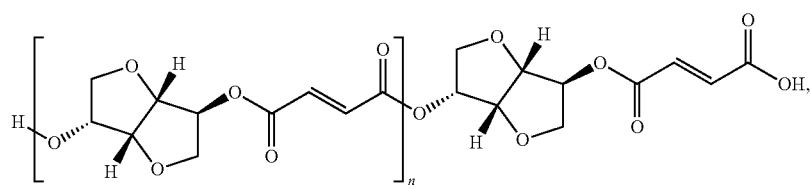
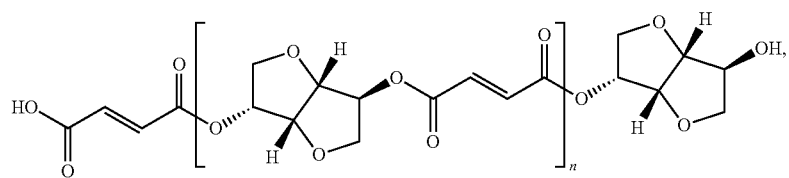
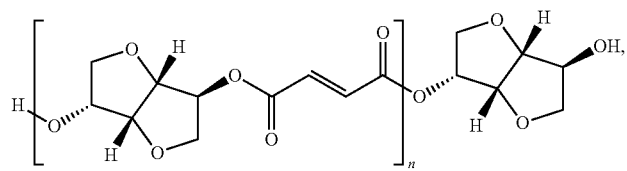
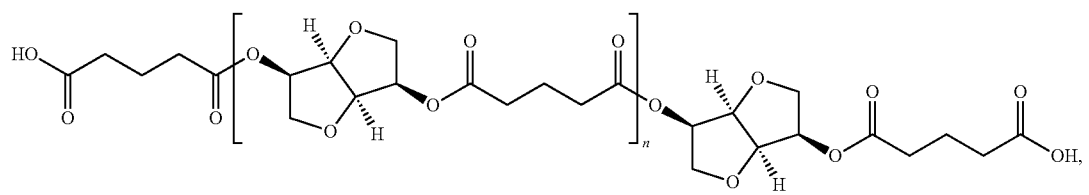
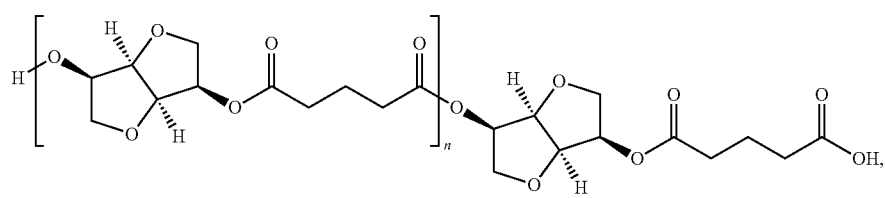

-continued
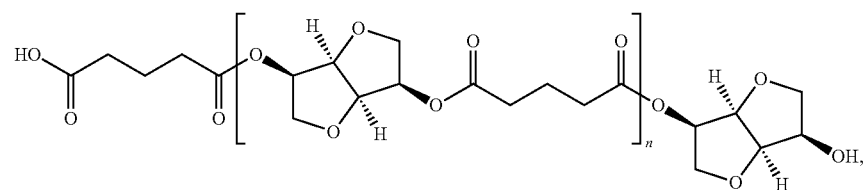
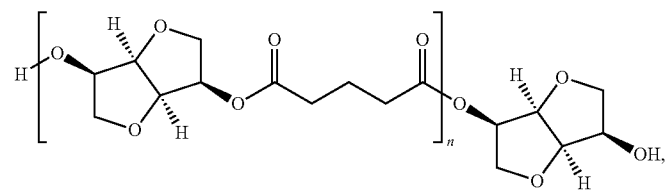
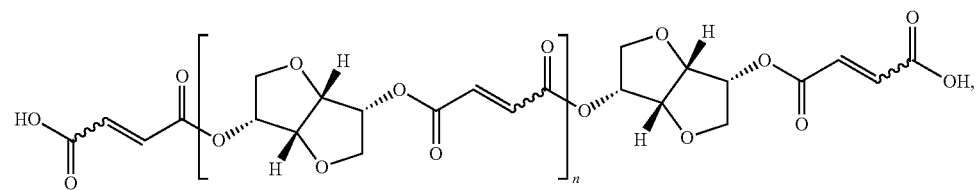
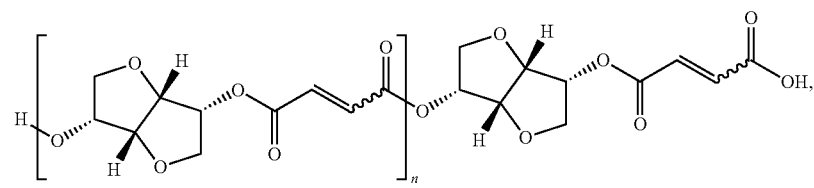
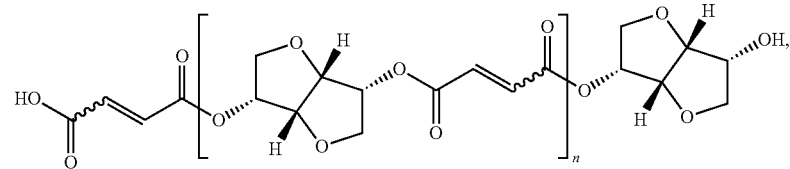
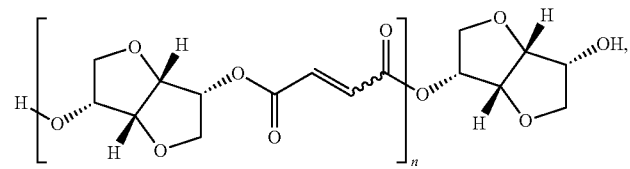
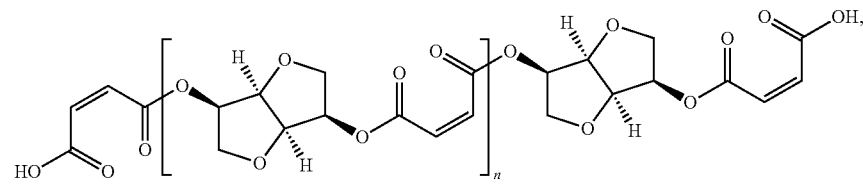
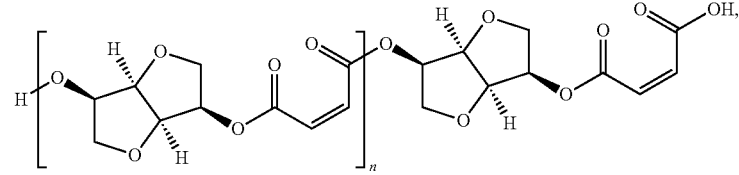
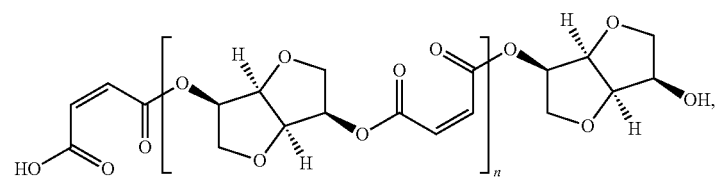

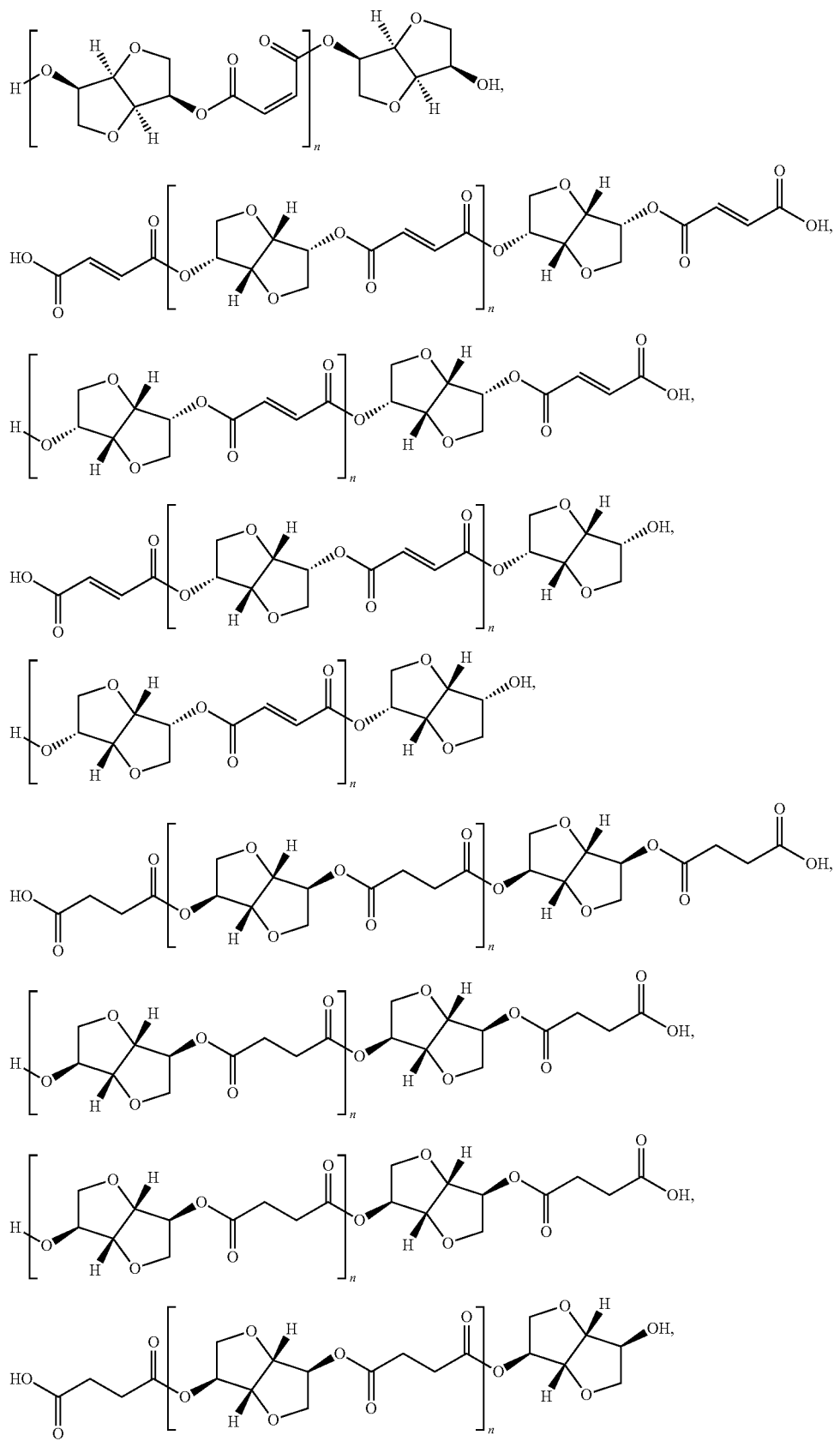

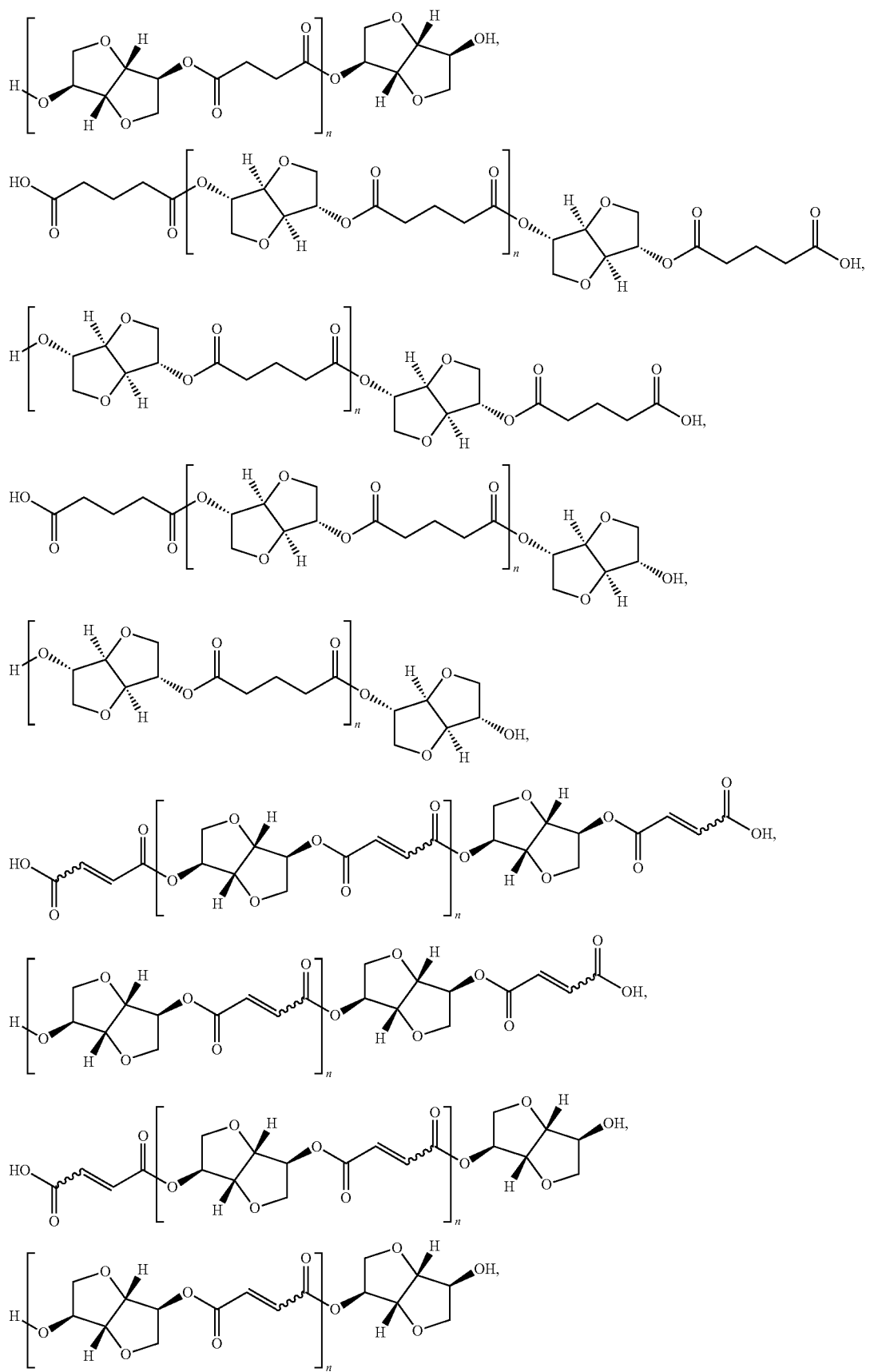

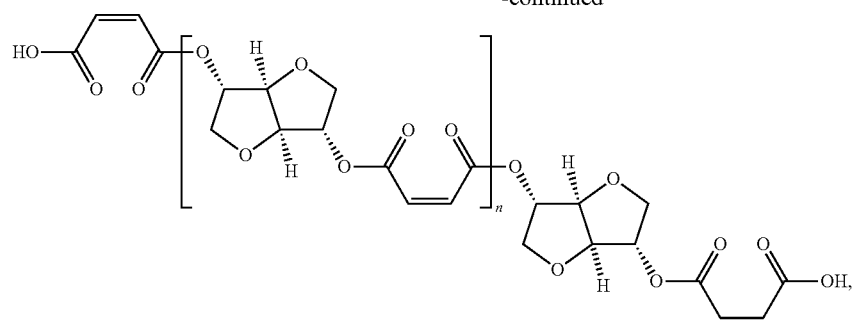
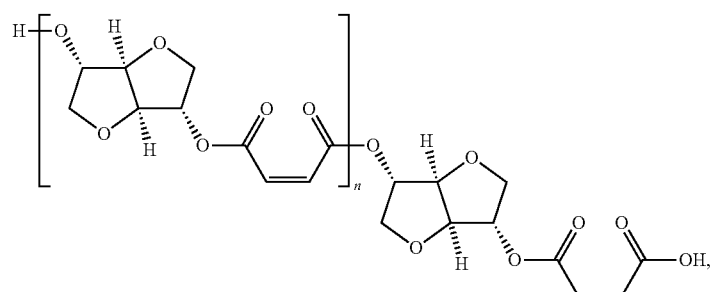
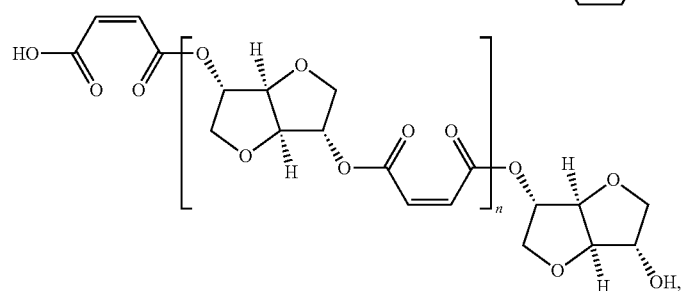
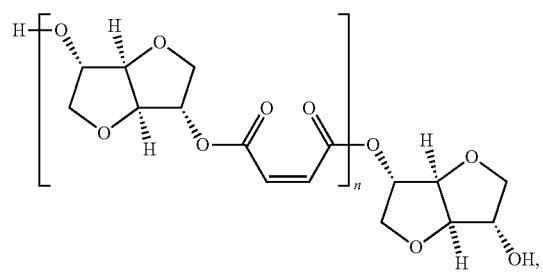
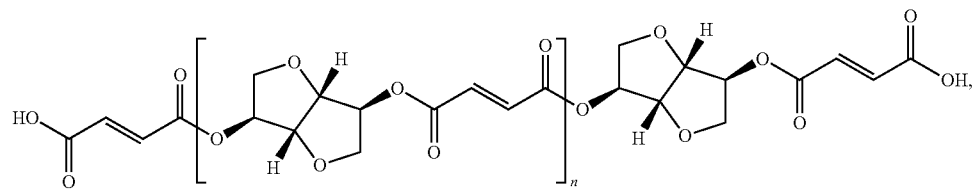
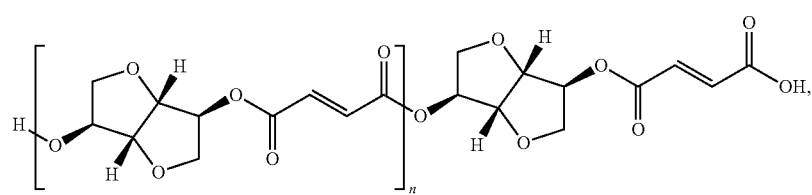
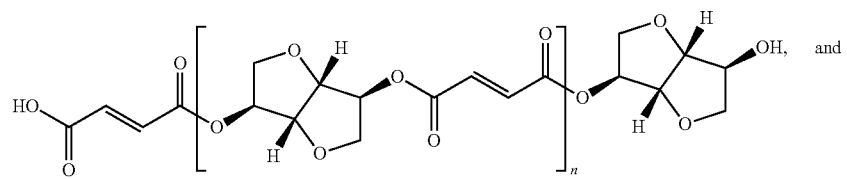
and

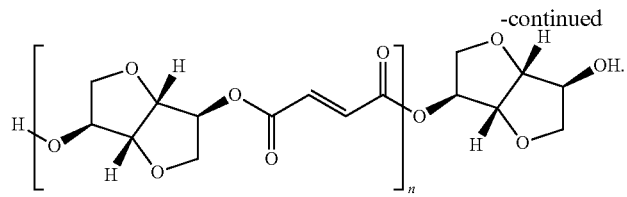

The polymer can have the structure:

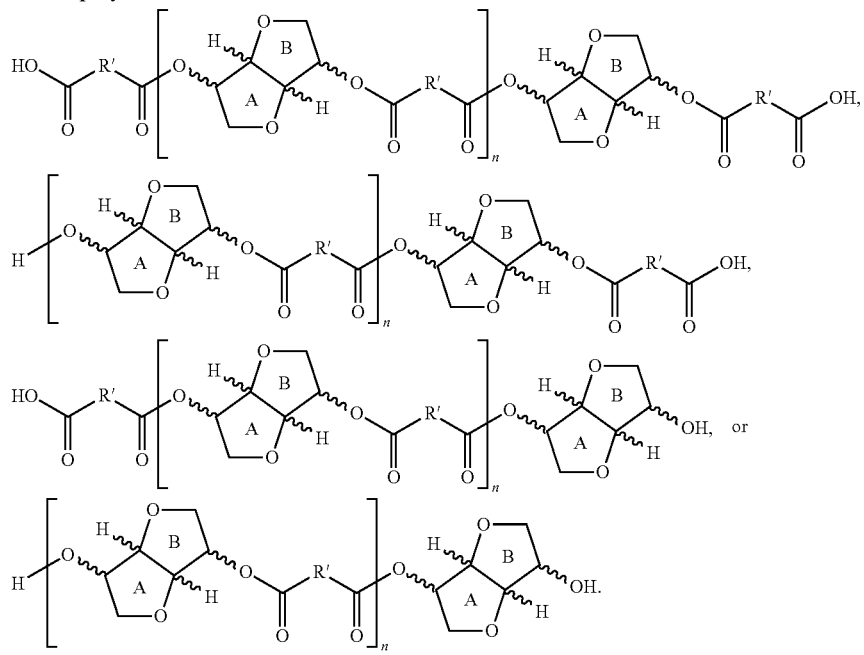

Rings A and B can form a ring system chosen from isosorbide, isomannide, and isoidide. At each occurrence, R' can be independently selected from —CH₂—CH₂—, —CH₂—CH₂—CH₂—, o-phenylene, cis —CH=CH—, and trans —CH=CH—. In some embodiments, at least one R' is —CH₂—CH₂— and at least one R' is cis or trans —CH=CH—; at least one R' is —CH₂—CH₂— and at least one R' is cis —CH=CH—; at least one R' is —CH₂—CH₂— and at least one R' is trans —CH=CH—; at least one R' is —CH₂—CH₂—CH₂— and at least one R' is cis or trans —CH=CH—; at least one R' is —CH₂—CH₂—CH₂— and at least one R' is cis —CH=CH—; at least one R' is —CH₂—CH₂—CH₂— and at least one R' is trans —CH=CH—; or at least one R' is cis —CH=CH— and at least one R' is trans —CH=CH—. In some embodiments, at least one R' is —CH₂—CH₂—, at least one R' is cis or trans —CH=CH—, and wherein the carboxylic acid has the structure:

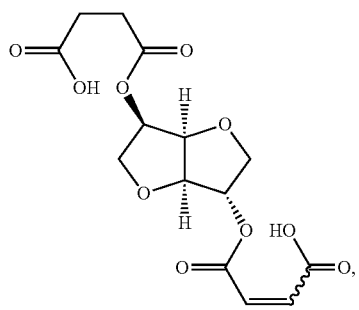

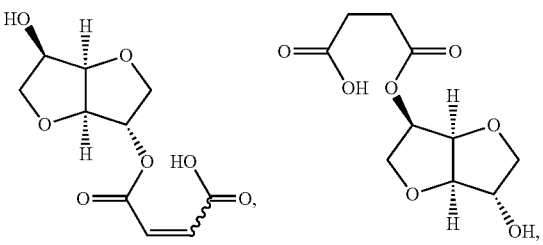

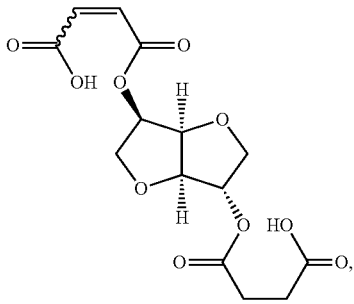

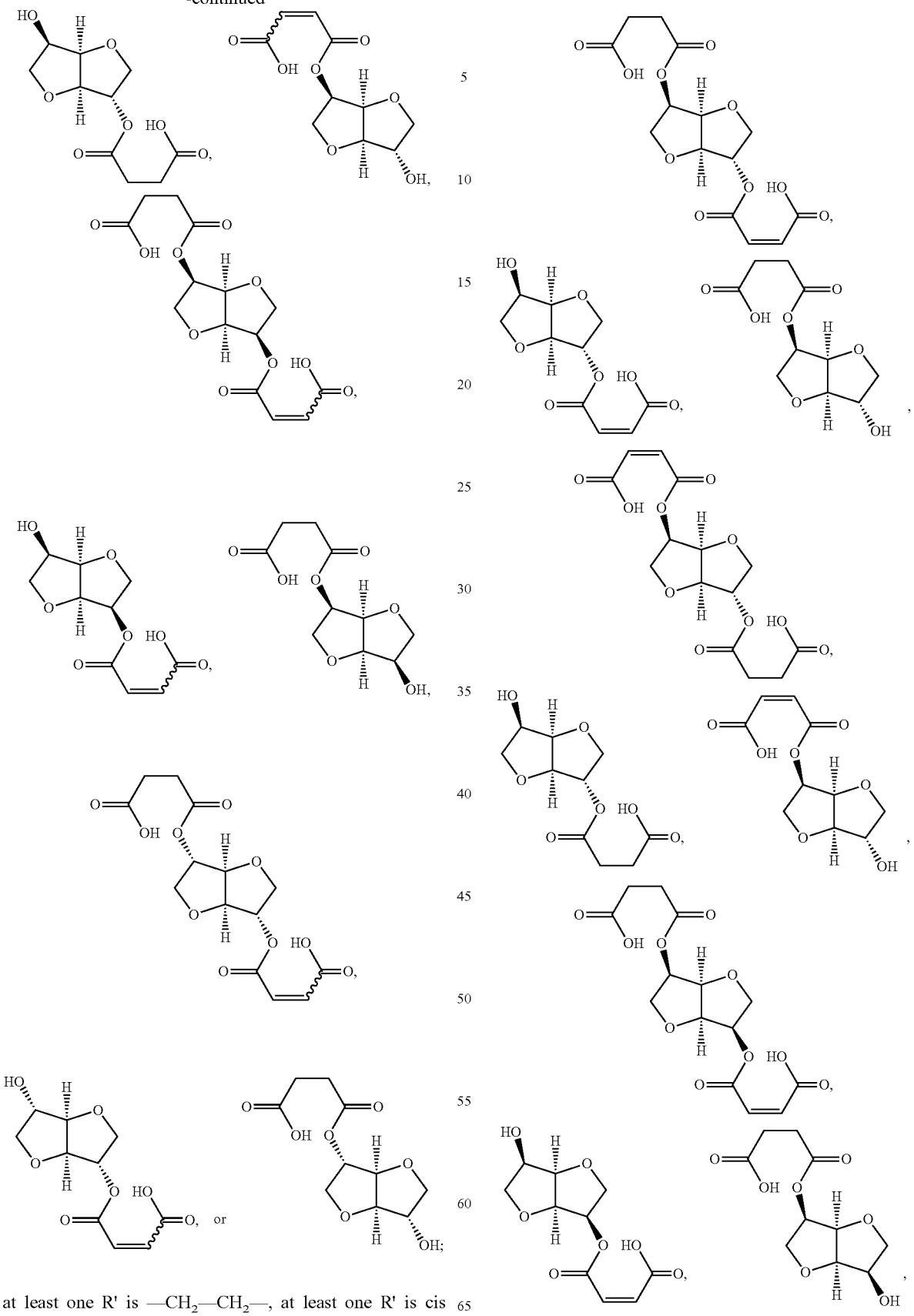
at least one R' is —CH$_2$—CH$_2$—, at least one R' is cis —CH=CH—, and wherein the carboxylic acid has the structure:

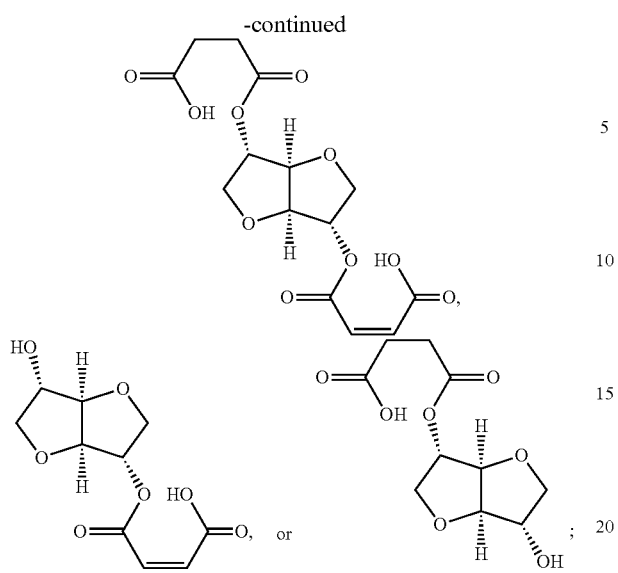
at least one R' is —CH₂—CH₂—, at least one R' is trans —CH=CH—, and wherein the carboxylic acid has the structure:
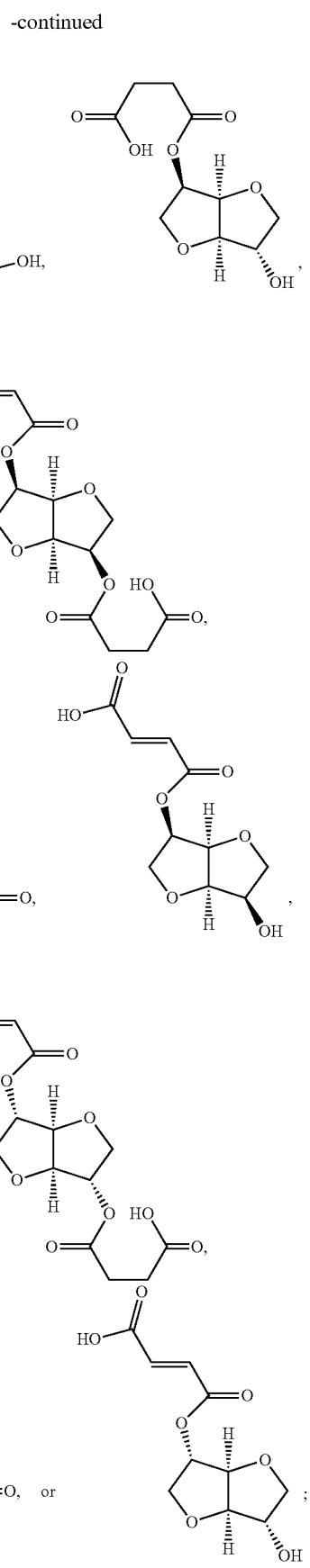

or
at least one R' is cis —CH=CH—, at least one R' is trans —CH=CH—, and wherein the carboxylic acid has the structure:
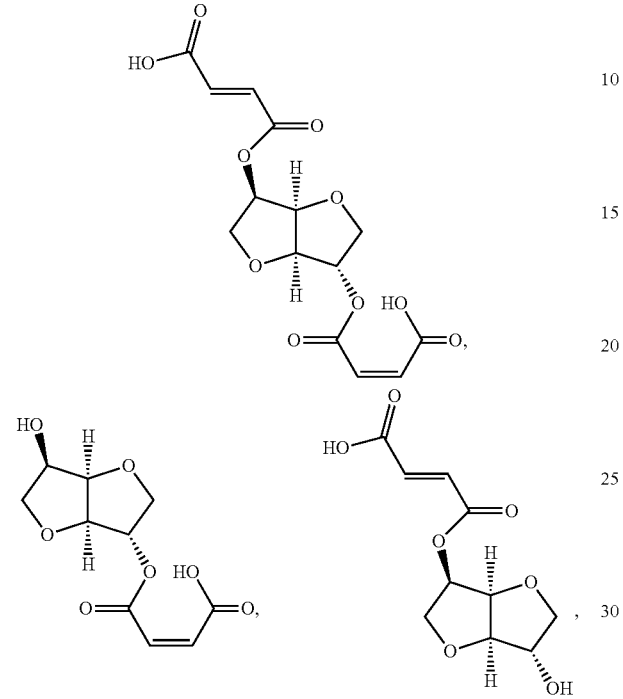
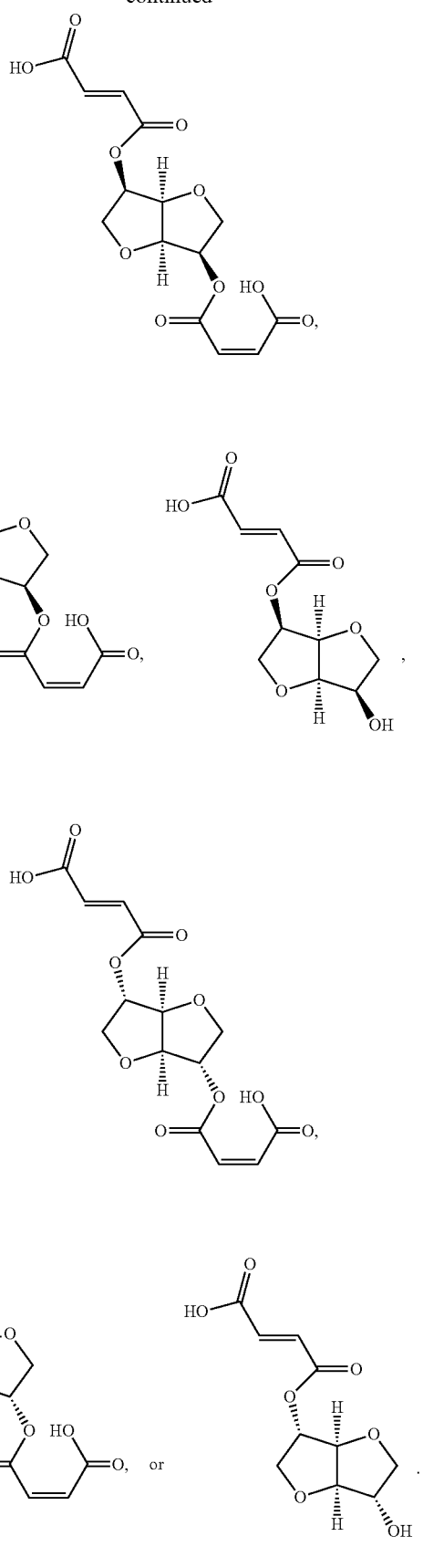

The polymer can have the structure:

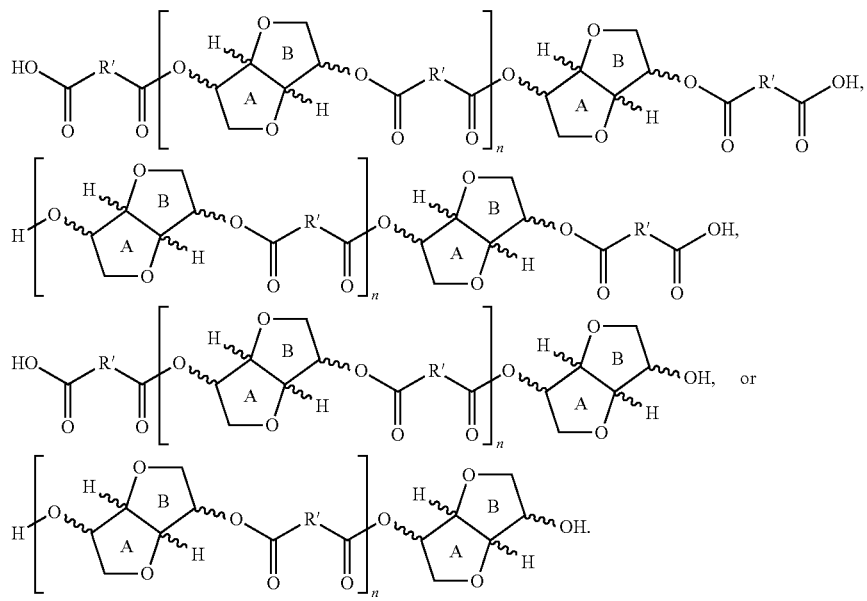

Rings A and B can form a ring system chosen from isosorbide, isomannide, and isoidide. At each occurrence, R' can be independently selected from —$CH_2$—$CH_2$—, —$CH_2$—$CH_2$—$CH_2$—, cis —CH=CH—, and trans —CH=CH—.

In various embodiments, the present invention provides a composition including one or more of the polymers described herein, wherein the one or more polymers are any suitable proportion of the composition. For example, the polymer can be a tackifier, and the composition can be a tackifier composition with tackifier properties that are at least in part from the polymer. The polymer can be a viscosifier, and the composition can be a viscosified composition with higher viscosity caused at least in part by the polymer.

In various embodiments, the present invention provides a polymer having the structure:

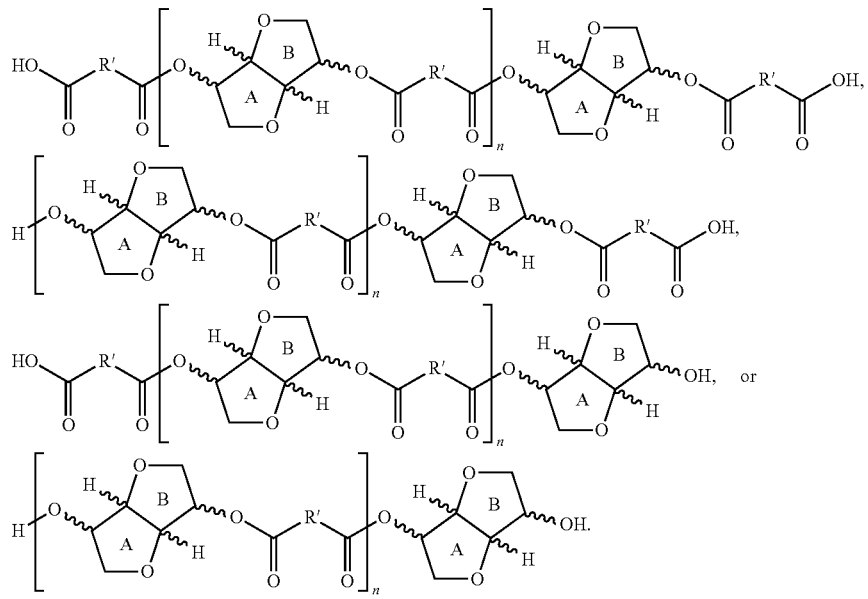

or a salt or ester thereof. Rings A and B can form a ring system chosen from isosorbide, isomannide, and isoidide. At each occurrence, R' can be independently selected from —$CH_2$—$CH_2$—, —$CH_2$—$CH_2$—$CH_2$—, o-phenylene, cis —CH=CH—, and trans —CH=CH—. The variable n can be about 1 to about 100,000. In some embodiments, if at least one R' is trans —CH=CH— then at least one R' is not trans —CH=CH—.

EXAMPLES

Various embodiments of the present invention can be better understood by reference to the following Examples which are offered by way of illustration. The present invention is not limited to the Examples given herein.
General.

Differential scanning calorimetry (DSC) was performed on 5 mg samples under a helium atmosphere by heating at 10° C. min$^{-1}$, cooling at 10° C. min$^{-1}$, then heating again at 10° C. min$^{-1}$. Glass transition temperatures ($T_g$) were determined from the second heat. Thermogravimetric analysis (TGA) was performed on 5 mg samples exposed to ambient air from 50 to 800° C. at a heat rate of 20° C. min$^{-1}$. The decomposition temperature ($T_d$) was calculated at 5% mass loss.

NMR spectroscopy was performed in DMSO-d$_6$ on a Bruker Avance III spectrometer (600 MHz). Signal integrations were normalized by setting the integration of the region from 4.56 to 4.30 ppm to one hydrogen. IR spectroscopy of thin films deposited on salt plates was performed on a Thermo Scientific Nicolet 380 FTIR.

Polymerization of diacid 3 was also followed at 180° C. and 10 rad s$^{-1}$ on a Rheometric Scientific ARES Strain Controlled Dynamic Rheometer with 25 mm diameter plates.

Gel permeation chromatography (GPC) was performed on filtered samples (0.22 micron PFTE filters) dissolved in chloroform with a flow rate of 1.0 mL min$^{-1}$ through AM-gel columns (10 μm particle size, guard, 0-10,000 Dalton, 1,000-20,000 Dalton, connected in series) on a Shimadzu SIL-20AHT instrument using a refractive index (RI) detector. Weights were calibrated to a blend of polystyrene standards (for higher molecular weights) and purified monomeric and dimeric compounds derived from diacid 3 (for lower molecular weights). Temperature-dependent tack was measured using a modified ASTM D2979 protocol[19] on an Instron model 5569 vertical load frame equipped with a temperature control box.

Example 1

Synthesis of Polymers

FIG. 1 illustrates isosorbide (1) and three isosorbide-based tackifiers (2-4). Thermal polymerization of diacid 3 (not purified) and dimethyl ester 4 (purified) was conducted on 5 gram scale in a 20 mL vial open to air. The start of the reaction (t=0) was defined as the time when steady magnetic stirring at 650 rpm was first achieved.

Figure 2A:
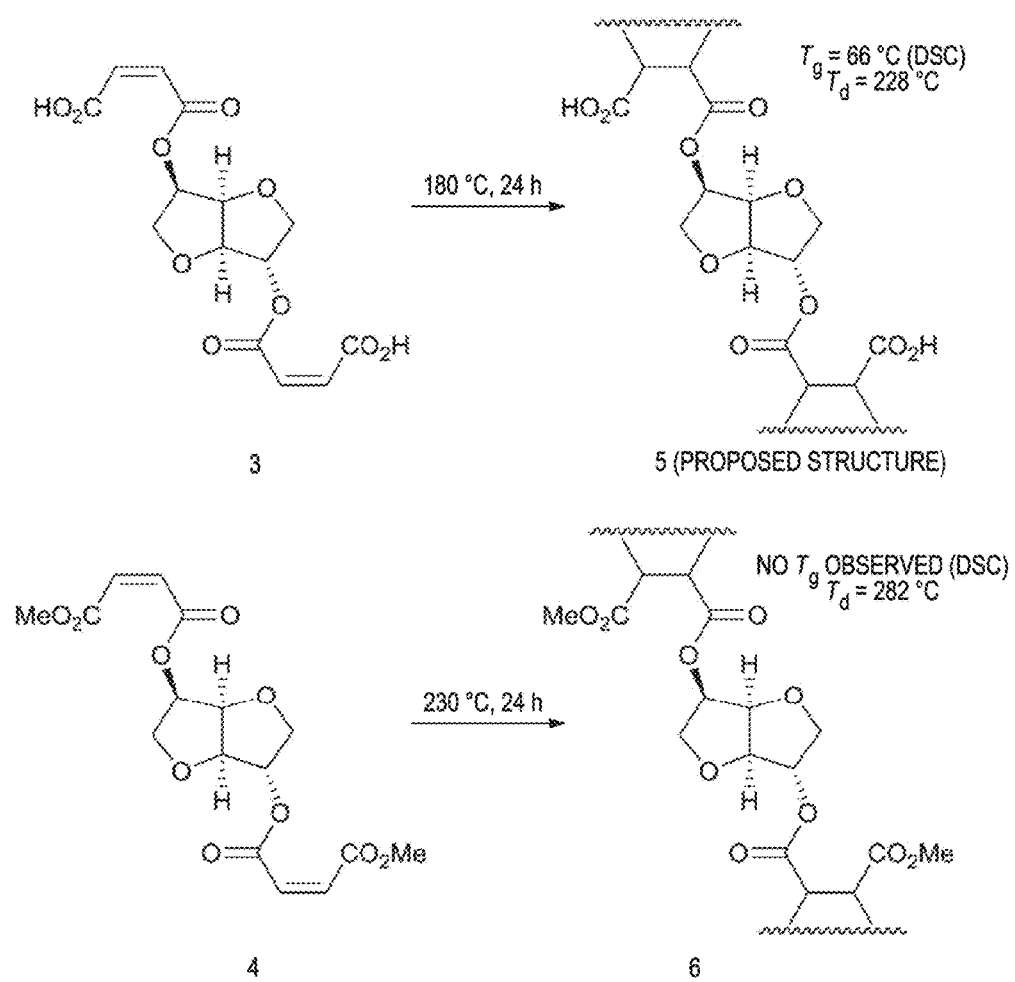
FIG. 2a illustrates free-radical polymerization products of 3 and 4, in accordance with various embodiments.
Figure 2B:
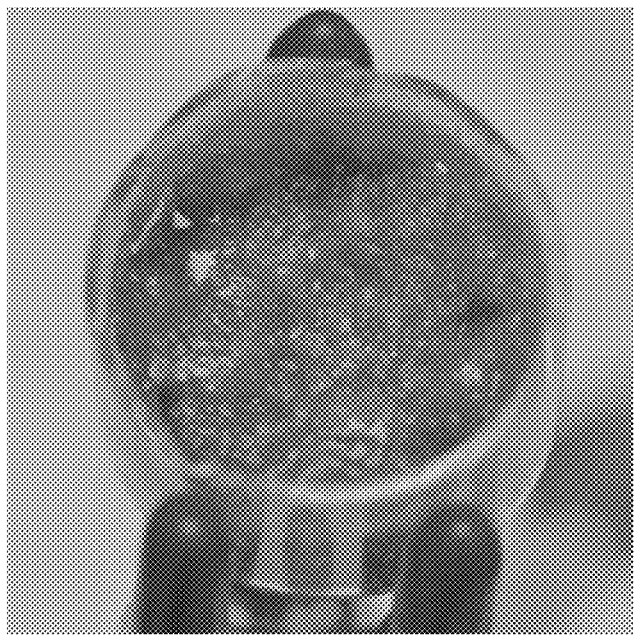
FIGS. 2b-c illustrate photographs of the actual polymerization products of 3 and 4, respectively, in accordance with various embodiments.
Figure 2C:

The polymerizations of diacid 3 and dimethyl ester 4 were conducted at the lowest temperatures which yielded complete polymerization (gauged visually) after 24 hours. Interestingly, methyl ester 4 was much slower to polymerize than diacid 3; diacid 3 polymerized at 180° C., but methyl ester 4 required 230° C. Furthermore, the physical appearance of the resultant polymers also differed significantly. Whereas diacid 3 polymerized to give a light-colored solid with an uneven surface (5, initially-proposed structure; see FIG. 2a, illustrating proposed free-radical polymerization products of 3 and 4), methyl ester 4 polymerized to give a dark-colored solid with a smooth surface (6). FIG. 2b-c illustrate photographs of the actual polymerization products of 3 and 4, respectively.

Maleates are known to resist radical homopolymerization (but can co-polymerize with other alkenes); maleate homopolymerizations often proceed through an initial alkene isomerization to the more-readily polymerized fumarate isomer. Therefore, the high polymerization temperatures were not surprising. However, the large difference in the required temperature for polymerization of diacid 3 and methyl ester 4 and in the morphology of the resultant polymers (5 and 6) alerted to the possibility of different polymerization mechanisms. Therefore, it was decided to further characterize the two polymerizations.

Example 2

Figure 3:
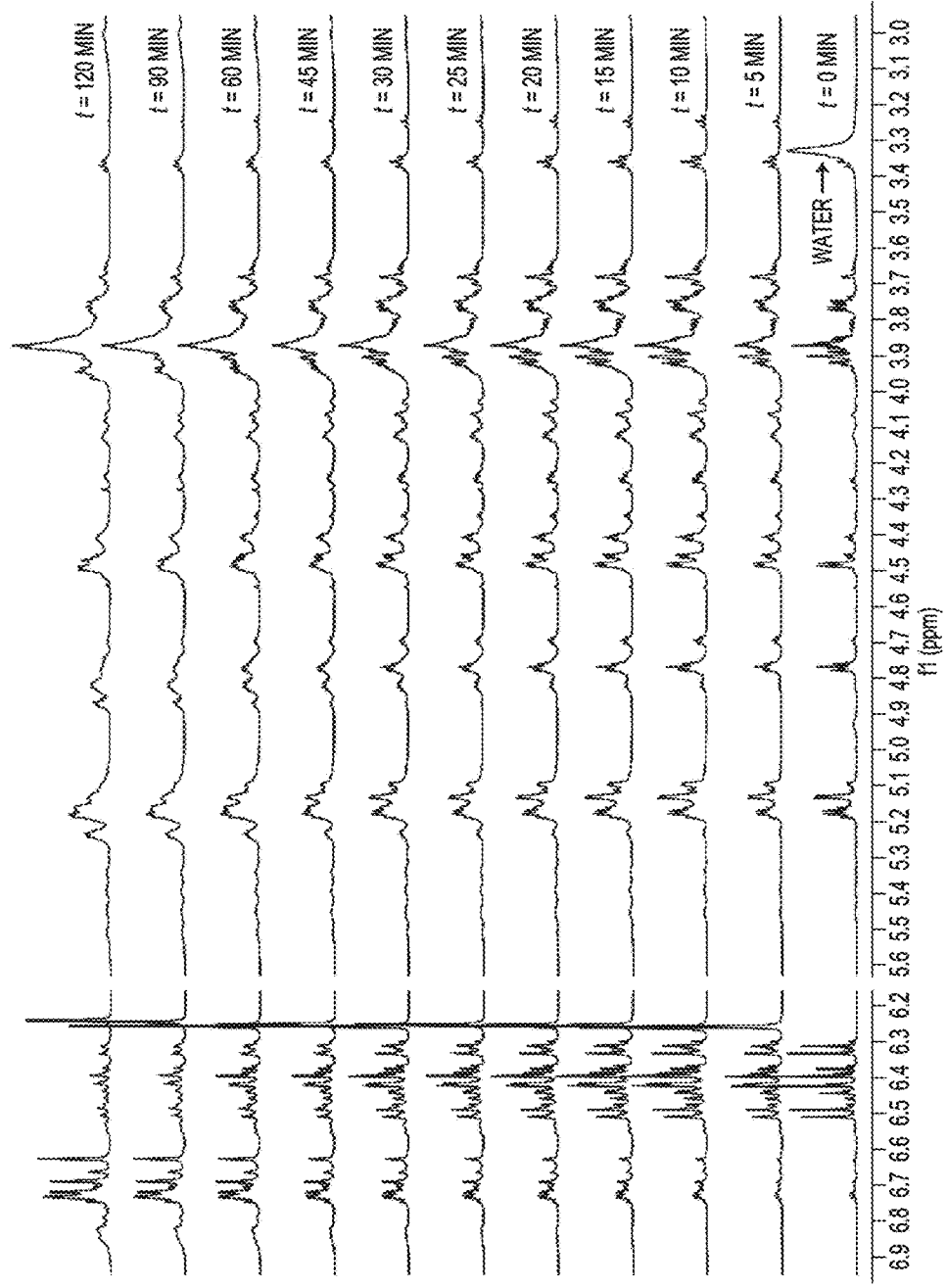
FIG. 3 illustrates time-dependent $^1$H nuclear magnetic resonance (NMR) spectra of the polymerization of diacid 3, in accordance with various embodiments.

NMR Spectroscopy $^1$H NMR spectroscopy was used to characterize the polymerization pathways. Aliquots of a polymerization of diacid 3 were obtained at time points from 0 minutes to 120 minutes (see FIG. 3, illustrating time-dependent $^1$H NMR spectra of the polymerization of diacid 3). The end point of 120 minutes was chosen because aliquots obtained at later time points did not fully dissolve in DMSO.

Figure 4:
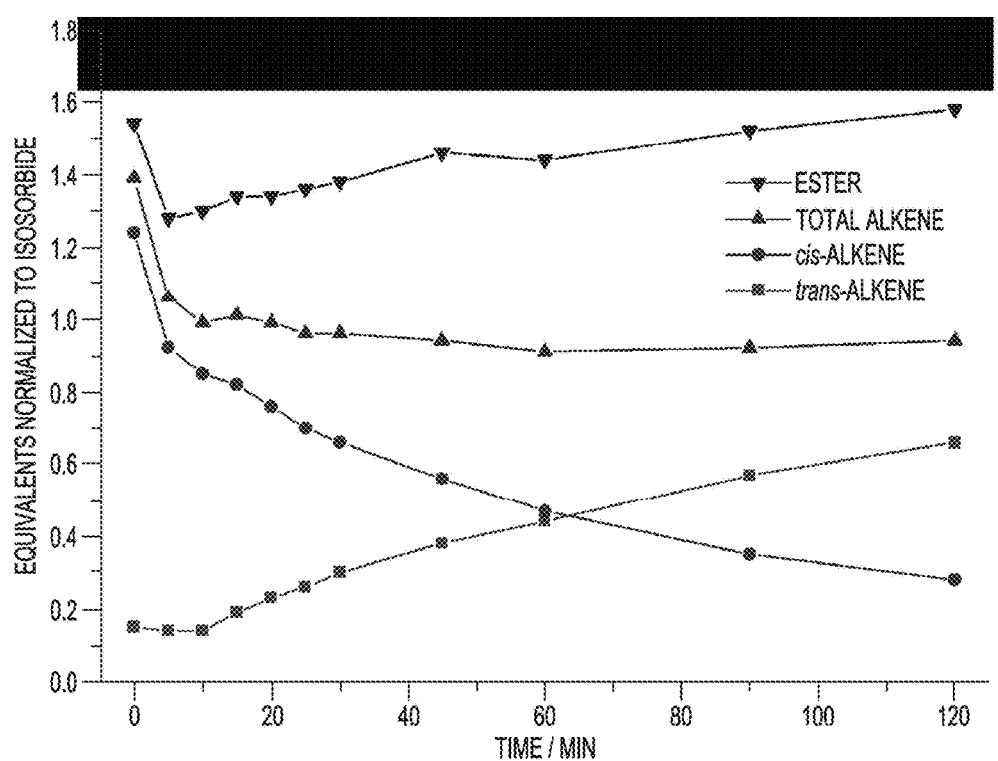
FIG. 4. Time-dependent number of equivalents (normalized to isosorbide content) of ester and alkene during the polymerization of diacid 3, in accordance with various embodiments.

It was determined from a phase-edited HSQC spectrum that although multiple isosorbide-containing species were present, one of the hydrogens at the ring fusion was always found in a narrow chemical shift range (4.56 to 4.30 ppm). No other hydrogens were observed in this region of the spectrum, and therefore the integration of this region corresponded to the isosorbide content of the sample. By analyzing both unreacted diacid 3 and a sample of diacid 3 that had been heated for 120 minutes in the presence of an internal standard (N,N-dimethylformamide), it was further determined that no isosorbide was lost or decomposed under these reaction conditions. Therefore, absolute quantities of various chemical fragments in the aliquots could be determined from the $^1$H NMR spectra by setting the integration of the chemical shift range from 4.56 to 4.30 ppm to one proton. The amounts of ester (5.28 to 5.04 ppm), cis-alkene (6.58 to 6.28 ppm; integrated range does not overlap maleic anhydride or maleic acid), and trans-alkene (6.93 to 6.65 ppm; integrated range does not overlap fumaric acid) as a function of time are plotted in FIG. 4. FIG. 4 illustrates the time-dependent number of equivalents (normalized to isosorbide content) of ester and alkene during the polymerization of diacid 3.

Figure 5:
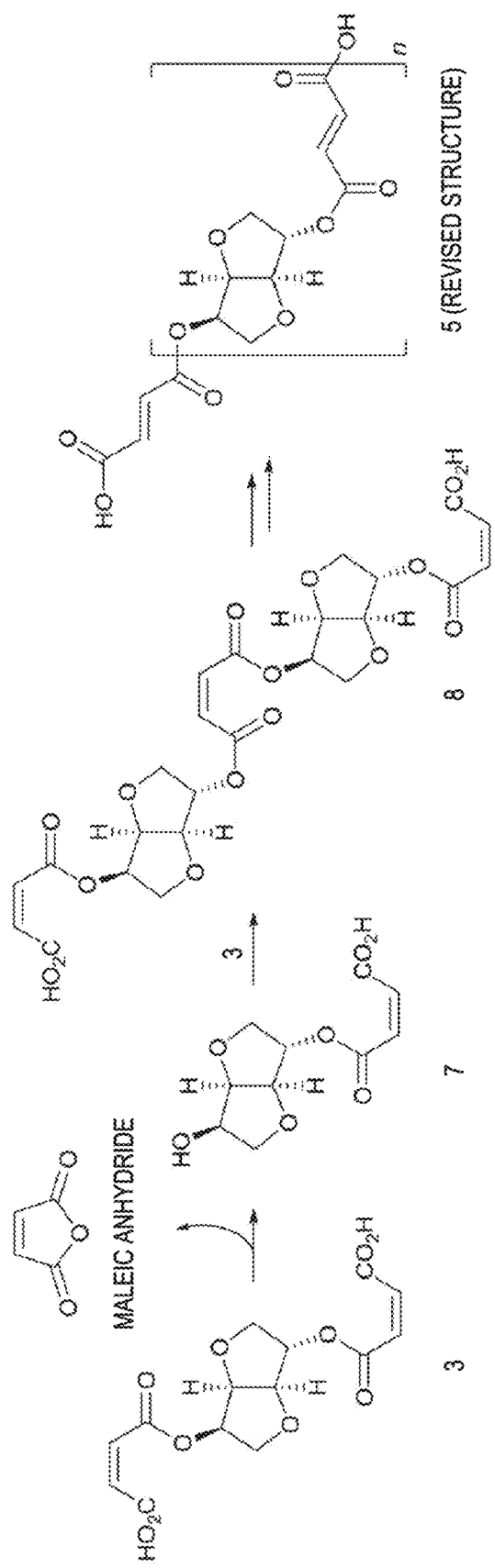
FIG. 5 illustrates a proposed thermal polymerization mechanism for diacid 3, in accordance with various embodiments.

Analysis of the data from the polymerization of diacid 3 revealed a loss of ester linkages and cis alkenes during the early stages of the reaction (t=0-5 min) consistent with rapid expulsion of maleic anhydride (see 7, FIG. 5, illustrating a proposed thermal polymerization mechanism for diacid 3). Afterwards, the number of ester linkages per isosorbide unit climbed back up while the alkene content continued to drop, stabilizing near 1.0 alkenes per isosorbide unit. This is consistent with a condensation reaction between the free hydroxyl group of compounds such as 7 and a carboxylic acid to form oligomeric polyesters such as 8. Furthermore, the alkenes undergo a thermodynamically-favorable isomerization under the reaction conditions, slowly converting maleates into fumarates. The combination of further polymerization and alkene isomerization yields polyester thermoplastic 5 (revised structure). The NMR spectra of the aliquots do not show evidence of radical polymerization under these reaction conditions.

Figure 6:
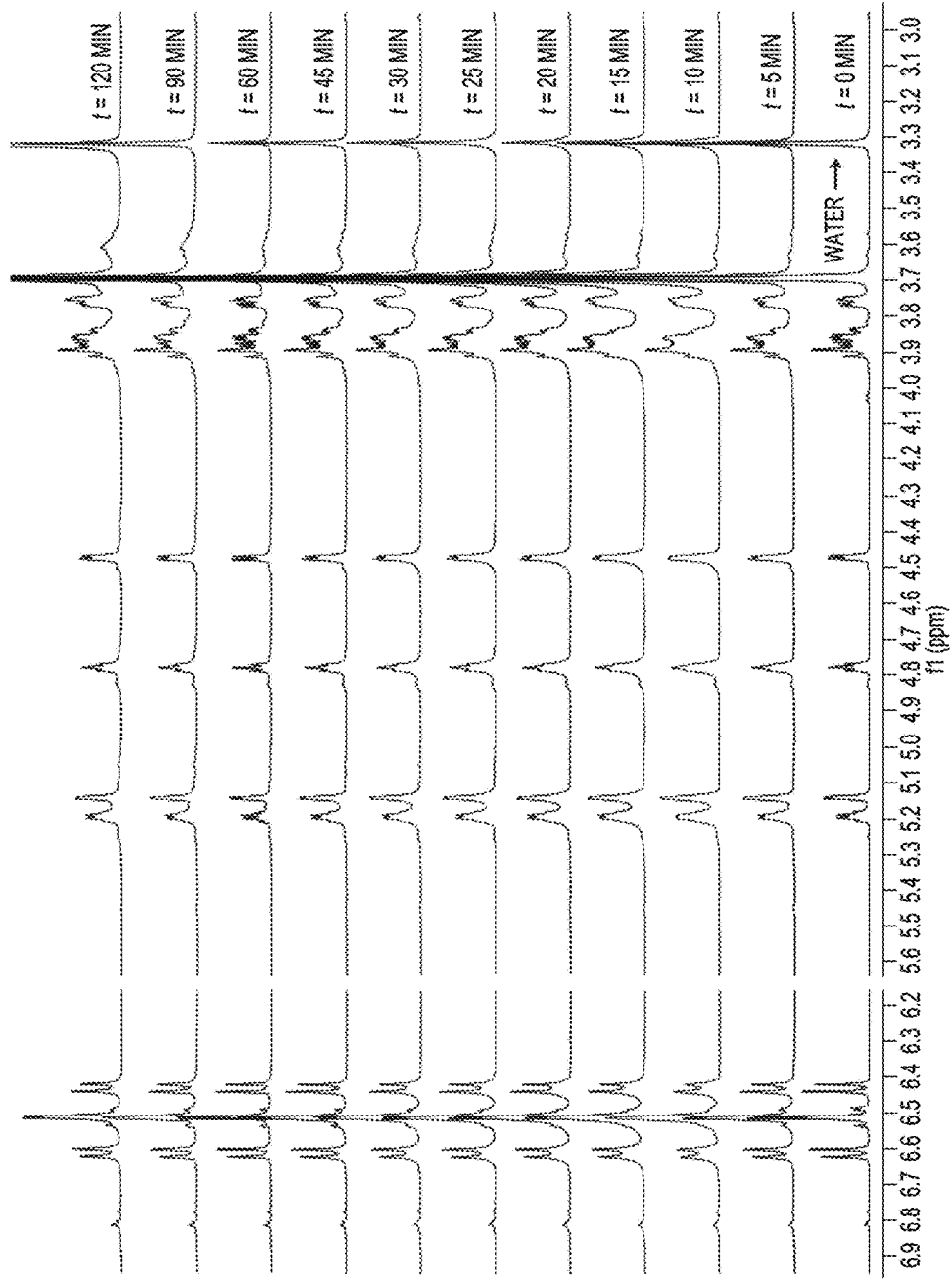
FIG. 6 illustrates time-dependent $^1$H NMR spectra of the polymerization of dimethyl ester 4, in accordance with various embodiments.
Figure 7:
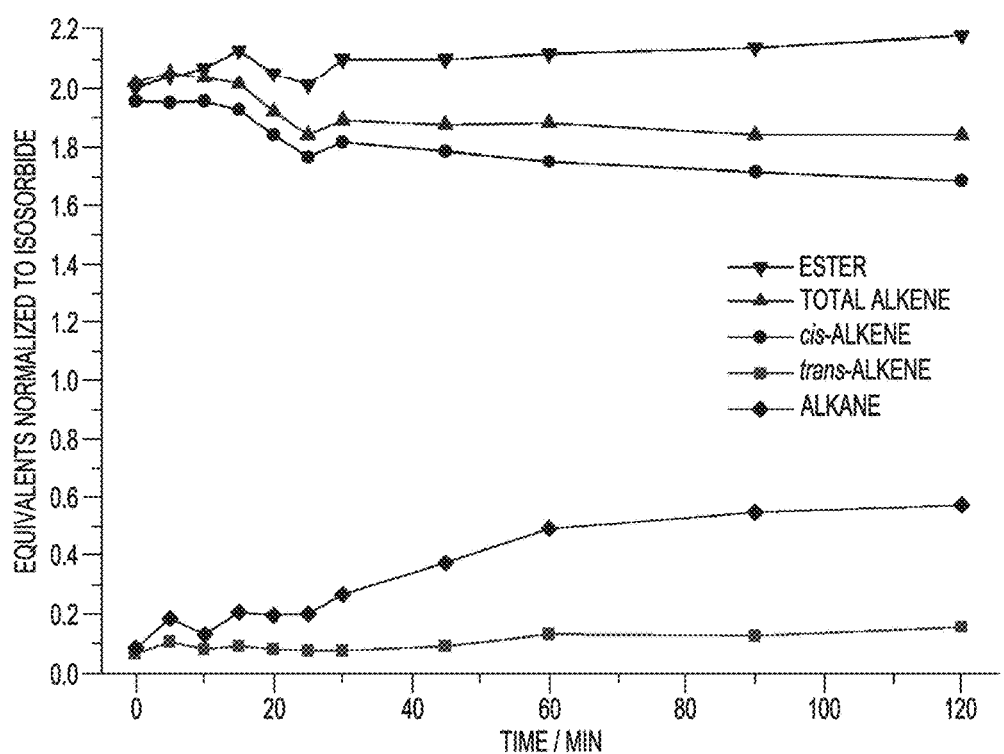
FIG. 7 illustrates the time-dependent number of equivalents (normalized to isosorbide content) of ester, alkene, and alkane during the polymerization of dimethyl ester, in accordance with various embodiments.

The polymerization of dimethyl ester 4 was analyzed by $^1$H NMR spectroscopy in the same manner (see FIGS. 6 and 7). FIG. 6 illustrates time-dependent $^1$H NMR spectra of the polymerization of dimethyl ester 4. FIG. 7 illustrates the time-dependent number of equivalents (normalized to isosorbide content) of ester, alkene, and alkane during the polymerization of dimethyl ester. In sharp contrast with the polymerization of diacid 3, the polymerization of dimethyl ester 4 did not involve ester bond cleavage or subsequent condensation polymerization. Furthermore, a new NMR signal appeared between 3.65 and 3.54 ppm, providing direct experimental evidence for the radical polymerization pathway depicted in FIG. 2a to form thermoset 6. The concentration of trans-alkene stayed low even though maleates generally isomerize to fumarates before undergoing radical polymerization. This observation is consistent with a slow alkene isomerization step and a fast polymerization of the resultant trans alkene.

Example 3

IR Spectroscopy and Rheology

Figure 8:
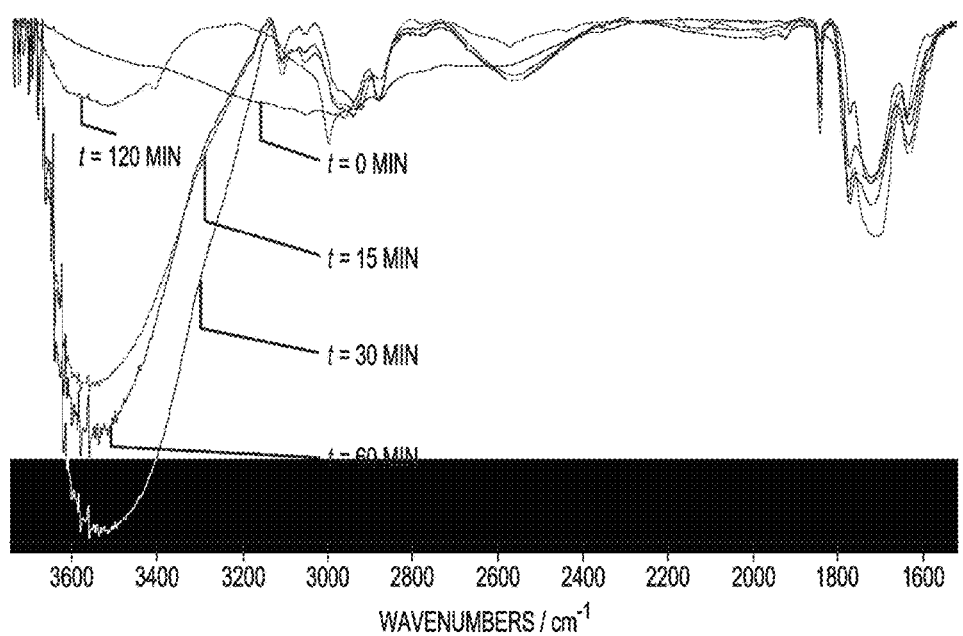
FIG. 8 illustrates time-dependent infrared (IR) spectra during the polymerization of diacid 3, in accordance with various embodiments.

Since $^1$H NMR spectroscopy suggested an unexpected polymerization pathway for diacid 3, IR spectroscopy and rheology were used for further verification of this result. IR spectra of selected aliquots (see, FIG. 8, illustrating time-dependent IR spectra during the polymerization of diacid 3, in accordance with various embodiments) provided additional evidence for the polymerization pathway outlined in FIG. 2a. Initially the IR spectrum showed predominantly intramolecular hydrogen bonding consistent with maleate mono-acids. A strong hydroxyl stretch consistent with free alcohols quickly appeared. This new stretch reduced in intensity after 30 minutes, but did not completely disappear because the oligomeric material present after 120 minutes of heating contained some fumarate mono-acids.

Figure 9:
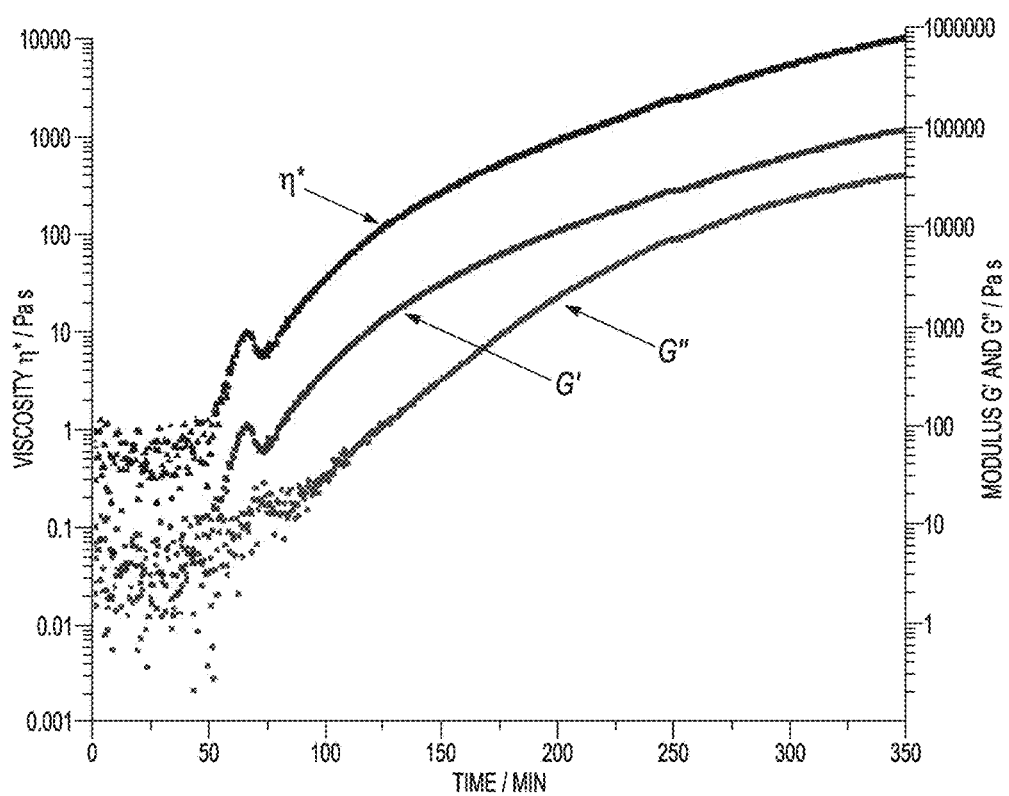
FIG. 9 illustrates time-dependent complex viscosity ($\eta^*$), storage modulus (G'), and loss modulus (G") at 180° C. and 10 rad s$^{-1}$ during the polymerization of diacid 3, in accordance with various embodiments.

The polymerization of diacid 3 was also followed by dynamic rheology (see, FIG. 9, illustrating time-dependent complex viscosity ($\eta$*), storage modulus (G'), and loss modulus (G") at 180° C. and 10 rad s$^{-1}$ during the polymerization of diacid 3). No change could be observed in complex viscosity ($\eta$*) or storage and loss moduli (G' and G", respectively) in the first 50 minutes because the low values at 180° C. were overwhelmed by instrument noise. A small but reproducible spike in complex viscosity and the storage and loss moduli was observed at 60-70 minutes. Afterwards, viscosity and storage and loss moduli continually increased, with viscosity reaching 11,200 Pa s (at 180° C.) after 350 minutes at 180° C. The smooth increase in viscosity and the storage and loss moduli from 70 minutes onwards suggested that the polymerization pathway characterized in the first 120 minutes is the same one operative at later time points.

Example 4

GPC Analysis and Tack Measurements

A 120 minute aliquot from the polymerization of diacid 3 was reacted with methyl iodide in the presence of potassium carbonate to convert the carboxylic acids into methyl esters for analysis by gel permeation chromatography (GPC). At this early stage of polymerization, the weight-averaged molecular weight ($M_w$) was 1451 and the number-averaged molecular weight ($M_n$) was 710.

It was desired to determine whether the oligomeric material formed by heat-treating diacid 3 for 120 minutes (hereafter referred to as 5') might also be suitable as a tackifier. The glass transition temperature ($T_g$) for oligomer 5' was determined by DSC to be 49° C. (compare with 10° C. for diacid 3).[19]

Temperature-dependent tack was measured by modifications to the ASTM D2979 standard. On an Instron® load frame, the tackifier to be tested was applied to a glass slide at a thickness of 0.1 mm. The slide was then clamped to a flat surface and, perpendicularly, a type 304 stainless steel probe measuring 5 mm in diameter, with a 90° polished tip was place above the slide. The probe was then lowered at a rate of 0.5 mm sec$^{-1}$ and contacted the surface at an average force of 1.5 N. The probe was then held on the surface for 1.0 sec and then raised at a rate of 0.5 mm sec$^{-1}$. Tack was measured as the maximum force required to remove the probe from the surface of the tackifier.

Figure 10:
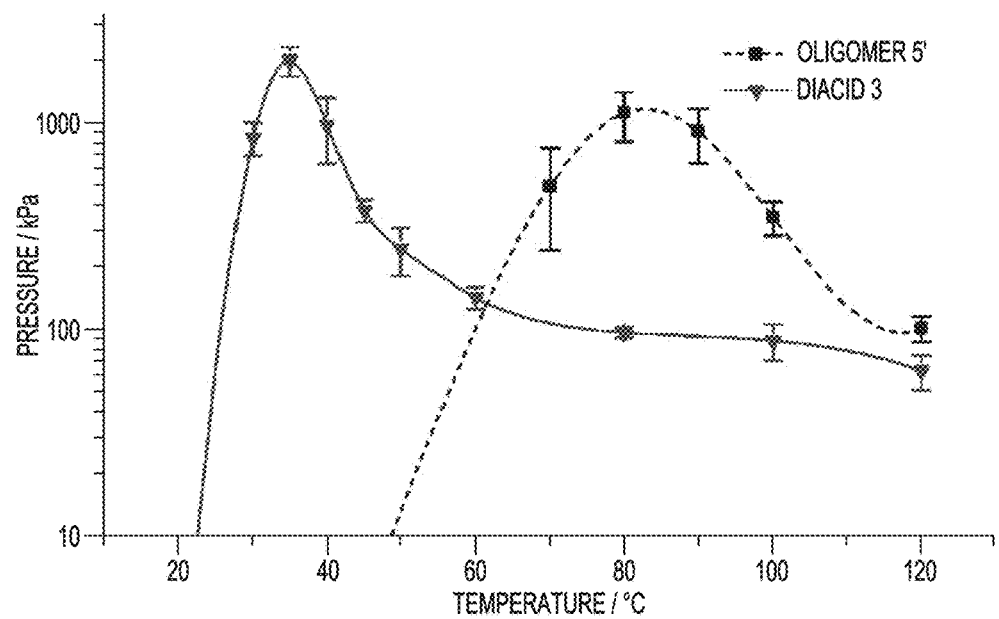
FIG. 10 illustrates temperature-dependent tack of diacid 3 and oligomer 5' (prepared by heating diacid 3 at 180° C. for 120 minutes), in accordance with various embodiments.

As shown in FIG. 10, illustrating temperature-dependent tack of diacid 3 and oligomer 5' (prepared by heating diacid 3 at 180° C. for 120 minutes), oligomerization resulted in tack at a higher temperature range, with oligomer 5' most tacky at 80° C. (compare with 35° C. for diacid 3). The oligomeric material was a little less tacky (1100±300 kPa for oligomer 5', compare with 2000±300 kPa for diacid 3), but high tack was available over a broader temperature range. Thus, oligomerization of isosorbide-based tackifiers such as diacid 3 offers a potential means to access derivatives that are optimized for higher temperature ranges.

Example 5

Conclusions from Examples 1-4

The thermal polymerizations of two isosorbide-maleic acid derivatives that had previously been studied as monomeric tackifiers—one with carboxylic acid end groups and one with methyl ester end groups—were compared. The reactions proceeded at different temperatures and yielded products with differing physical appearances, suggesting a difference in polymerization mechanism. $^1$H NMR spectroscopy revealed that the methyl ester-terminated monomer reacted through the expected radical polymerization mechanism. In contrast, the carboxylic acid-terminated monomer expelled maleic anhydride and subsequently underwent a condensation polymerization to form a polyester thermoplastic. IR spectroscopy and rheological characterization of the polymerization further supported the deduced condensation polymerization pathway. Thermal oligomerization of the carboxylic acid-terminated monomeric tackifier delivered an oligomeric tackifier that performed at higher temperatures than the monomeric precursor.

In conclusion, $^1$H NMR spectroscopy revealed divergent thermal polymerization pathways for an isosorbide- and maleic acid-based diacid (3) and a closely-related dimethyl ester (4). Whereas dimethyl ester 4 underwent the expected radical polymerization, diacid 3 polymerized through expulsion of maleic anhydride followed by subsequent condensation reactions. Characterization of the tack properties of an oligomer generated by partial polymerization of diacid 3 (i.e., 5') demonstrated that oligomers of isosorbide and simple diacids may be useful as higher-temperature tackifiers.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments.

The following exemplary embodiments are provided, the numbering of which is not to be construed as designating levels of importance:

Embodiment 1 provides a method of forming a polymer, the method comprising:

subjecting a composition comprising a carboxylic acid having the structure $(R^f-O)_{z1}-R^a$ to conditions sufficient to form a polymer having the structure $R^{eg}-[O-R^a(O-R^b)_{z1-2}-O-C(O)-R'(O-R^d)_{z2-1}-C(O)]_n-O-R^a(O-R^b)_{z1-2}-O-R^{eg}$ or a salt or ester thereof,
wherein
$R^a$ is a substituted or unsubstituted $(C_1-C_{50})$hydrocarbyl having a valency of z1 and interrupted or terminated by 0, 1, 2, or 3 groups independently chosen from —O—, —S—, substituted or unsubstituted —NH—, and —(O—$(C_2-C_3)$alkylene)$_{y1}$- wherein y1 is about 1 to about 10,000 and wherein the $(C_2-C_3)$alkylene is substituted or unsubstituted,
at each occurrence, R' is independently a substituted or unsubstituted $(C_1-C_{50})$hydrocarbyl having a valency of z2+1 interrupted or terminated by 0, 1, 2, or 3 groups independently chosen from —O—, —S—, substituted or unsubstituted —NH—, and —(O—$(C_2-C_3)$alkylene)$_{y2}$- wherein y2 is about 1 to about 10,000 and wherein the $(C_2-C_3)$alkylene is substituted or unsubstituted
at each occurrence, $R^b$ is independently chosen from —H, —C(O)—R'(O—$R^d$)$_{z2-1}$—C(O)—[O—$R^a$(O—$R^c$)$_{z1-2}$—O—C(O)—R'(O—$R^d$)$_{z2-1}$—C(O)]$_{n1}$—OH, and —C(O)—R'(O—$R^d$)$_{z2-1}$—C(O)—[O—$R^a$(O—$R^c$)$_{z1-2}$—O—C(O)—R'(O—$R^d$)$_{z2-1}$—C(O)]$_{n1}$—O—$R^a$(O—$R^c$)$_{z1-2}$—O—$R_{eg}$,
wherein at each occurrence, n1 is independently about 0 to about 100,000,
at each occurrence, $R^c$ is independently chosen from —H, —C(O)—R'(O—$R^d$)$_{z2-1}$—C(O)—[O—$R^a$(O—$R^b$)$_{z1-2}$—O—C(O)—R'(O—$R^d$)$_{z2-1}$—C(O)]$_{n2}$—OH, and —C(O)—R'(O—$R^d$)$_{z2-1}$—C(O)—[O—$R^a$(O—$R^b$)$_{z1-2}$—O—C(O)—R'(O—$R^d$)$_{z2-1}$—C(O)]$_{n2}$—O—$R^a$(O—$R^b$)$_{z1-2}$—O—$R^{eg}$,
wherein at each occurrence, n2 is independently about 0 to about 100,000,
at each occurrence, $R^d$ is independently chosen from —H, —C(O)—[O—$R^a(R^b)_{z1-2}$—O—C(O)—R'(O—$R^e$)$_{z2-1}$—C(O)]$_{n3}$—OH, and —C(O)—[O—$R^a$(O—$R^b$)$_{z1-2}$—O—C(O)—R'(O—$R^e$)$_{z2-1}$—C(O)]$_{n3}$—O—$R^a$(O—$R^b$)$_{z1-2}$—O—$R^{eg}$, wherein at each occurrence, n3 is independently about 0 to about 100,000,
at each occurrence, $R^e$ is independently chosen from —H, —C(O)—[O—$R^a$(O—$R^b$)$_{z1-2}$—O—C(O)—R'(O—$R^d$)$_{z2-1}$—C(O)]$_{n4}$—OH, and —C(O)—[O—$R^a$(O—$R^b$)$_{z1-2}$—O—C(O)—R'(O—$R^d$)$_{z2-1}$—C(O)]$_{n4}$—O—$R^a(R^b)_{z1-2}$—O—$R^{eg}$, wherein at each occurrence, n4 is independently about 0 to about 100,000,
at each occurrence, $R^f$ is independently chosen from (HO—C(O))$_{z2}$—R'—C(O)— and H—, wherein at least one $R^f$ in each molecule containing $R^f$ is (HO—C(O))$_{z2}$—R'—C(O)—,
at each occurrence, $R^{eg}$ is independently chosen from HO—C(O)—R'(O—$R^d$)$_{z2-1}$—C(O)— and H—,
z1 is about 2 to about 100,
z2 is about 1 to about 100, and
n is about 1 to about 100,000.

Embodiment 2 provides the method of Embodiment 1, wherein the carboxylic acid has the structure $R^f-R^a-R^f$, and the polymer has the structure $R^{eg}-[O-R^a-O-C(O)-R'(O-R^d)_{z2-1}-C(O)]_n-O-R^a-O-R^{eg}$,
wherein
$R^a$ is a substituted or unsubstituted $(C_1-C_{50})$hydrocarbylene interrupted or terminated by 0, 1, 2, or 3 groups independently chosen from —O—, —S—, substituted or unsubstituted —NH—, and —(O—$(C_2-C_3)$alkylene)$_{y1}$- wherein y1 is about 1 to about 10,000 and wherein the $(C_2-C_3)$alkylene is substituted or unsubstituted,
at each occurrence, $R^d$ is independently chosen from —H, —C(O)—[O—$R^a$—O—C(O)—R'(O—$R^e$)$_{z2-1}$—C(O)]$_{n3}$—OH, and —C(O)—[O—$R^a$—O—C(O)—R'(O—$R^e$)$_{z2-1}$—C(O)]$_{n3}$—O—$R^a$—O—$R^{eg}$ wherein at each occurrence, n3 is independently about 0 to about 100,000, and
at each occurrence, $R^e$ is independently chosen from —H, —C(O)—[O—$R^a$—O—C(O)—R'(O—$R^d$)$_{z2-1}$—C(O)]$_{n4}$—OH, and —C(O)—[O—$R^a$—O—C(O)—R'(O—$R^d$)$_{z2-1}$—C(O)]$_{n4}$—O—$R^a$—O—$R^{eg}$, wherein at each occurrence, n4 is independently about 0 to about 100,000.

Embodiment 3 provides the method of any one of Embodiments 1-2, wherein the carboxylic acid has the structure $(R^f)_{z1}-R^a$, and the polymer has the structure $R^{eg}-[O-R^a(O-R^b)_{z1-2}-O-C(O)-R'-C(O)]_n-O-R^a(O-R^b)_{z1-2}-O-R^{eg}$ or a salt or ester thereof,
wherein
$R^a$ is a substituted or unsubstituted $(C_1-C_{50})$hydrocarbyl having a valency of z1 and interrupted or terminated by 0, 1, 2, or 3 groups independently chosen from —O—, —S—, substituted or unsubstituted —NH—, and —(O—$(C_2-C_3)$alkylene)$_{y1}$- wherein y1 is about 1 to about 10,000 and wherein the $(C_2-C_3)$alkylene is substituted or unsubstituted,
at each occurrence, R' is independently a substituted or unsubstituted $(C_1-C_{50})$hydrocarbylene interrupted or terminated by 0, 1, 2, or 3 groups independently chosen from —O—, —S—, substituted or unsubstituted —NH—, and —(O—$(C_2-C_3)$alkylene)$_{y2}$- wherein y2 is about 1 to about 10,000 and wherein the $(C_2-C_3)$alkylene is substituted or unsubstituted,
at each occurrence, $R^b$ is independently chosen from —H, —C(O)—R'—C(O)—[O—$R^a$(O—$R^c$)$_{z1-2}$—O—C(O)—R'—C(O)]$_{n1}$—OH, and —C(O)—R'—C(O)—[O—$R^a$(O—$R^c$)$_{z1-2}$—O—C(O)—R'—C(O)]$_{n1}$—O—$R^a$(O—$R^c$)$_{z1-2}$—O—$R^{eg}$, wherein at each occurrence, n1 is independently about 0 to about 100,000,
at each occurrence, $R^c$ is independently chosen from —H, —C(O)—R'—C(O)—[O—$R^a$(O—$R^b$)$_{z1-2}$—O—C(O)—R'—C(O)]$_{n2}$—OH, and —C(O)—R'—C(O)—[O—$R^a$(O—$R^b$)$_{z1-2}$—O—C(O)—R'—C(O)]$_{n2}$—O—$R^a$(O—$R^b$)$_{z1-2}$—O—$R^{eg}$, wherein at each occurrence, n2 is independently about 0 to about 100,000, at each occurrence, $R^f$ is independently chosen from HO—C(O)—R'—C(O)— and H—, wherein at least one $R^f$ in each molecule containing $R^f$ is HO—C(O)—R'—C(O)—, and at each occurrence, $R^{eg}$ is independently chosen from HO—C(O)—R'—C(O)— and H—, Embodiment 4 provides the method of any one of Embodiments 1-3, wherein the polymer is at least one of a tackifier and a viscosifier.

Embodiment 5 provides the method of any one of Embodiments 1-4, wherein the conditions sufficient to form the polymer comprise heating.

Embodiment 6 provides the method of Embodiment 5, wherein the heating is heating to about 50° C. to about 1000° C.

Embodiment 7 provides the method of any one of Embodiments 5-6, wherein the heating is heating to about 100° C. to about 250° C.

Embodiment 8 provides the method of any one of Embodiments 5-7, wherein the heating is heating to about 150° C. to about 210° C.

Embodiment 9 provides the method of any one of Embodiments 1-8, wherein the carboxylic acid is about 1 wt % to about 100 wt % of the composition.

Embodiment 10 provides the method of any one of Embodiments 1-9, wherein the composition further comprises a carrier liquid.

Embodiment 11 provides the method of Embodiment 10, wherein the combination of the carboxylic acid and the carrier liquid is about 100 wt % of the composition.

Embodiment 12 provides the method of any one of Embodiments 1-11, wherein the composition is substantially free of other carboxylic acids.

Embodiment 13 provides the method of any one of Embodiments 1-12, wherein the composition is substantially free of carboxylic acids having the structure HO—C(O)—R'(O—$R^d$)$_{z2-1}$—C(O)—OH or HO—R'(O—$R^d$)$_{z2-1}$—C(O)—OH.

Embodiment 14 provides the method of any one of Embodiments 1-13, wherein $R^a$ is a substituted or unsubstituted ($C_1$-$C_{50}$)hydrocarbylene having a valency of z1 and interrupted or terminated by 0, 1, 2, or 3 groups independently chosen from —O—, —S—, substituted or unsubstituted —NH—, and —(O—($C_2$-$C_3$)alkylene)$_{y1}$- wherein y1 is about 1 to about 10,000 and wherein the ($C_2$-$C_3$)alkylene is substituted or unsubstituted.

Embodiment 15 provides the method of any one of Embodiments 1-14, wherein $R^a$ is a divalent fused bicyclic ring system.

Embodiment 16 provides the method of any one of Embodiments 1-15, wherein R' is substituted or unsubstituted ($C_2$-$C_{10}$)hydrocarbylene.

Embodiment 17 provides the method of any one of Embodiments 1-16, wherein z1 is about 2 to about 10.

Embodiment 18 provides the method of any one of Embodiments 1-17, wherein z1 is 2.

Embodiment 19 provides the method of any one of Embodiments 1-18, wherein z2 is about 1 to about 10.

Embodiment 20 provides the method of any one of Embodiments 1-19, wherein z2 is 1.

Embodiment 21 provides the method of any one of Embodiments 1-20, wherein n is about 1 to about 100.

Embodiment 22 provides the method of any one of Embodiments 1-21, wherein n is about 1 to about 20.

Embodiment 23 provides the method of any one of Embodiments 1-22, wherein the polymer is an oligomer.

Embodiment 24 provides the method of any one of Embodiments 1-23, wherein the carboxylic acid has the structure HO—C(O)—R'—C(O)—O—$R^a$—O—C(O)—R'—C(O)—OH or HO—C(O)—R'—C(O)—O—$R^a$—OH.

Embodiment 25 provides the method of any one of Embodiments 1-24, wherein the polymer has the structure $R^{eg}$—[O—$R^a$—O—C(O)—R'—C(O)]$_n$—O—$R^a$—O—$R^{eg}$.

Embodiment 26 provides the method of any one of Embodiments 1-25, wherein the carboxylic acid has the structure:

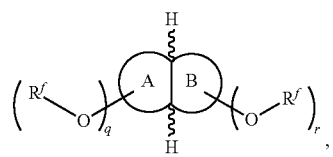

wherein
at each occurrence, $R^f$ is independently chosen from —H and —C(O)—R'—C(O)—OH, wherein the carboxylic acid has at least one $R^f$ that is —C(O)—R'—C(O)—OH,
fused rings A and B are each independently chosen from substituted or unsubstituted ($C_5$-$C_{10}$)cycloalkyl and ($C_2$-$C_{10}$)heterocyclyl,
q and r are each independently 1-8, and
at each occurrence, R' is independently a substituted or unsubstituted ($C_2$-$C_{10}$)hydrocarbylene.

Embodiment 27 provides the method of any one of Embodiments 1-26, wherein the carboxylic acid has the structure:

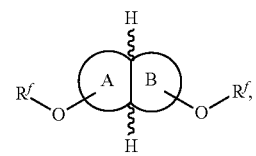

and wherein the polymer has the structure:

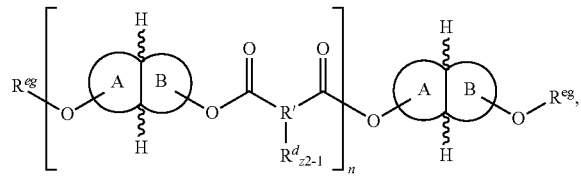

wherein
at each occurrence, $R^f$ is independently chosen from —H and —C(O)—R'—(C(O)—OH)$_{z2}$, wherein the carboxylic acid has at least one $R^f$ that is —C(O)—R'—(C(O)—OH)$_{z2}$,
at each occurrence, $R^{eg}$ is independently chosen from —H and —C(O)—R'($R^d$)$_{z2-1}$—C(O)—OH,
fused rings A and B are each independently chosen from substituted or unsubstituted ($C_5$-$C_{10}$)cycloalkyl and ($C_2$-$C_{10}$)heterocyclyl,
at each occurrence, $R^d$ is independently chosen from —H,

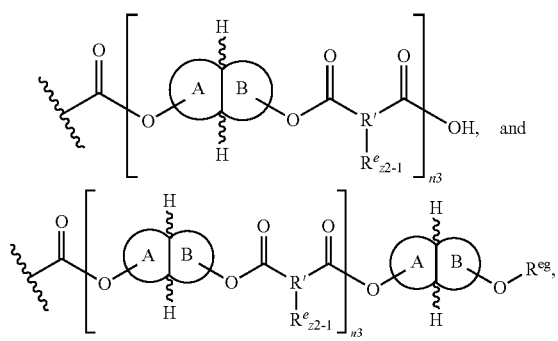

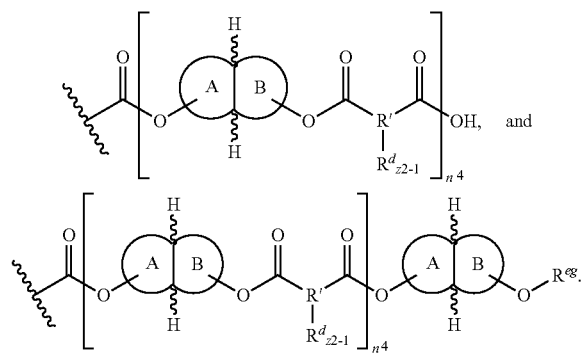

at each occurrence, n3 is independently about 0 to about 100,000, at each occurrence, $R^e$ is independently chosen from —H, at each occurrence, n4 is independently about 0 to about 100,000, and at each occurrence, R' is independently a substituted or unsubstituted $(C_2-C_{10})$hydrocarbyl having valence z2+1.

Embodiment 28 provides the method of any one of Embodiments 1-27, wherein the carboxylic acid has the structure:

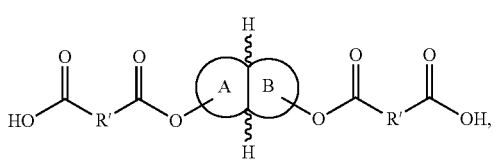

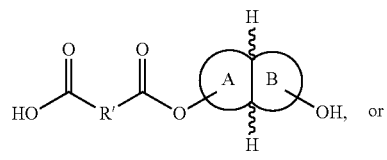

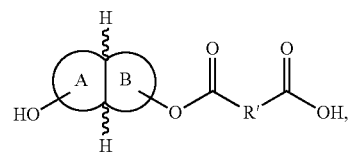

and wherein the polymer has the structure:

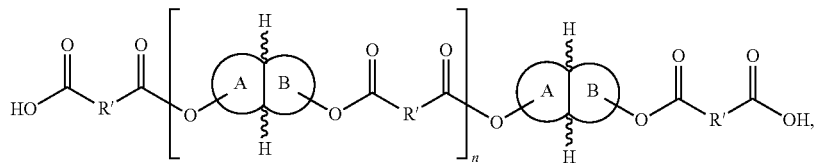

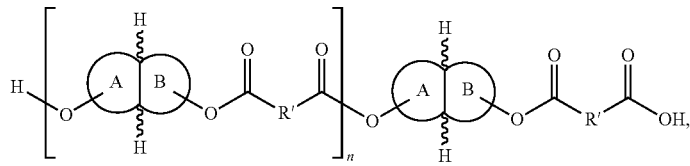

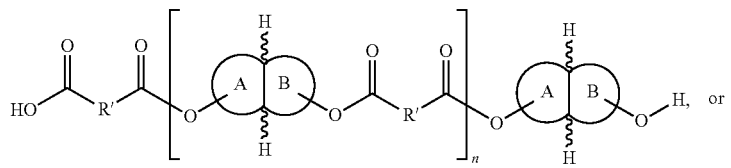

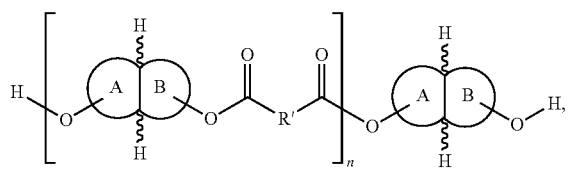

wherein
  fused rings A and B are each independently chosen from substituted or unsubstituted ($C_5$-$C_{10}$)cycloalkyl and ($C_2$-$C_{10}$)heterocyclyl,
  at each occurrence, R' is independently a substituted or unsubstituted ($C_2$-$C_{10}$)hydrocarbylene.

Embodiment 29 provides the method of Embodiment 28, wherein at each occurrence, R' is unsubstituted.

Embodiment 30 provides the method of Embodiments 28-29, wherein at each occurrence, R' is independently chosen from ($C_1$-$C_5$)alkylene, ($C_5$-$C_{10}$)aryl, and ($C_2$-$C_5$)alkenylene.

Embodiment 31 provides the method of any one of Embodiments 28-30, wherein at each occurrence, R' is independently chosen from —$CH_2$—$CH_2$—, —$CH_2$—$CH_2$—$CH_2$—, o-phenylene, cis —CH=CH—, and trans —CH=CH—.

Embodiment 32 provides the method of any one of Embodiments 28-31, wherein rings A and B are unsubstituted with the exception of the one or more alcohol and ester substituents —OC(O)—R'—C(O)OH.

Embodiment 33 provides the method of any one of Embodiments 28-32, wherein one of the alcohol and ester substituents including R' is alpha to at least one carbon atom shared by rings A and B.

Embodiment 34 provides the method of any one of Embodiments 28-33, wherein rings A and B are the same size.

Embodiment 35 provides the method of any one of Embodiments 28-34, wherein rings A and B are 5-membered rings.

Embodiment 36 provides the method of any one of Embodiments 28-35, wherein at least one of rings A and B include at least one oxygen atom.

Embodiment 37 provides the method of any one of Embodiments 28-36, wherein each of rings A and B is a tetrahydrofuran ring, wherein each carbon atom shared by rings A and B has an oxygen atom alpha thereto.

Embodiment 38 provides the method of any one of Embodiments 28-37, wherein each of the alcohol and ester substituents —OC(O)—R'—C(O)OH are alpha to a different carbon atom shared by each of rings A and B.

Embodiment 39 provides the method of any one of Embodiments 28-38, wherein rings A and B form a ring system chosen from isosorbide, isomannide, and isoidide.

Embodiment 40 provides the method of any one of Embodiments 28-39, wherein rings A and B are unsubstituted.

Embodiment 41 provides the method of any one of Embodiments 28-40, wherein the carboxylic acid has the structure:

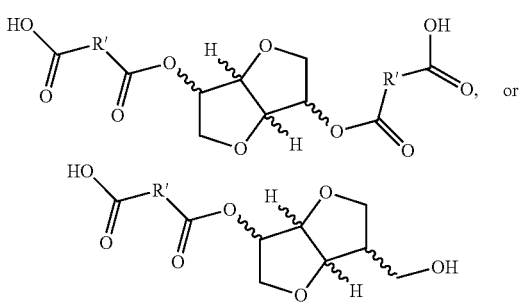

and the polymer has the structure:

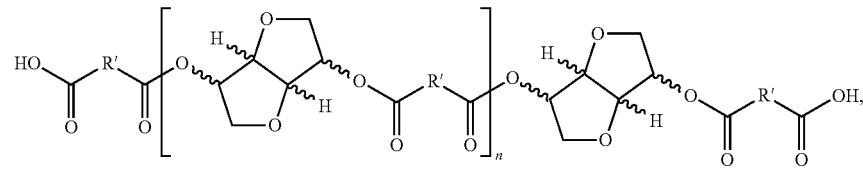

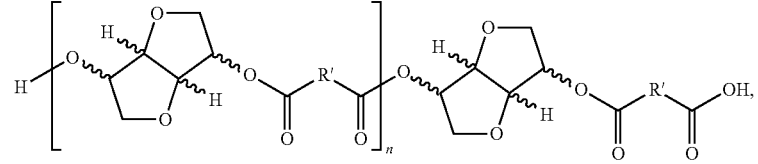

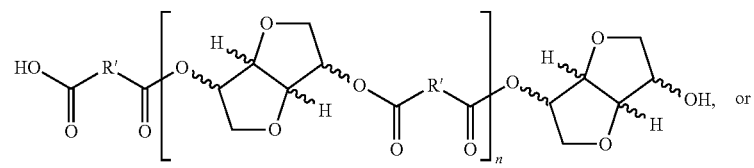

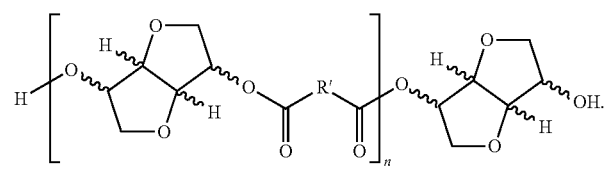

Embodiment 42 provides the method of any one of Embodiments 1-41, wherein the carboxylic acid is chosen from
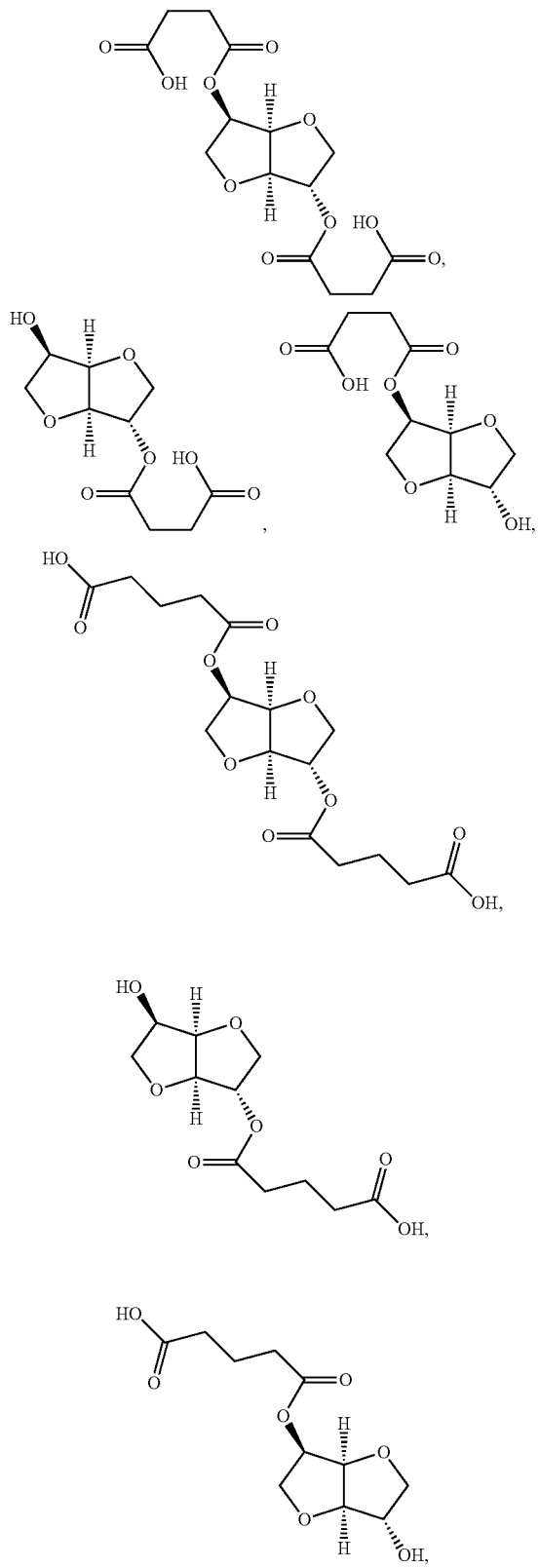
-continued
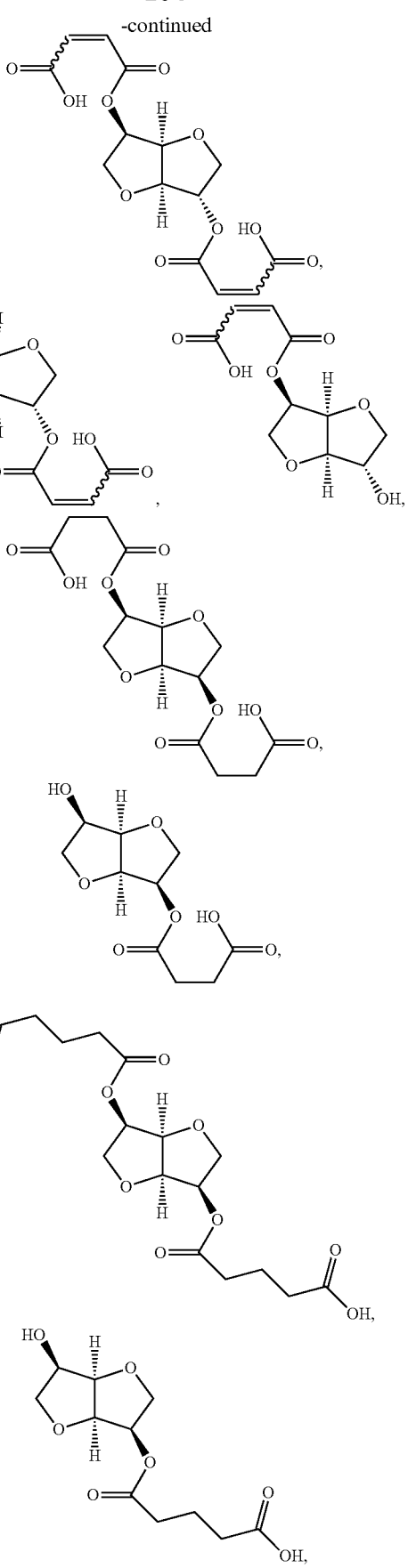

105
-continued
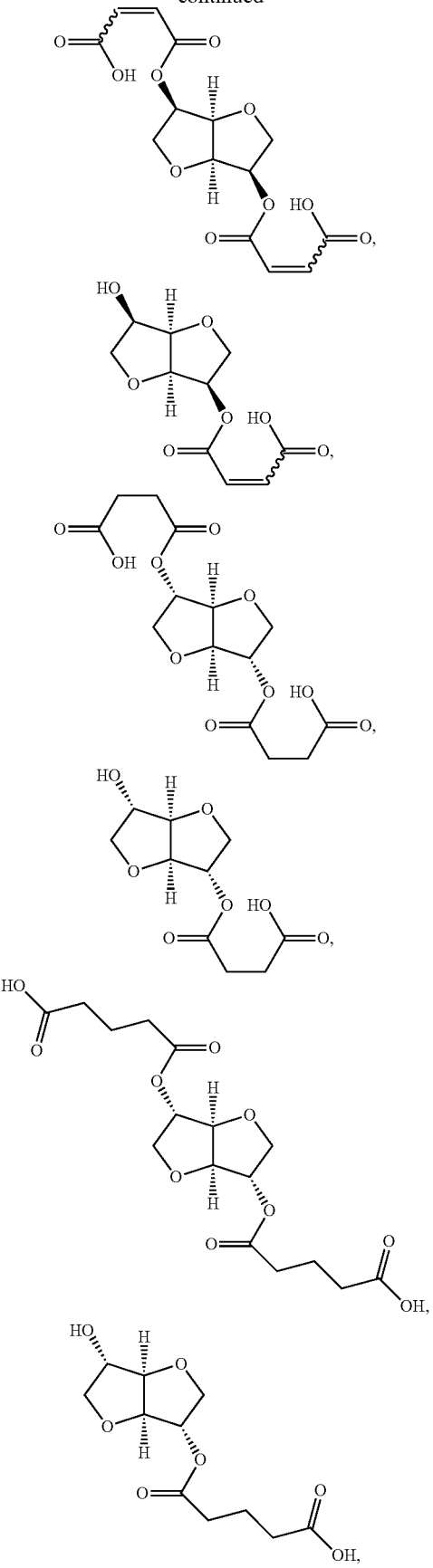
106
-continued
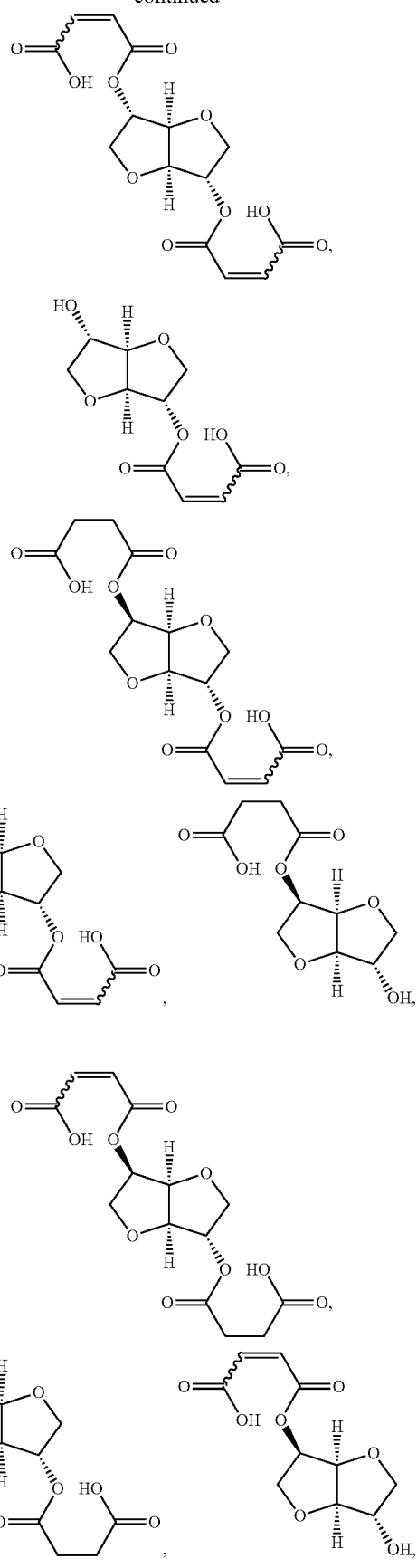

107
-continued
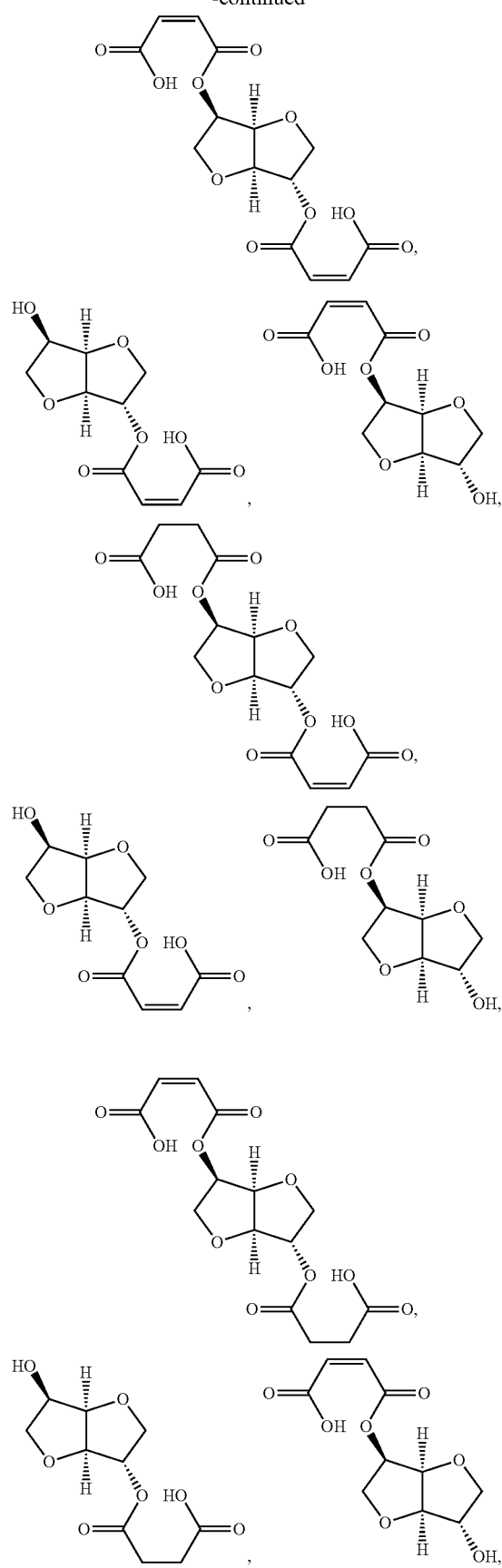
108
-continued
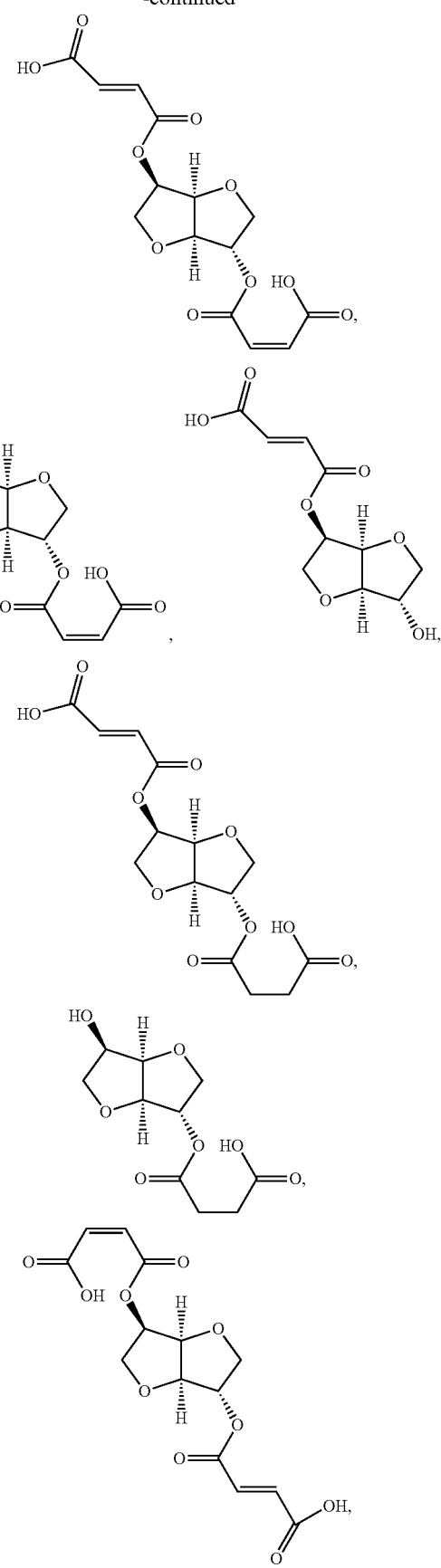

109
-continued
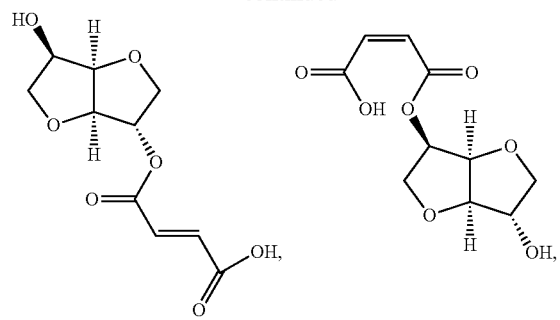
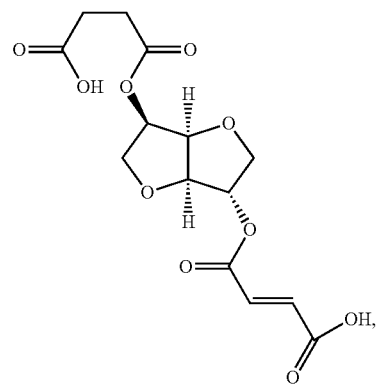
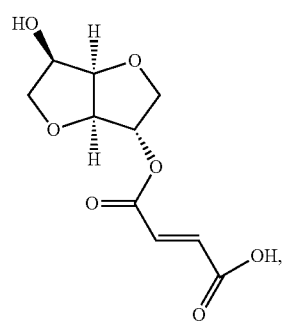
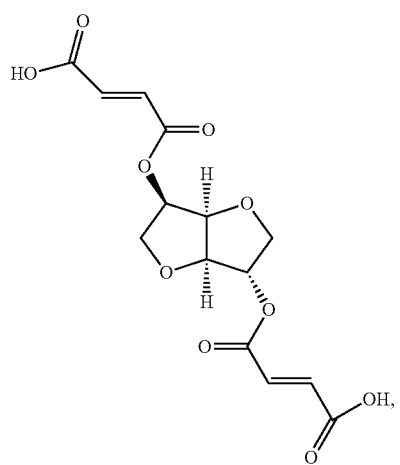
110
-continued
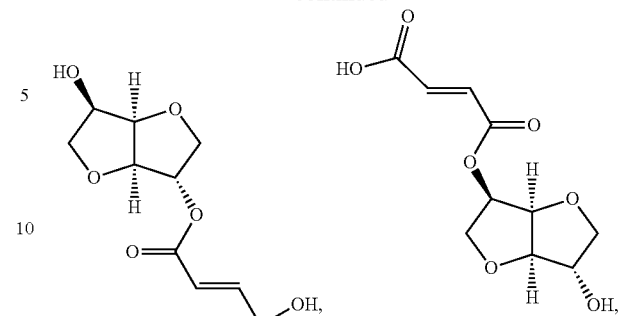
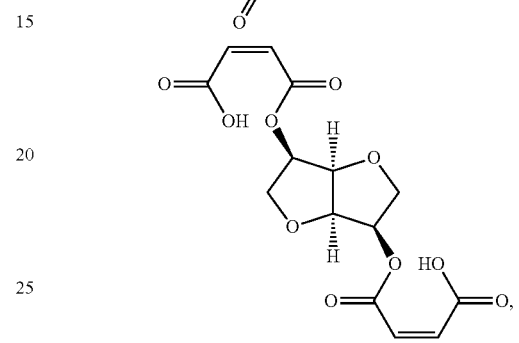
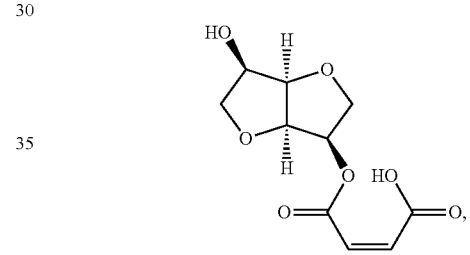
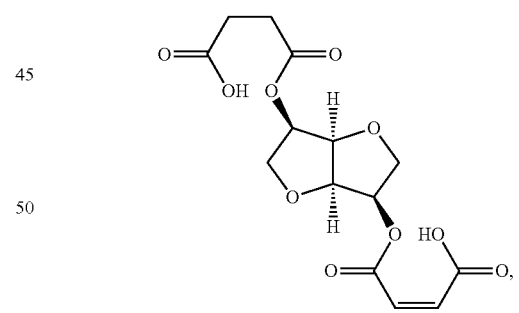
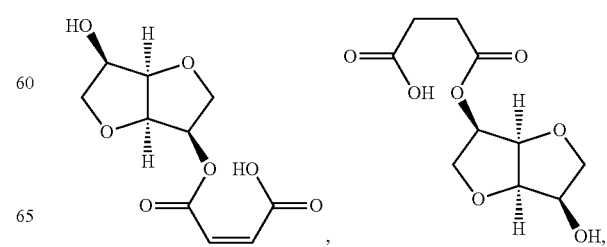

111
-continued
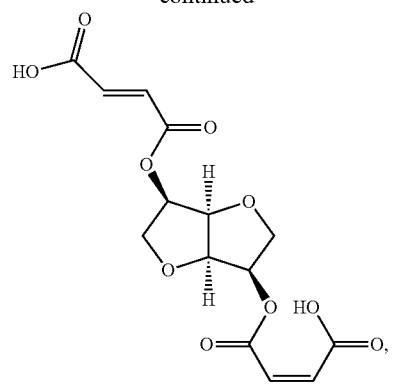
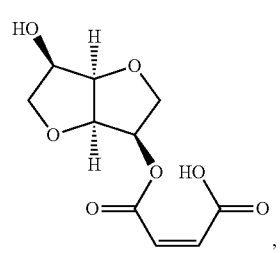
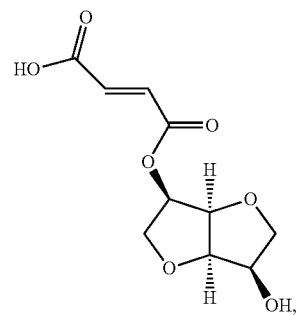
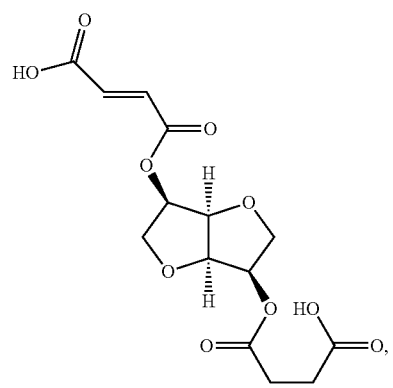
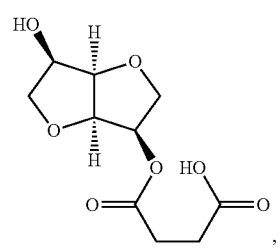
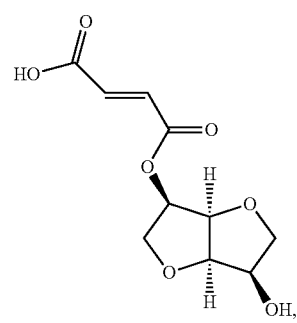
112
-continued
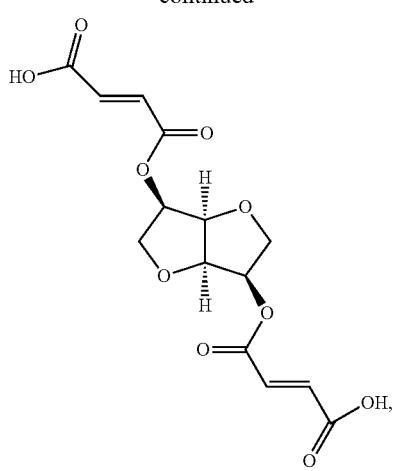
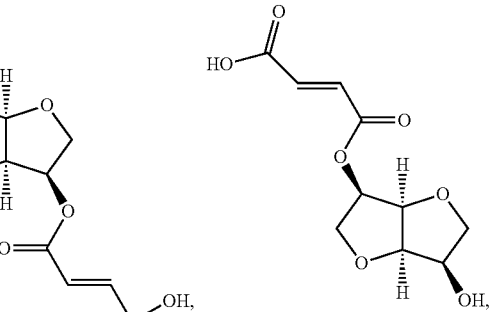
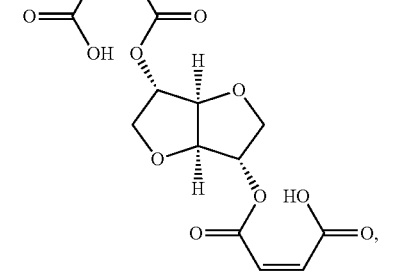
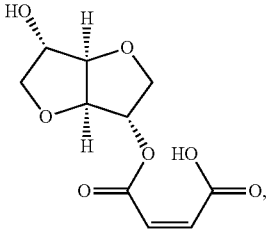
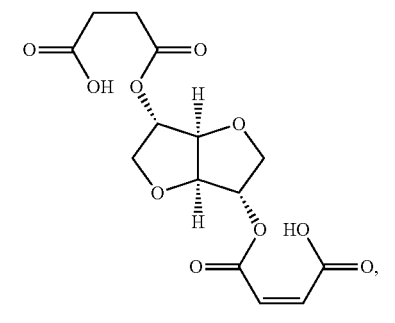

113
-continued
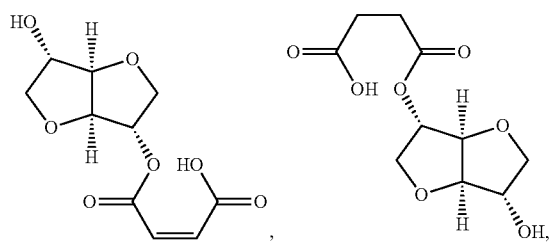
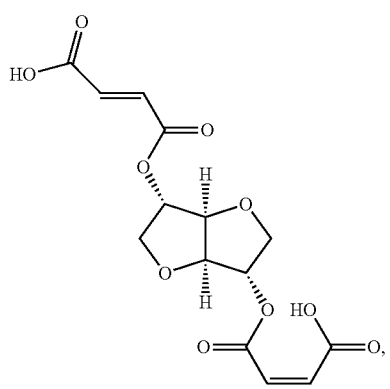
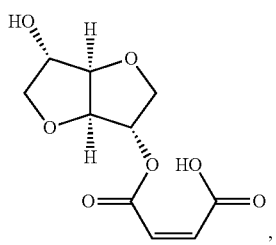
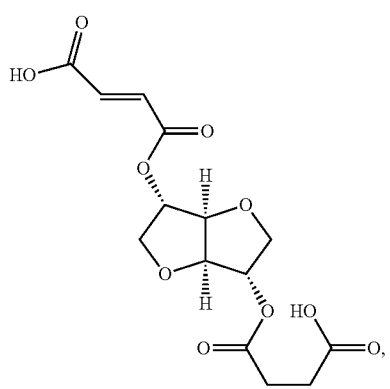
114
-continued
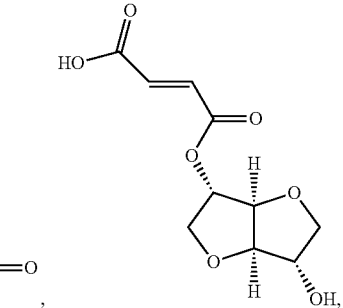
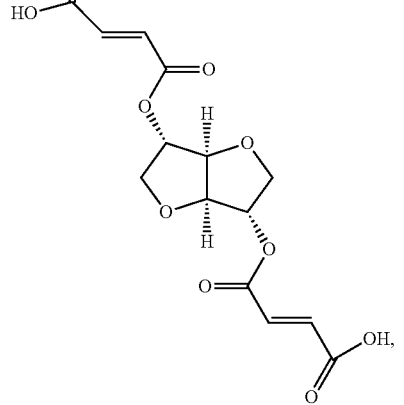
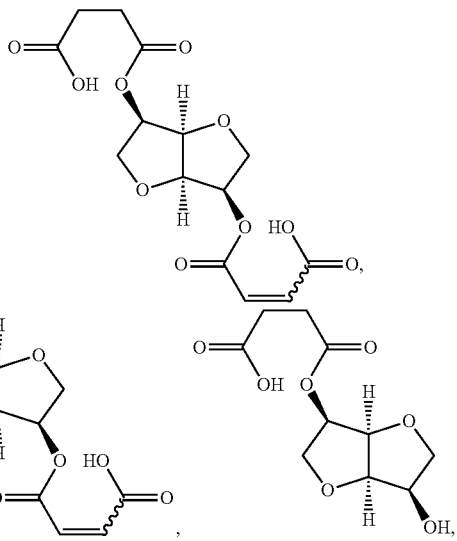
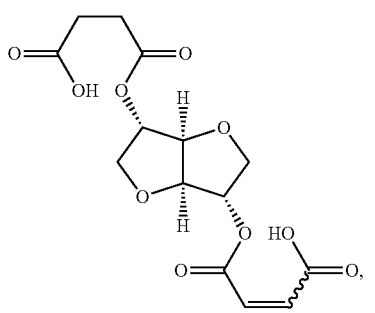

115
-continued
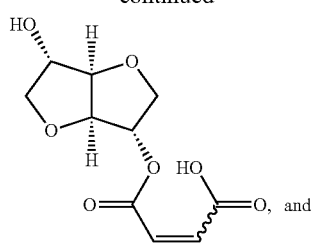
, and
116
-continued
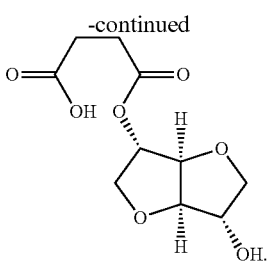
Embodiment 43 provides the method of any one of Embodiment 1-42, wherein the polymer has a structure that is chosen from:
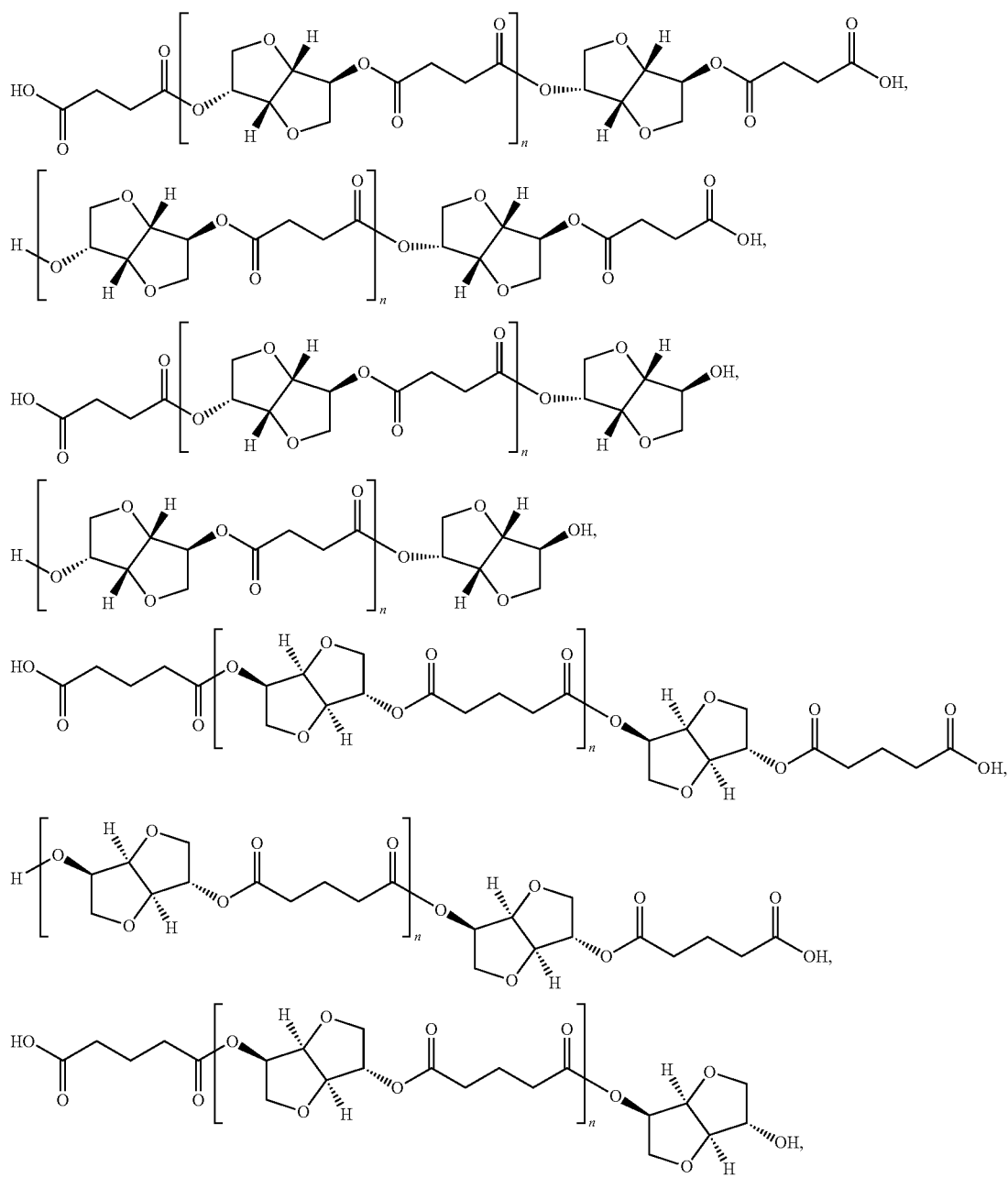

-continued
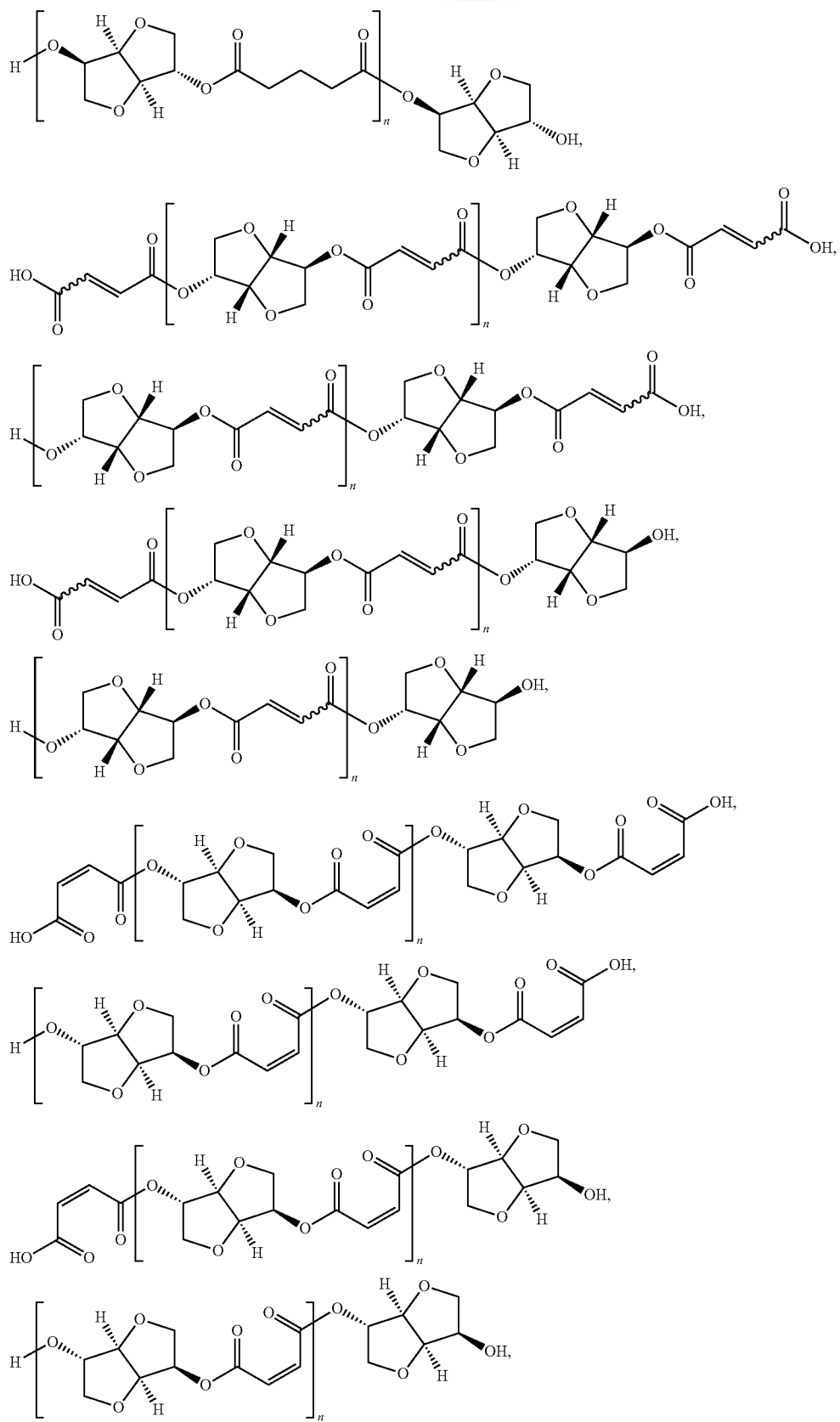

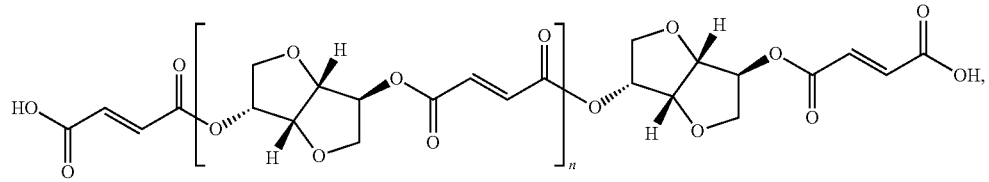
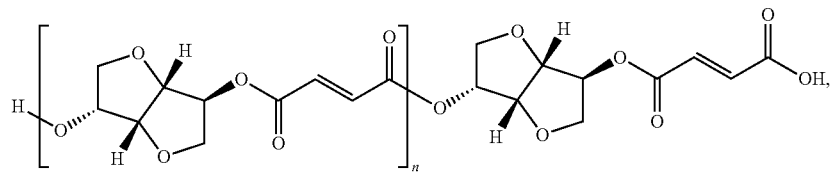
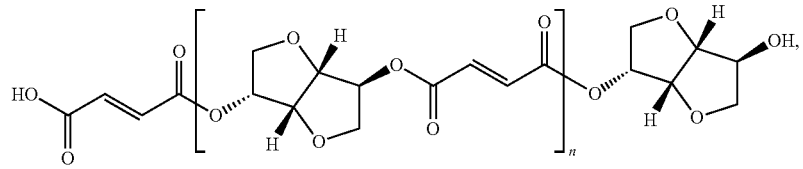
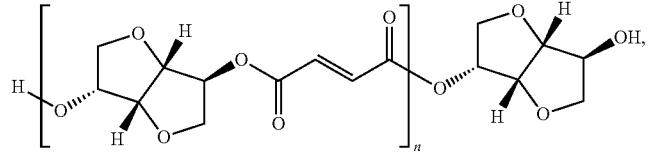
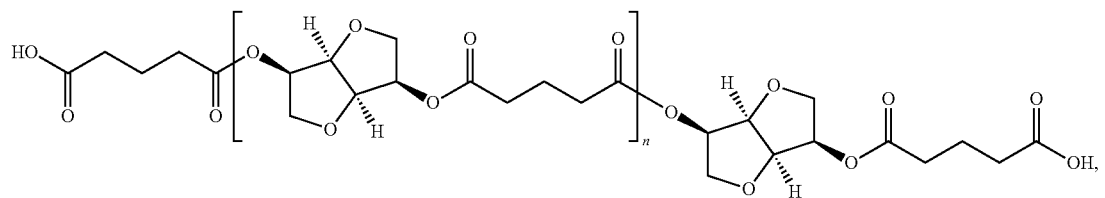
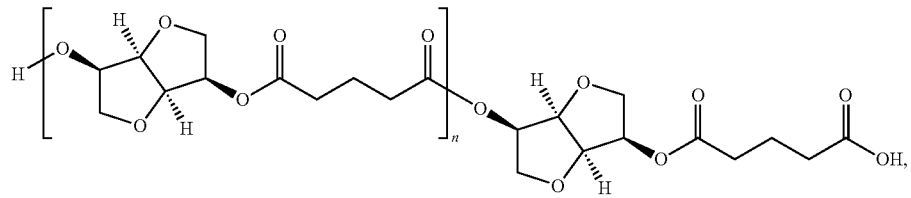
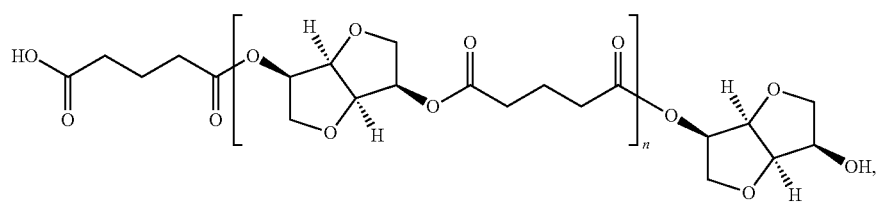
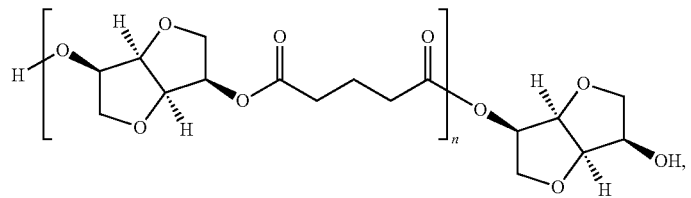
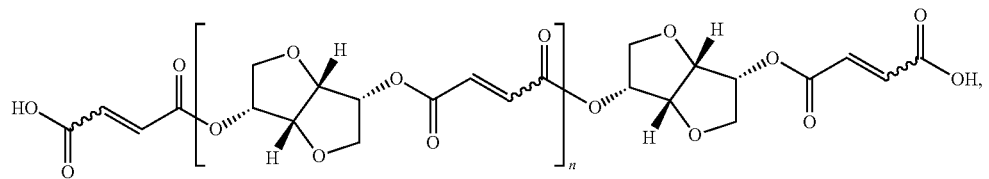

-continued
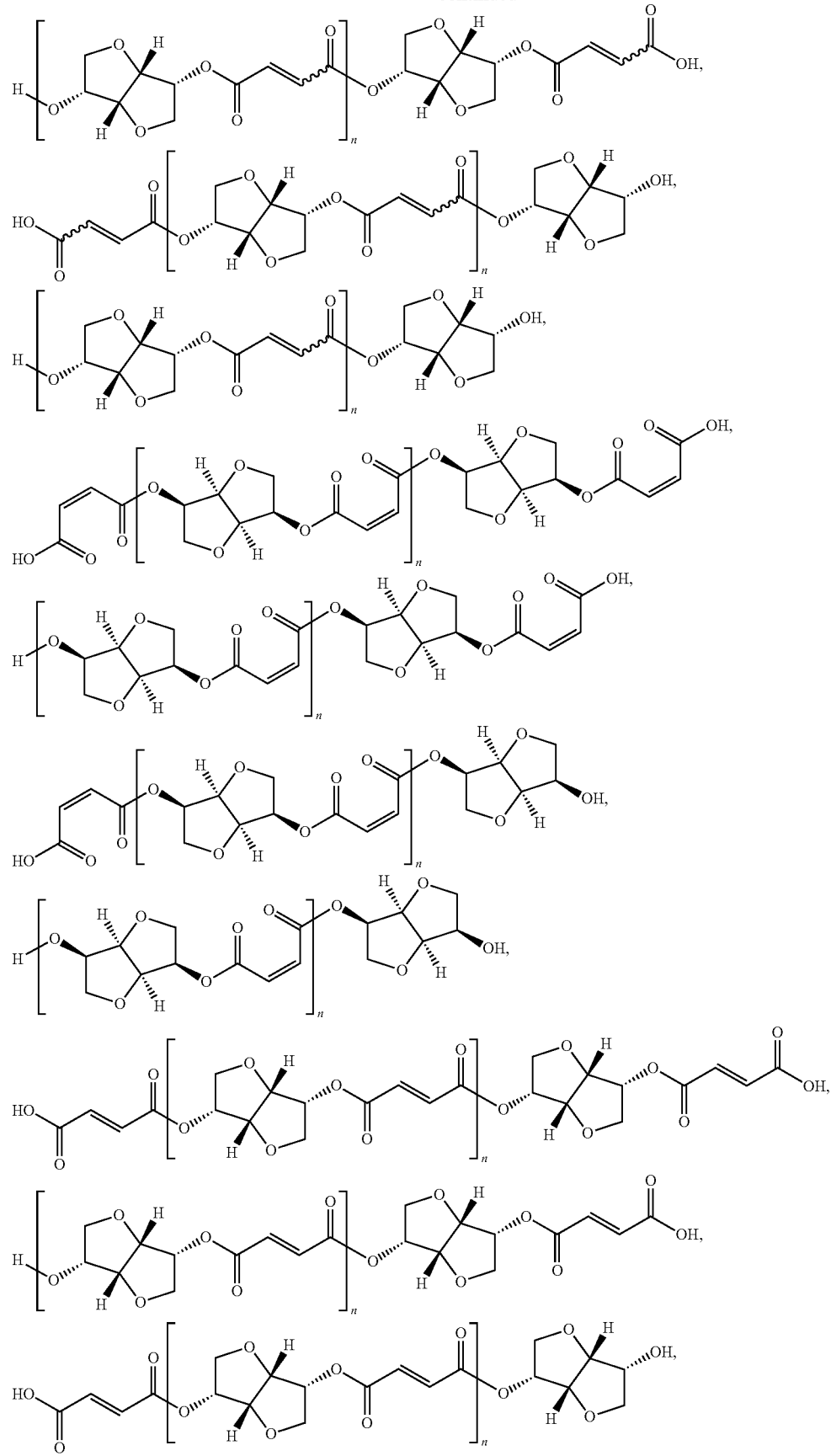

-continued
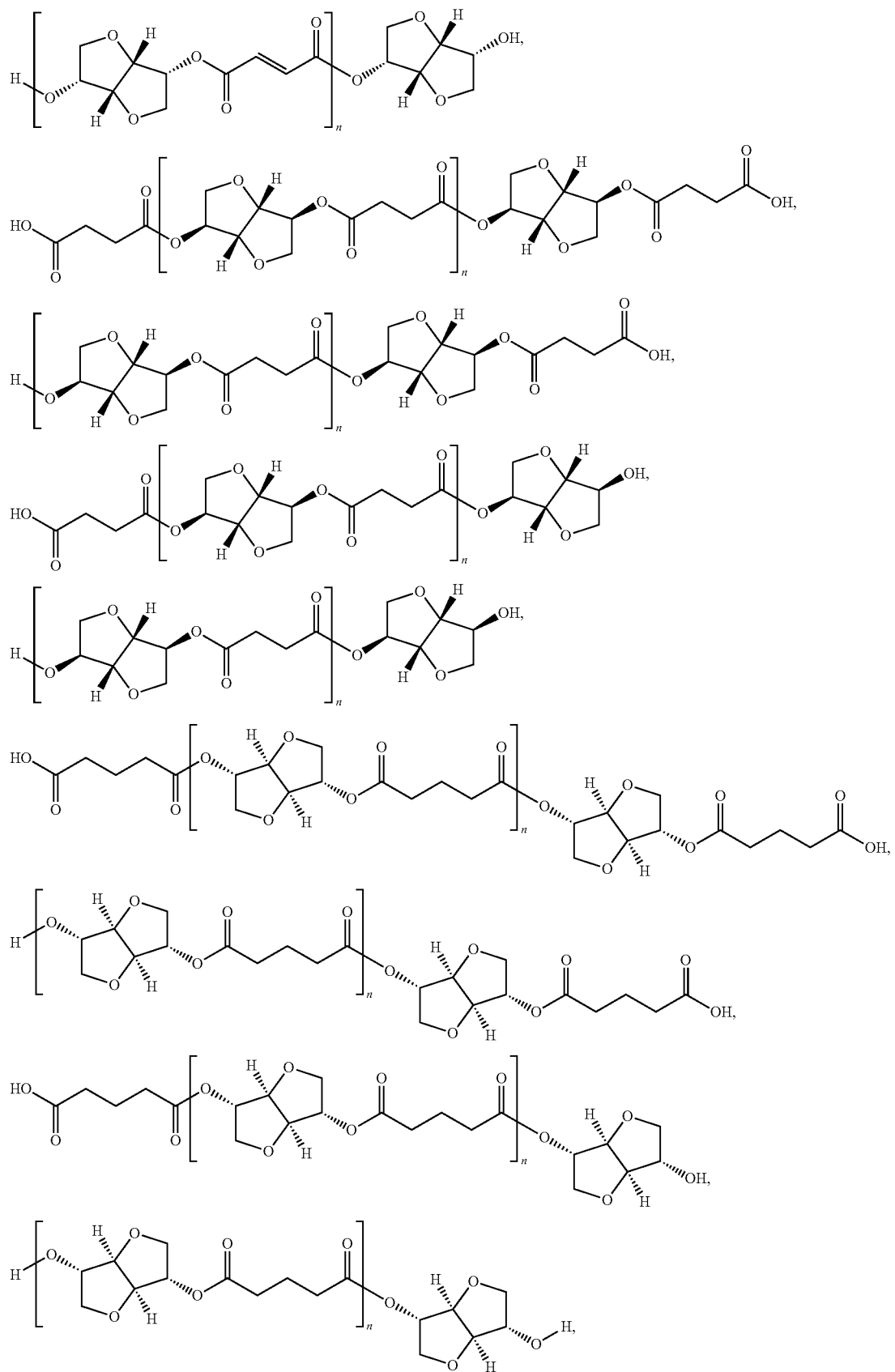

-continued
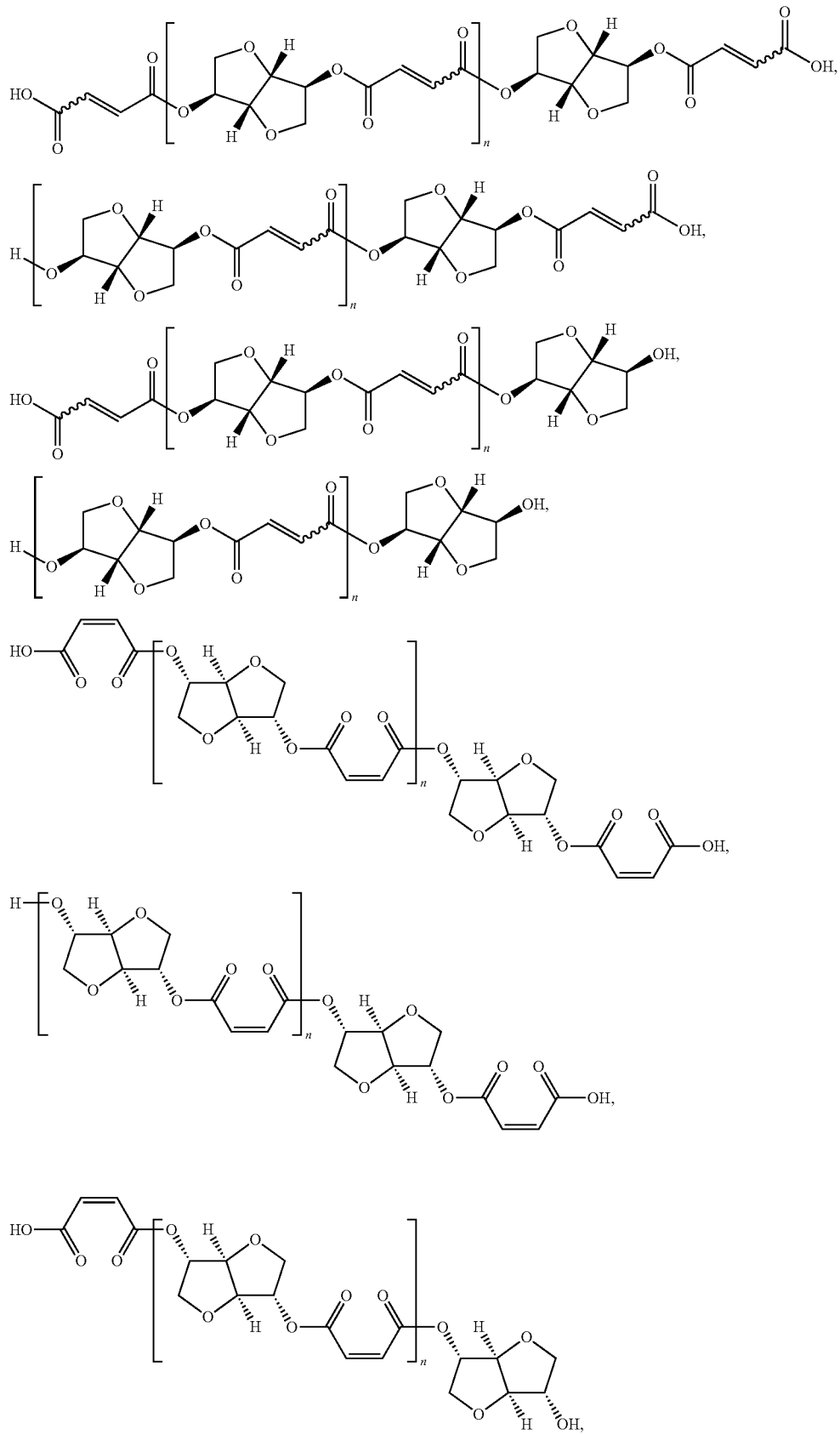

-continued
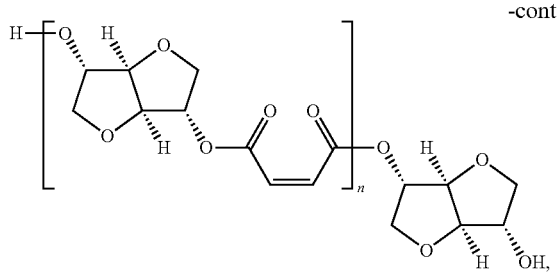
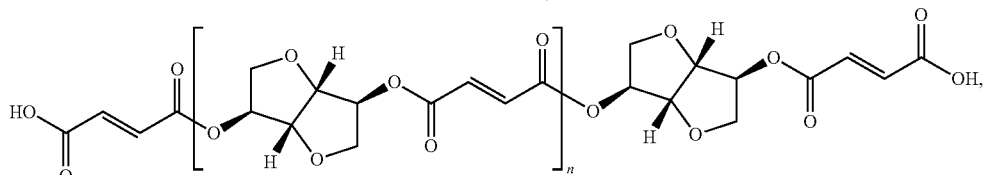
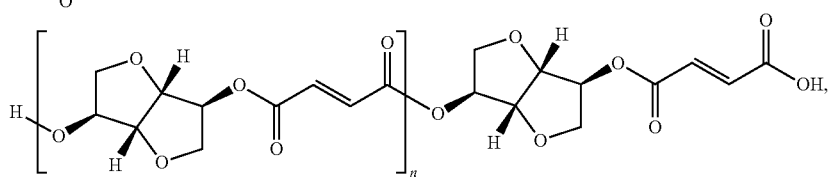
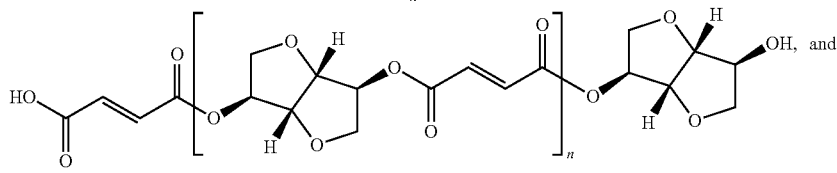
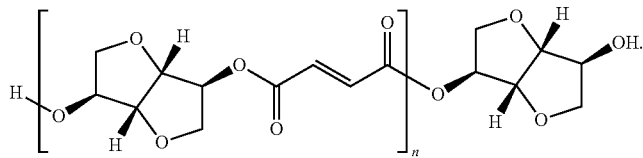
Embodiment 44 provides the method of any one of Embodiments 1-43, wherein the carboxylic acid has the structure:
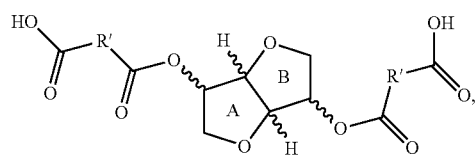
-continued
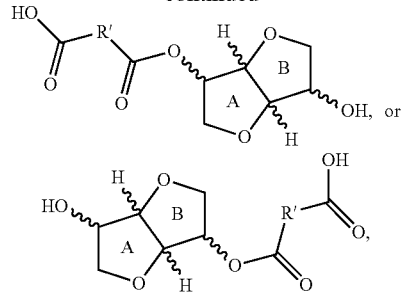
and the polymer has the structure:
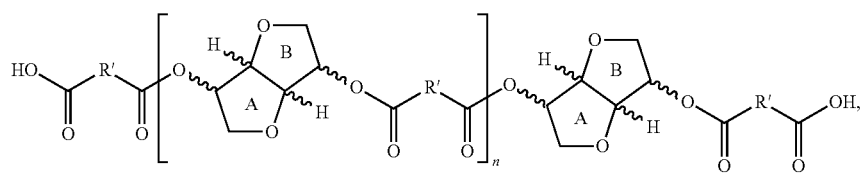

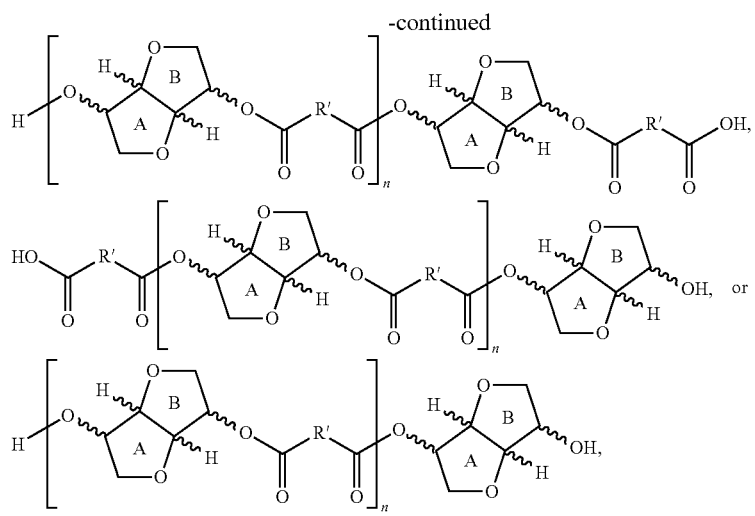

wherein
- rings A and B form a ring system chosen from isosorbide, isomannide, and isoidide, and
- at each occurrence, R' is independently selected from —CH₂—CH₂—, —CH₂—CH₂—CH₂—, o-phenylene, cis —CH=CH—, and trans —CH=CH—.

Embodiment 45 provides the method of Embodiment 44, wherein:
- at least one R' is —CH₂—CH₂— and at least one R' is cis or trans —CH=CH—;
- at least one R' is —CH₂—CH₂— and at least one R' is cis —CH=CH—;
- at least one R' is —CH₂—CH₂— and at least one R' is trans —CH=CH—;
- at least one R' is —CH₂—CH₂—CH₂— and at least one R' is cis or trans —CH=CH—;
- at least one R' is —CH₂—CH₂—CH₂— and at least one R' is cis —CH=CH—;
- at least one R' is —CH₂—CH₂—CH₂— and at least one R' is trans —CH=CH—; or
- at least one R' is cis —CH=CH— and at least one R' is trans —CH=CH—.

Embodiment 46 provides the method of any one of Embodiments 44-45, wherein:
- at least one R' is —CH₂—CH₂—, at least one R' is cis or trans —CH=CH—, and wherein the carboxylic acid has the structure:

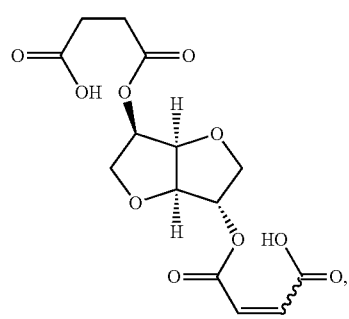

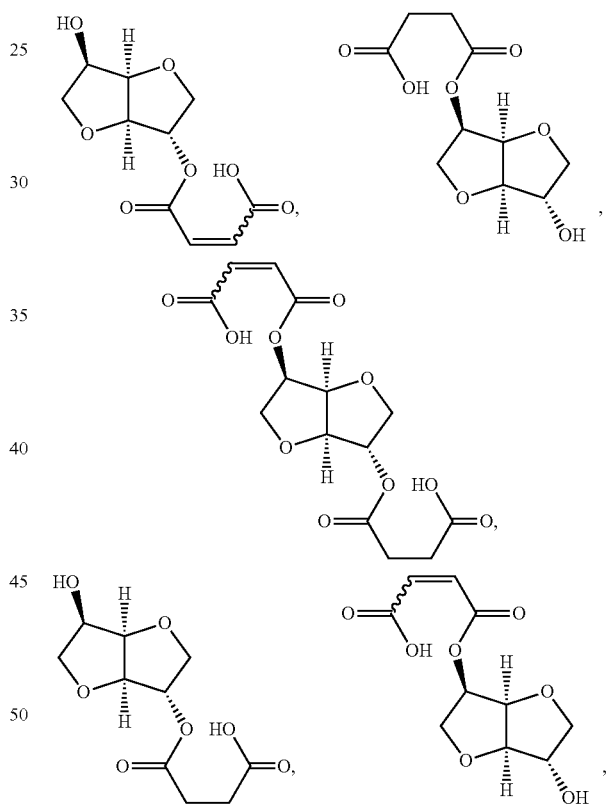

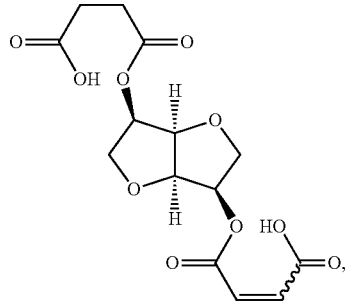

-continued
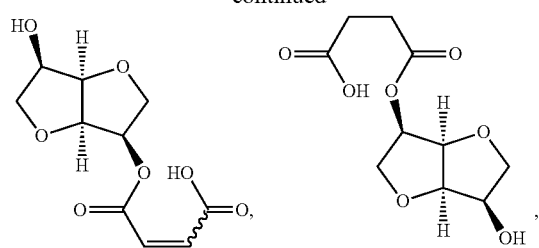
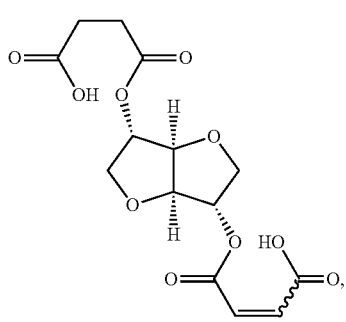
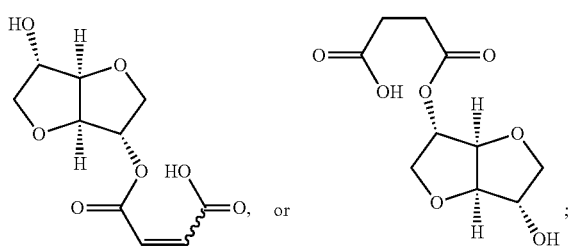
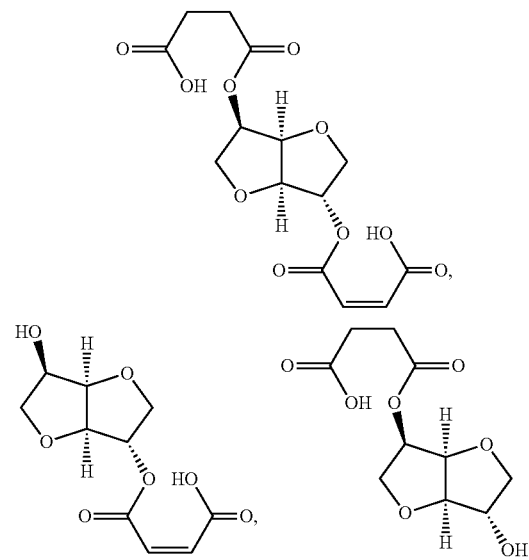
at least one R' is —CH$_2$—CH$_2$—, at least one R' is cis —CH=CH—, and wherein the carboxylic acid has the structure:
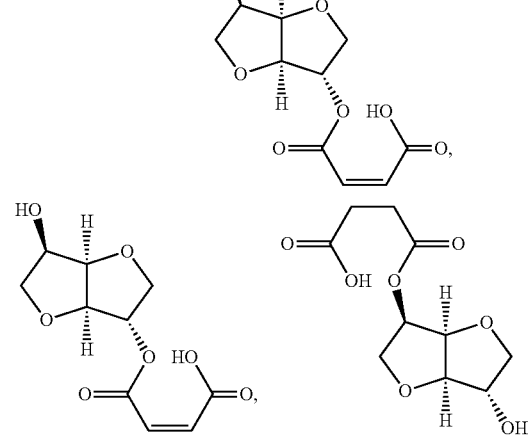
-continued
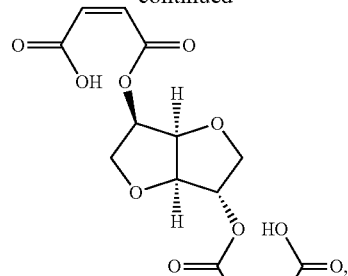
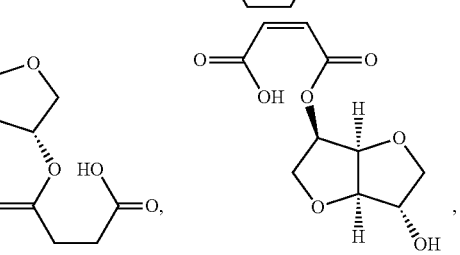
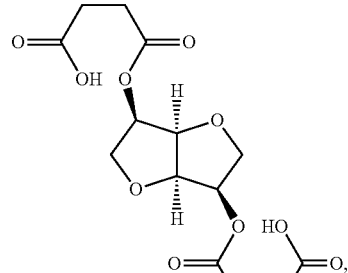
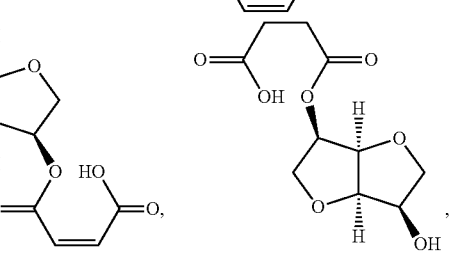
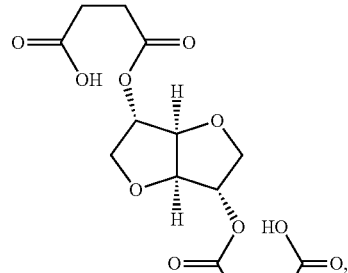
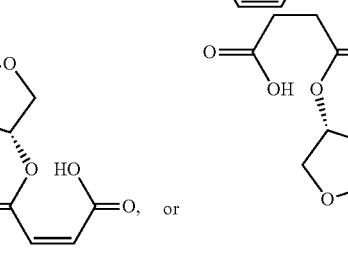
at least one R' is —CH$_2$—CH$_2$—, at least one R' is trans —CH=CH—, and wherein the carboxylic acid has the structure:

133
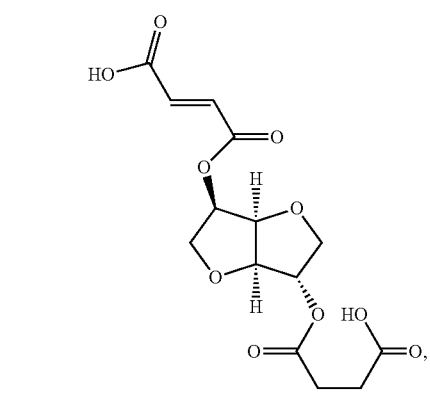
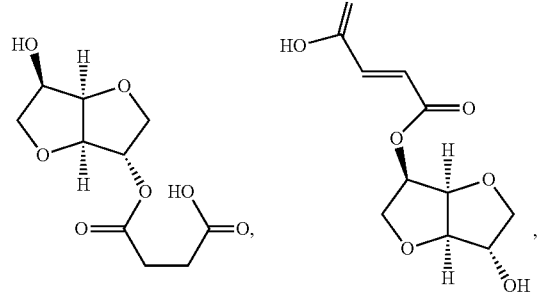
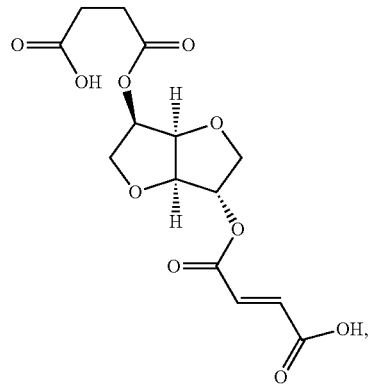
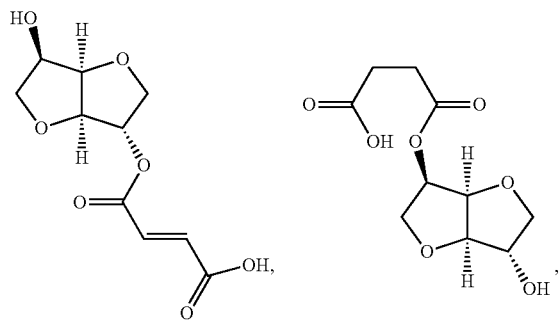
134
-continued
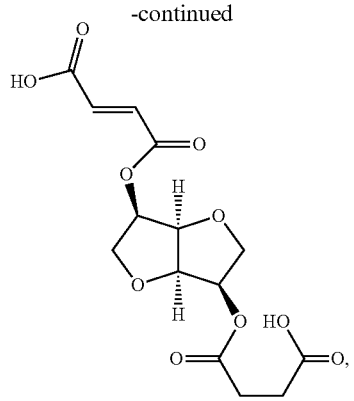
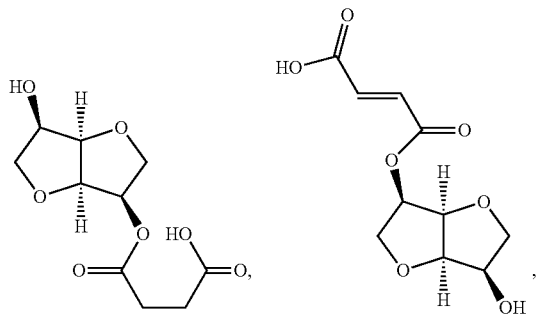
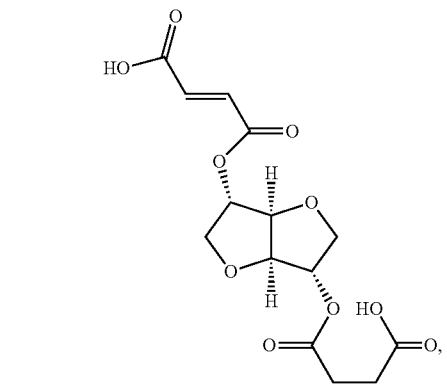
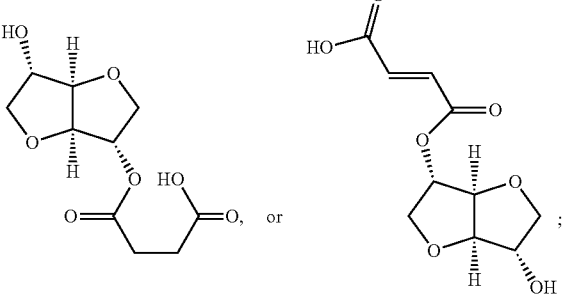
at least one R' is cis —CH=CH—, at least one R' is trans —CH=CH—, and wherein the carboxylic acid has the structure:

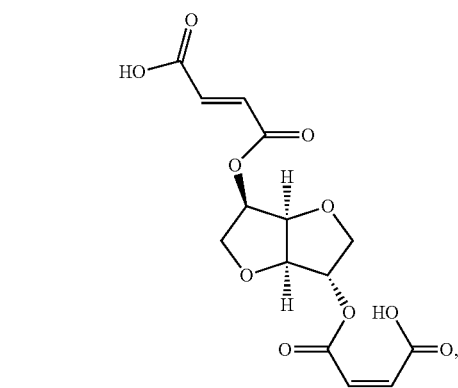
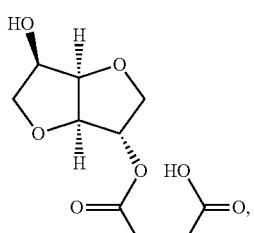
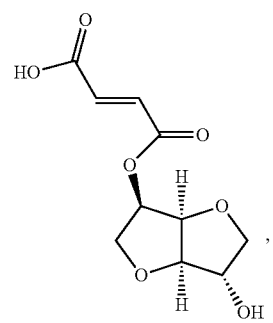
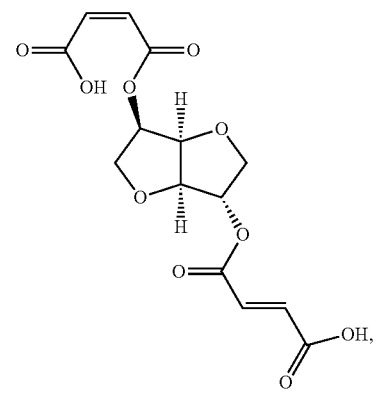
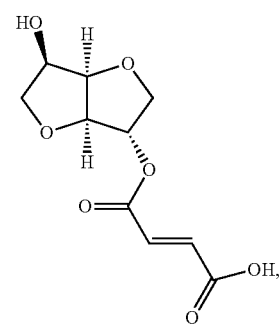
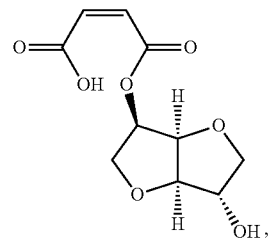
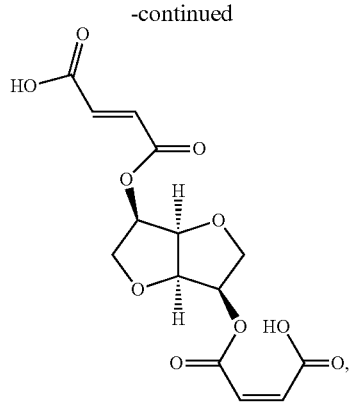
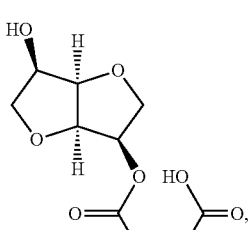
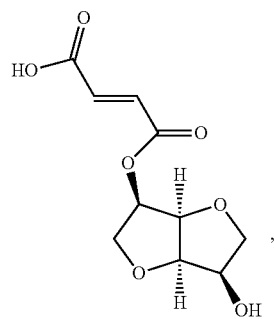
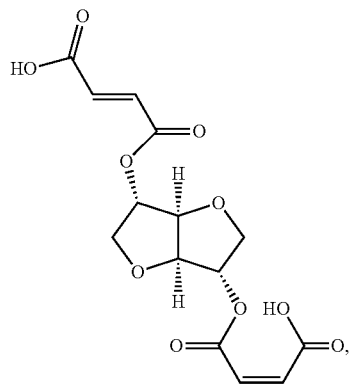
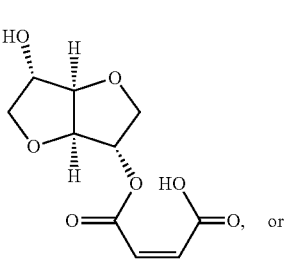
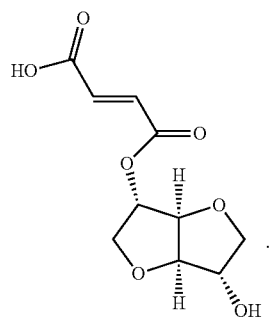
Embodiment 47 provides the method of any one of Embodiments 1-46, wherein the carboxylic acid is chosen from:

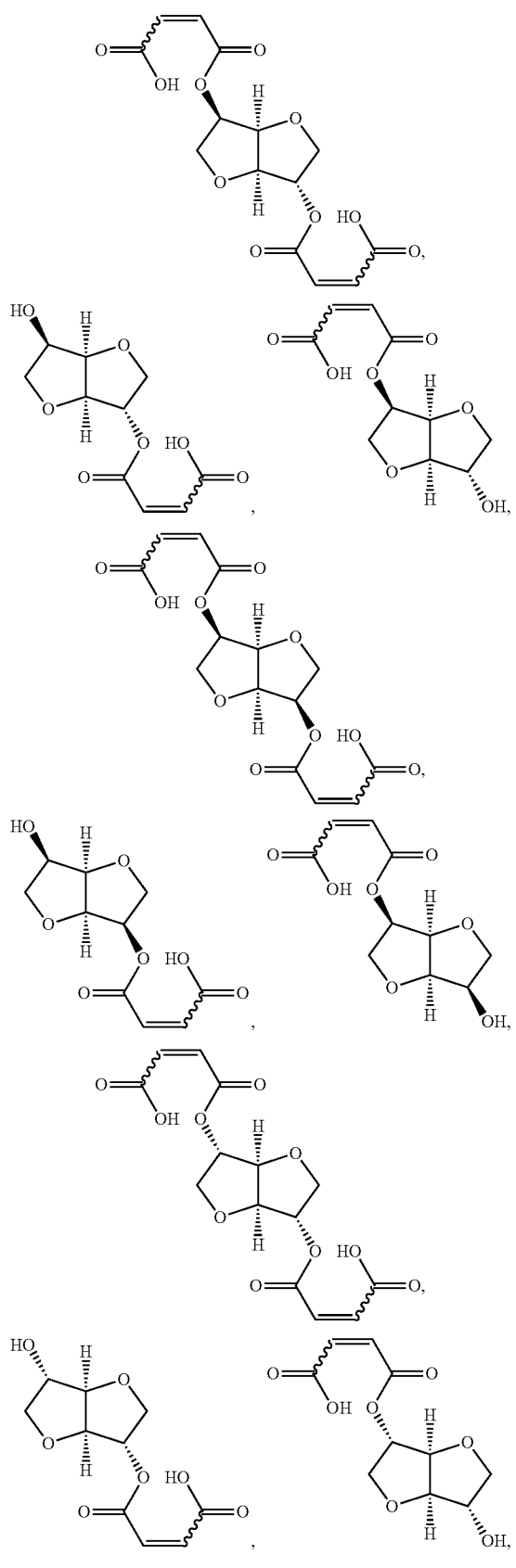
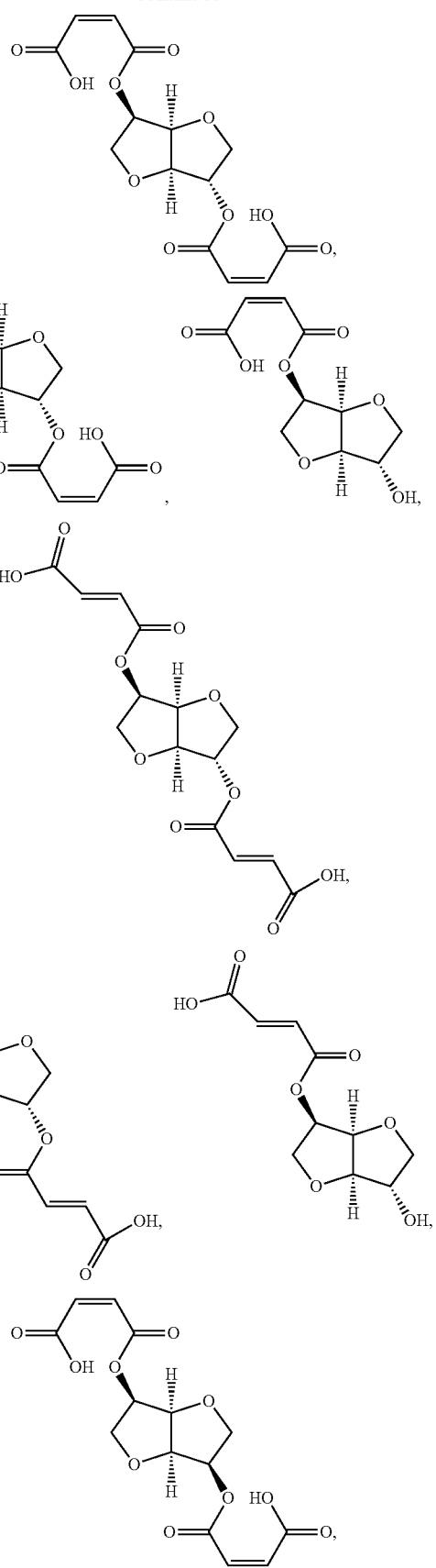

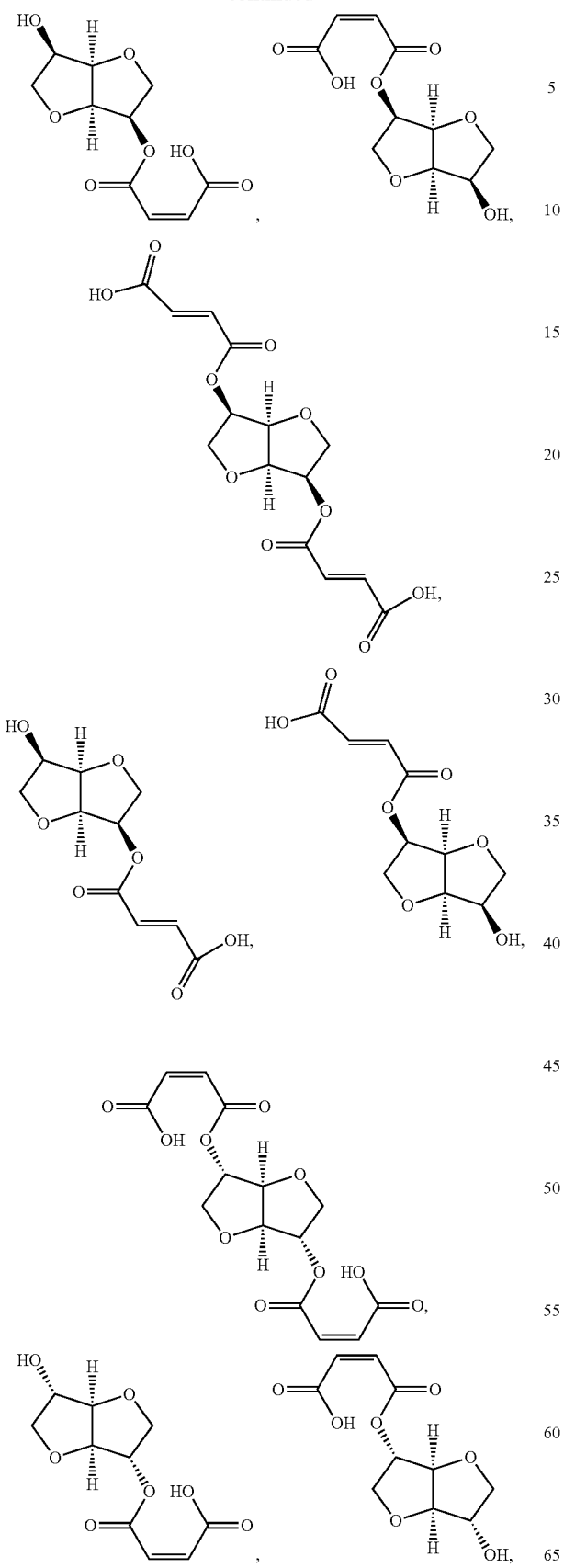
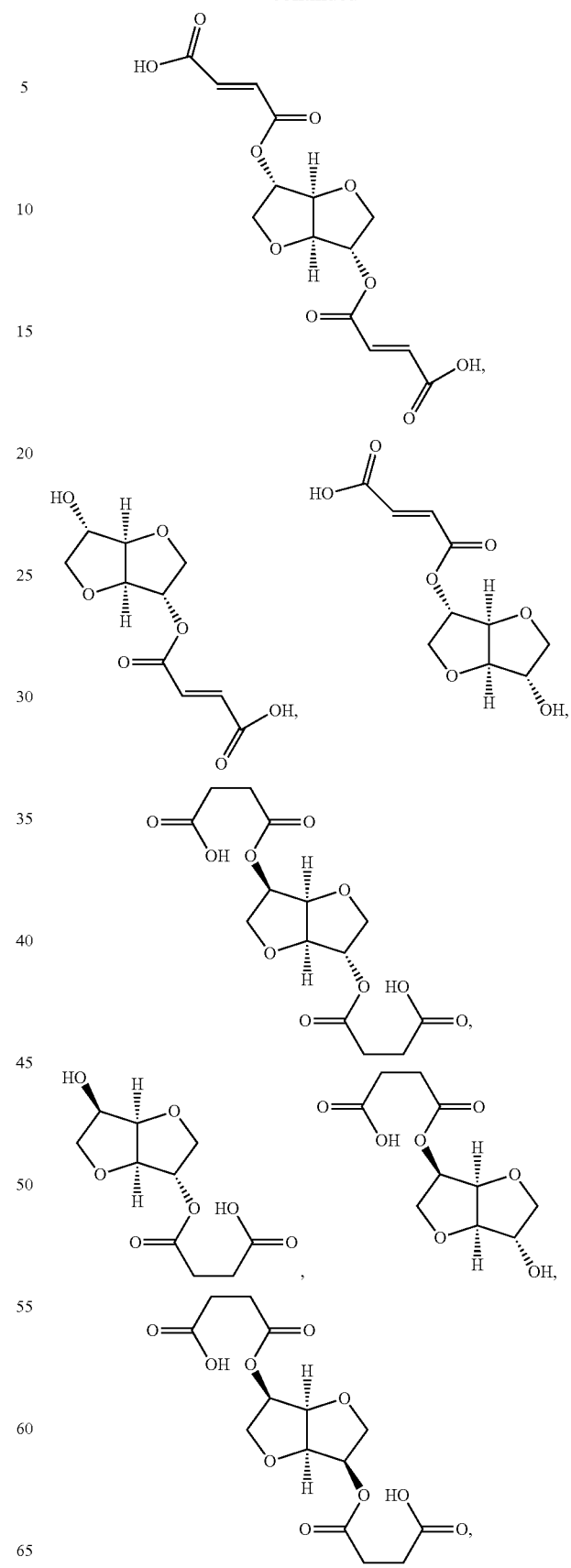

141
-continued
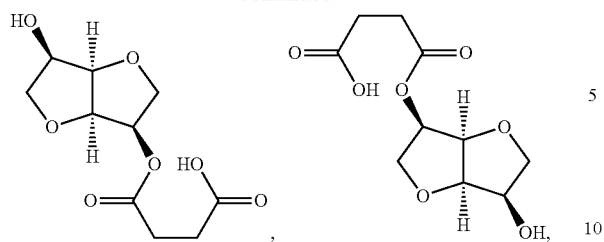
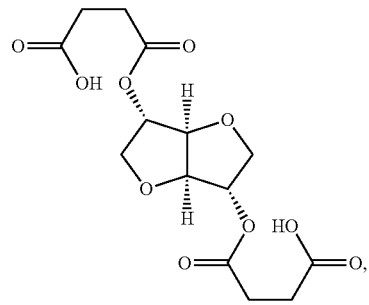
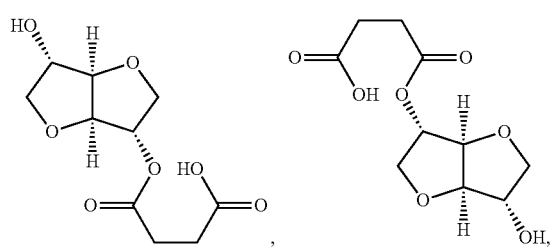
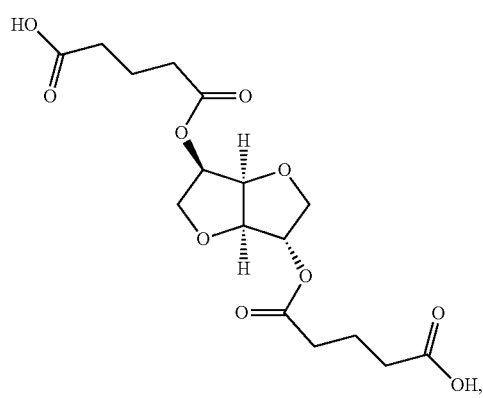
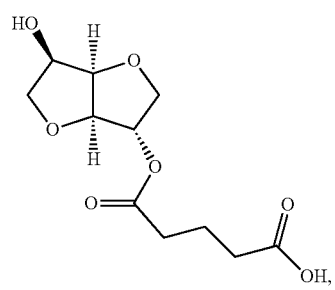
142
-continued
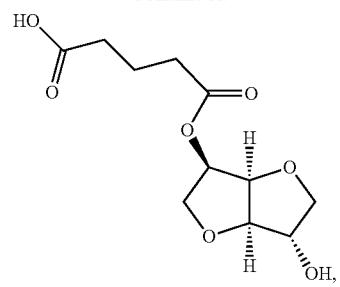
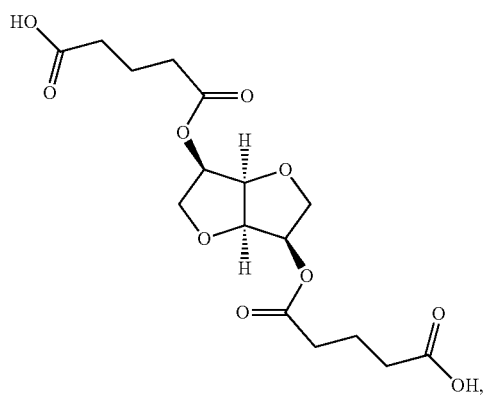
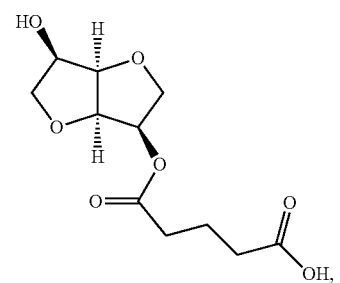
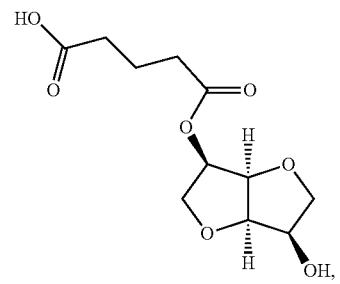
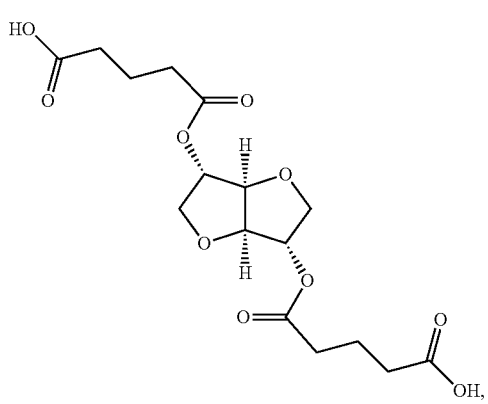

-continued

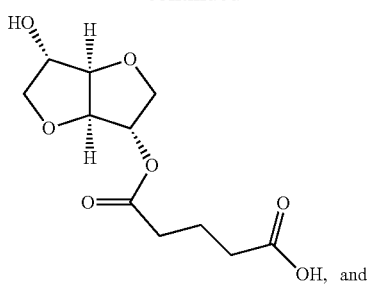

OH, and

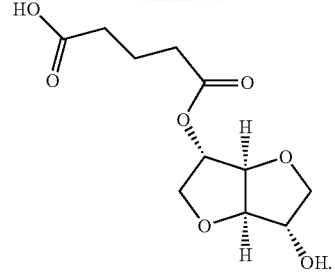

OH.

Embodiment 48 provides the method of Embodiment 47, wherein the polymer has the structure:

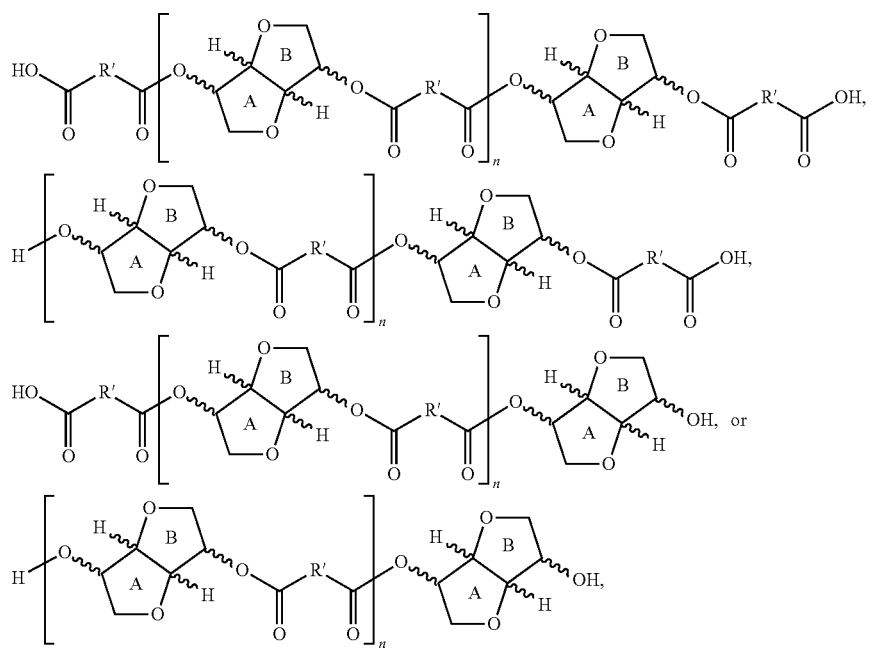

wherein
  rings A and B form a ring system chosen from isosorbide, isomannide, and isoidide, and
  at each occurrence, R' is independently selected from —$CH_2$—$CH_2$—, —$CH_2$—$CH_2$—$CH_2$—, cis —CH=CH—, and trans —CH=CH—.

Embodiment 49 provides a method of forming a polymer, the method comprising: subjecting a composition comprising a carboxylic acid having the structure:

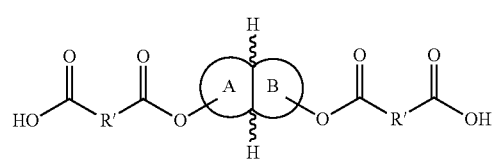

to conditions sufficient to form a polymer having the structure:

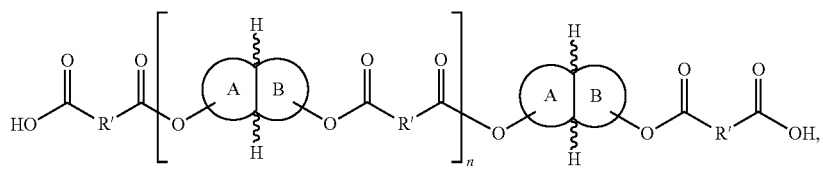

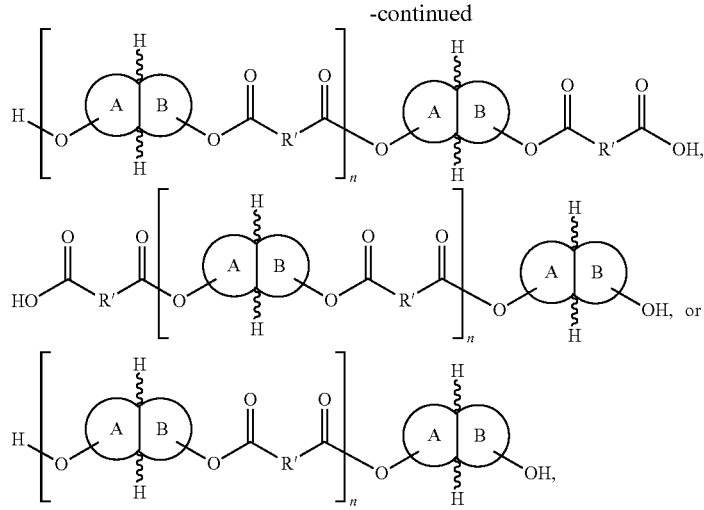

wherein
the composition optionally comprises a carrier liquid,
a) the carboxylic acid and the carrier liquid are about 100 wt % of the composition, b) the composition is substantially free of other carboxylic acids, c) the composition is substantially free of carboxylic acids having the structure HO—C(O)—R'—C(O)—OH or HO—C(O)—R'—OH, or any combination of a), b), and c),
fused rings A and B are each independently chosen from substituted or unsubstituted ($C_5$-$C_{10}$)cycloalkyl and ($C_2$-$C_{10}$)heterocyclyl,
$R^a$ is substituted or unsubstituted ($C_1$-$C_{50}$)hydrocarbyl having a valency of z1 and interrupted or terminated by 0, 1, 2, or 3 groups independently chosen from —O—, —S—, substituted or unsubstituted —NH—, and —(O—($C_2$-$C_3$)alkylene)$_{y1}$- wherein y1 is about 1 to about 10,000 and wherein the ($C_2$-$C_3$)alkylene is substituted or unsubstituted,
at each occurrence, R' is independently a substituted or unsubstituted ($C_2$-$C_{10}$)hydrocarbylene, and
n is about 1 to about 100,000.

Embodiment 50 provides a polymer having the structure:

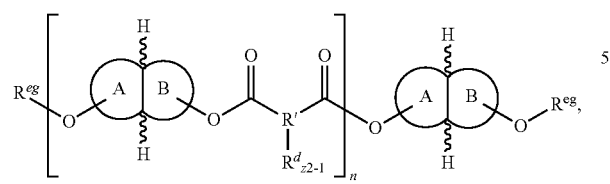

or a salt or ester thereof, wherein
at each occurrence, $R^{eg}$ is independently chosen from —H and —C(O)—R'($R^d$)$_{z2-1}$—C(O)—OH,
fused rings A and B are each independently chosen from substituted or unsubstituted ($C_5$-$C_{10}$)cycloalkyl and ($C_2$-$C_{10}$)heterocyclyl,
n is about 1 to about 100,000,
z2 is about 1 to about 100,
at each occurrence, R' is independently a substituted or unsubstituted ($C_2$-$C_{10}$)hydrocarbyl having valence z2+1, at each occurrence, $R^d$ is independently chosen from —H,

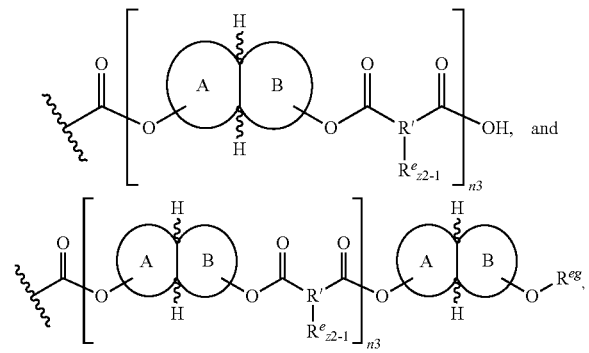

at each occurrence, n3 is independently about 0 to about 100,000,
at each occurrence, R is independently chosen from —H,

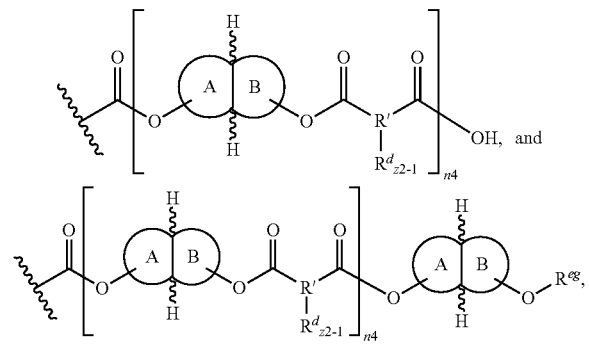

and
at each occurrence, n4 is independently about 0 to about 100,000.

Embodiment 51 provides the polymer of Embodiment 50, wherein z2 is about 1 to about 10.

Embodiment 52 provides the polymer of any one of Embodiments 50-51, wherein z2 is 1.

Embodiment 53 provides the polymer of any one of Embodiments 50-52, wherein the polymer has the structure

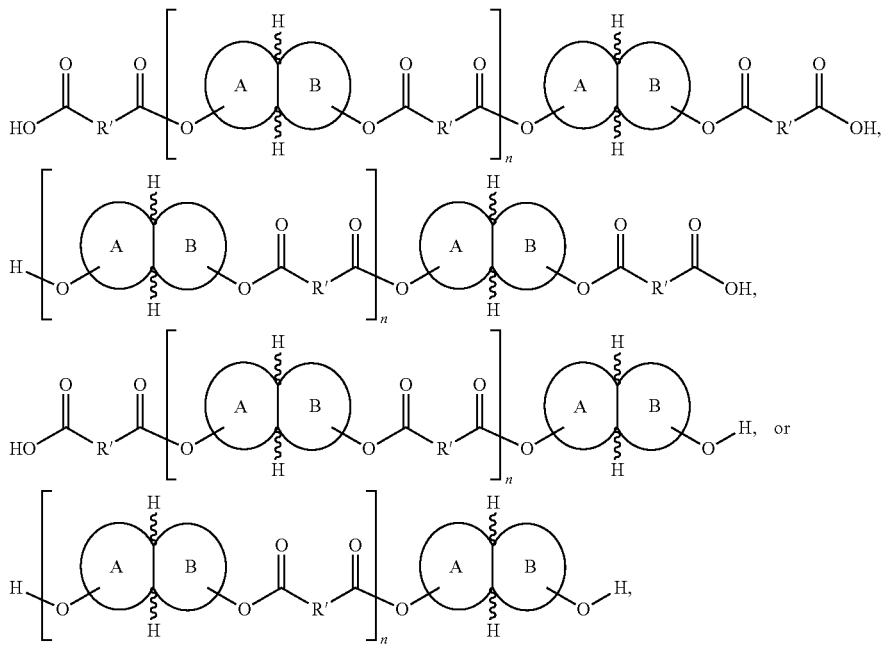

wherein at each occurrence, R' is independently substituted or unsubstituted $(C_2\text{-}C_{10})$hydrocarbylene.

Embodiment 54 provides the polymer of any one of Embodiments 50-53, wherein the polymer is at least one of a tackifier and a viscosifier.

Embodiment 55 provides the polymer of any one of Embodiments 50-54, wherein n is about 1 to about 100.

Embodiment 56 provides the polymer of any one of Embodiments 50-55, wherein n is about 1 to about 20.

Embodiment 57 provides the polymer of any one of Embodiments 50-56, wherein the polymer has a weight average molecular weight of about 500 to about 1,000,000.

Embodiment 58 provides the polymer of any one of Embodiments 50-57, wherein the polymer has a weight average molecular weight of about 1,000 to about 2,000.

Embodiment 59 provides the polymer of any one of Embodiments 50-58, wherein the polymer has a number average molecular weight of about 200 to about 1,000,000.

Embodiment 60 provides the polymer of any one of Embodiments 50-59, wherein the polymer has a number average molecular weight of about 500 to about 1,000.

Embodiment 61 provides the polymer of any one of Embodiments 50-60, wherein the polymer is an oligomer.

Embodiment 62 provides the polymer of any one of Embodiments 50-61, wherein the polymer has a glass transition temperature of about 20° C. to about 500° C.

Embodiment 63 provides the polymer of any one of Embodiments 50-62, wherein the polymer has a glass transition temperature of about 40 (C to about 90° C.

Embodiment 64 provides the polymer of any one of Embodiments 50-63, wherein the polymer has a tack of about 200 kPa to about 2000 kPa at one or more temperatures that are about 60° C. to about 120° C.

Embodiment 65 provides the polymer of any one of Embodiments 50-64, wherein the polymer has a tack of about 300 kPa to about 1500 kPa at one or more temperatures that are about 70° C. to about 100° C.

Embodiment 66 provides the polymer of any one of Embodiments 50-65, wherein the polymer has a tack of about 900 kPa to about 1500 kPa at one or more temperatures that are about 70 (C to about 90° C.

Embodiment 67 provides the polymer of any one of Embodiments 50-66, wherein the polymer has a tack of about 0 kPa to about 100 kPa at one or more temperatures that are about −40° C. to about 80° C.

Embodiment 68 provides the polymer of any one of Embodiments 50-67, wherein at each occurrence, R' is unsubstituted.

Embodiment 69 provides the polymer of any one of Embodiments 50-68, wherein at each occurrence, R' is independently chosen from $(C_1\text{-}C_5)$alkylene, $(C_5\text{-}C_{10})$aryl, and $(C_2\text{-}C_5)$alkenylene.

Embodiment 70 provides the polymer of any one of Embodiments 50-69, wherein
at each occurrence, R' is independently chosen from —CH$_2$—CH$_2$—, —CH$_2$—CH$_2$—CH$_2$—, o-phenylene, cis —CH═CH—, and trans —CH═CH—.

Embodiment 71 provides the polymer of any one of Embodiments 50-70, wherein rings A and B are unsubstituted with the exception of the one or more alcohol and ester substituents —OC(O)—R'—C(O)OH.

Embodiment 72 provides the polymer of any one of Embodiments 50-71, wherein one of the alcohol and ester substituents including R' is alpha to at least one carbon atom shared by rings A and B.

Embodiment 73 provides the polymer of any one of Embodiments 50-72, wherein rings A and B are the same size.

Embodiment 74 provides the polymer of any one of Embodiments 50-73, wherein rings A and B are 5-membered rings.

Embodiment 75 provides the polymer of any one of Embodiments 50-74, wherein at least one of rings A and B include at least one oxygen atom.

Embodiment 76 provides the polymer of any one of Embodiments 50-75, wherein each of rings A and B is a tetrahydrofuran ring, wherein each carbon atom shared by rings A and B has an oxygen atom alpha thereto.

Embodiment 77 provides the polymer of any one of Embodiments 50-76, wherein each of the alcohol and ester substituents —OC(O)—R'—C(O)OH are alpha to a different carbon atom shared by each of rings A and B.

Embodiment 78 provides the polymer of any one of Embodiments 50-77, wherein rings A and B form a ring system chosen from isosorbide, isomannide, and isoidide.

Embodiment 79 provides the polymer of any one of Embodiments 50-78, wherein rings A and B are unsubstituted.

Embodiment 80 provides the polymer of any one of Embodiments 50-79, wherein the polymer has the structure:

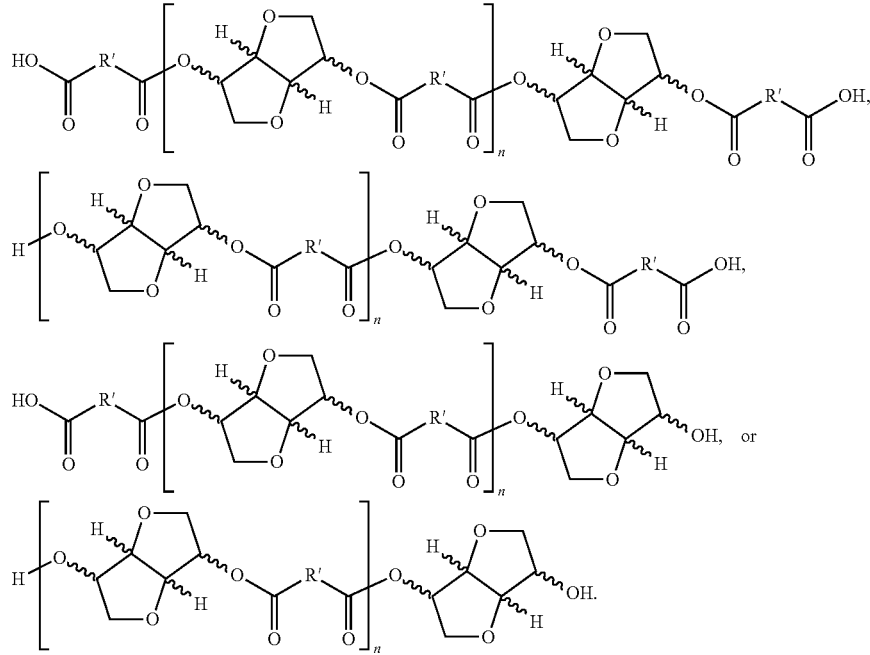

Embodiment 81 provides the polymer of any one of Embodiments 50-80, wherein the polymer has a structure that is chosen from:

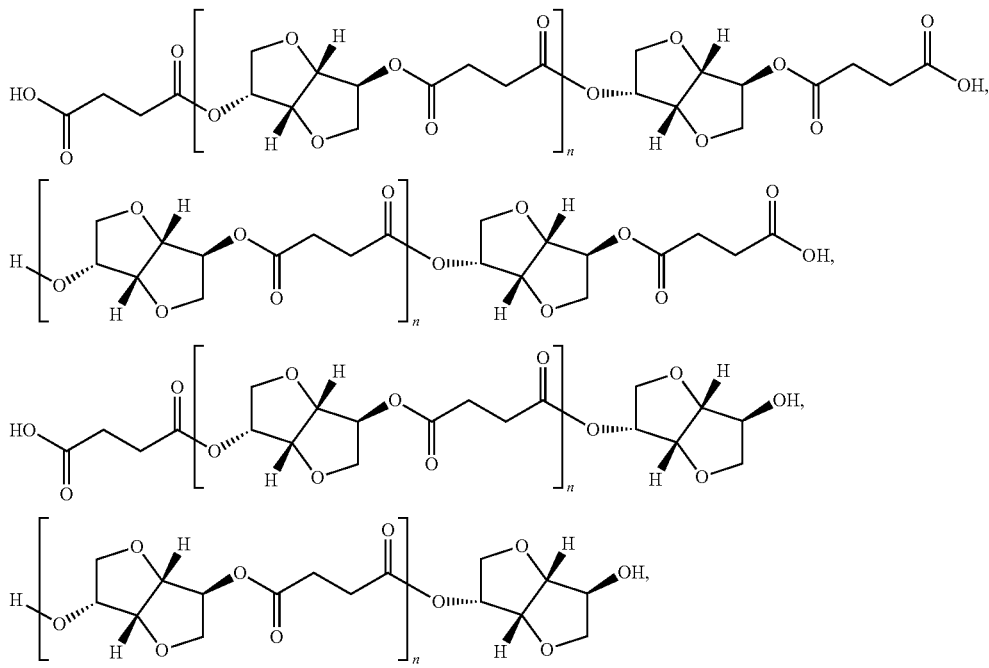

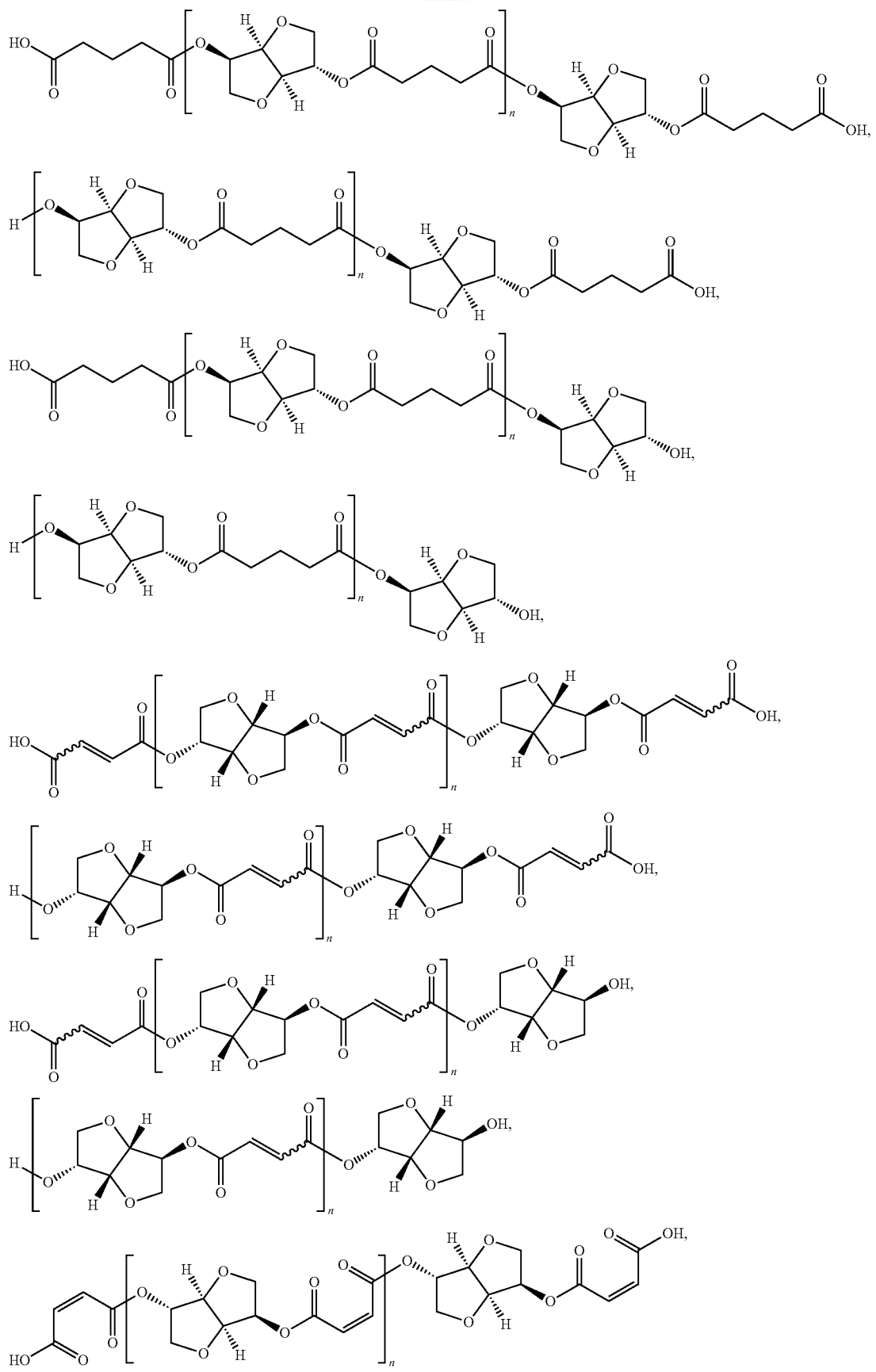

-continued
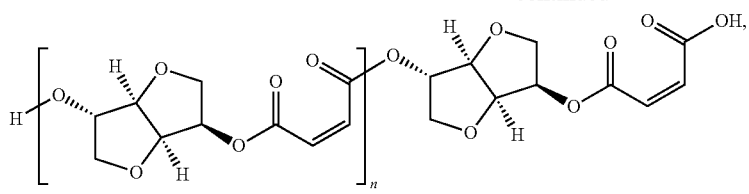
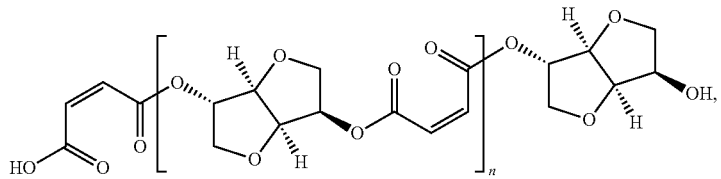
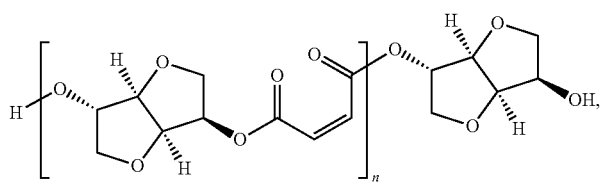
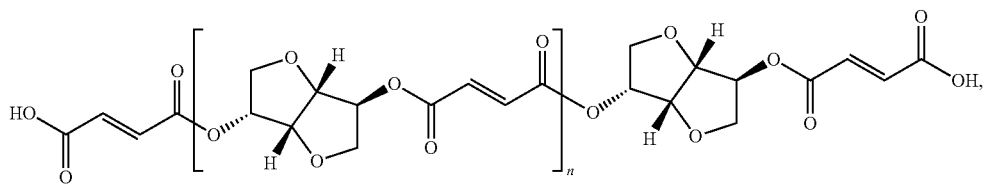
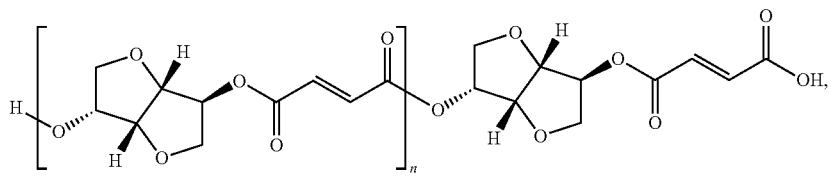
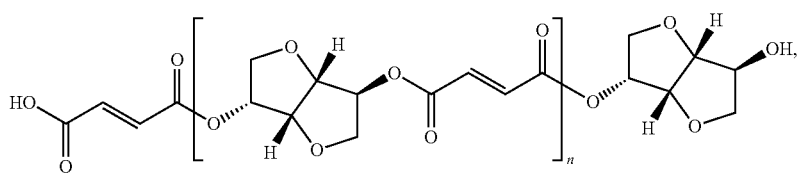
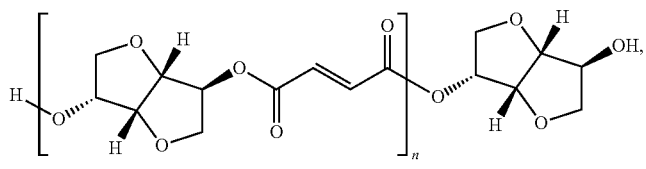
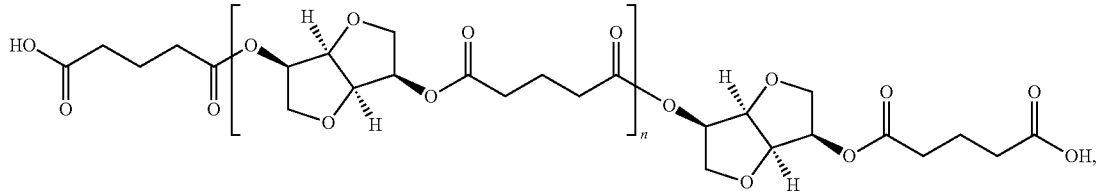
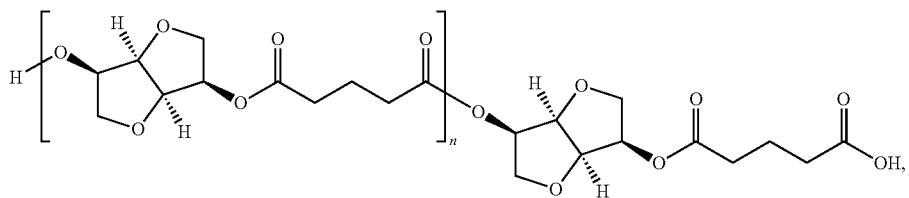

-continued
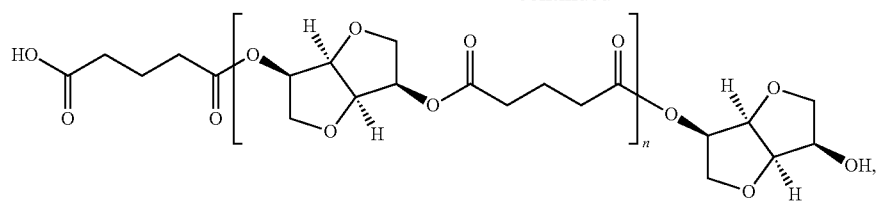
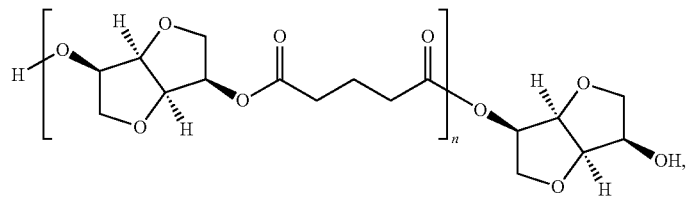
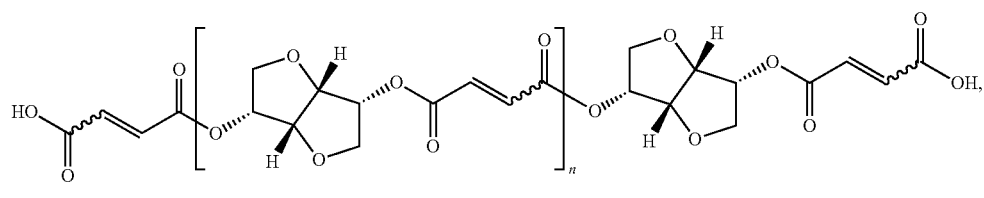
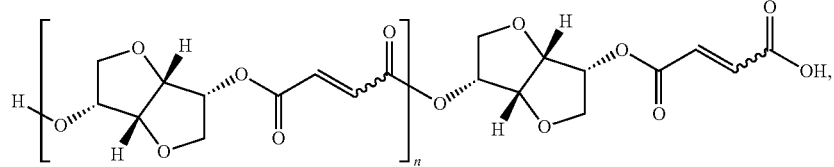
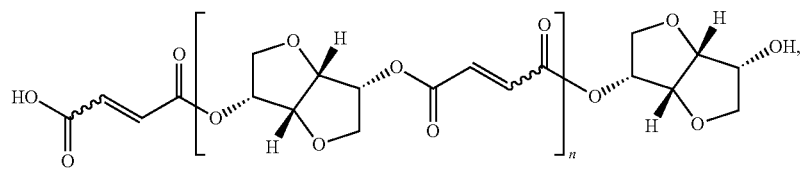
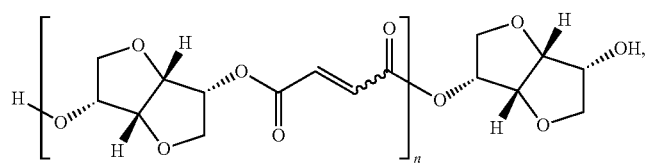
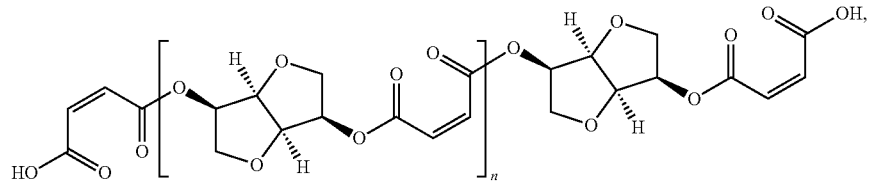
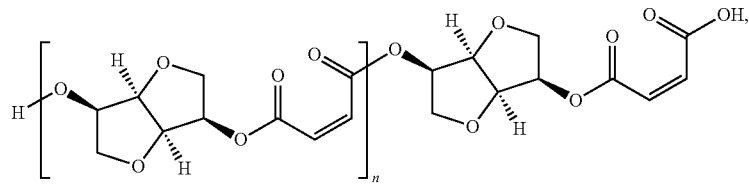
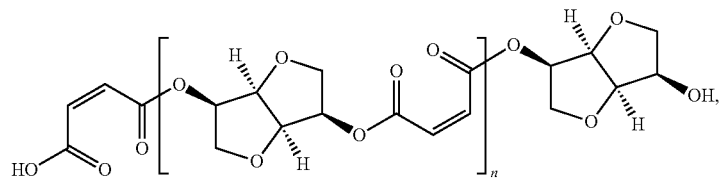

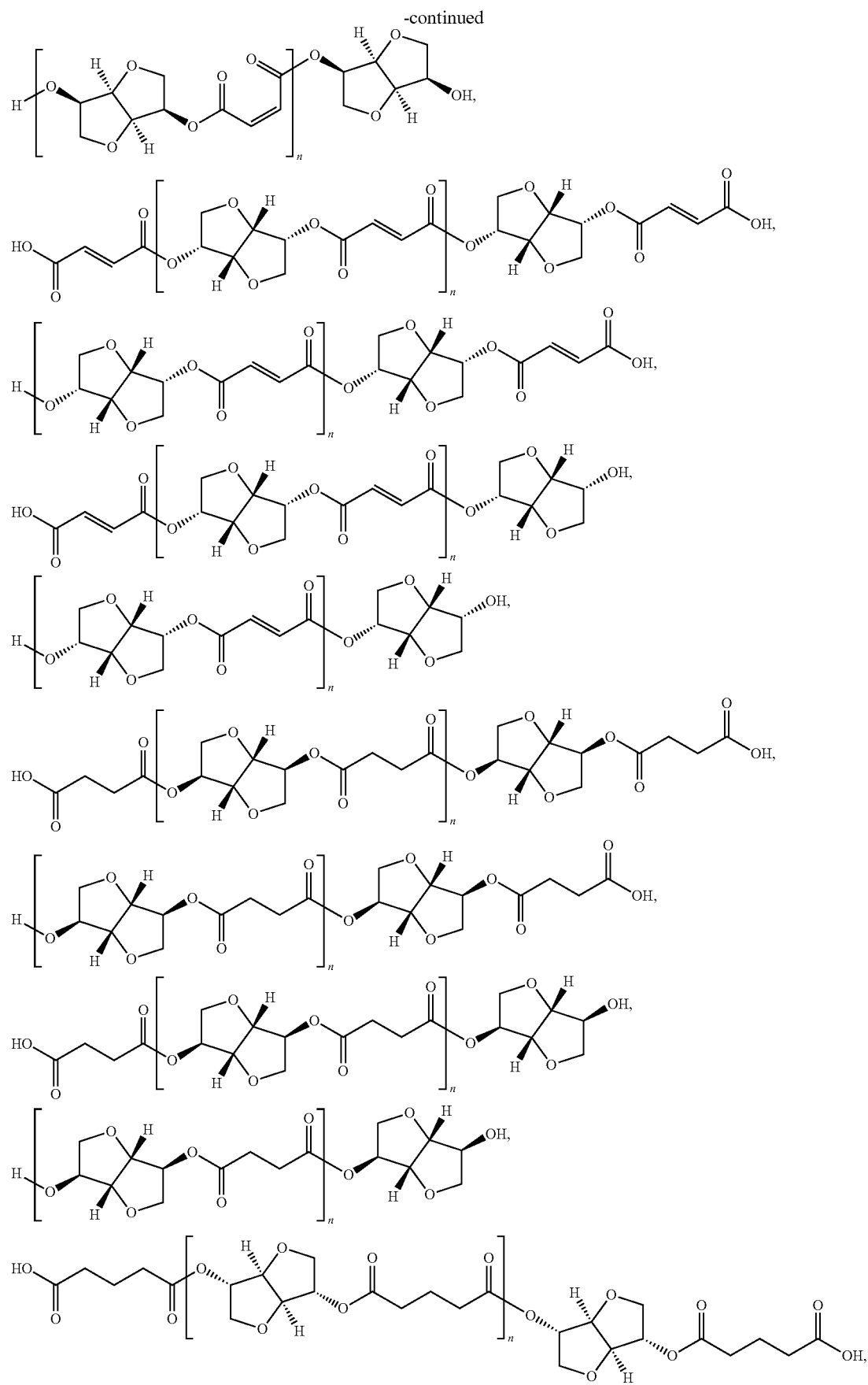

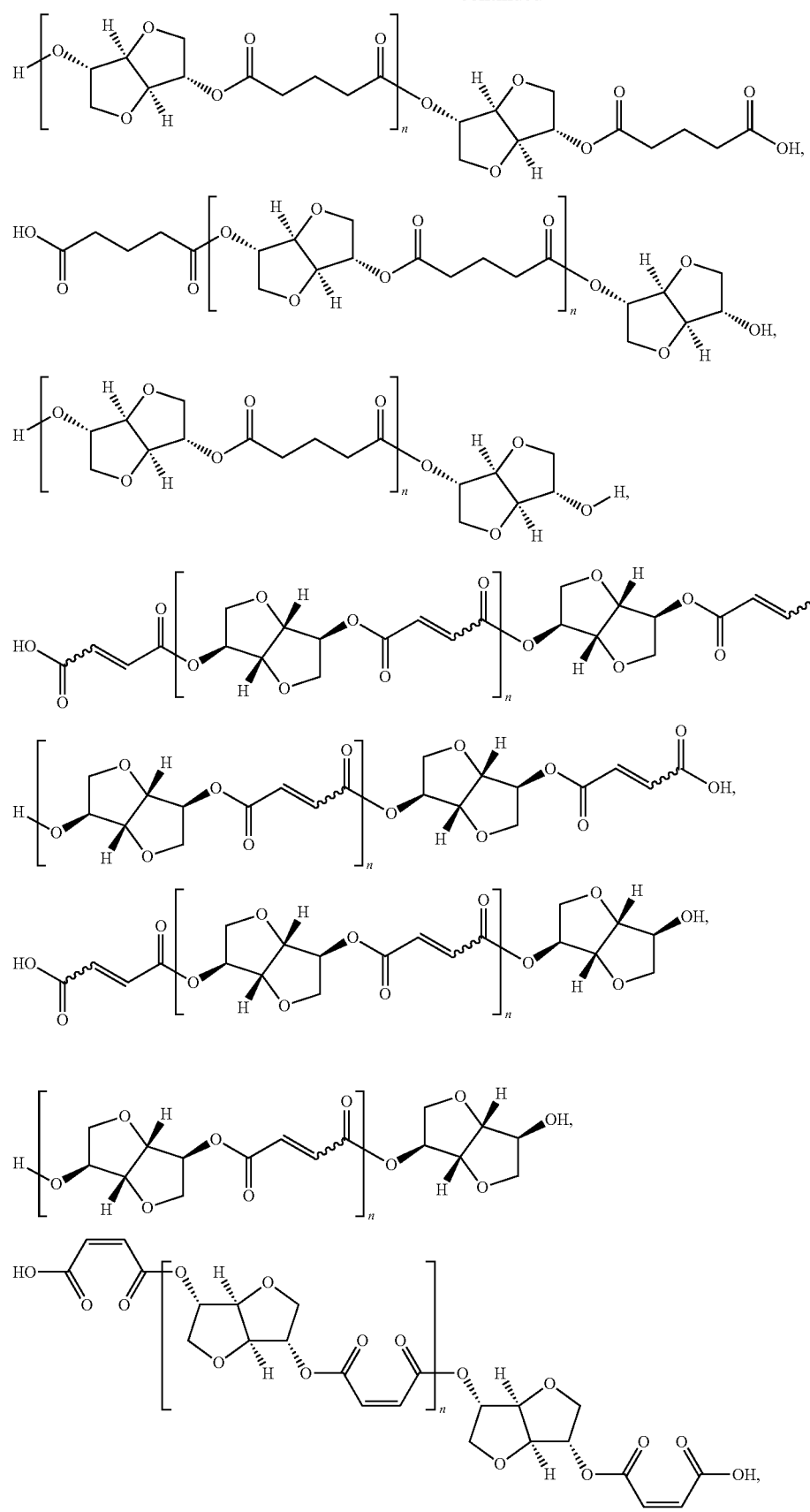

-continued
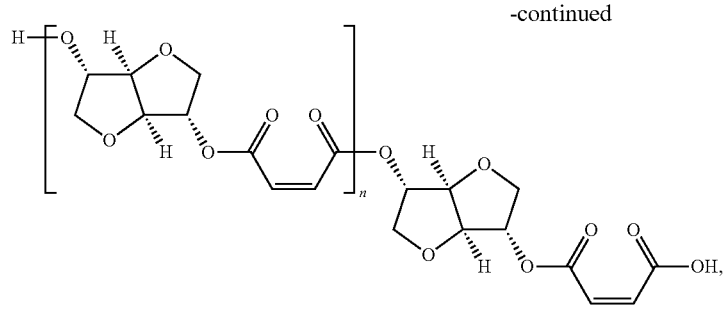
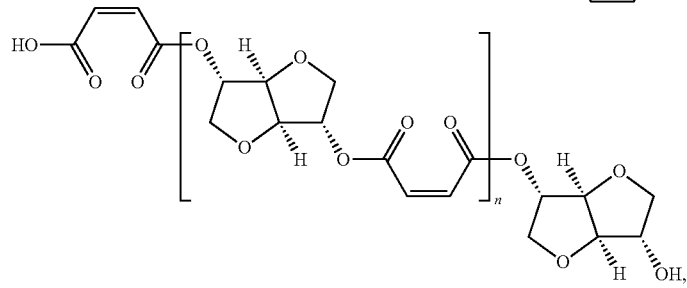
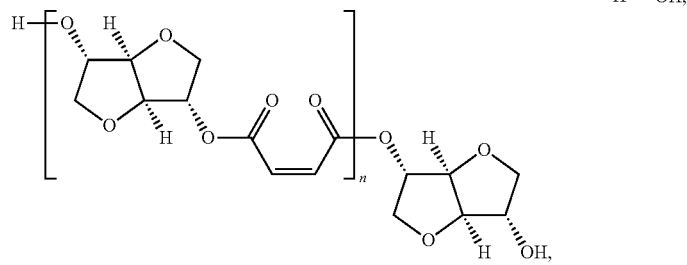
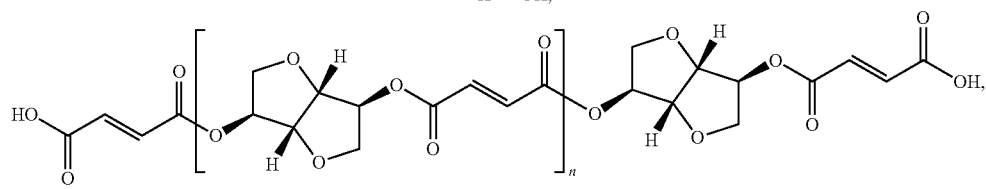
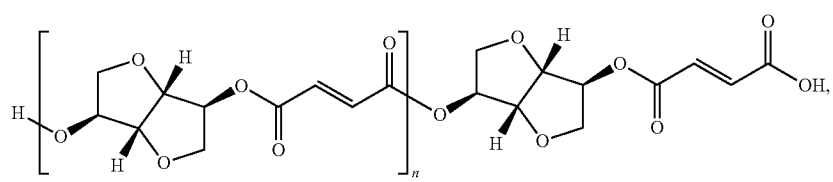
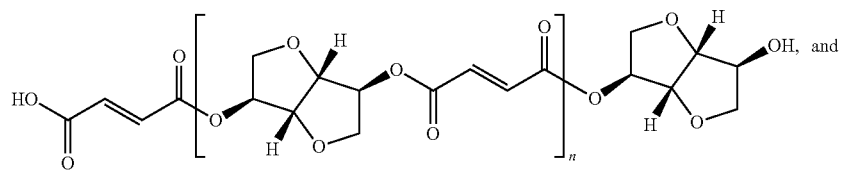
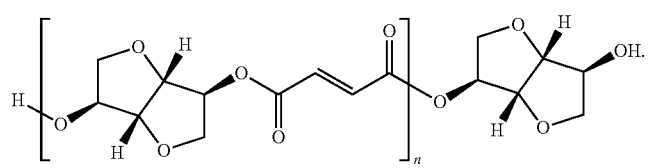
Embodiment 82 provides the polymer of any one of Embodiments 50-81, wherein the polymer has the structure:

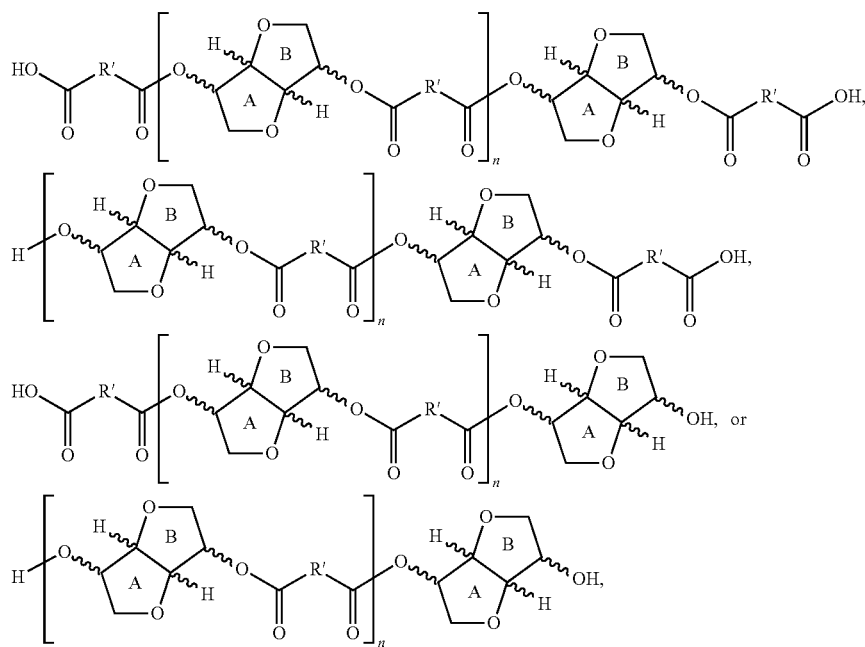

wherein rings A and B form a ring system chosen from isosorbide, isomannide, and isoidide, and at each occurrence, R' is independently selected from —CH$_2$—CH$_2$—, —CH$_2$—CH$_2$—CH$_2$—, o-phenylene, cis —CH═CH—, and trans —CH═CH—.

Embodiment 83 provides the polymer of Embodiment 82, wherein:

at least one R' is —CH$_2$—CH$_2$— and at least one R' is cis or trans —CH═CH—;

at least one R' is —CH$_2$—CH$_2$— and at least one R' is cis —CH═CH—;

at least one R' is —CH$_2$—CH$_2$— and at least one R' is trans —CH═CH—;

at least one R' is —CH$_2$—CH$_2$—CH$_2$— and at least one R' is cis or trans —CH═CH—;

at least one R' is —CH$_2$—CH$_2$—CH$_2$— and at least one R' is cis —CH═CH—;

at least one R' is —CH$_2$—CH$_2$—CH$_2$— and at least one R' is trans —CH═CH—; or at least one R' is cis —CH═CH— and at least one R' is trans —CH═CH—.

Embodiment 84 provides the polymer of any one of Embodiments 82-83, wherein:

at least one R' is —CH$_2$—CH$_2$—, at least one R' is cis or trans —CH═CH—, and wherein the carboxylic acid has the structure:

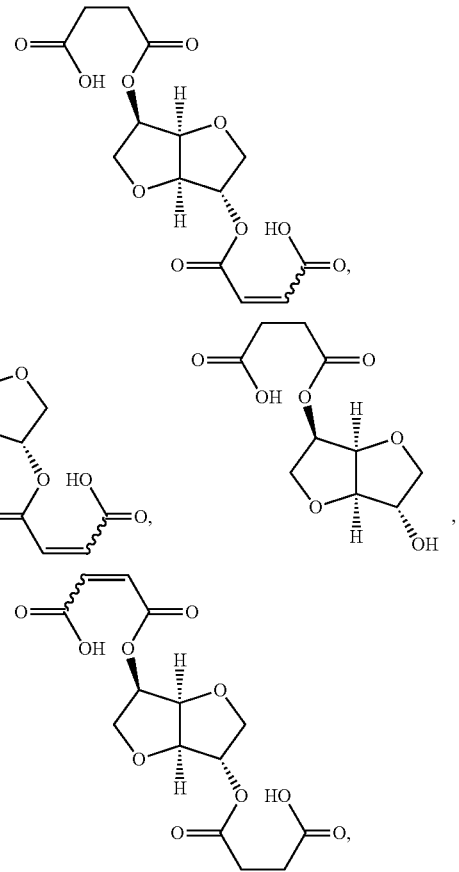

-continued
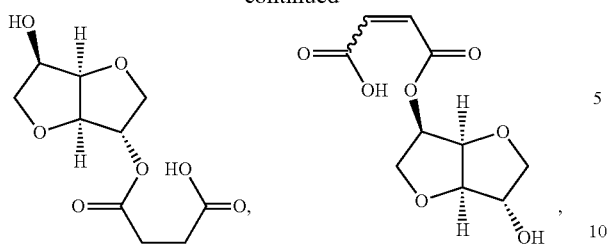
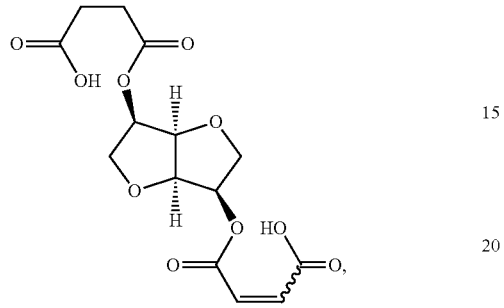
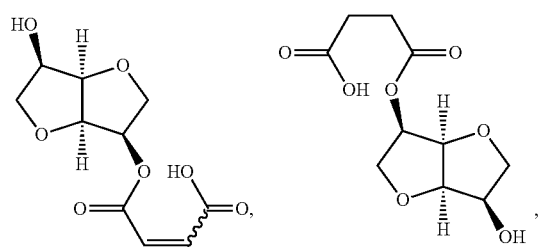
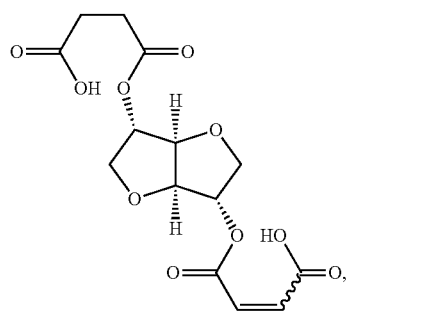
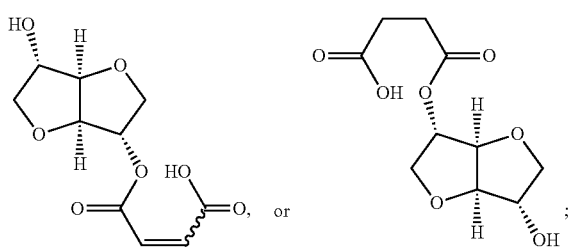
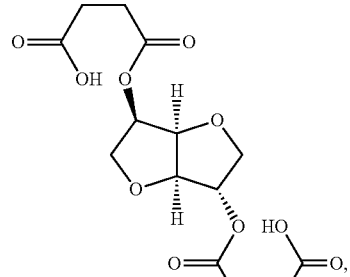
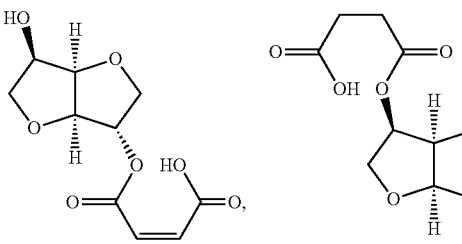
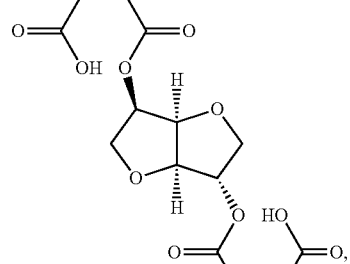
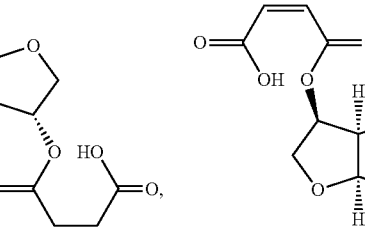
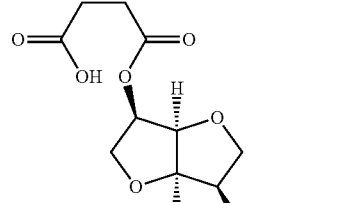
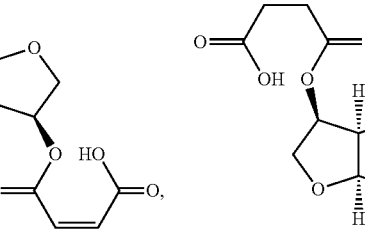
at least one R' is —CH$_2$—CH$_2$—, at least one R' is cis —CH=CH—, and wherein the carboxylic acid has the structure:

167
-continued
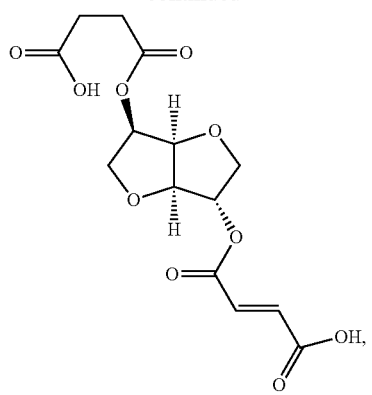
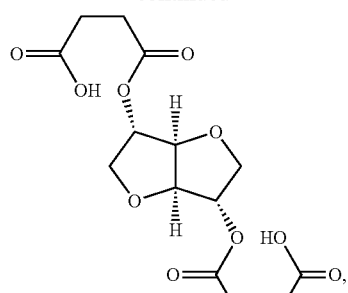
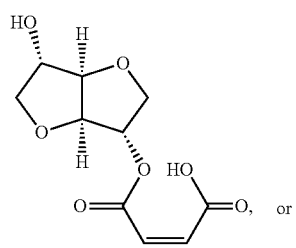 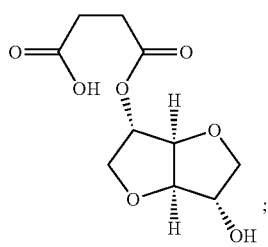
at least one R' is —CH₂—CH₂—, at least one R' is trans —CH=CH—, and wherein the carboxylic acid has the structure:
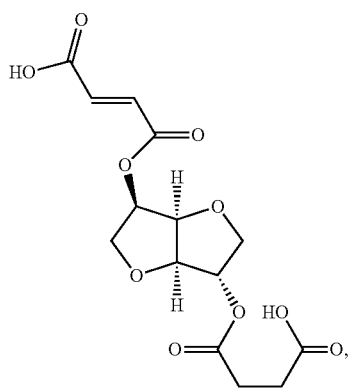
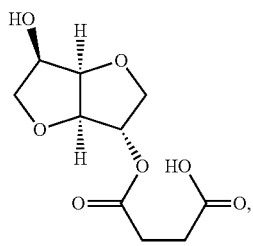 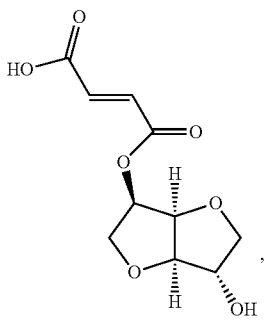 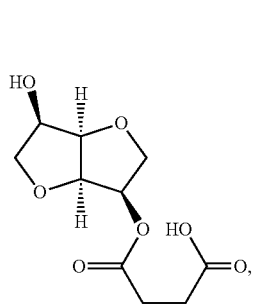 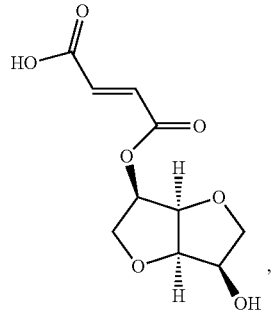

169
-continued
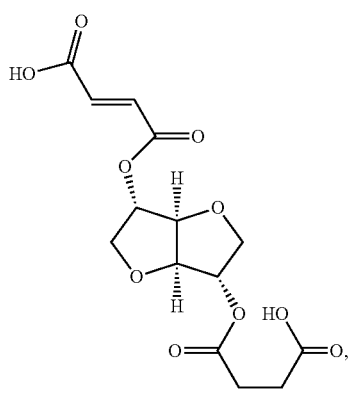
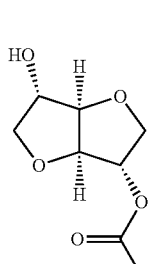 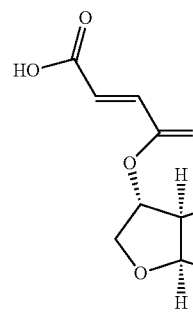
or
at least one R' is cis —CH═CH—, at least one R' is trans —CH═CH—, and wherein the carboxylic acid has the structure:
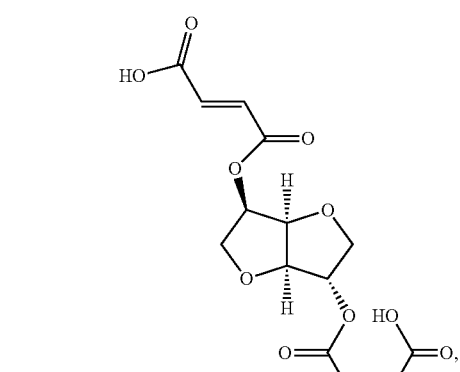
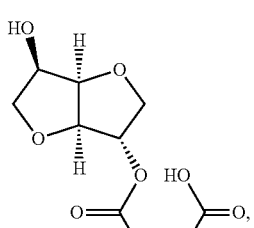 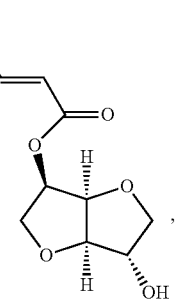
170
-continued
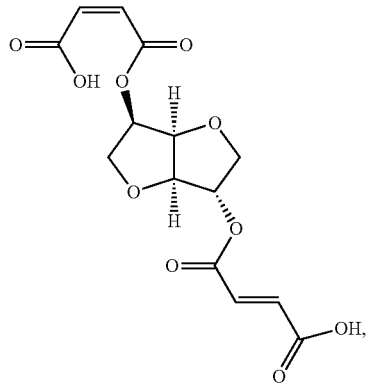
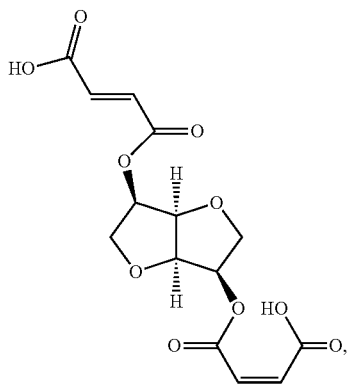
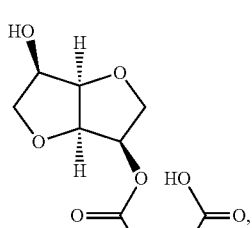 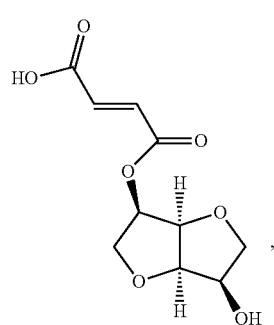

-continued
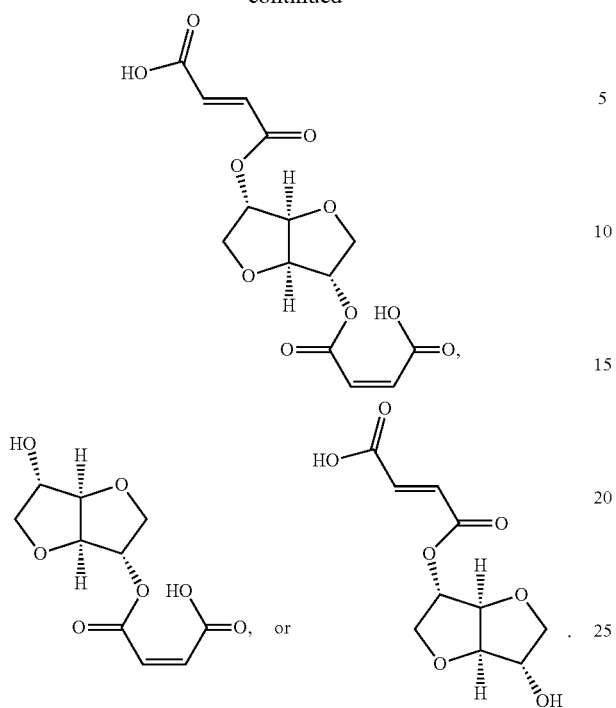
Embodiment 85 provides the polymer of any one of Embodiments 50-84, wherein the carboxylic acid is chosen from:
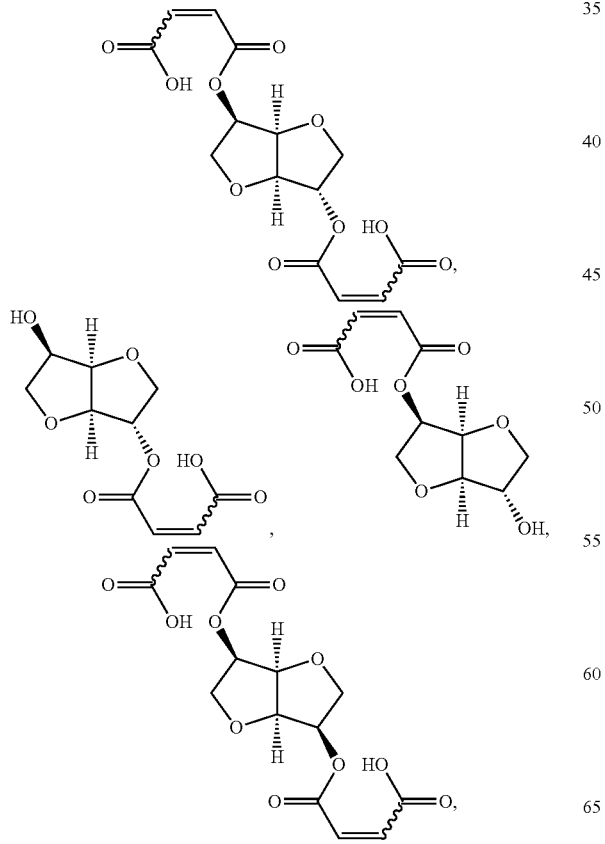
-continued
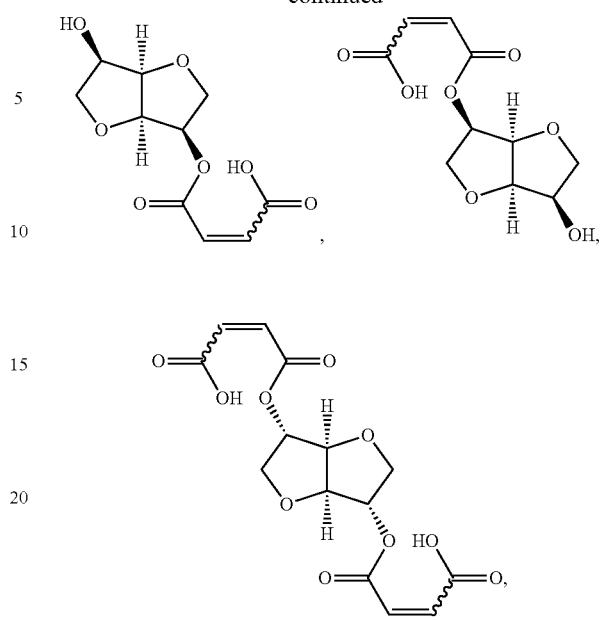
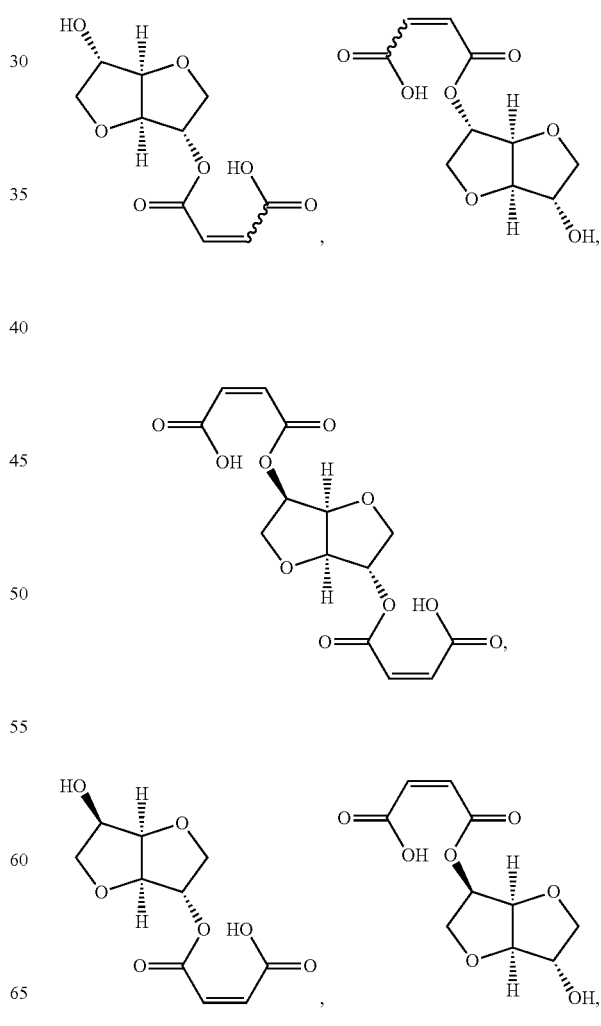

173
-continued
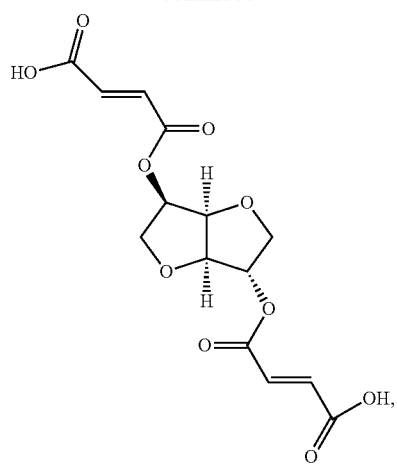
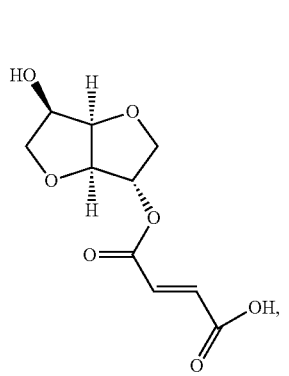 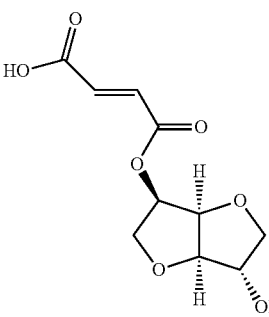
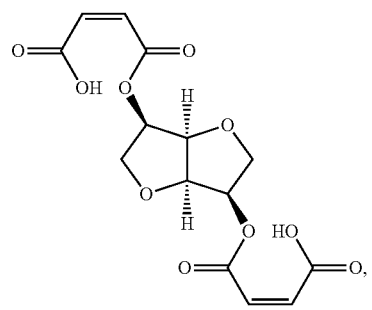
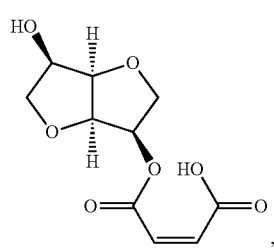 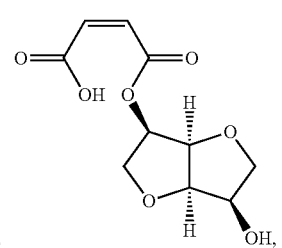
174
-continued
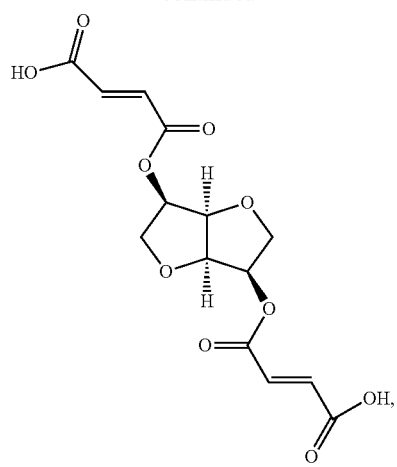
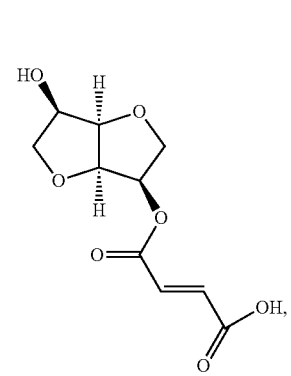 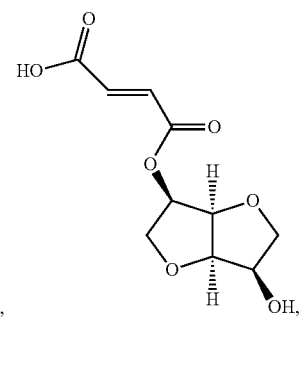
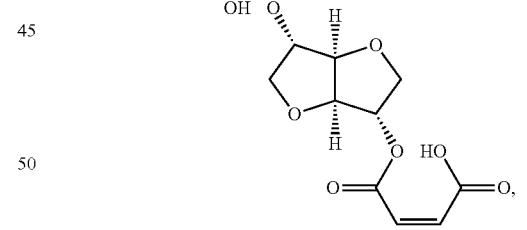
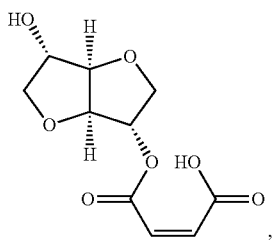 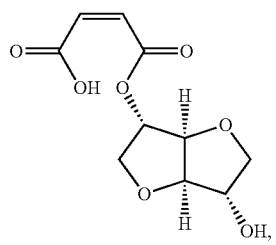

175
-continued
176
-continued
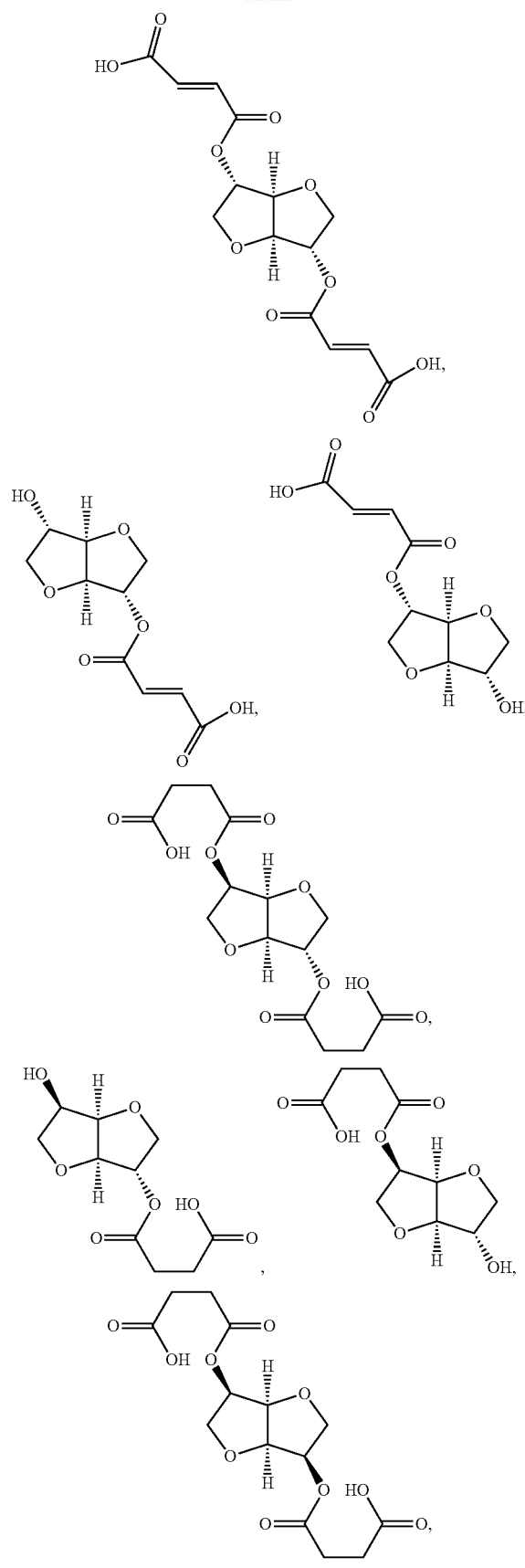
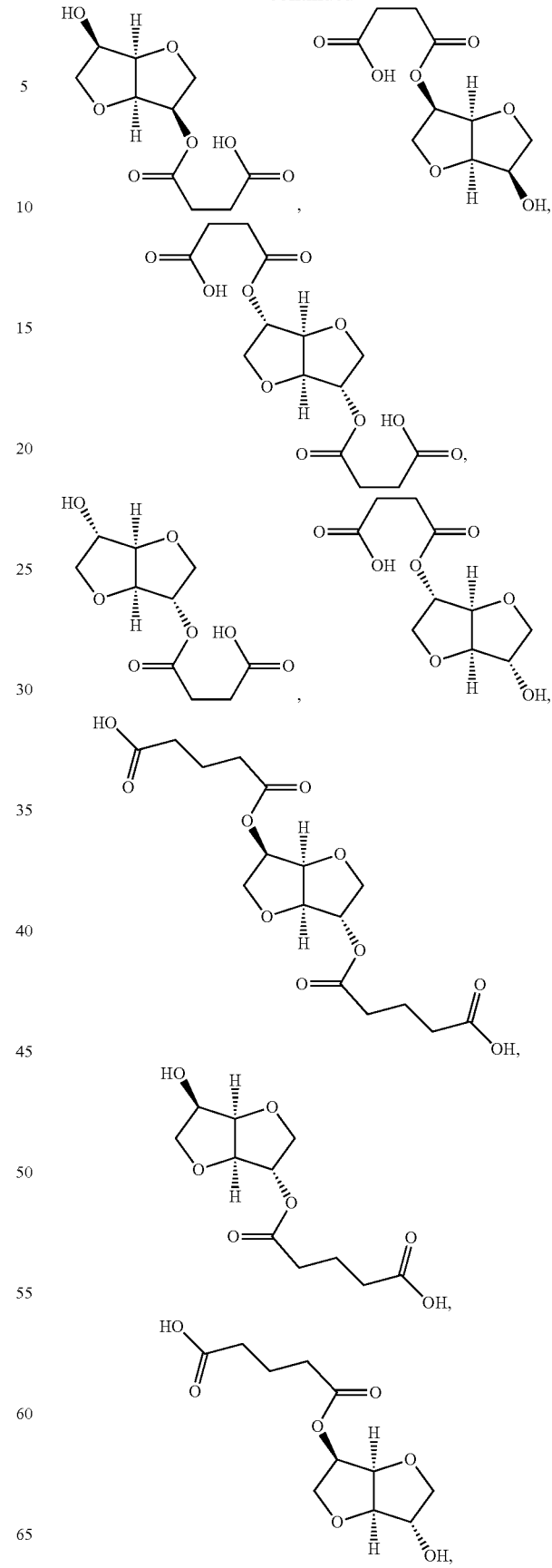

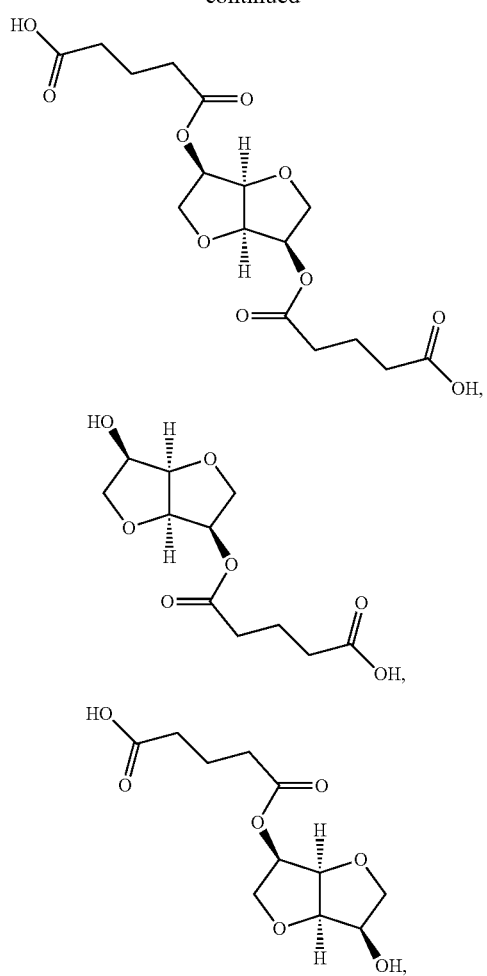
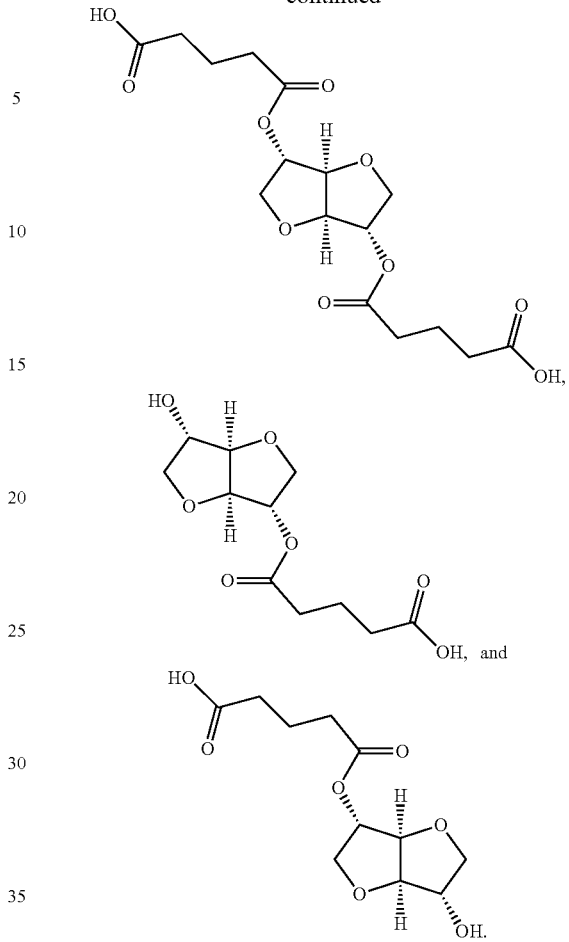
Embodiment 86 provides the polymer of any one of Embodiments 50-85, wherein the polymer has the structure:
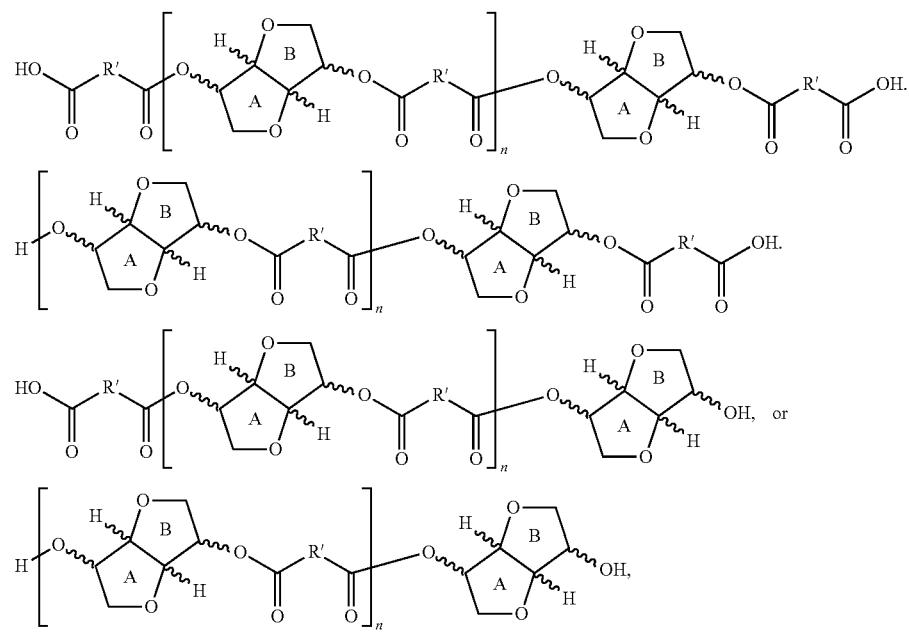

wherein
rings A and B form a ring system chosen from isosorbide, isomannide, and isoidide, and
at each occurrence, R' is independently selected from —$CH_2$—$CH_2$—, —$CH_2$—$CH_2$—$CH_2$—, cis —CH=CH—, and trans —CH=CH—.

Embodiment 87 provides the polymer of any one of Embodiments 50-86, wherein no R' is p-phenylene.

Embodiment 88 provides the polymer of any one of Embodiments 50-87, wherein at least one R' is p-phenylene and at least one R' is not p-phenylene.

Embodiment 89 provides the polymer of any one of Embodiments 50-88, wherein no R' is trans —CH=CH—.

Embodiment 90 provides the polymer of any one of Embodiments 50-89, wherein at least one R' is trans —CH=CH— and at least one R' is not trans —CH=CH—.

Embodiment 91 provides the polymer of any one of Embodiments 50-90, wherein no R' is cis —CH=CH—.

Embodiment 92 provides the polymer of any one of Embodiments 50-91, wherein at least one R' is cis —CH=CH— and at least one R' is not cis —CH=CH—.

Embodiment 93 provides a tackifier composition comprising the polymer of any one of Embodiments 50-92.

Embodiment 94 provides a viscosified composition comprising the polymer of any one of Embodiments 50-92.

Embodiment 95 provides a polymer having the structure:

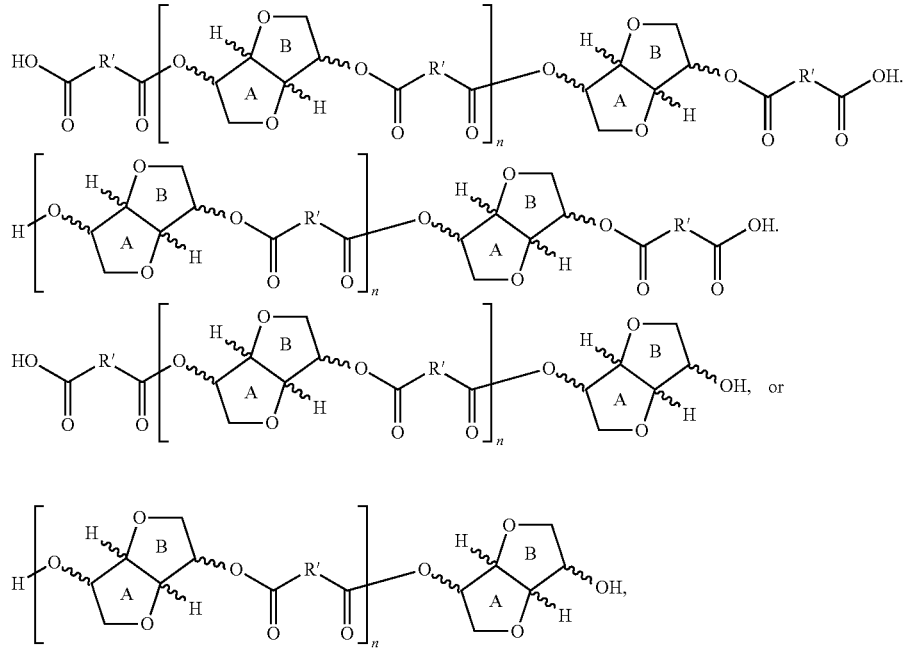

or a salt thereof, wherein
rings A and B form a ring system chosen from isosorbide, isomannide, and isoidide,
at each occurrence, R' is independently selected from —$CH_2$—$CH_2$—, —$CH_2$—$CH_2$—$CH_2$—, o-phenylene, cis —CH=CH—, and trans —CH=CH—, and
n is about 1 to about 100,000.

Embodiment 96 provides the polymer of Embodiment 95, wherein if at least one R' is trans —CH=CH— then at least one R' is not trans —CH=CH—.

Embodiment 96 provides the method, polymer, or composition of any one or any combination of Embodiments 1-95 optionally configured such that all elements or options recited are available to use or select from.

What is claimed is:
1. A polymer having the structure:

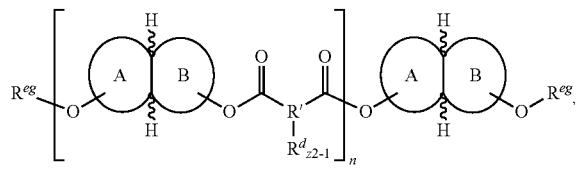

or a salt or ester thereof, wherein
at each occurrence, $R^{eg}$ is independently chosen from —H and —C(O)—R'($R^d$)$_{z2-1}$—C(O)—OH,
fused rings A and B are each independently chosen from substituted or unsubstituted ($C_5$-$C_{10}$)cycloalkyl and ($C_2$-$C_{10}$)heterocyclyl,
n is about 1 to about 100,000,
z2 is about 1 to about 100,
at each occurrence, R' is independently a substituted or unsubstituted ($C_2$-$C_{10}$)hydrocarbyl having valence z2+1,
at each occurrence, $R^d$ is independently chosen from —H,

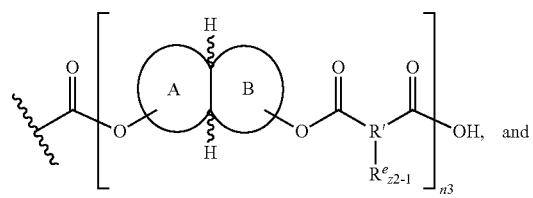

-continued

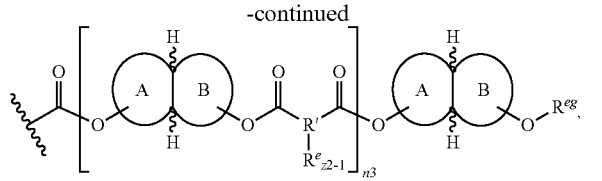

at each occurrence, n3 is independently about 0 to about 100,000,
at each occurrence, $R^e$ is independently chosen from
—H,

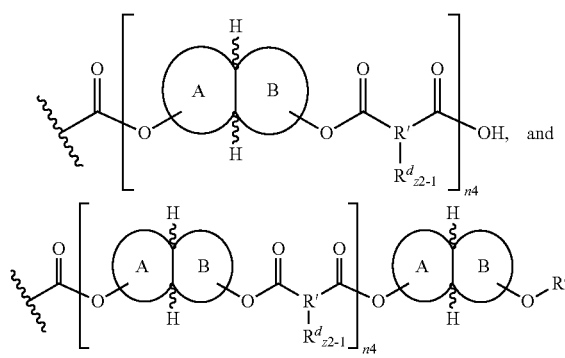

and
at each occurrence, n4 is independently about 0 to about 100,000;
wherein at least one $R^d$ in the polymer is not —H.

2. The polymer of claim 1, wherein z2 is about 1 to about 10.

3. The polymer of claim 1, wherein the polymer has the structure

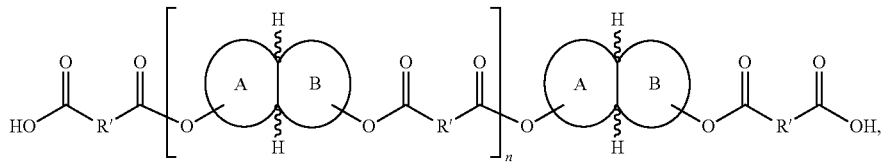

wherein at each occurrence, R' is independently $(C_2$-$C_{10})$ hydrocarby substituted with $R^d_{z2-1}$.

4. The polymer of claim 1, wherein the polymer is at least one of a tackifier and a viscosifier.

5. The polymer of claim 1, wherein n is about 1 to about 100.

6. The polymer of claim 1, wherein the polymer has a number average molecular weight of about 200 to about 1,000,000.

7. The polymer of claim 1, wherein the polymer has a glass transition temperature of about 20° C. to about 500° C.

8. The polymer of claim 1, wherein the polymer has a tack of about 200 kPa to about 2000 kPa at one or more temperatures that are about 60° C. to about 120° C.

9. The polymer of claim 1, wherein at each occurrence, R' is substituted with $R^d_{z2-1}$ and is independently chosen from $(C_1$-$C_5)$alkylene, $(C_5$-$C_{10})$alkenylene, and $(C_2$-$C_5)$alkenylene, wherein at least one R' is $(C_1$-$C_5)$alkylene.

10. The polymer of claim 1, wherein at each occurrence, R' is substituted with $R^d_{z2-1}$ and is independently chosen from ethylene, propylene, o-phenylene, cis ethenylene, and trans ethenylene, wherein at least one R' is independently chosen from ethylene and propylene.

11. The polymer of claim 1, wherein rings A and B form a ring system chosen from isosorbide, isomannide, and isoidide.

12. The polymer of claim 1, wherein the polymer has the structure:

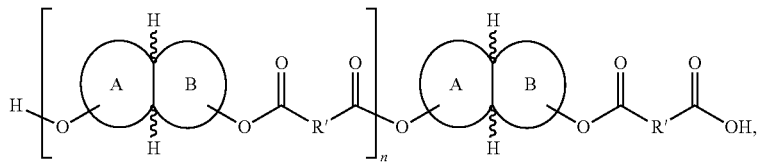

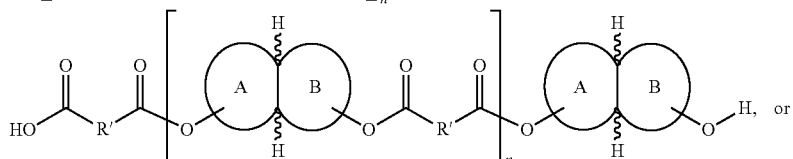

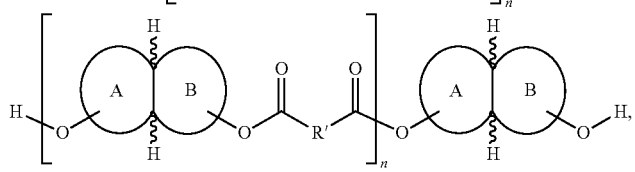

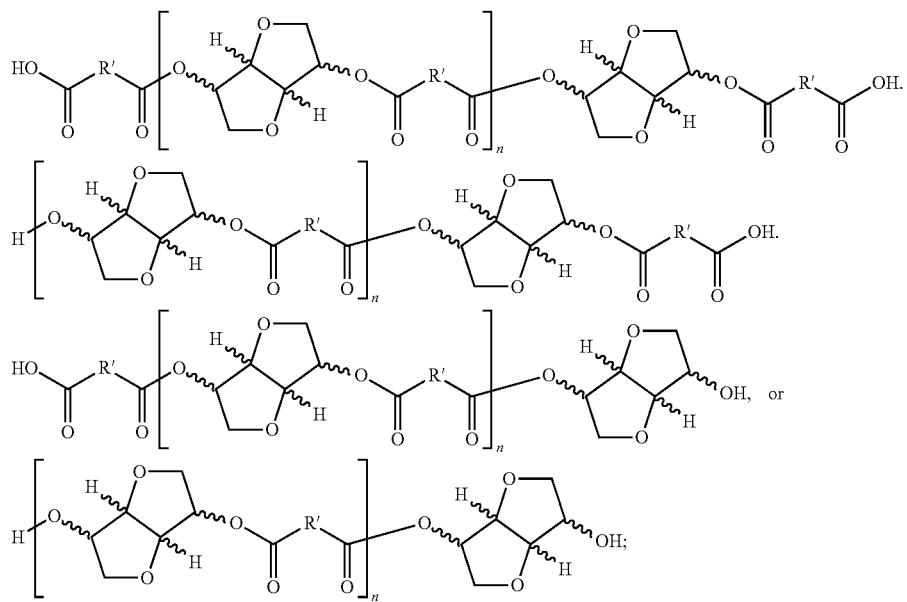

wherein R' is substituted with $R^d_{z2\text{-}1}$.

13. The polymer of claim 1, wherein the polymer has the structure:

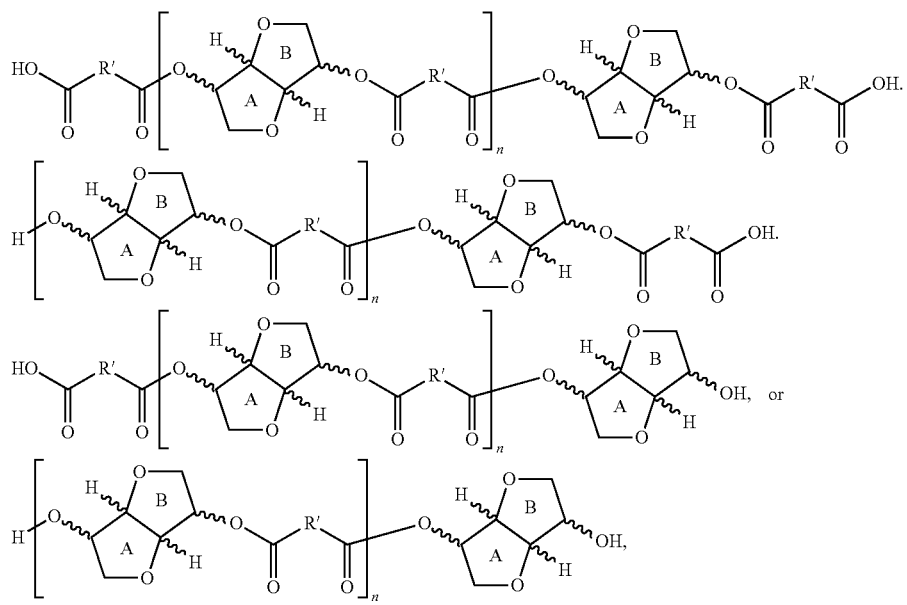

wherein
rings A and B form a ring system chosen from isosorbide, isomannide, and isoidide, and
at each occurrence, R' is substituted with $R^d_{z2\text{-}1}$ and is independently selected from ethylene, propylene, o-phenylene, cis ethenylene, and trans ethenylene.

14. The polymer of claim 13, wherein at least two R' are present, and:
at least one R' is ethylene and at least one R' is cis or trans ethenylene;
at least one R' is ethylene and at least one R' is cis ethenylene;
at least one R' is ethylene and at least one R' is trans ethenylene;
at least one R' is propylene and at least one R' is cis or trans ethenylene;
at least one R' is propylene and at least one R' is cis ethenylene;
at least one R' is propylene and at least one R' is trans ethenylene; or
at least one R' is cis ethenylene and at least one R' is trans ethenylene.

15. The polymer of claim 1, wherein the polymer has the structure:

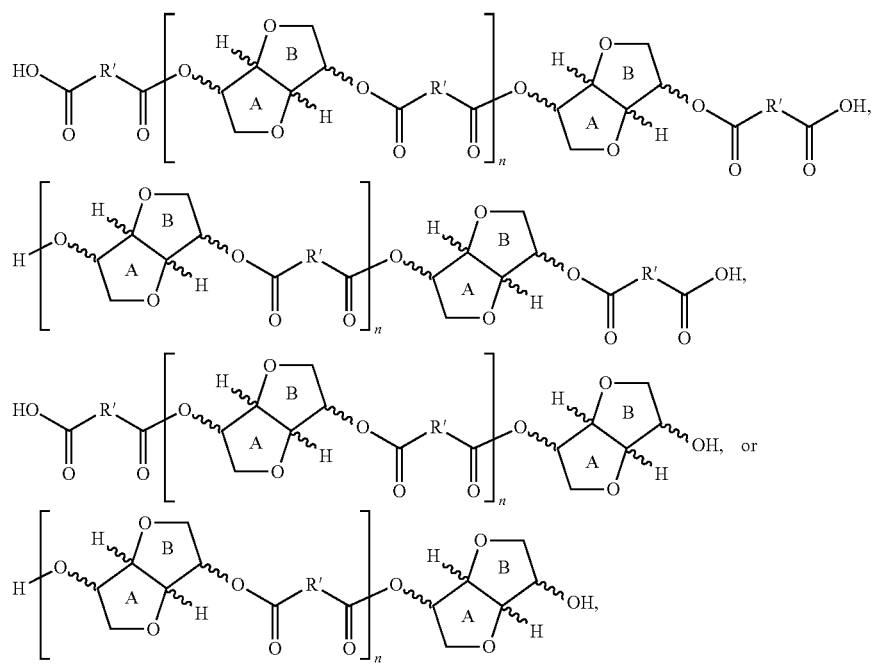
wherein
rings A and B form a ring system chosen from isosorbide, isomannide, and isoidide, and
at each occurrence, R' is substituted with $R^d_{z2-1}$ and is independently selected from ethylene, propylene, cis ethenylene, and trans ethenylene.
* * * * *

UNITED STATES PATENT AND TRADEMARK OFFICE
CERTIFICATE OF CORRECTION

PATENT NO. : 10,392,471 B2
APPLICATION NO. : 15/153234
DATED : August 27, 2019
INVENTOR(S) : Chen et al.

Page 1 of 2

It is certified that error appears in the above-identified patent and that said Letters Patent is hereby corrected as shown below:

On the Title Page

On page 2, in Column 2, Item (56), under "Other Publications", Line 38, delete "Poly(butyiene" and insert --Poly(butylene-- therefor In the Specification Column 1, Line 14, delete "The" and insert --This-- therefor Column 8, Line 66, after "n-hexyl", insert --,--

Column 14, Line 29, delete "-(O-($C_2$-$C_3$)alkylene)$_{y2}$-." and insert -- -(O-($C_2$-$C_3$)alkylene)$_{y1}$-.-- therefor Column 14, Line 29, delete "Ra" and insert --$R^a$-- therefor Column 95, Line 43, delete "$R_{eg}$," and insert --$R^{eg}$,-- therefor Column 96, Line 32, delete "$R^{e9}$," and insert --$R^{eg}$,-- therefor Column 101, Line 9, after "of", insert --any one of--

Column 116, Line 13, delete "Embodiment" and insert --Embodiments-- therefor

Column 146, Line 43, delete "R" and insert --$R^e$-- therefor

Column 179, Line 55, after "salt", insert --or ester--

Signed and Sealed this
Seventh Day of July, 2020

Andrei Iancu
*Director of the United States Patent and Trademark Office*

CERTIFICATE OF CORRECTION (continued)
U.S. Pat. No. 10,392,471 B2

In the Claims

Column 180, Line 17, in Claim 1, delete "$R^{eg}$is" and insert --$R^{eg}$ is-- therefor Column 180, Line 18, in Claim 1, delete "-C(O)-R'($R^d$),$_{z2-1}$-C(O)-OH," and insert -- -C(O)-R'($R^d$)$_{z2-1}$-C(O)-OH,-- therefor Column 180, Lines 20-21, in Claim 1, delete "($C_5$-$C_{10}$)cyccloalkyl" and insert --($C_5$-$C_{10}$)cycloalkyl-- therefor Column 181, Line 37, in Claim 3, after "structure", insert --:--

Column 182, Line 2, in Claim 3, delete "hydrocarby" and insert --hydrocarbylene-- therefor Column 182, Line 21, in Claim 9, delete "($C_5$-$C_{10}$)alkenylene," and insert --($C_5$-$C_{10}$)arylene,-- therefor Column 182, Line 26, in Claim 10, delete "$R^d_{z2-1}$and" and insert --$R^d_{z2-1}$ and-- therefor Column 183, Line 59, in Claim 13, delete "$R^d_{z2-1}$and" and insert --$R^d_{z2-1}$ and-- therefor Column 185, Line 32, in Claim 15, delete "$R^d_{z2-1}$and" and insert --$R^d_{z2-1}$ and-- therefor